US012743824B2

(12) United States Patent
Dvorak

(10) Patent No.: US 12,743,824 B2
(45) Date of Patent: Sep. 22, 2026

(54) METHOD AND SYSTEM FOR IMPROVED VISUALIZATION OF CHARTS IN SPREADSHEETS

(71) Applicant: Adaptam Inc., Palo Alto, CA (US)

(72) Inventor: Robert E. Dvorak, Portola Valley, CA (US)

(73) Assignee: Adaptam Inc., Palo Alto, CA (US)

( * ) Notice: Subject to any disclaimer, the term of this patent is extended or adjusted under 35 U.S.C. 154(b) by 0 days.

(21) Appl. No.: 18/074,301

(22) Filed: Dec. 2, 2022

(65) Prior Publication Data

US 2023/0177751 A1 Jun. 8, 2023

Related U.S. Application Data

(60) Provisional application No. 63/285,945, filed on Dec. 3, 2021.

(51) Int. Cl.

| | |
|---|---|
| ***G06T 11/26*** | (2026.01) |
| ***G06F 3/0483*** | (2013.01) |
| ***G06F 3/0486*** | (2013.01) |
| ***G06F 40/18*** | (2020.01) |

(52) U.S. Cl.

CPC ............ *G06T 11/26* (2026.01); *G06F 3/0483* (2013.01); *G06F 3/0486* (2013.01); *G06F 40/18* (2020.01); *G06T 2200/24* (2013.01)

(58) Field of Classification Search

CPC . G06T 11/206; G06T 2200/24; G06F 3/0483; G06F 3/0486; G06F 40/18; G06F 3/0482; G06F 3/04842

See application file for complete search history.

(56) References Cited

U.S. PATENT DOCUMENTS

| | | | | |
|---|---|---|---|---|
| 5,535,324 A | | 7/1996 | Alvarez et al. | |
| 6,529,217 B1 * | | 3/2003 | Maguire, III ........... | G06F 40/18 715/765 |
| 8,321,781 B2 * | | 11/2012 | Tolle ..................... | G06F 16/904 715/769 |
| 8,527,909 B1 * | | 9/2013 | Mullany ............ | G06F 3/04883 345/173 |

(Continued)

OTHER PUBLICATIONS

U.S. Appl. No. 17/384,404, filed Jul. 23, 2021 US 202220027555, Jan. 27, 20223, Pending.

*Primary Examiner* — Kenny Nguyen

(74) *Attorney, Agent, or Firm* — HAYNES BEFFEL & WOLFELD LLP; Ernest J. Beffel, Jr.

(57) ABSTRACT

The technology disclosed improves the creation, modification and presentation of spreadsheet charts. The technology makes creating charts from non-contiguous data, i.e., data requiring more than one non-contiguous ranges, easy and intuitive for users. Instead of placing the inputs in pop-ups, drop-downs and/or sidebars employing ribbons and other steps, the inputs are placed on the desired chart proximate to where the populated data will display. The inputs accept typed text, spreadsheet cells and provide a selector for cell selection. Embodiments will pre-populate title locations accepting similar inputs, add color for easier information identification and provide user sidebar or other input options. Error and warning messages are provided to help users generate the chart they desire.

14 Claims, 122 Drawing Sheets
(96 of 122 Drawing Sheet(s) Filed in Color)

(56) References Cited

U.S. PATENT DOCUMENTS 8,972,421 B2 * 3/2015 Vishnubhatta ........ G06F 16/284 707/754
9,727,550 B2 * 8/2017 He ...................... G06F 3/04842
10,606,855 B2 * 3/2020 Pattabhiraman ...... G06F 16/284
10,620,790 B2 * 4/2020 Ellis ...................... G06F 16/248
11,294,924 B1 * 4/2022 Talbot ................. G06F 3/04842
11,748,634 B1 * 9/2023 Kulkarni ............. G06F 18/2148 707/722
2008/0195930 A1 * 8/2008 Tolle ....................... G06F 40/18 715/227
2009/0112922 A1 * 4/2009 Barinaga ............. G06F 16/9577
2009/0235152 A1 9/2009 Rampson et al.
2011/0088011 A1 * 4/2011 Ouali ...................... G06F 11/36 717/105
2013/0103701 A1 * 4/2013 Vishnubhatta ........ G06F 16/284 707/754
2013/0197953 A1 * 8/2013 Sholes ............... G06Q 10/0631 705/7.12
2014/0053091 A1 2/2014 Hou et al.
2015/0254369 A1 * 9/2015 Hou ...................... G06F 16/248 707/798
2015/0317297 A1 11/2015 Chandrasekaran et al.
2015/0346972 A1 * 12/2015 Boekling .............. G06T 11/203 703/2
2016/0012111 A1 * 1/2016 Pattabhiraman ...... G06F 16/284 707/722
2016/0055232 A1 * 2/2016 Yang ................... G06F 16/2428 707/740
2016/0170610 A1 * 6/2016 Bertram .............. G06F 16/2428 715/845
2016/0179780 A1 6/2016 Winkle et al.
2016/0321231 A1 * 11/2016 Lehmann ................ G06F 40/18
2016/0321233 A1 * 11/2016 He ........................ G06T 11/206
2017/0351653 A1 * 12/2017 Ramlet .............. G06Q 30/0245
2018/0129373 A1 * 5/2018 Ellis ...................... G06F 16/248
2018/0157467 A1 * 6/2018 Stachura ................... G06F 8/38
2018/0157468 A1 * 6/2018 Stachura ................... G06F 8/34
2019/0102425 A1 * 4/2019 Obeidat .............. G06F 16/2428
2019/0147031 A1 * 5/2019 Dvorak ................... G06F 40/18 715/219
2020/0302013 A1 * 9/2020 Stegmaier ............... G06F 40/18
2021/0073279 A1 * 3/2021 Leite Goldner ........ G06F 40/18
2022/0270183 A1 * 8/2022 Menon ................... G06Q 40/12
2023/0033480 A1 * 2/2023 Nakakimura .......... G06N 20/00

* cited by examiner

Copies the data needed

| | | |
|---|---|---|
| Germany | 2/4/15 | 1175 |
| France | 2/5/15 | 400 |
| USA | 2/7/15 | 880 |
| France | 2/1/15 | 75.45 |
| USA | 2/8/15 | 1375 |
| USA | 2/5/15 | 1000 |
| France | 2/7/15 | 482.54 |
| Germany | 2/3/15 | 1468.74 |
| Canada | 2/6/15 | 360.48 |
| Germany | 2/3/15 | 263.35 |
| Canada | 2/4/15 | 300 |
| Germany | 1/30/15 | 1700 |
| Canada | 2/1/15 | 103 |
| Canada | 2/7/15 | 320 |
| Germany | 2/7/15 | 975 |
| Germany | 2/8/15 | 1490.35 |
| Canada | 2/3/15 | 203 |
| USA | 2/2/15 | 450 |
| USA | 2/6/15 | 600 |
| France | 2/5/15 | 767.87 |
| USA | 2/2/15 | 1600 |

FIG. 3A

Sorts it by dates

| | | |
|---|---|---|
| Germany | 1/30/15 | 1700 |
| France | 2/1/15 | 75.45 |
| Canada | 2/1/15 | 103 |
| USA | 2/2/15 | 450 |
| USA | 2/2/15 | 1600 |
| Germany | 2/3/15 | 1468.74 |
| Germany | 2/3/15 | 263.35 |
| Canada | 2/3/15 | 203 |
| Germany | 2/4/15 | 1175 |
| Canada | 2/4/15 | 300 |
| France | 2/5/15 | 400 |
| USA | 2/5/15 | 1000 |
| France | 2/5/15 | 767.87 |
| Canada | 2/6/15 | 360.48 |
| USA | 2/6/15 | 600 |
| USA | 2/7/15 | 880 |
| France | 2/7/15 | 482.54 |
| Canada | 2/7/15 | 320 |
| Germany | 2/7/15 | 975 |
| USA | 2/8/15 | 1375 |
| Germany | 2/8/15 | 1490.35 |

FIG. 3B

Filters out undesired dates

| | | |
|---|---|---|
| France | 2/1/15 | 75.45 |
| Canada | 2/1/15 | 103 |
| USA | 2/2/15 | 450 |
| USA | 2/2/15 | 1600 |
| Germany | 2/3/15 | 1468.74 |
| Germany | 2/3/15 | 263.35 |
| Canada | 2/3/15 | 203 |
| Germany | 2/4/15 | 1175 |
| Canada | 2/4/15 | 300 |
| France | 2/5/15 | 400 |
| USA | 2/5/15 | 1000 |
| France | 2/5/15 | 767.87 |
| Canada | 2/6/15 | 360.48 |
| USA | 2/6/15 | 600 |
| USA | 2/7/15 | 880 |
| France | 2/7/15 | 482.54 |
| Canada | 2/7/15 | 320 |
| Germany | 2/7/15 | 975 |

| Sorts by Country | | |
|---|---|---|
| Canada | 2/1/15 | 103 |
| Canada | 2/3/15 | 203 |
| Canada | 2/4/15 | 300 |
| Canada | 2/6/15 | 360.48 |
| Canada | 2/7/15 | 320 |
| France | 2/1/15 | 75.45 |
| France | 2/5/15 | 400 |
| France | 2/5/15 | 767.87 |
| France | 2/7/15 | 482.54 |
| Germany | 2/3/15 | 1468.74 |
| Germany | 2/3/15 | 263.35 |
| Germany | 2/4/15 | 1175 |
| Germany | 2/7/15 | 975 |
| USA | 2/2/15 | 450 |
| USA | 2/2/15 | 1600 |
| USA | 2/5/15 | 1000 |
| USA | 2/6/15 | 600 |
| USA | 2/7/15 | 880 |

| SUM by Country | |
|---|---|
| Canada | 1286.48 |
| France | 1725.86 |
| Germany | 3882.09 |
| USA | 4530 |

FIG. 4B

| Copies values | |
|---|---|
| Canada | 1286.48 |
| France | 1725.86 |
| Germany | 3882.09 |
| USA | 4530 |

FIG. 4C

| Sorts by SUM values | |
|---|---|
| USA | 4530 |
| Germany | 3882.09 |
| France | 1725.86 |
| Canada | 1286.48 |

| User starts chart setup | |
|---|---|
| USA | 4530 |
| Germany | 3882.09 |
| France | 1725.86 |
| Canada | 1286.48 |

488

567

| Copies date filtered values | |
|---|---|
| 2/1/15 | 75.45 |
| 2/1/15 | 103 |
| 2/2/15 | 450 |
| 2/2/15 | 1600 |
| 2/3/15 | 1468.74 |
| 2/3/15 | 263.35 |
| 2/3/15 | 203 |
| 2/4/15 | 1175 |
| 2/4/15 | 300 |
| 2/5/15 | 400 |
| 2/5/15 | 1000 |
| 2/5/15 | 767.87 |
| 2/6/15 | 360.48 |
| 2/6/15 | 600 |
| 2/7/15 | 880 |
| 2/7/15 | 482.54 |
| 2/7/15 | 320 |
| 2/7/15 | 975 |

FIG. 6A

| SUM by date | |
|---|---|
| 2/1/15 | 178.45 |
| 2/2/15 | 2050 |
| 2/3/15 | 1935.09 |
| 2/4/15 | 1475 |
| 2/5/15 | 2167.87 |
| 2/6/15 | 960.48 |
| 2/7/15 | 2657.54 |

FIG. 6B

| Copies values | |
|---|---|
| 2/1/15 | 178.45 |
| 2/2/15 | 2050 |
| 2/3/15 | 1935.09 |
| 2/4/15 | 1475 |
| 2/5/15 | 2167.87 |
| 2/6/15 | 960.48 |
| 2/7/15 | 2657.54 |

FIG. 6C

| Sorts by SUM values | |
|---|---|
| 2/7/15 | 2657.54 |
| 2/5/15 | 2167.87 |
| 2/2/15 | 2050 |
| 2/3/15 | 1935.09 |
| 2/4/15 | 1475 |
| 2/6/15 | 960.48 |
| 2/1/15 | 178.45 |

| User starts chart setup | |
|---|---|
| 2/7/15 | 2657.54 |
| 2/5/15 | 2167.87 |
| 2/2/15 | 2050 |
| 2/3/15 | 1935.09 |
| 2/4/15 | 1475 |
| 2/6/15 | 960.48 |
| 2/1/15 | 178.45 |

Retrieves Non-spreadsheet cell (NSC) external formulaic data

| donations | date | country |
|---|---|---|
| 1175 | 2/4/15 | Germany |
| 400 | 2/5/15 | France |
| 880 | 2/7/15 | USA |
| 75.45 | 2/1/15 | France |
| 1375 | 2/8/15 | USA |
| 1000 | 2/5/15 | USA |
| 482.54 | 2/7/15 | France |
| 1468.74 | 2/3/15 | Germany |
| 360.48 | 2/6/15 | Canada |
| 263.35 | 2/3/15 | Germany |
| 300 | 2/4/15 | Canada |
| 1700 | 1/30/15 | Germany |
| 103 | 2/1/15 | Canada |
| 320 | 2/7/15 | Canada |
| 975 | 2/7/15 | Germany |
| 1490.35 | 2/8/15 | Germany |
| 203 | 2/3/15 | Canada |
| 450 | 2/2/15 | USA |
| 600 | 2/6/15 | USA |
| 767.87 | 2/5/15 | France |
| 1600 | 2/2/15 | USA |

FIG. 12A

Sorts data by date

| country | donations | date |
|---|---|---|
| Germany | 1700 | 1/30/15 |
| France | 75.45 | 2/1/15 |
| Canada | 103 | 2/1/15 |
| USA | 450 | 2/2/15 |
| USA | 1600 | 2/2/15 |
| Germany | 1468.74 | 2/3/15 |
| Germany | 263.35 | 2/3/15 |
| Canada | 203 | 2/3/15 |
| Germany | 1175 | 2/4/15 |
| Canada | 300 | 2/4/15 |
| France | 400 | 2/5/15 |
| USA | 1000 | 2/5/15 |
| France | 767.87 | 2/5/15 |
| Canada | 360.48 | 2/6/15 |
| USA | 600 | 2/6/15 |
| USA | 880 | 2/7/15 |
| France | 482.54 | 2/7/15 |
| Canada | 320 | 2/7/15 |
| Germany | 975 | 2/7/15 |
| USA | 1375 | 2/8/15 |
| Germany | 1490.35 | 2/8/15 |

FIG. 12B

Filters out undesired dates

| country | donations | date |
|---|---|---|
| | | |
| France | 75.45 | 2/1/15 |
| Canada | 103 | 2/1/15 |
| USA | 450 | 2/2/15 |
| USA | 1600 | 2/2/15 |
| Germany | 1468.74 | 2/3/15 |
| Germany | 263.35 | 2/3/15 |
| Canada | 203 | 2/3/15 |
| Germany | 1175 | 2/4/15 |
| Canada | 300 | 2/4/15 |
| France | 400 | 2/5/15 |
| USA | 1000 | 2/5/15 |
| France | 767.87 | 2/5/15 |
| Canada | 360.48 | 2/6/15 |
| USA | 600 | 2/6/15 |
| USA | 880 | 2/7/15 |
| France | 482.54 | 2/7/15 |
| Canada | 320 | 2/7/15 |
| Germany | 975 | 2/7/15 |
| | | |

Sorts by country values to setup calculation groups

| country | donations |
|---|---|
| Canada | 103 |
| Canada | 203 |
| Canada | 300 |
| Canada | 360.48 |
| Canada | 320 |
| France | 75.45 |
| France | 400 |
| France | 767.87 |
| France | 482.54 |
| Germany | 1468.74 |
| Germany | 263.35 |
| Germany | 1175 |
| Germany | 975 |
| USA | 450 |
| USA | 1600 |
| USA | 1000 |
| USA | 600 |
| USA | 880 |

Does SUM group calculations

| country | SUM( donations) |
|---|---|
| Canada | 1286.48 |
| France | 1725.86 |
| Germany | 3882.09 |
| USA | 4530 |

FIG. 13B

Setups chart input with default sort order

| country | calc |
|---|---|
| Canada | 1286.48 |
| France | 1725.86 |
| Germany | 3882.09 |
| USA | 4530 |

Redo sort by calc values ready for charting

| country | calc |
|---|---|
| USA | 4472.80787 |
| Germany | 3832.40539 |
| France | 1699.58918 |
| Canada | 1266.08935 |

Generates the chart

Retrieves Non-spreadsheet cell (NSC) external formulaic data

| date | donations |
|---|---|
| 2/4/15 | 1175 |
| 2/5/15 | 400 |
| 2/7/15 | 880 |
| 2/1/15 | 75.45 |
| 2/8/15 | 1375 |
| 2/5/15 | 1000 |
| 2/7/15 | 482.54 |
| 2/3/15 | 1468.74 |
| 2/6/15 | 360.48 |
| 2/3/15 | 263.35 |
| 2/4/15 | 300 |
| 1/30/15 | 1700 |
| 2/1/15 | 103 |
| 2/7/15 | 320 |
| 2/7/15 | 975 |
| 2/8/15 | 1490.35 |
| 2/3/15 | 203 |
| 2/2/15 | 450 |
| 2/6/15 | 600 |
| 2/5/15 | 767.87 |
| 2/2/15 | 1600 |

FIG. 14A

Sorts data by dates

| date | donations |
|---|---|
| 1/30/15 | 1700 |
| 2/1/15 | 75.45 |
| 2/1/15 | 103 |
| 2/2/15 | 450 |
| 2/2/15 | 1600 |
| 2/3/15 | 1468.74 |
| 2/3/15 | 263.35 |
| 2/3/15 | 203 |
| 2/4/15 | 1175 |
| 2/4/15 | 300 |
| 2/5/15 | 400 |
| 2/5/15 | 1000 |
| 2/5/15 | 767.87 |
| 2/6/15 | 360.48 |
| 2/6/15 | 600 |
| 2/7/15 | 880 |
| 2/7/15 | 482.54 |
| 2/7/15 | 320 |
| 2/7/15 | 975 |
| 2/8/15 | 1375 |
| 2/8/15 | 1490.35 |

Filters out undesired dates

| date | donations |
|---|---|
| 2/1/15 | 75.45 |
| 2/1/15 | 103 |
| 2/2/15 | 450 |
| 2/2/15 | 1600 |
| 2/3/15 | 1468.74 |
| 2/3/15 | 263.35 |
| 2/3/15 | 203 |
| 2/4/15 | 1175 |
| 2/4/15 | 300 |
| 2/5/15 | 400 |
| 2/5/15 | 1000 |
| 2/5/15 | 767.87 |
| 2/6/15 | 360.48 |
| 2/6/15 | 600 |
| 2/7/15 | 880 |
| 2/7/15 | 482.54 |
| 2/7/15 | 320 |
| 2/7/15 | 975 |

Does SUM group calculations*

| date | SUM( donations) |
|---|---|
| 2/1/15 | 178.45 |
| 2/2/15 | 2050 |
| 2/3/15 | 1935.09 |
| 2/4/15 | 1475 |
| 2/5/15 | 2167.87 |
| 2/6/15 | 960.48 |
| 2/7/15 | 2657.54 |

* Already sorted in date value groups

FIG. 14D

Setup chart input with default sort

| date | calc |
|---|---|
| 2/7/15 | 2657.54 |
| 2/5/15 | 2167.87 |
| 2/2/15 | 2050 |
| 2/3/15 | 1935.09 |
| 2/4/15 | 1475 |
| 2/6/15 | 960.48 |
| 2/1/15 | 178.45 |

FIG. 14E

Resort by calc values to chart

| date | calc |
|---|---|
| 2/7/15 | 2657.54 |
| 2/5/15 | 2167.87 |
| 2/2/15 | 2050 |
| 2/3/15 | 1935.09 |
| 2/4/15 | 1475 |
| 2/6/15 | 960.48 |
| 2/1/15 | 178.45 |

Generates the chart

Retrieves Non-spreadsheet cell (NSC) external formulaic data

| country | date | donations | fees |
|---|---|---|---|
| Germany | 2/4/15 | 1175 | 14.1 |
| France | 2/5/15 | 400 | 4.8 |
| USA | 2/7/15 | 880 | 10.56 |
| France | 2/1/15 | 75.45 | 0.91 |
| USA | 2/8/15 | 1375 | 14.57 |
| USA | 2/5/15 | 1000 | 12 |
| France | 2/7/15 | 482.54 | 5.79 |
| Germany | 2/3/15 | 1468.74 | 13.22 |
| Canada | 2/6/15 | 360.48 | 4.33 |
| Germany | 2/3/15 | 263.35 | 3.16 |
| Canada | 2/4/15 | 300 | 3.6 |
| Germany | 1/30/15 | 1700 | 0.9 |
| Canada | 2/1/15 | 103 | 1.24 |
| Canada | 2/7/15 | 320 | 3.84 |
| Germany | 2/7/15 | 975 | 11.7 |
| Germany | 2/8/15 | 1490.35 | 13.41 |
| Canada | 2/3/15 | 203 | 2.44 |
| USA | 2/2/15 | 450 | 5.4 |
| USA | 2/6/15 | 600 | 7.2 |
| France | 2/5/15 | 767.87 | 9.21 |
| USA | 2/2/15 | 1600 | 14.01 |

FIG. 16A

Sorts data by dates

| country | date | donations | fees |
|---|---|---|---|
| Germany | 1/30/15 | 1700 | 0.9 |
| France | 2/1/15 | 75.45 | 0.91 |
| Canada | 2/1/15 | 103 | 1.24 |
| USA | 2/2/15 | 450 | 5.4 |
| USA | 2/2/15 | 1600 | 14.01 |
| Germany | 2/3/15 | 1468.74 | 13.22 |
| Germany | 2/3/15 | 263.35 | 3.16 |
| Canada | 2/3/15 | 203 | 2.44 |
| Germany | 2/4/15 | 1175 | 14.1 |
| Canada | 2/4/15 | 300 | 3.6 |
| France | 2/5/15 | 400 | 4.8 |
| USA | 2/5/15 | 1000 | 12 |
| France | 2/5/15 | 767.87 | 9.21 |
| Canada | 2/6/15 | 360.48 | 4.33 |
| USA | 2/6/15 | 600 | 7.2 |
| USA | 2/7/15 | 880 | 10.56 |
| France | 2/7/15 | 482.54 | 5.79 |
| Canada | 2/7/15 | 320 | 3.84 |
| Germany | 2/7/15 | 975 | 11.7 |
| USA | 2/8/15 | 1375 | 14.57 |
| Germany | 2/8/15 | 1490.35 | 13.41 |

Filters out undesired dates

| country | date | donations | fees |
|---|---|---|---|
| | | | |
| France | 2/1/15 | 75.45 | 0.91 |
| Canada | 2/1/15 | 103 | 1.24 |
| USA | 2/2/15 | 450 | 5.4 |
| USA | 2/2/15 | 1600 | 14.01 |
| Germany | 2/3/15 | 1468.74 | 13.22 |
| Germany | 2/3/15 | 263.35 | 3.16 |
| Canada | 2/3/15 | 203 | 2.44 |
| Germany | 2/4/15 | 1175 | 14.1 |
| Canada | 2/4/15 | 300 | 3.6 |
| France | 2/5/15 | 400 | 4.8 |
| USA | 2/5/15 | 1000 | 12 |
| France | 2/5/15 | 767.87 | 9.21 |
| Canada | 2/6/15 | 360.48 | 4.33 |
| USA | 2/6/15 | 600 | 7.2 |
| USA | 2/7/15 | 880 | 10.56 |
| France | 2/7/15 | 482.54 | 5.79 |
| Canada | 2/7/15 | 320 | 3.84 |
| Germany | 2/7/15 | 975 | 11.7 |
| | | | |

Sorts by Country to create iterative calculation groups

| country | donations | fees |
|---|---|---|
| Canada | 103 | 1.24 |
| Canada | 203 | 2.44 |
| Canada | 300 | 3.6 |
| Canada | 360.48 | 4.33 |
| Canada | 320 | 3.84 |
| France | 75.45 | 0.91 |
| France | 400 | 4.8 |
| France | 767.87 | 9.21 |
| France | 482.54 | 5.79 |
| Germany | 1468.74 | 13.22 |
| Germany | 263.35 | 3.16 |
| Germany | 1175 | 14.1 |
| Germany | 975 | 11.7 |
| USA | 450 | 5.4 |
| USA | 1600 | 14.01 |
| USA | 1000 | 12 |
| USA | 600 | 7.2 |
| USA | 880 | 10.56 |

Does iterative SUM calculations by country group

| country | SUM( donations) | SUM(fees) | SQRT( SUM(fees)) |
|---|---|---|---|
| Canada | 1286.48 | 15.45 | 3.9306488 |
| France | 1725.86 | 20.71 | 4.5508241 |
| Germany | 3882.09 | 42.18 | 6.4946132 |
| USA | 4530 | 49.17 | 7.0121323 |

FIG. 17B

Do SUM(donations)-SUM(fees)-SQRT(SUM(fees))-1.01 calculation

| country | calc |
|---|---|
| Canada | 1266.089351 |
| France | 1699.589176 |
| Germany | 3832.405387 |
| USA | 4472.807868 |

FIG. 17C

Sorts by calc values

| country | calc |
|---|---|
| USA | 4472.80787 |
| Germany | 3832.40539 |
| France | 1699.58918 |
| Canada | 1266.08935 |

Generates the chart

2535

3045

FIG. 44
4457
4474
4464
4444
Data Setup
COUNT(sponsors)
type
Legend:
Mail
Online
country
Canada
France
Germany
USA
Stacked column
Cancel
Save
Visualizer
Sheet2
Sheet3
Chart1
Data
Table
Visualizer1

6655

| | A | B | C | D | E | F | G | H | I | J |
|---|---|---|---|---|---|---|---|---|---|---|
| 1 | | | | | | | | | | |
| 2 | | | | | Today's Dollars | | | | Today's Counts | |
| 3 | | | | Total | Existing | New | | Total | Existing | New |
| 4 | Donations today | | | | | | | | | |
| 5 | | All | | $4025.28 | $2623.00 | $1402.28 | | 21 | 11 | 10 |
| 6 | | Platinum | | $2100.00 | $1200.00 | $900.00 | | 2 | 1 | 1 |
| 7 | | Gold | | $840.00 | $765.00 | $75.00 | | 4 | 3 | 1 |
| 8 | | No Status | | $1085.28 | $658.00 | 427.28 | | 15 | 7 | 8 |
| 9 | Donations same time last week | | | | | | | | | |
| 10 | | All | | $4025.28 | $2623.00 | $1402.28 | | 22 | 14 | 8 |
| 11 | | Platinum | | $2100.00 | $1200.00 | $900.00 | | 3 | 2 | 1 |
| 12 | | Gold | | $840.00 | $765.00 | $75.00 | | 3 | 2 | 1 |
| 13 | | No Status | | $1085.28 | $658.00 | 427.28 | | 16 | 10 | 6 |
| 14 | vs. same time last week | | | | | | | | | |
| 15 | | All | | 98.4% | 89.2% | 122.1% | | 95.4% | 78.6% | 125.0% |
| 16 | | Platinum | | 93.5% | 80.2% | 120.0% | | 66.7% | 50.0% | 100.0% |
| 17 | | Gold | | 80.8% | 86.0% | 50.0% | | 133.3% | 150.0% | 100.0% |
| 18 | | No Status | | 135.1% | 118.6% | 172.1% | | 93.8% | 70.0% | 133.3% |

Retrieves in-cell formulaic data

| country | donations | fees | date |
|---|---|---|---|
| Germany | 1175 | 14.1 | 2/4/15 |
| France | 400 | 4.8 | 2/5/15 |
| USA | 880 | 10.56 | 2/7/15 |
| France | 75.45 | 0.91 | 2/1/15 |
| USA | 1375 | 14.57 | 2/8/15 |
| USA | 1000 | 12 | 2/5/15 |
| France | 482.54 | 5.79 | 2/7/15 |
| Germany | 1468.74 | 13.22 | 2/3/15 |
| Canada | 360.48 | 4.33 | 2/6/15 |
| Germany | 263.35 | 3.16 | 2/3/15 |
| Canada | 300 | 3.6 | 2/4/15 |
| Germany | 1700 | 0.9 | 1/30/15 |
| Canada | 103 | 1.24 | 2/1/15 |
| Canada | 320 | 3.84 | 2/7/15 |
| Germany | 975 | 11.7 | 2/7/15 |
| Germany | 1490.35 | 13.41 | 2/8/15 |
| Canada | 203 | 2.44 | 2/3/15 |
| USA | 450 | 5.4 | 2/2/15 |
| USA | 600 | 7.2 | 2/6/15 |
| France | 767.87 | 9.21 | 2/5/15 |
| USA | 1600 | 14.01 | 2/2/15 |

FIG. 93A

Orders horizontally by labels/legends and vertically sorts by donations

| date | country | donations | fees |
|---|---|---|---|
| 2/1/15 | France | 75.45 | 0.91 |
| 2/1/15 | Canada | 103 | 1.24 |
| 2/3/15 | Canada | 203 | 2.44 |
| 2/3/15 | Germany | 263.35 | 3.16 |
| 2/4/15 | Canada | 300 | 3.6 |
| 2/7/15 | Canada | 320 | 3.84 |
| 2/6/15 | Canada | 360.48 | 4.33 |
| 2/5/15 | France | 400 | 4.8 |
| 2/2/15 | USA | 450 | 5.4 |
| 2/7/15 | France | 482.54 | 5.79 |
| 2/6/15 | USA | 600 | 7.2 |
| 2/5/15 | France | 767.87 | 9.21 |
| 2/7/15 | USA | 880 | 10.56 |
| 2/7/15 | Germany | 975 | 11.7 |
| 2/5/15 | USA | 1000 | 12 |
| 2/4/15 | Germany | 1175 | 14.1 |
| 2/8/15 | USA | 1375 | 14.57 |
| 2/3/15 | Germany | 1468.74 | 13.22 |
| 2/8/15 | Germany | 1490.35 | 13.41 |
| 2/2/15 | USA | 1600 | 14.01 |
| 1/30/15 | Germany | 1700 | 0.9 |

Filters out data with donations not >500

| date | country | donations | fees |
|---|---|---|---|
| 2/6/15 | USA | 600 | 7.2 |
| 2/5/15 | France | 767.87 | 9.21 |
| 2/7/15 | USA | 880 | 10.56 |
| 2/7/15 | Germany | 975 | 11.7 |
| 2/5/15 | USA | 1000 | 12 |
| 2/4/15 | Germany | 1175 | 14.1 |
| 2/8/15 | USA | 1375 | 14.57 |
| 2/3/15 | Germany | 1468.74 | 13.22 |
| 2/8/15 | Germany | 1490.35 | 13.41 |
| 2/2/15 | USA | 1600 | 14.01 |
| 1/30/15 | Germany | 1700 | 0.9 |

Sorts vertically by dates

| date | country | donations | fees |
|---|---|---|---|
| 1/30/15 | Germany | 1700 | 0.9 |
| 2/2/15 | USA | 1600 | 14.01 |
| 2/3/15 | Germany | 1468.74 | 13.22 |
| 2/4/15 | Germany | 1175 | 14.1 |
| 2/5/15 | France | 767.87 | 9.21 |
| 2/5/15 | USA | 1000 | 12 |
| 2/6/15 | USA | 600 | 7.2 |
| 2/7/15 | USA | 880 | 10.56 |
| 2/7/15 | Germany | 975 | 11.7 |
| 2/8/15 | USA | 1375 | 14.57 |
| 2/8/15 | Germany | 1490.35 | 13.41 |

Filters out dates not 2/1/15..2/7/15

| date | country | donations | fees |
|---|---|---|---|
| 2/2/15 | USA | 1600 | 14.01 |
| 2/3/15 | Germany | 1468.74 | 13.22 |
| 2/4/15 | Germany | 1175 | 14.1 |
| 2/5/15 | France | 767.87 | 9.21 |
| 2/5/15 | USA | 1000 | 12 |
| 2/6/15 | USA | 600 | 7.2 |
| 2/7/15 | USA | 880 | 10.56 |
| 2/7/15 | Germany | 975 | 11.7 |

FIG. 94B

Does donations - fees calculations for date and country iterations

| date | country | calc * |
|---|---|---|
| 2/2/15 | USA | 1585.99 |
| 2/3/15 | Germany | 1455.52 |
| 2/4/15 | Germany | 1160.9 |
| 2/5/15 | France | 758.66 |
| 2/5/15 | USA | 988 |
| 2/6/15 | USA | 592.8 |
| 2/7/15 | USA | 869.44 |
| 2/7/15 | Germany | 963.3 |

* calc = donations-fees

FIG. 94C 2D reconfigures the calculated values by date and country values default sorted {!AZ}

| | France | Germany | USA |
|---|---|---|---|
| 2/2/15 | | | 1585.99 |
| 2/3/15 | | 1455.52 | |
| 2/4/15 | | 1160.9 | |
| 2/5/15 | 758.66 | | 988 |
| 2/6/15 | | | 592.8 |
| 2/7/15 | | 963.3 | 869.44 |

FIG. 95A

Generates the chart

FIG. 95B

Retrieves the formulaic data

| country | donations | date |
|---|---|---|
| Germany | 1175 | 2/4/15 |
| France | 400 | 2/5/15 |
| USA | 880 | 2/7/15 |
| France | 75.45 | 2/1/15 |
| USA | 1375 | 2/8/15 |
| USA | 1000 | 2/5/15 |
| France | 482.54 | 2/7/15 |
| Germany | 1468.74 | 2/3/15 |
| Canada | 360.48 | 2/6/15 |
| Germany | 263.35 | 2/3/15 |
| Canada | 300 | 2/4/15 |
| Germany | 1700 | 1/30/15 |
| Canada | 103 | 2/1/15 |
| Canada | 320 | 2/7/15 |
| Germany | 975 | 2/7/15 |
| Germany | 1490.35 | 2/8/15 |
| Canada | 203 | 2/3/15 |
| USA | 450 | 2/2/15 |
| USA | 600 | 2/6/15 |
| France | 767.87 | 2/5/15 |
| USA | 1600 | 2/2/15 |

FIG. 97A

Sorts by donations

| date | country | donations |
|---|---|---|
| 2/1/15 | France | 75.45 |
| 2/1/15 | Canada | 103 |
| 2/3/15 | Canada | 203 |
| 2/3/15 | Germany | 263.35 |
| 2/4/15 | Canada | 300 |
| 2/7/15 | Canada | 320 |
| 2/6/15 | Canada | 360.48 |
| 2/5/15 | France | 400 |
| 2/2/15 | USA | 450 |
| 2/7/15 | France | 482.54 |
| 2/6/15 | USA | 600 |
| 2/5/15 | France | 767.87 |
| 2/7/15 | USA | 880 |
| 2/7/15 | Germany | 975 |
| 2/5/15 | USA | 1000 |
| 2/4/15 | Germany | 1175 |
| 2/8/15 | USA | 1375 |
| 2/3/15 | Germany | 1468.74 |
| 2/8/15 | Germany | 1490.35 |
| 2/2/15 | USA | 1600 |
| 1/30/15 | Germany | 1700 |

FIG. 97B

Filters out data with donations not >200

| date | country | donations |
|---|---|---|
| | | |
| | | |
| 2/3/15 | Canada | 203 |
| 2/3/15 | Germany | 263.35 |
| 2/4/15 | Canada | 300 |
| 2/7/15 | Canada | 320 |
| 2/6/15 | Canada | 360.48 |
| 2/5/15 | France | 400 |
| 2/2/15 | USA | 450 |
| 2/7/15 | France | 482.54 |
| 2/6/15 | USA | 600 |
| 2/5/15 | France | 767.87 |
| 2/7/15 | USA | 880 |
| 2/7/15 | Germany | 975 |
| 2/5/15 | USA | 1000 |
| 2/4/15 | Germany | 1175 |
| 2/8/15 | USA | 1375 |
| 2/3/15 | Germany | 1468.74 |
| 2/8/15 | Germany | 1490.35 |
| 2/2/15 | USA | 1600 |
| 1/30/15 | Germany | 1700 |

Sorts donations by date and country iterations

| date | country | donations |
|---|---|---|
| 1/30/15 | Germany | 1700 |
| 2/2/15 | USA | 450 |
| 2/2/15 | USA | 1600 |
| 2/3/15 | Canada | 203 |
| 2/3/15 | Germany | 263.35 |
| 2/3/15 | Germany | 1468.74 |
| 2/4/15 | Canada | 300 |
| 2/4/15 | Germany | 1175 |
| 2/5/15 | France | 400 |
| 2/5/15 | France | 767.87 |
| 2/5/15 | USA | 1000 |
| 2/6/15 | Canada | 360.48 |
| 2/6/15 | USA | 600 |
| 2/7/15 | Canada | 320 |
| 2/7/15 | France | 482.54 |
| 2/7/15 | Germany | 975 |
| 2/7/15 | USA | 880 |
| 2/8/15 | Germany | 1490.35 |
| 2/8/15 | USA | 1375 |

Filter to dates in 2/1/15..2/7/15 *

| date | country | donations |
|---|---|---|
| 2/2/15 | USA | 450 |
| 2/2/15 | USA | 1600 |
| 2/3/15 | Canada | 203 |
| 2/3/15 | Germany | 263.35 |
| 2/3/15 | Germany | 1468.74 |
| 2/4/15 | Canada | 300 |
| 2/4/15 | Germany | 1175 |
| 2/5/15 | France | 400 |
| 2/5/15 | France | 767.87 |
| 2/5/15 | USA | 1000 |
| 2/6/15 | Canada | 360.48 |
| 2/6/15 | USA | 600 |
| 2/7/15 | Canada | 320 |
| 2/7/15 | France | 482.54 |
| 2/7/15 | Germany | 975 |
| 2/7/15 | USA | 880 |

* Already in date and country default sort order

2D organizes the donation values by date and country default sorted {!AZ}

| | Canada | France | Germany | USA |
|---|---|---|---|---|
| 2/2/15 | | | | 450 |
| 2/2/15 | | | | 1600 |
| 2/3/15 | 203 | | 263.35 | |
| 2/3/15 | | | 1468.74 | |
| 2/4/15 | 300 | | 1175 | |
| 2/5/15 | | 400 | | |
| 2/5/15 | | 767.87 | | |
| 2/6/15 | | | | 600 |
| 2/7/15 | 320 | 482.54 | 975 | 880 |

Generates the chart

Retrieves formulaic data from Donations table

| date | country | donations |
|---|---|---|
| 2/4/15 | Germany | 1175 |
| 2/5/15 | France | 400 |
| 2/7/15 | USA | 880 |
| 2/1/15 | France | 75.45 |
| 2/8/15 | USA | 1375 |
| 2/5/15 | USA | 1000 |
| 2/7/15 | France | 482.54 |
| 2/3/15 | Germany | 1468.74 |
| 2/6/15 | Canada | 360.48 |
| 2/3/15 | Germany | 263.35 |
| 2/4/15 | Canada | 300 |
| 1/30/15 | Germany | 1700 |
| 2/1/15 | Canada | 103 |
| 2/7/15 | Canada | 320 |
| 2/7/15 | Germany | 975 |
| 2/8/15 | Germany | 1490.35 |
| 2/3/15 | Canada | 203 |
| 2/2/15 | USA | 450 |
| 2/6/15 | USA | 600 |
| 2/5/15 | France | 767.87 |
| 2/2/15 | USA | 1600 |

FIG. 101A

Retrieves formulaic data from Fees table

| date_2{ date} | country_2{ country} | fees_2 |
|---|---|---|
| 2/4/15 | Germany | 14.1 |
| 2/5/15 | France | 4.8 |
| 2/1/15 | France | 0.91 |
| 2/8/15 | USA | 14.57 |
| 2/5/15 | USA | 12 |
| 2/7/15 | France | 5.79 |
| 2/3/15 | Germany | 13.22 |
| 2/3/15 | Germany | 3.16 |
| 2/4/15 | Canada | 3.6 |
| 1/30/15 | Germany | 0.9 |
| 2/7/15 | Canada | 3.84 |
| 2/7/15 | Germany | 11.7 |
| 2/8/15 | Germany | 13.41 |
| 2/2/15 | USA | 5.4 |
| 2/6/15 | USA | 7.2 |
| 2/5/15 | France | 9.21 |
| 2/2/15 | USA | 14.01 |

FIG. 101B

Sort both sets of data by date and the date_2 from date and then country and country_2 from country

| date | country | donations | date_2{ date} | country_2{ country} | fees_2 |
|---|---|---|---|---|---|
| 1/30/15 | Germany | 1700 | 1/30/15 | Germany | 0.9 |
| 2/1/15 | Canada | 103 | | | |
| 2/1/15 | France | 75.45 | 2/1/15 | France | 0.91 |
| 2/2/15 | USA | 450 | 2/2/15 | USA | 5.4 |
| 2/2/15 | USA | 1600 | 2/2/15 | USA | 14.01 |
| 2/3/15 | Canada | 203 | | | |
| 2/3/15 | Germany | 1468.74 | 2/3/15 | Germany | 13.22 |
| 2/3/15 | Germany | 263.35 | 2/3/15 | Germany | 3.16 |
| 2/4/15 | Canada | 300 | 2/4/15 | Canada | 3.6 |
| 2/4/15 | Germany | 1175 | 2/4/15 | Germany | 14.1 |
| 2/5/15 | France | 400 | 2/5/15 | France | 4.8 |
| 2/5/15 | France | 767.87 | 2/5/15 | France | 9.21 |
| 2/5/15 | USA | 1000 | 2/5/15 | USA | 12 |
| 2/6/15 | Canada | 360.48 | | | |
| 2/6/15 | USA | 600 | 2/6/15 | USA | 7.2 |
| 2/7/15 | Canada | 320 | 2/7/15 | Canada | 3.84 |
| 2/7/15 | France | 482.54 | 2/7/15 | France | 5.79 |
| 2/7/15 | Germany | 975 | 2/7/15 | Germany | 11.7 |
| 2/7/15 | USA | 880 | | | |
| 2/8/15 | Germany | 1490.35 | 2/8/15 | Germany | 13.41 |
| 2/8/15 | USA | 1375 | 2/8/15 | USA | 14.57 |

Sort both sets of data by date and the date_2 from date and then country and country_2 from country

| date | country | donations | date_2{date} | country_2{country} | fees_2 |
|---|---|---|---|---|---|
| 1/30/15 | Germany | 1700 | 1/30/15 | Germany | 0.9 |
| 2/1/15 | Canada | 103 | | | |
| 2/1/15 | France | 75.45 | 2/1/15 | France | 0.91 |
| 2/2/15 | USA | 450 | 2/2/15 | USA | 5.4 |
| 2/2/15 | USA | 1600 | 2/2/15 | USA | 14.01 |
| 2/3/15 | Canada | 203 | | | |
| 2/3/15 | Germany | 1468.74 | 2/3/15 | Germany | 13.22 |
| 2/3/15 | Germany | 263.35 | 2/3/15 | Germany | 3.16 |
| 2/4/15 | Canada | 300 | 2/4/15 | Canada | 3.6 |
| 2/4/15 | Germany | 1175 | 2/4/15 | Germany | 14.1 |
| 2/5/15 | France | 400 | 2/5/15 | France | 4.8 |
| 2/5/15 | France | 767.87 | 2/5/15 | France | 9.21 |
| 2/5/15 | USA | 1000 | 2/5/15 | USA | 12 |
| 2/6/15 | Canada | 360.48 | | | |
| 2/6/15 | USA | 600 | 2/6/15 | USA | 7.2 |
| 2/7/15 | Canada | 320 | 2/7/15 | Canada | 3.84 |
| 2/7/15 | France | 482.54 | 2/7/15 | France | 5.79 |
| 2/7/15 | Germany | 975 | 2/7/15 | Germany | 11.7 |
| 2/7/15 | USA | 880 | | | |
| 2/8/15 | Germany | 1490.35 | 2/8/15 | Germany | 13.41 |
| 2/8/15 | USA | 1375 | 2/8/15 | USA | 14.57 |

Filter (constrain) data to the date values between 2/1/15 to 2/7/15

| date | country | donations | date_2{date} | country_2{country} | fees_2 |
|---|---|---|---|---|---|
| | | | | | |
| 2/1/15 | Canada | 103 | | | |
| 2/1/15 | France | 75.45 | 2/1/15 | France | 0.91 |
| 2/2/15 | USA | 450 | 2/2/15 | USA | 5.4 |
| 2/2/15 | USA | 1600 | 2/2/15 | USA | 14.01 |
| 2/3/15 | Canada | 203 | | | |
| 2/3/15 | Germany | 1468.74 | 2/3/15 | Germany | 13.22 |
| 2/3/15 | Germany | 263.35 | 2/3/15 | Germany | 3.16 |
| 2/4/15 | Canada | 300 | 2/4/15 | Canada | 3.6 |
| 2/4/15 | Germany | 1175 | 2/4/15 | Germany | 14.1 |
| 2/5/15 | France | 400 | 2/5/15 | France | 4.8 |
| 2/5/15 | France | 767.87 | 2/5/15 | France | 9.21 |
| 2/5/15 | USA | 1000 | 2/5/15 | USA | 12 |
| 2/6/15 | Canada | 360.48 | | | |
| 2/6/15 | USA | 600 | 2/6/15 | USA | 7.2 |
| 2/7/15 | Canada | 320 | 2/7/15 | Canada | 3.84 |
| 2/7/15 | France | 482.54 | 2/7/15 | France | 5.79 |
| 2/7/15 | Germany | 975 | 2/7/15 | Germany | 11.7 |
| 2/7/15 | USA | 880 | | | |

Setup up the SUM iterative calculations for both tables of data by date and country iterations

| date | country | donations | date_2{ date} | country_2{ country} | fees_2 |
|---|---|---|---|---|---|
| 2/1/15 | Canada | 103 | | | |
| 2/1/15 | France | 75.45 | 2/1/15 | France | 0.91 |
| 2/2/15 | USA | 450 | 2/2/15 | USA | 5.4 |
| | | 1600 | | | 14.01 |
| 2/3/15 | Canada | 203 | | | |
| 2/3/15 | Germany | 1468.74 | 2/3/15 | Germany | 13.22 |
| | | 263.35 | | | 3.16 |
| 2/4/15 | Canada | 300 | 2/4/15 | Canada | 3.6 |
| 2/4/15 | Germany | 1175 | 2/4/15 | Germany | 14.1 |
| 2/5/15 | France | 400 | 2/5/15 | France | 4.8 |
| | | 767.87 | | | 9.21 |
| 2/5/15 | USA | 1000 | 2/5/15 | USA | 12 |
| 2/6/15 | Canada | 360.48 | | | |
| 2/6/15 | USA | 600 | 2/6/15 | USA | 7.2 |
| 2/7/15 | Canada | 320 | 2/7/15 | Canada | 3.84 |
| 2/7/15 | France | 482.54 | 2/7/15 | France | 5.79 |
| 2/7/15 | Germany | 975 | 2/7/15 | Germany | 11.7 |
| 2/7/15 | USA | 880 | | | |

Does the iterative SUM calculations by date and country

| date | country | SUM{ donations} | date_2{ date} | country_2{ country} | SUM( fees_2) |
|---|---|---|---|---|---|
| 2/1/15 | Canada | 103 | | | |
| 2/1/15 | France | 75.45 | 2/1/15 | France | 0.91 |
| 2/2/15 | USA | 2050 | 2/2/15 | USA | 19.41 |
| 2/3/15 | Canada | 203 | | | |
| 2/3/15 | Germany | 1732.09 | 2/3/15 | Germany | 16.38 |
| 2/4/15 | Canada | 300 | 2/4/15 | Canada | 3.6 |
| 2/4/15 | Germany | 1175 | 2/4/15 | Germany | 14.1 |
| 2/5/15 | France | 1167.87 | 2/5/15 | France | 14.01 |
| 2/5/15 | USA | 1000 | 2/5/15 | USA | 12 |
| 2/6/15 | Canada | 360.48 | | | |
| 2/6/15 | USA | 600 | 2/6/15 | USA | 7.2 |
| 2/7/15 | Canada | 320 | 2/7/15 | Canada | 3.84 |
| 2/7/15 | France | 482.54 | 2/7/15 | France | 5.79 |
| 2/7/15 | Germany | 975 | 2/7/15 | Germany | 11.7 |
| 2/7/15 | USA | 880 | | | |

Do SUM(donations) - SUM(fees_2 ...) calculations

| date | country | SUM{ donations} |
|---|---|---|
| 2/1/15 | Canada | 103 |
| 2/1/15 | France | 74.54 |
| 2/2/15 | USA | 2030.59 |
| 2/3/15 | Canada | 203 |
| 2/3/15 | Germany | 1715.71 |
| 2/4/15 | Canada | 296.4 |
| 2/4/15 | Germany | 1160.9 |
| 2/5/15 | France | 1153.86 |
| 2/5/15 | USA | 988 |
| 2/6/15 | Canada | 360.48 |
| 2/6/15 | USA | 592.8 |
| 2/7/15 | Canada | 316.16 |
| 2/7/15 | France | 476.75 |
| 2/7/15 | Germany | 963.3 |
| 2/7/15 | USA | 880 |

NOTE: … above is
{date_2{date},country_2{country}}

Organize the values by sorted layout of date and country

| | Canada | France | Germany | USA |
|---|---|---|---|---|
| 2/1/15 | 103 | 74.54 | | |
| 2/2/15 | | | | 2030.59 |
| 2/3/15 | 203.00 | | 1715.71 | |
| 2/4/15 | 296.40 | | 1160.90 | |
| 2/5/15 | | 1153.86 | | 988.00 |
| 2/6/15 | 360.48 | | | |
| 2/7/15 | 316.16 | 476.75 | 963.30 | 880.00 |

Generates the chart

Retreives formulaic data from Test table external or in-cell data

| exp_t | wk_t | wt_gross_t |
|---|---|---|
| 996 | 0 | 2.156 |
| 996 | 1 | 2.153 |
| 996 | 2 | 2.13 |
| 996 | 3 | 1.945 |
| 996 | 4 | 1.742 |
| 996 | 5 | 1.478 |
| 997 | 0 | 2.214 |
| 997 | 1 | 2.211 |
| 997 | 2 | 2.187 |
| 997 | 3 | 2.034 |
| 997 | 4 | 1.981 |
| 997 | 5 | 1.962 |

FIG. 107A

Retreives formulaic data from Control table external or in-cell data

| exp_c | wk_c | wt_gross_c |
|---|---|---|
| 996 | 0 | 2.148 |
| 996 | 1 | 2.201 |
| 996 | 2 | 2.351 |
| 996 | 3 | 2.487 |
| 996 | 4 | 2.638 |
| 996 | 5 | 2.812 |
| 997 | 0 | 2.211 |
| 997 | 1 | 2.264 |
| 997 | 2 | 2.417 |
| 997 | 3 | 2.556 |
| 997 | 4 | 2.701 |
| 997 | 5 | 2.87 |

FIG. 107B

Retreives formulaic data from Dish table external or in-cell data

| exp | type | wt_glass | wt_medium |
|---|---|---|---|
| 996 | test | 0.718 | 0.255 |
| 996 | control | 0.716 | 0.243 |
| 997 | test | 0.738 | 0.261 |
| 997 | control | 0.737 | 0.25 |

FIG. 107C

Sets up the iterative loops

| exp_t | wk_t |
|---|---|
| 996 | 0 |
| 996 | 1 |
| 996 | 2 |
| 996 | 3 |
| 996 | 4 |
| 996 | 5 |
| 997 | 0 |
| 997 | 1 |
| 997 | 2 |
| 997 | 3 |
| 997 | 4 |
| 997 | 5 |

FIG. 108A

Applies the wk_t{>0} constraint (filter) to the loops

| exp_t | wk_t |
|---|---|
| | |
| 996 | 1 |
| 996 | 2 |
| 996 | 3 |
| 996 | 4 |
| 996 | 5 |
| | |
| 997 | 1 |
| 997 | 2 |
| 997 | 3 |
| 997 | 4 |
| 997 | 5 |

Organizes the data for the iterative loop calculations by exp_t and wk_t iterations

| exp_t | wk_t | wt_grow_t | wt_gross_t{ wk_t{!LOOP-1}} | wt_gross_t{ wk_t{!LOOP-1}} | wt_glass{ exp{exp_t}, type{"test"}} | wt_medium{ exp{exp_t}, type{"test"}} | wt_gross_c{ exp_c{exp_t}, wk_c{wk_t}} | wt_gross_c{exp_ c{exp_t},wk_c{ wk_t{!LOOP-1}}} | wt_gross_c{exp_ c{exp_t},wk_c{ wk_t{!LOOP-1}}} | exp{exp_t}, type{"control"} } | wt_medium{ exp{exp_t}, type{"control"}} |
|---|---|---|---|---|---|---|---|---|---|---|---|
| 996 | 1 | 2.153 | 2.156 | 2.156 | 0.718 | 0.255 | 2.201 | 2.148 | 2.148 | 0.716 | 0.243 |
| 996 | 2 | 2.13 | 2.153 | 2.153 | 0.718 | 0.255 | 2.351 | 2.201 | 2.201 | 0.716 | 0.243 |
| 996 | 3 | 1.945 | 2.13 | 2.13 | 0.718 | 0.255 | 2.487 | 2.351 | 2.351 | 0.716 | 0.243 |
| 996 | 4 | 1.742 | 1.945 | 1.945 | 0.718 | 0.255 | 2.638 | 2.487 | 2.487 | 0.716 | 0.243 |
| 996 | 5 | 1.478 | 1.742 | 1.742 | 0.718 | 0.255 | 2.812 | 2.638 | 2.638 | 0.716 | 0.243 |
| 997 | 1 | 2.211 | 2.214 | 2.214 | 0.738 | 0.261 | 2.264 | 2.211 | 2.211 | 0.737 | 0.25 |
| 997 | 2 | 2.187 | 2.211 | 2.211 | 0.738 | 0.261 | 2.417 | 2.264 | 2.264 | 0.737 | 0.25 |
| 997 | 3 | 2.034 | 2.187 | 2.187 | 0.738 | 0.261 | 2.556 | 2.417 | 2.417 | 0.737 | 0.25 |
| 997 | 4 | 1.981 | 2.034 | 2.034 | 0.738 | 0.261 | 2.701 | 2.556 | 2.556 | 0.737 | 0.25 |
| 997 | 5 | 1.962 | 1.981 | 1.981 | 0.738 | 0.261 | 2.87 | 2.701 | 2.701 | 0.737 | 0.25 |

FIG. 109

Does iterative loop calculations by exp_t and wk_t iterations

| exp_t | wk_t | calc |
|---|---|---|
| 996 | 1 | -0.0471112 |
| 996 | 2 | -0.1402645 |
| 996 | 3 | -0.2575974 |
| 996 | 4 | -0.3076697 |
| 996 | 5 | -0.4469361 |
| 997 | 1 | -0.0457698 |
| 997 | 2 | -0.139614 |
| 997 | 3 | -0.2259907 |
| 997 | 4 | -0.1436233 |
| 997 | 5 | -0.117948 |

FIG. 110A

Orders and formats calculations, X axis labels and Legends for chart

| | 996 | 997 |
|---|---|---|
| 1 | -4.7% | -4.6% |
| 2 | -14.0% | -14.0% |
| 3 | -25.8% | -22.6% |
| 4 | -30.8% | -14.4% |
| 5 | -44.7% | -11.8% |

FIG. 110B

Generates the chart

FIG. 110C

| Retrieves formulaic data from the cells in Sheet3 | | |
|---|---|---|
| Sheet3!B1:B21 | Sheet3!C1:C21{ '2/1/15'..'2/7/15'} | Sheet3!D1:D21 |
| Germany | 2/4/15 | 1175 |
| France | 2/5/15 | 400 |
| USA | 2/7/15 | 880 |
| France | 2/1/15 | 75.45 |
| USA | 2/8/15 | 1375 |
| USA | 2/5/15 | 1000 |
| France | 2/7/15 | 482.54 |
| Germany | 2/3/15 | 1468.74 |
| Canada | 2/6/15 | 360.48 |
| Germany | 2/3/15 | 263.35 |
| Canada | 2/4/15 | 300 |
| Germany | 1/30/15 | 1700 |
| Canada | 2/1/15 | 103 |
| Canada | 2/7/15 | 320 |
| Germany | 2/7/15 | 975 |
| Germany | 2/8/15 | 1490.35 |
| Canada | 2/3/15 | 203 |
| USA | 2/2/15 | 450 |
| USA | 2/6/15 | 600 |
| France | 2/5/15 | 767.87 |
| USA | 2/2/15 | 1600 |

FIG. 111A

| Sorts data by dates | | |
|---|---|---|
| Sheet3!B1:B21 | Sheet3!C1:C21{ '2/1/15'..'2/7/15'} | Sheet3!D1:D21 |
| Germany | 1/30/15 | 1700 |
| France | 2/1/15 | 75.45 |
| Canada | 2/1/15 | 103 |
| USA | 2/2/15 | 450 |
| USA | 2/2/15 | 1600 |
| Germany | 2/3/15 | 1468.74 |
| Germany | 2/3/15 | 263.35 |
| Canada | 2/3/15 | 203 |
| Germany | 2/4/15 | 1175 |
| Canada | 2/4/15 | 300 |
| France | 2/5/15 | 400 |
| USA | 2/5/15 | 1000 |
| France | 2/5/15 | 767.87 |
| Canada | 2/6/15 | 360.48 |
| USA | 2/6/15 | 600 |
| USA | 2/7/15 | 880 |
| France | 2/7/15 | 482.54 |
| Canada | 2/7/15 | 320 |
| Germany | 2/7/15 | 975 |
| USA | 2/8/15 | 1375 |
| Germany | 2/8/15 | 1490.35 |

FIG. 111B

| Filters out undesired dates | | |
|---|---|---|
| Sheet3!B1:B21 | Sheet3!C1:C21{ '2/1/15'..'2/7/15'} | Sheet3!D1:D21 |
| | | |
| France | 2/1/15 | 75.45 |
| Canada | 2/1/15 | 103 |
| USA | 2/2/15 | 450 |
| USA | 2/2/15 | 1600 |
| Germany | 2/3/15 | 1468.74 |
| Germany | 2/3/15 | 263.35 |
| Canada | 2/3/15 | 203 |
| Germany | 2/4/15 | 1175 |
| Canada | 2/4/15 | 300 |
| France | 2/5/15 | 400 |
| USA | 2/5/15 | 1000 |
| France | 2/5/15 | 767.87 |
| Canada | 2/6/15 | 360.48 |
| USA | 2/6/15 | 600 |
| USA | 2/7/15 | 880 |
| France | 2/7/15 | 482.54 |
| Canada | 2/7/15 | 320 |
| Germany | 2/7/15 | 975 |
| | | |

Sorts by Country values to setup calculation groups

| Sheet3!B1:B21 | Sheet3!D1:D21 |
|---|---|
| Canada | 103 |
| Canada | 203 |
| Canada | 300 |
| Canada | 360.48 |
| Canada | 320 |
| France | 75.45 |
| France | 400 |
| France | 767.87 |
| France | 482.54 |
| Germany | 1468.74 |
| Germany | 263.35 |
| Germany | 1175 |
| Germany | 975 |
| USA | 450 |
| USA | 1600 |
| USA | 1000 |
| USA | 600 |
| USA | 880 |

Does SUM group calculations

| Sheet3!B1:B21 | SUM( Sheet3!D1:D21) |
|---|---|
| Canada | 1286.48 |
| France | 1725.86 |
| Germany | 3882.09 |
| USA | 4530 |

FIG. 112B

Setups chart input with default sort order

| Sheet3!B1:B21 | calc |
|---|---|
| Canada | 1286.48 |
| France | 1725.86 |
| Germany | 3882.09 |
| USA | 4530 |

Generates the chart

Retrieves formulaic data data from external table or in-cell

| fees | donations | date |
| --- | --- | --- |
| 14.1 | 1175 | 2/4/15 |
| 4.8 | 400 | 2/5/15 |
| 10.56 | 880 | 2/7/15 |
| 0.91 | 75.45 | 2/1/15 |
| 14.57 | 1375 | 2/8/15 |
| 12 | 1000 | 2/5/15 |
| 5.79 | 482.54 | 2/7/15 |
| 13.22 | 1468.74 | 2/3/15 |
| 4.33 | 360.48 | 2/6/15 |
| 3.16 | 263.35 | 2/3/15 |
| 3.6 | 300 | 2/4/15 |
| 0.9 | 1700 | 1/30/15 |
| 1.24 | 103 | 2/1/15 |
| 3.84 | 320 | 2/7/15 |
| 11.7 | 975 | 2/7/15 |
| 13.41 | 1490.35 | 2/8/15 |
| 2.44 | 203 | 2/3/15 |
| 5.4 | 450 | 2/2/15 |
| 7.2 | 600 | 2/6/15 |
| 9.21 | 767.87 | 2/5/15 |
| 14.01 | 1600 | 2/2/15 |

FIG. 114A

Sorts columns by label/legend and row sorts by date !AZ

| date | donations | fees |
| --- | --- | --- |
| 1/30/15 | 1700 | 0.9 |
| 2/1/15 | 75.45 | 0.91 |
| 2/1/15 | 103 | 1.24 |
| 2/2/15 | 450 | 5.4 |
| 2/2/15 | 1600 | 14.01 |
| 2/3/15 | 1468.74 | 13.22 |
| 2/3/15 | 263.35 | 3.16 |
| 2/3/15 | 203 | 2.44 |
| 2/4/15 | 1175 | 14.1 |
| 2/4/15 | 300 | 3.6 |
| 2/5/15 | 400 | 4.8 |
| 2/5/15 | 1000 | 12 |
| 2/5/15 | 767.87 | 9.21 |
| 2/6/15 | 360.48 | 4.33 |
| 2/6/15 | 600 | 7.2 |
| 2/7/15 | 880 | 10.56 |
| 2/7/15 | 482.54 | 5.79 |
| 2/7/15 | 320 | 3.84 |
| 2/7/15 | 975 | 11.7 |
| 2/8/15 | 1375 | 14.57 |
| 2/8/15 | 1490.35 | 13.41 |

Does the algebraic calculations

| date | donations-fees |
| --- | --- |
| 1/30/15 | 1699.1 |
| 2/1/15 | 74.54 |
| 2/1/15 | 101.76 |
| 2/2/15 | 444.6 |
| 2/2/15 | 1585.99 |
| 2/3/15 | 1455.52 |
| 2/3/15 | 260.19 |
| 2/3/15 | 200.56 |
| 2/4/15 | 1160.9 |
| 2/4/15 | 296.4 |
| 2/5/15 | 395.2 |
| 2/5/15 | 988 |
| 2/5/15 | 758.66 |
| 2/6/15 | 356.15 |
| 2/6/15 | 592.8 |
| 2/7/15 | 869.44 |
| 2/7/15 | 476.75 |
| 2/7/15 | 316.16 |
| 2/7/15 | 963.3 |
| 2/8/15 | 1360.43 |
| 2/8/15 | 1476.94 |

FIG. 114C

Generates chart from labels/ legends and formula results

| date | donations-fees |
| --- | --- |
| 1/30/15 | 1699.1 |
| 2/1/15 | 74.54 |
| 2/1/15 | 101.76 |
| 2/2/15 | 444.6 |
| 2/2/15 | 1585.99 |
| 2/3/15 | 1455.52 |
| 2/3/15 | 260.19 |
| 2/3/15 | 200.56 |
| 2/4/15 | 1160.9 |
| 2/4/15 | 296.4 |
| 2/5/15 | 395.2 |
| 2/5/15 | 988 |
| 2/5/15 | 758.66 |
| 2/6/15 | 356.15 |
| 2/6/15 | 592.8 |
| 2/7/15 | 869.44 |
| 2/7/15 | 476.75 |
| 2/7/15 | 316.16 |
| 2/7/15 | 963.3 |
| 2/8/15 | 1360.43 |
| 2/8/15 | 1476.94 |

FIG. 114D

Data in external database or in-cell

| donor_num | country | donations | fees | date |
|---|---|---|---|---|
| 10002 | Germany | 1175 | 14.1 | 2/4/15 |
| 10001 | France | 400 | 4.8 | 2/5/15 |
| 10003 | USA | 880 | 10.56 | 2/7/15 |
| 10005 | France | 75.45 | 0.91 | 2/1/15 |
| 10007 | USA | 1375 | 14.57 | 2/8/15 |
| 10008 | USA | 1000 | 12 | 2/5/15 |
| 10010 | France | 482.54 | 5.79 | 2/7/15 |
| 10012 | Germany | 1468.74 | 13.22 | 2/3/15 |
| 10013 | Canada | 360.48 | 4.33 | 2/6/15 |
| 10016 | Germany | 263.35 | 3.16 | 2/3/15 |
| 10017 | Canada | 300 | 3.6 | 2/4/15 |
| 10019 | Germany | 1700 | 0.9 | 1/30/15 |
| 10020 | Canada | 103 | 1.24 | 2/1/15 |
| 10021 | Canada | 320 | 3.84 | 2/7/15 |
| 10023 | Germany | 975 | 11.7 | 2/7/15 |
| 10024 | Germany | 1490.35 | 13.41 | 2/8/15 |
| 10025 | Canada | 203 | 2.44 | 2/3/15 |
| 10027 | USA | 450 | 5.4 | 2/2/15 |
| 10028 | USA | 600 | 7.2 | 2/6/15 |
| 10029 | France | 767.87 | 9.21 | 2/5/15 |
| 10030 | USA | 1600 | 14.01 | 2/2/15 |

FIG. 116A

Retrieves formulaic data from an external table or in-cell

| donations | date |
|---|---|
| 1175 | 2/4/15 |
| 400 | 2/5/15 |
| 880 | 2/7/15 |
| 75.45 | 2/1/15 |
| 1375 | 2/8/15 |
| 1000 | 2/5/15 |
| 482.54 | 2/7/15 |
| 1468.74 | 2/3/15 |
| 360.48 | 2/6/15 |
| 263.35 | 2/3/15 |
| 300 | 2/4/15 |
| 1700 | 1/30/15 |
| 103 | 2/1/15 |
| 320 | 2/7/15 |
| 975 | 2/7/15 |
| 1490.35 | 2/8/15 |
| 203 | 2/3/15 |
| 450 | 2/2/15 |
| 600 | 2/6/15 |
| 767.87 | 2/5/15 |
| 1600 | 2/2/15 |

FIG. 116B

Horizontally sorts by labels/legend and vertically orts by ascending (!AZ) date

| date | donations |
|---|---|
| 1/30/15 | 1700 |
| 2/1/15 | 75.45 |
| 2/1/15 | 103 |
| 2/2/15 | 450 |
| 2/2/15 | 1600 |
| 2/3/15 | 1468.74 |
| 2/3/15 | 263.35 |
| 2/3/15 | 203 |
| 2/4/15 | 1175 |
| 2/4/15 | 300 |
| 2/5/15 | 400 |
| 2/5/15 | 1000 |
| 2/5/15 | 767.87 |
| 2/6/15 | 360.48 |
| 2/6/15 | 600 |
| 2/7/15 | 880 |
| 2/7/15 | 482.54 |
| 2/7/15 | 320 |
| 2/7/15 | 975 |
| 2/8/15 | 1375 |
| 2/8/15 | 1490.35 |

Generates chart from date labels/legends and matching field donations values

FIG. 116D

Data in external database or in-cell

| donor_num | country | date | donations | fees |
|---|---|---|---|---|
| 10002 | Germany | 2/4/15 | 1175 | 14.1 |
| 10001 | France | 2/5/15 | 400 | 4.8 |
| 10003 | USA | 2/7/15 | 880 | 10.56 |
| 10005 | France | 2/1/15 | 75.45 | 0.91 |
| 10007 | USA | 2/8/15 | 1375 | 14.57 |
| 10008 | USA | 2/5/15 | 1000 | 12 |
| 10010 | France | 2/7/15 | 482.54 | 5.79 |
| 10012 | Germany | 2/3/15 | 1468.74 | 13.22 |
| 10013 | Canada | 2/6/15 | 360.48 | 4.33 |
| 10016 | Germany | 2/3/15 | 263.35 | 3.16 |
| 10017 | Canada | 2/4/15 | 300 | 3.6 |
| 10019 | Germany | 1/30/15 | 1700 | 0.9 |
| 10020 | Canada | 2/1/15 | 103 | 1.24 |
| 10021 | Canada | 2/7/15 | 320 | 3.84 |
| 10023 | Germany | 2/7/15 | 975 | 11.7 |
| 10024 | Germany | 2/8/15 | 1490.35 | 13.41 |
| 10025 | Canada | 2/3/15 | 203 | 2.44 |
| 10027 | USA | 2/2/15 | 450 | 5.4 |
| 10028 | USA | 2/6/15 | 600 | 7.2 |
| 10029 | France | 2/5/15 | 767.87 | 9.21 |
| 10030 | USA | 2/2/15 | 1600 | 14.01 |

FIG. 118A

Retrieves formulaic data from an external table or in-cell

| date | fees |
|---|---|
| 2/4/15 | 14.1 |
| 2/5/15 | 4.8 |
| 2/7/15 | 10.56 |
| 2/1/15 | 0.91 |
| 2/8/15 | 14.57 |
| 2/5/15 | 12 |
| 2/7/15 | 5.79 |
| 2/3/15 | 13.22 |
| 2/6/15 | 4.33 |
| 2/3/15 | 3.16 |
| 2/4/15 | 3.6 |
| 1/30/15 | 0.9 |
| 2/1/15 | 1.24 |
| 2/7/15 | 3.84 |
| 2/7/15 | 11.7 |
| 2/8/15 | 13.41 |
| 2/3/15 | 2.44 |
| 2/2/15 | 5.4 |
| 2/6/15 | 7.2 |
| 2/5/15 | 9.21 |
| 2/2/15 | 14.01 |

FIG. 118B

Sorts the data by ascending (!AZ) date

| date | donations |
|---|---|
| 1/30/15 | 1700 |
| 2/1/15 | 75.45 |
| 2/1/15 | 103 |
| 2/2/15 | 450 |
| 2/2/15 | 1600 |
| 2/3/15 | 1468.74 |
| 2/3/15 | 263.35 |
| 2/3/15 | 203 |
| 2/4/15 | 1175 |
| 2/4/15 | 300 |
| 2/5/15 | 400 |
| 2/5/15 | 1000 |
| 2/5/15 | 767.87 |
| 2/6/15 | 360.48 |
| 2/6/15 | 600 |
| 2/7/15 | 880 |
| 2/7/15 | 482.54 |
| 2/7/15 | 320 |
| 2/7/15 | 975 |
| 2/8/15 | 1375 |
| 2/8/15 | 1490.35 |

Generates chart from date labels/legends and matching field donations values

FIG. 118D

12200
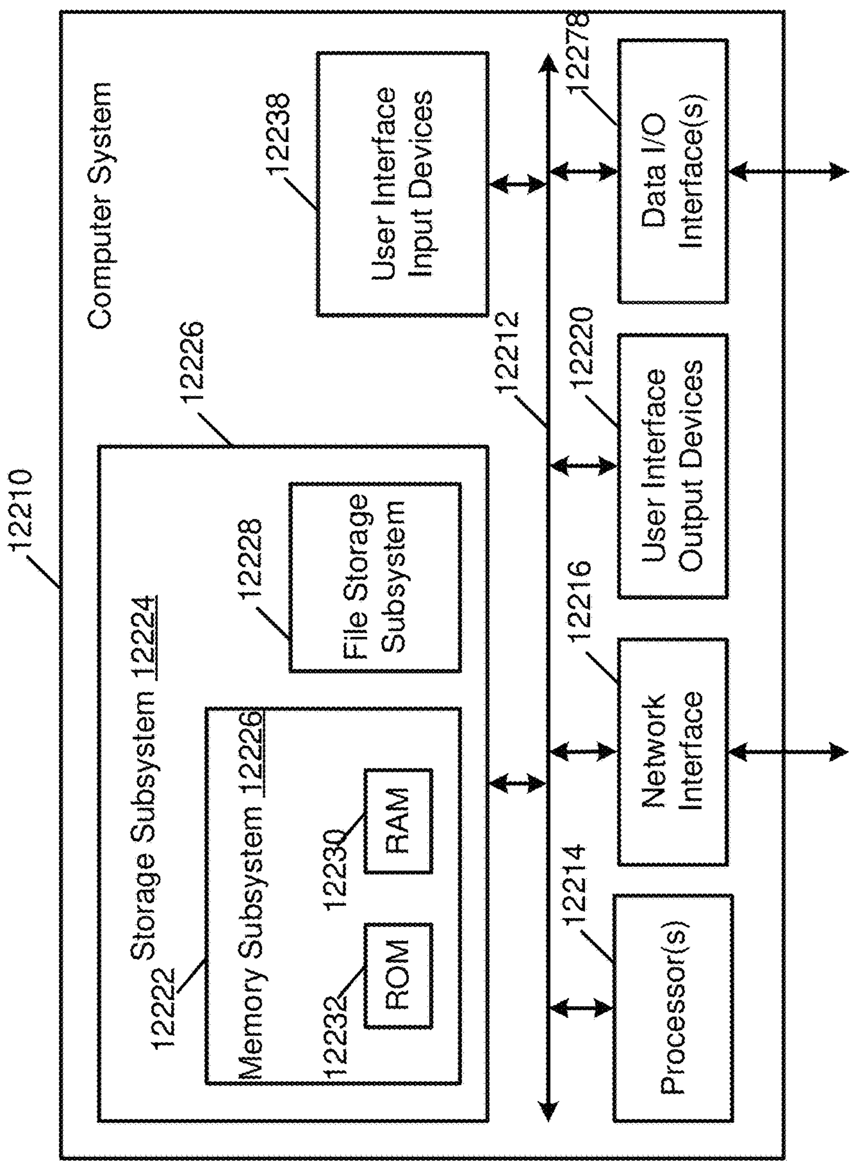
Fig. 122 Computer System

METHOD AND SYSTEM FOR IMPROVED VISUALIZATION OF CHARTS IN SPREADSHEETS

CROSS-REFERENCE

This application claims the benefit of and priority to U.S. Application No. 63/285,945, titled Method and System for Improved Visualization of Charts in Spreadsheets," filed 3 Dec. 2021.

RELATED APPLICATIONS

This application is related to and incorporates by reference the following applications: U.S. application Ser. No. 16/031,339, titled "Methods and Systems for Providing Selective Multi-Way Replication and Atomization of Cell Blocks and Other Elements in Spreadsheets and Presentations," filed 10 Jul. 2018, which claims the benefit of U.S. Provisional Application No. 62/530,835, filed Jul. 10, 2017, U.S. application Ser. No. 16/031,379, titled "Methods and Systems for Connecting a Spreadsheet to External Data Sources with Formulaic Specification of Data Retrieval," filed 10 Jul. 2018, which claims the benefit of U.S. Provisional Application No. 62/530,786, filed Jul. 10, 2017, U.S. application Ser. No. 16/031,759, titled, "Methods and Systems for Connecting A Spreadsheet to External Data Sources with Temporal Replication of Cell Blocks," filed 10 Jul. 2018, now U.S. Pat. No. 11,017,165, issued 25 May 2021, which claims the benefit of U.S. Provisional Patent Application No. 62/530,794, filed on Jul. 10, 2017, and U.S. application Ser. No. 16/191,402, titled, "Methods and Systems for Connecting A Spreadsheet to External Data Sources with Ordered Formulaic Specification of Data Retrieved" filed Nov. 14, 2018, now U.S. Pat. No. 11,036, 929, issued 15 Jun. 2021, which claims the benefit of U.S. Provisional Patent Application No. 62/586,719," filed on Nov. 15, 2017.

U.S. application Ser. No. 17/359,430, titled, "Methods and Systems for Constructing a Complex Formula in a Spreadsheet Cell," filed 25 June 2021, which claims the benefit of U.S. Provisional Patent Application No. 63/044, 990", filed 26 Jun. 2020.

U.S. application Ser. No. 17/359,418, titled "Methods and Systems for Presenting Drop-Down, Pop-Up or Other Presentation of a Multi-Value Data Set in a Spreadsheet Cell," filed 25 Jun. 2021, which claims the benefit of U.S. Provisional Patent Application No. 63/044,989, filed 26 Jun. 2020.

U.S. application Ser. No. 17/384,404, titled "Method and System for Improved Spreadsheet Charts," filed 23 Jul. 2021, which claims the benefit of U.S. Provisional Patent Application No. 63/055,581, filed 23 Jul. 2020.

U.S. application Ser. No. 17/374,898, titled "Method and System for Improved Spreadsheet Analytical Functioning," filed 13 Jul. 2021, which claims the benefit of U.S. Provisional Patent Application No. 63/051,280, filed 13 Jul. 2020.

U.S. application Ser. No. 17/374,901, titled "Method and System for Improved Ordering of Output from Spreadsheet Analytical Functions," filed 13 Jul. 2021, which claims the benefit of U.S. Provisional Patent Application No. 63/051, 283, filed 13 Jul. 2020.

U.S. application Ser. No. 17/752,814 titled "Method And System for Spreadsheet Error Identification and Avoidance," filed 24 May 2022 which claims the benefit of U.S. Provisional Patent Application No. 63/192,475, filed 24 May 2021.

U.S. application Ser. No. 17/903,934 titled "Method and System for Improved 2d Ordering of Output from Spreadsheet Analytical Functions," filed 6 Sep. 2022 which claims the benefit of U.S. Provisional Patent Application No. 63/240,828, filed 3 Sep. 2021.

BACKGROUND

In today's spreadsheets creating a chart from external data that involves analytics (e.g., data calculations or filtering) is a multi-step complicated process involving data import into the spreadsheet cells, data manipulation to support the analyses, data calculation, results organization for the chart, and finally, the chart input/creation. This process is even more complicated if sizeable data sets are involved, range or array function calculations, complex repetitive calculations and/or charts that change with different data constraints/ filters (e.g., varying by different dates or ranges of dates). Creating the same chart from in-cell data, while one big step of data importation easier, can still be a multi-step complicated process that requires data manipulation, calculation and results organization for the chart. Therein lies a large opportunity to dramatically simplify creating charts from external data and charts from in-cell data which involve analytics (e.g., data calculations, sorting and/or filtering).

SUMMARY

The technology disclosed improves the creation, modification and presentation of spreadsheet charts from external data or from in-cell data where analytics is involved. Embodiments of our technology deliver spreadsheet charts from external data without instantiating the data into a range of cells. Other embodiments of our technology deliver spreadsheet charts from in-cell data requiring data sorting, filtering and/or calculations without any such spreadsheet cell actions by the user. Variants of our technologies work for generating charts involving range or array function analytics, algebraic formula analytics and/or data manipulation (e.g., sorting/ordering and filtering).

Other aspects of the invention relate to improving the modification of charts through different forms of data filtering, sorting/reordering and removal/add back. Embodiments of our visualized charts support generation of the charts in spreadsheet worksheet tabs, visualizer dedicated tabs, slide tabs, deck tabs and dashboard dedicated tabs or other UI representations within the application. Most of these are also capable of being put into a presentation mode showing the content for presentation purposes. Embodiments support user specification of the inputs in sidebars, popups, ribbons, menus, dropdowns and on chart. Embodiments support the use of external data from multiple different table sources and/or in-cell data from multiple different data sets.

Particular aspects of the technology disclosed are described in the claims, specification and drawings.

BRIEF DESCRIPTION OF THE DRAWINGS

The patent or application file contains at least one drawing executed in color. Copies of this patent or patent application publication with color drawing(s) will be provided by the Office upon request and payment of the necessary fee.

The included drawings are for illustrative purposes and serve only to provide examples of possible structures and process operations for one or more implementations of this disclosure. These drawings in no way limit any changes in form and detail that may be made by one skilled in the art without departing from the spirit and scope of this disclosure. A more complete understanding of the subject matter may be derived by referring to the detailed description and claims when considered in conjunction with the following figures, wherein like reference numbers refer to similar elements throughout the figures.

FIGS. 3A, 3B, 3C, 4A, 4B, 4C, 4D and FIG. 4E examples in Microsoft Excel chart the eight data manipulation, filtering, analytics and setup start steps required to get the desired chart in FIG. 2.

FIGS. 6A, 6B, 6C, 6D and 6E example in Microsoft Excel the five data manipulation, analytics and setup start steps required to get the desired chart in FIG. 5.

FIGS. 12A, 12B, 12C 13A, 13B, 13C, 13D and 13E examples the eight illustrative steps/actions automatically done by our technology to generate from the user inputs in FIG. 10 the chart (External and GROUP) in FIG. 10 which is comparable to the Microsoft Excel chart in FIG. 2.

FIGS. 14A, 14B, 14C, 14D, 14E, 14F and 14G example the one user change in FIG. 11 that triggers the seven illustrative steps/actions automatically done by our data visualizer (External and GROUP) technology to generate the chart in FIG. 11 which is comparable to the Microsoft Excel chart in FIG. 5.

FIGS. 16A, 16B, 16C, 17A, 17B, 17C, 17D and 17E example the eight illustrative steps/actions automatically done in buffer by our data visualizer (External and GROUP) technology to generate the chart in FIG. 15.

FIGS. 88, 89 and 90 examples the use of our data visualizer within a spreadsheet dashboard tab.

FIGS. 91, 92, 93A, 93B, 93C, 94A, 94B, 94C, 95A and 95B examples an algebraic formula data visualization using in-cell data showing all the illustrative automated steps/actions done by our technology (In-cell and CALC).

FIGS. 96, 97A, 97B, 97C, 98A, 98B, 98C and FIG. 98D examples a first and third data field data visualization using external or in-cell data showing all the automated steps/actions done by our technology (DATA).

FIGS. 99, 100, 101A, 101B, 101C, 102A, 102B, 103A, 103B, 104A, 104B and 104C examples a two data source complex range or array function formula data visualization using external and/or in-cell data sources showing all the illustrative automated steps/actions done by our technology (GROUP).

FIGS. 105, 106, 107A, 107B, 107C, 108A, 108B, 109, 110A, 110B and FIG. 110C examples a three data source complex algebraic formula data visualization using external and/or in-cell data sources showing all the automated illustrative steps/actions done by our technology (CALC).

FIGS. 111A, 111B, 111C, 112A, 112B, 112C and FIG. 112D examples all the (In-cell and GROUP) automated steps done by our technology in buffer for the chart generated in FIG. 33.

FIGS. 113, 114A, 114B, 114C and FIG. 114D examples an algebraic formula (CALC) data visualization and all the automated steps done by our technology using either external or in-cell data.

FIGS. 115, 116A, 116B, 116C and FIG. 116D examples a first and third data field (DATA) data visualization and all the illustrative automated steps done by our technology using either external or in-cell data.

FIGS. 117, 118A, 118B, 118C and 118D examples the result of a one input change in the example in FIG. 115 (DATA) data visualization and all the automated steps done by our technology using either external or in-cell data.

FIG. 122 depicts an example computer system that can be used to implement aspects of the technology disclosed.

DETAILED DESCRIPTION

Figure 1:
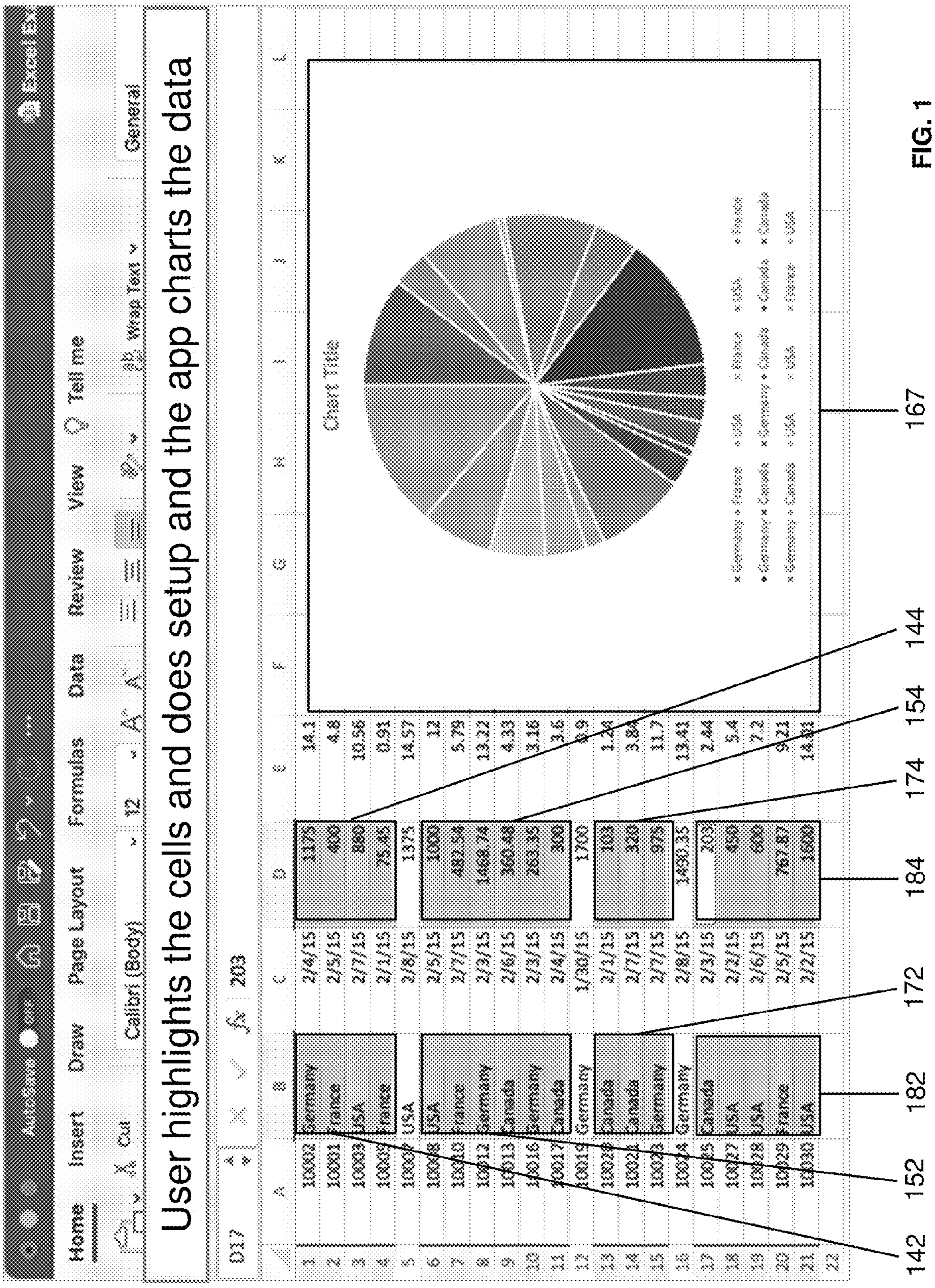
FIG. 1 examples how in Microsoft Excel what you input is what you get in a chart.

The following detailed description is made with reference to the figures. Example implementations are described to illustrate the technology disclosed, not to limit its scope, which is defined by the claims. Those of ordinary skill in the art will recognize a variety of equivalent variations on the description that follows.

When spreadsheet applications were first created, they electronically emulated tabular paper spreadsheets. More recently, Microsoft Excel, Google Sheets, Apple Numbers and others have dramatically increased the breadth of capabilities and usefulness of spreadsheets. Spreadsheet applications now access data across a wide variety of sources including relational, structured and semi-structured, open data protocol (OData), Web and Hadoop among others; and these applications manipulate data—such as in pivot tables and via Microsoft PowerPivot. Additionally, spreadsheets have extensive functionality for creating charts with SmartArt and for building forms, and they even have programming languages embedded within them, such as Visual Basic (VBA in Excel), Apps Script (in Google Sheets) and Apple Script (in Numbers).

With all the added capabilities, spreadsheet applications have become substantially more complicated. All this complexity has led to over a hundred books and thousands of online videos that have been published to help users understand the capabilities of Excel alone. However, unlike programming languages and programming where users tend to spend long hours of focused use day after day, most spreadsheet users are much more occasional users episodically working in spreadsheets as part of being a student, doing their job or doing some other activity. Therefore, they tend to know how to use a small fraction of the spreadsheet capabilities and not to remember non-intuitive instructions. For these users it is incredibly beneficial to make the usage simple and intuitive requiring no memory of what to do and how to do it. For those users it is very valuable to have external data (e.g., web or their employer company data) simply available in their spreadsheets and to eliminate as much data manipulation and data analytics as possible (e.g., to eliminate making data manipulation mistakes or mistakes applying the right analytic calculations to the right data).

Spreadsheet providers like Microsoft Excel and Google Sheets, as well as the other spreadsheet providers, have not made external data directly available in their spreadsheet formulas instead requiring users to import the data into their spreadsheet cells. Once users have imported the data, they can then use functions like LOOKUP, VLOOKUP or HLOOKUP to manipulate that data extracting the values they need for analyses. Then the users need to do the analyses which can frequently involve more data manipulation, sometimes the use of Pivot Tables and/or calculations. Then they need to arrange the data to feed the chart and then finally setup the chart. Our new technology gets rid of all but the last step of setting up the chart, making it dramatically simpler for low and even high skilled spreadsheet users to chart external data and then change the desired chart by changing the input specification(s) it is using (e.g., filtering or constraining it) or changing the analytic formula it is charting.

Our technology also greatly simplifies charting in-cell data when the data and its layout does not match that needed for the chart input. It eliminates all the data manipulation (e.g., copying, sorting and layout changes) required to support the desired analytics (e.g., calculations and/or filtering), eliminates the in-cell data analytics, and configuring of the results for chart input. It also dramatically simplifies changes in the chart (e.g., changing the data filters or changing the calculations being charted) as we will now example.

Current Technology Limitations

Both leading spreadsheets, Microsoft Excel and Google Sheets, as well as the other spreadsheets charting capabilities, chart the data as you input it with some minor variations (e.g., switching rows and column inputs of data and labels/legends/headers). What you input is what you get, as exampled for Microsoft Excel in FIG. 1 with no post data selection sorting, filtering or calculational capabilities. So, if a charity user wants to create a PIE chart of the total donations for each country ordered from largest to smallest for the week of Feb. 1, 2015 to Feb. 7, 2015, they need to select the data leaving out any data before or after those dates. The user in FIG. 1 has done that selecting the data 142, 152, 182, 172, 184, 174, 154 and 144 but when they generate the chart 167 it is of each of the slices not the totals and in the order selected not grouped by country. They instead wanted the chart 267 in FIG. 2 which shows the total donations for each country ordered from largest to smallest for total country donations for the week of Feb. 1, 2015 to Feb. 7, 2015, However, to get that outcome they need to execute the eight steps (actions) shown in FIG. 3A through FIG. 4E and then create the chart.

In FIG. 3A the user starts by copying all the data needed (which includes undesired dates) because that scales to much bigger data sets and is much less error prone than trying to copy only the desired dates as shown in 242, 252, 282, 272, 284, 274, 254 and 244. In step two FIG. 3B the user then sorts the data by date so that in step three FIG. 3C they can eliminate the data, 338 and 398, with dates outside the desired date range. In step four FIG. 4A the user then sorts the data by country 451 so that in step five FIG. 4B they can sum the donations by country (actually a pretty work intensive step on data of any size and complexity where the number of data points vary by country thereby not allowing a simple SUM copy-paste but requiring a number of rows specific SUM formulas). In step six FIG. 4C the user copies the values for the previous calculations so that they can then sort the data from largest to smallest total donations without having the values recalculate incorrectly. In step seven FIG. 4D the user sorts the calculated values largest to smallest 439, so in step eight FIG. 4E the user can then start the setup of the PIE chart. Scale this to a larger charity with tens of thousands of donations and it is easy to see the substantial amount of work involved. If the user was Pivot table knowledgeable they could use that approach but, as we exampled in our U.S. application Ser. No. 17/374,901, that entails a substantial amount of work as well.

Figure 2:
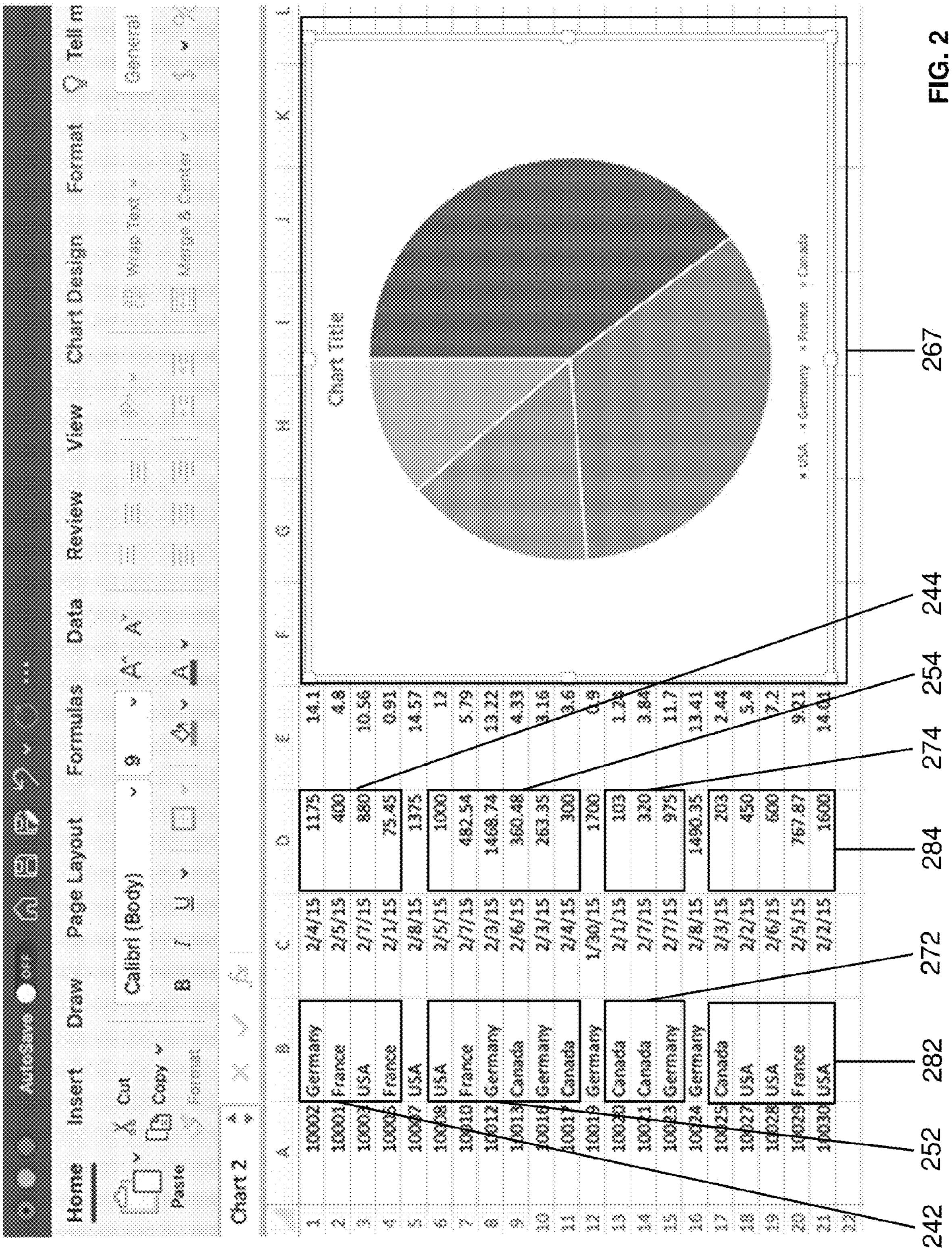
FIG. 2 examples the data and the chart the user wanted in Microsoft Excel.
Figure 5:
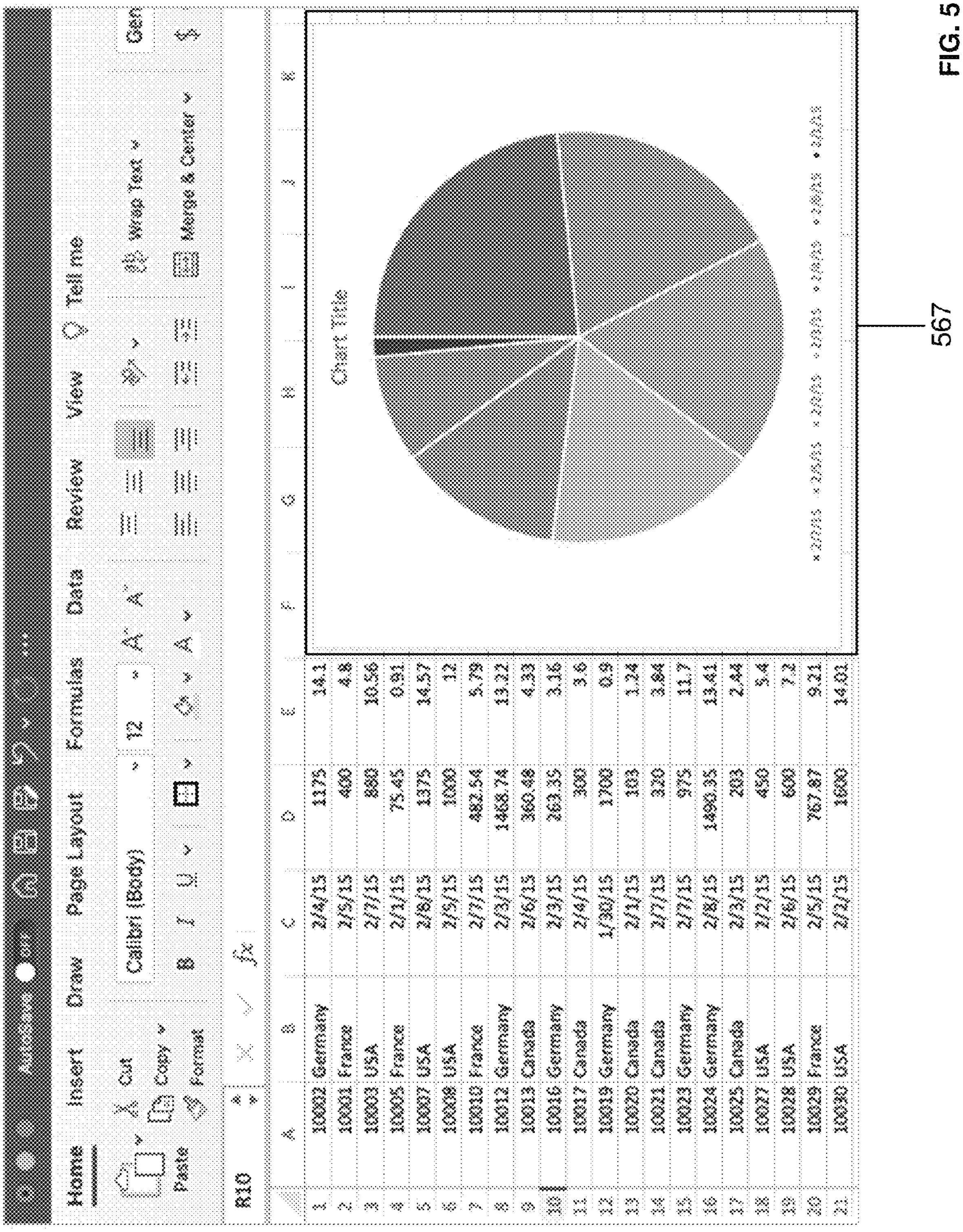
FIG. 5 examples in Microsoft Excel the next chart wanted by the user.
Figure 7:
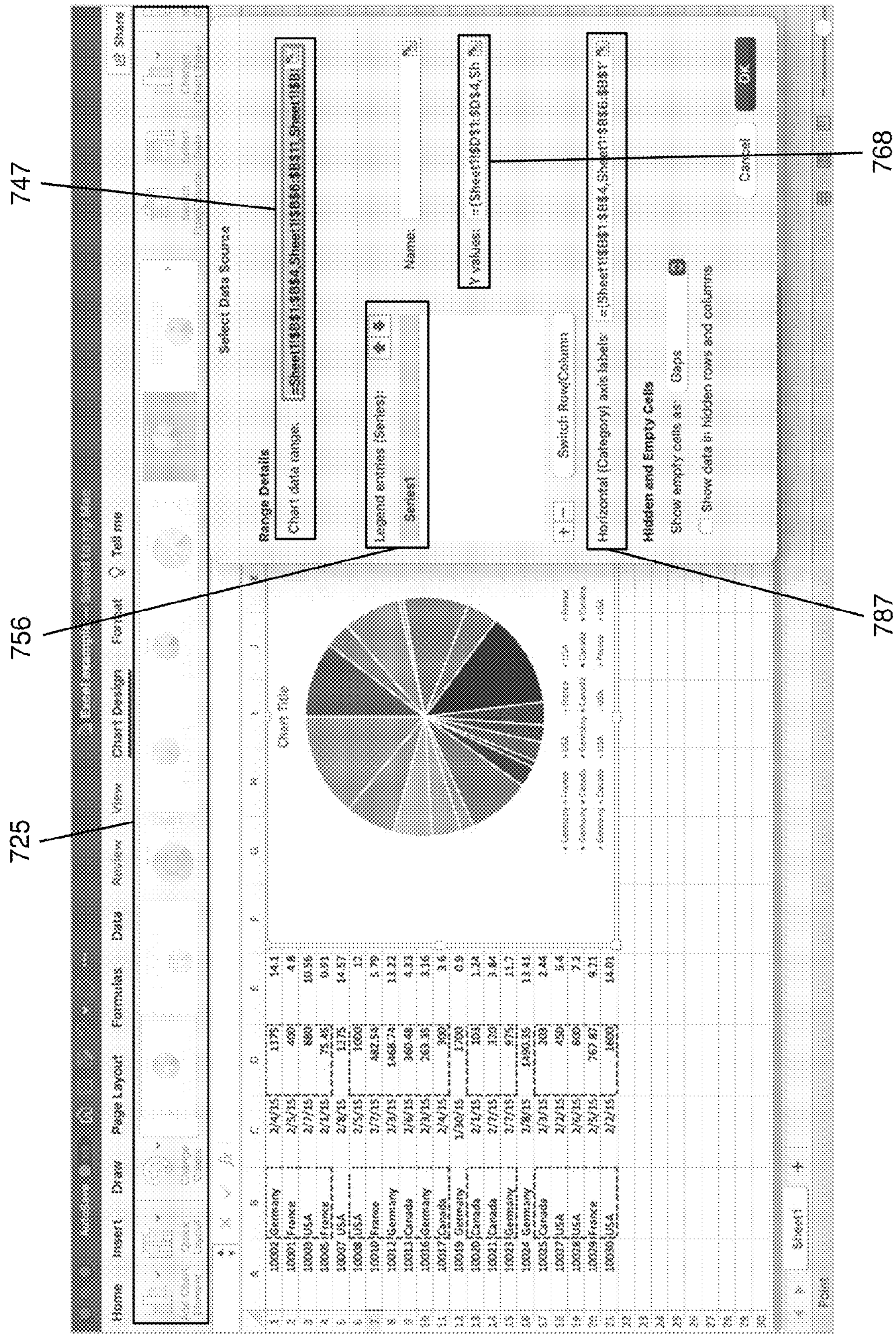
FIG. 7 examples in Microsoft Excel a popup displaying the inputted values and what goes where in input or for later modification.

If after seeing the ordered result of the country donations for the week of Feb. 1, 2015 to Feb. 7, 2015 in FIG. 2 267, they decide they would like to see the PIE chart of total donations by day for that same time period as shown in FIG. 5 567, they need to execute the five steps (actions) as shown in FIG. 6A through FIG. 6E. This is after taking advantage of the data manipulation from the previous steps shown in FIG. 3B and FIG. 3C. So, in step one FIG. 6A copying the date range filtered values from the step in FIG. 3C. Then they need to do the SUMs by date in step two FIG. 6B which gives the day-by-day total donations and is a major task for data of any larger size. In step three FIG. 6C they need to copy the values so they can do the sort and then in step four FIG. 6D do the sort by largest to smallest 639 so that in step five FIG. 6E they can start the setup of the chart. The user is now a total of thirteen steps (eight plus five) into something that will take approximately one and a half steps in our technology. However, before we explain that comparison in FIG. 7 we will example the Microsoft Excel chart setup/modification UI for the chart in FIG. 1. The data is in 747, the Legend in 756, the Y values in 768, and the axis labels in 787. There are many ways in the existing spreadsheets to input the chart values as we will show there are many ways to input the chart values in our technology, the difference lies in the elimination of all the work before the input in our technology. The user has selected the PIE chart elsewhere using ribbon selection and changing settings is mostly done via other menu or ribbon selections. In Microsoft Excel chart setup uses one or more ribbons, popups or menus and has a Chart Design ribbon 725 dedicated to it.

Figure 8:
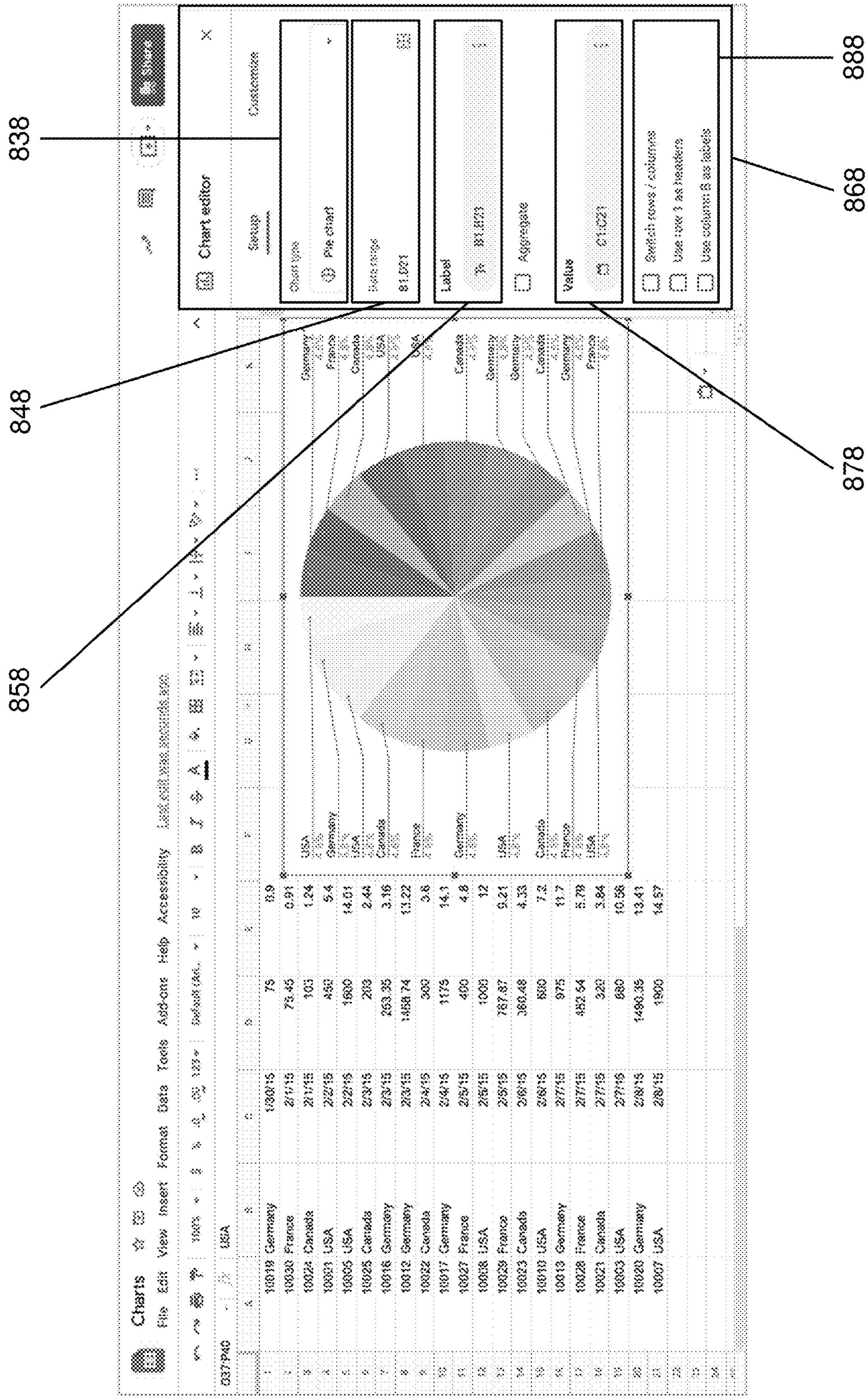
FIG. 8 examples in Google Sheets the sidebar cell range display of the comparable inputs (and locations for modifications) as was shown in FIG. 7 for Microsoft Excel for the comparable chart.
Figure 9:
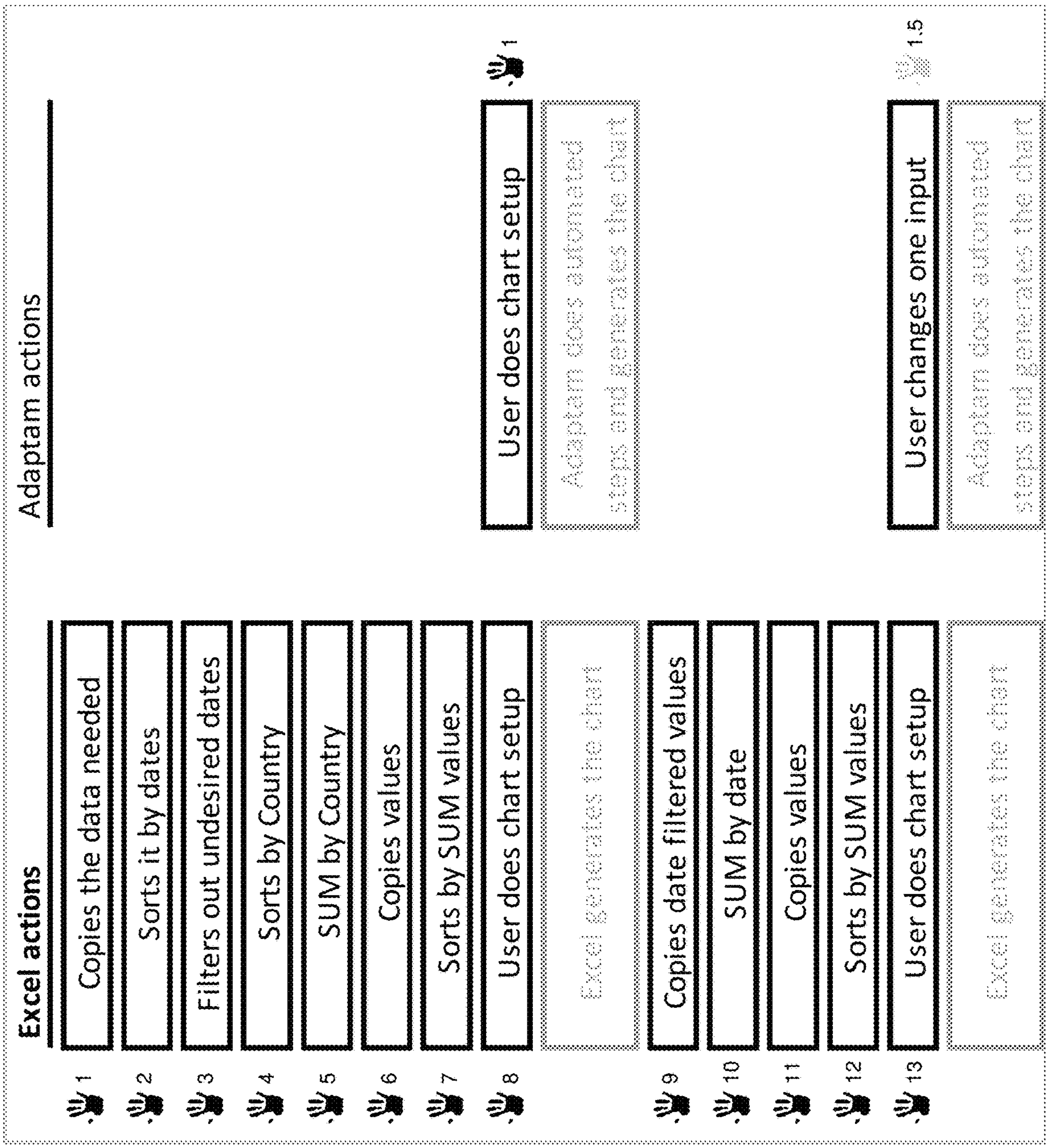
FIG. 9 compares the thirteen user actions required to generate the two charts in FIG. 2 and FIG. 5 in Microsoft Excel versus the one and one-half actions in our technology.
Figure 10:
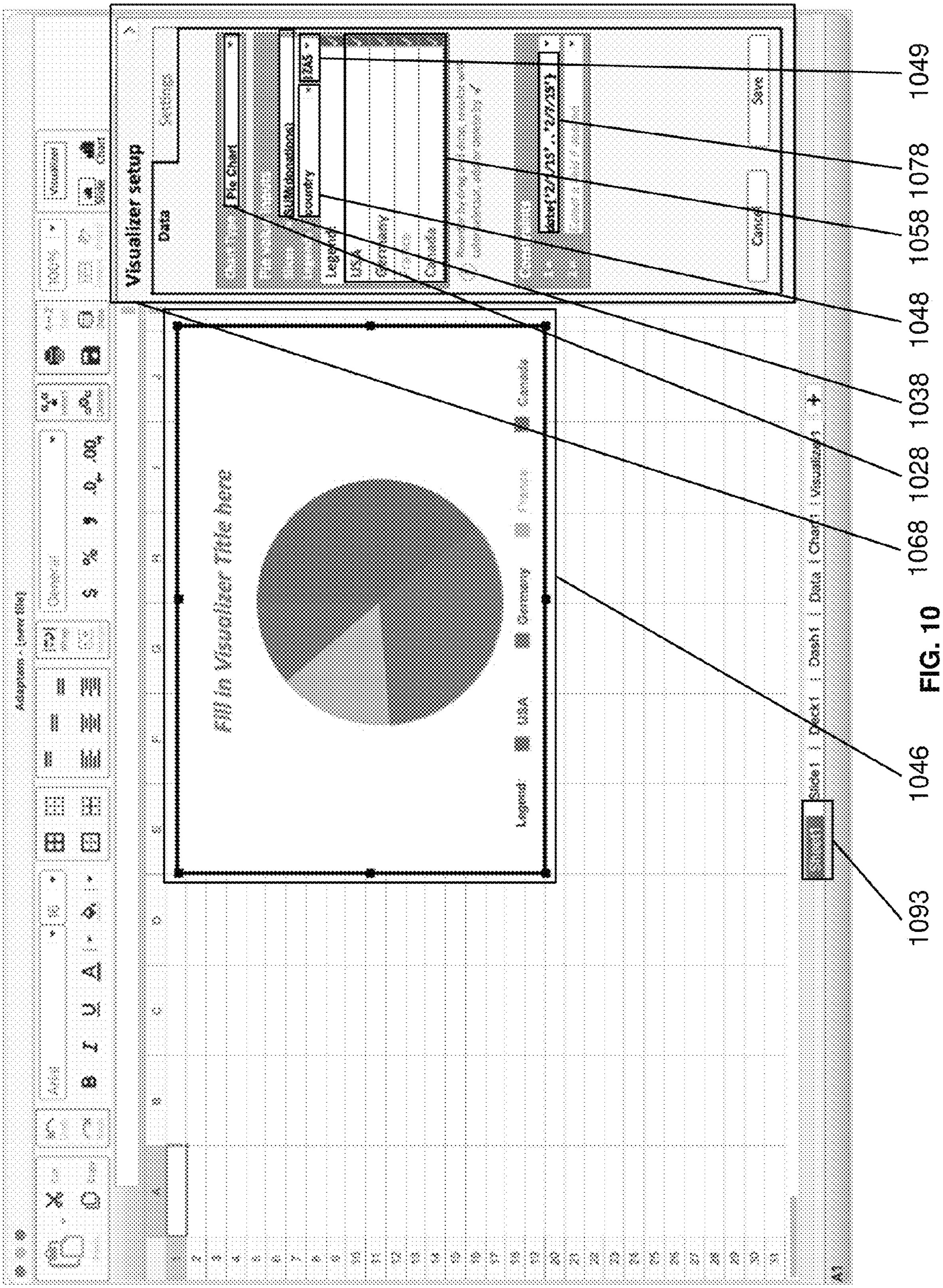
FIG. 10 examples the user input (setup) into our (GROUP) technology to create the comparable chart to FIG. 2.

FIG. 8 shows the Google Sheets UI which looks different than the Microsoft Excel UI but functionally does very similar things producing similar charts of "what you input is what you get" with no post data selection filtering capabilities and no calculational capabilities. To duplicate creating the charts 267 in FIG. 2 and then 567 in FIG. 5 in Google Sheets requires doing the same thirteen data manipulation and analytical steps and so we have not repeated them. In contrast FIG. 9 examples the difference of steps using our technology to create the two different charts, specifically the one- and one-half steps using our technology versus the thirteen using the existing spreadsheets. The difference is our technology automatically does the required analytics to create the chart rather than requiring the user to do it. FIG. 10 examples the one step inputting the user setup that creates the chart comparable to chart 267 in FIG. 2. Then FIG. 11 examples the half step change that then creates the chart comparable to chart 567 in FIG. 5. As we will example later the required inputs (specifications) in our technology parallel those in a conventional spreadsheet, the difference is we are putting external data fields, external formulaic data fields or in-cell formulaic data inputs rather than the exact cells to be charted. While in this example the inputs in this embodiment of our technology look more like those of Google Sheets, we will later example UIs that look more like Microsoft Excel. Any of the input approaches effectively inputs the same thing; the labels/legends, the series of values to be charted for those labels/legends, and the type of chart.

Our Chart Visualization Technology

A major difference with our technology visualizing a chart is the user does no data sorting, data copying and calculation steps using our technology, the user simply does the chart setup using our formulaic data or comparable instruction sets and if desired the formula of their choice and all those other steps are automatically done in buffer by our technology. Creating the second chart is even easier because most of the chart setup inputs are already done and the user only has to make one chart setup change (hence half a step).

FIG. 10 examples the chart setup in our technology for the chart comparable to the chart 267 in FIG. 2. In this embodiment our visualized chart is generated in spreadsheet worksheet 'Sheet1' 1093, but as we will example later could be generated elsewhere within our spreadsheet application. Our comparable chart 1046 is created by the five chart setup inputs (specifications) 1028, 1038, 1048, 1078 and 1049. In this embodiment of our technology those user inputs (specifications) are put into a visualizer setup sidebar 1068, but as we will example later those inputs could be done in a popup, directly on the visualizer chart or through another UI. The user first selects the type of chart they desire 1028 from a dropdown list of available types or other UI specifier. Then they input the formulaic data (or other data external data specifier) or formulaic data formula, in this example the 'SUM{donations)' 1038. Specifying the formulaic data field 'donations' tells our technology what in-cell data set or external data table the user wants thereby populating the remaining (smart) dropdowns so that users can simply select the inputs they desire from a list defined by our technology (to only include applicable options). The user then selects or types the Legends input (specification) they want, 'country' 1048, selects a sorting type '!ZAS' 1049 which is largest (Z) to smallest (A) slice (S) value, and then adds the constraint (filter) of the 'date{Feb. 1, 2015' . . . 'Feb. 7, 2015'}' 1078. These inputs, generate the chart 1046 automatically doing in buffer the equivalent in FIG. 12A through FIG. 13E of all eight steps done manually in Excel in FIG. 3A through FIG. 4E.

Figure 11:
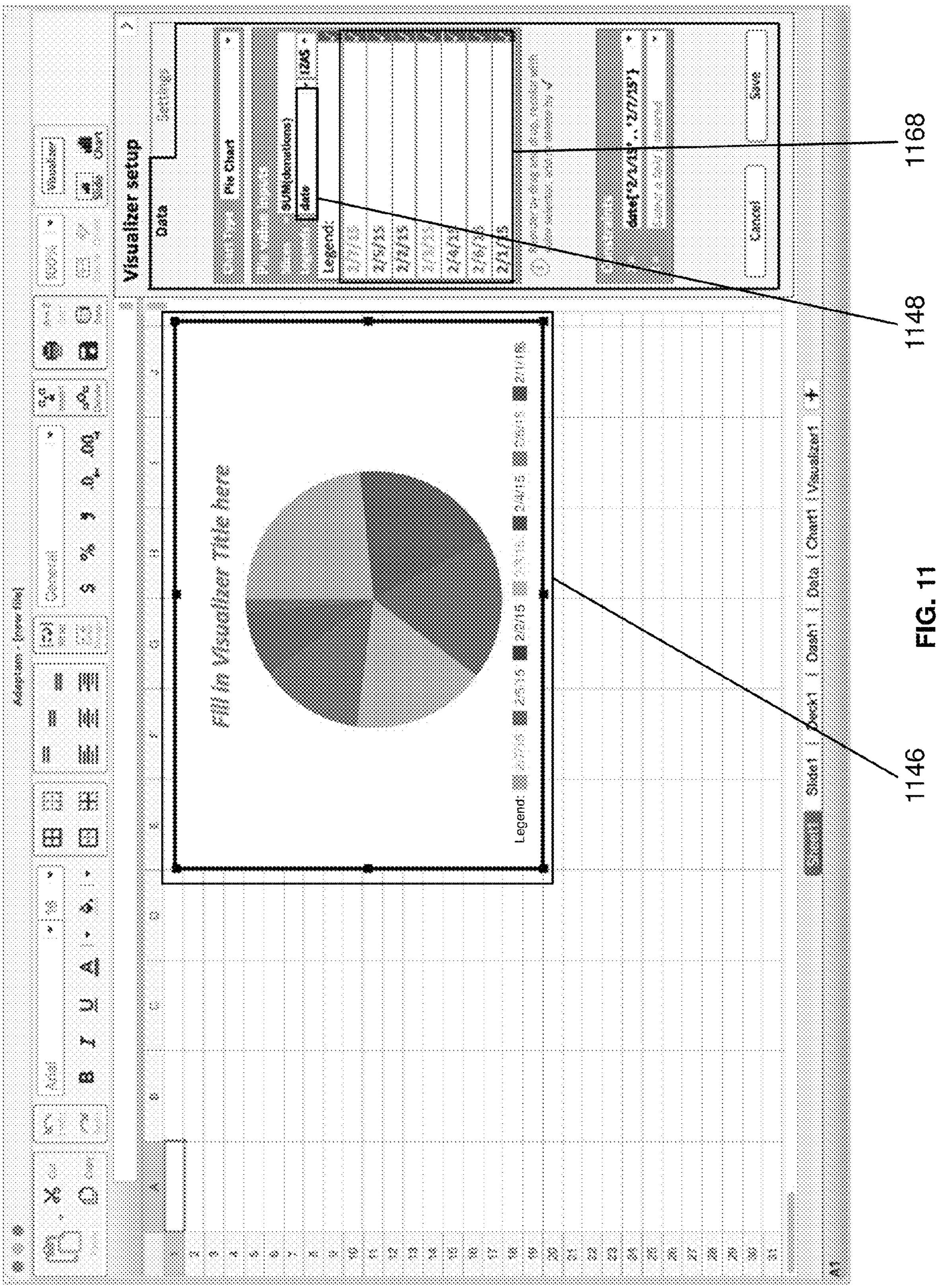
FIG. 11 examples the half action user change in our (GROUP) technology to create the comparable chart to FIG. 5.

FIG. 11 examples the one visualizer module chart setup change required in our technology to get the chart 1146 which is comparable to chart 567 in FIG. 5. That one change replacing 'country' 1048 in FIG. 10 with 'date' 1148 automatically changes the chart slice calculations to be for each of the dates 1168 instead of each of the countries 1058 in FIG. 10 and automatically changes the legends in the chart 1046 and sidebar 1058 in FIG. 10 to those in chart 1146 and those in sidebar 1168 in FIG. 11. All these changes come automatically, as shown in FIG. 14A through FIG. 14G, from one input switch which replaces all five of the manual steps shown for Microsoft Excel in FIG. 6A through FIG. 6E. In our technology creating a chart from external data is done without seeing the data and instantiating it into a range of cells, without sorting it in cells, without filtering it in cells, without doing calculations on it within cells, and without further in cell sorting and manipulating it to put the data into the form needed for chart setup. Likewise, if the formulaic data used by our technology was from data stored in cells somewhere within the workbooks within the spreadsheet, the user of our technology creates the chart without needing to see the data, without doing in-cell calculations with the data, and without doing any in-cell sorting, copying or other manipulation of the data. That is because all the steps done in FIG. 12A through FIG. 14F are automatically done in buffer (in our application) triggered by the chart inputs in our technology, not a user having to do the manual spreadsheet cell work.

The automatically done steps by our technology start in FIG. 12A which retrieves the Non-spreadsheet cell (NSC) external data using our formulaic fields. In FIG. 12B our technology sorts the data in buffer by the values of 'date' so that in FIG. 12C it can filter (constrain) the data to dates within 'Feb. 1, 2015' and 'Feb. 7, 2015' eliminating 1228 and 1288. Next in FIG. 13A our technology sorts the data by country (grouping according to label/legend values) so that in FIG. 13B our technology does the 'SUM(donations)' (spreadsheet predefined function formula) calculations. Next in FIG. 13C our technology illustratively sets up the labels/legends and calculated values for chart input using our default sort, which in this embodiment is ascending alphabetically by label/legend value. In FIG. 13C our technology then sorts by the user selected '!ZAS' sort 1049 (in FIG. 10) which is the largest to smallest Pie Slice value 1379 before then generating the chart 1046 in FIG. 10 in the final step FIG. 13E. Note, these automatically done steps by our technology are illustratively exampled as our application can use very different automatically executed steps to accomplish the same outcome.

That one input change replacing the Legends input with 'date' 1148 in FIG. 11 then automatically triggers our technology to retrieve the Non-spreadsheet cell (NSC) external data in FIG. 14A, sort the data by dates 1453 in FIG. 14B, filters out the data for the undesired dates 1426 and 1486 in FIG. 14C, do the SUM group calculations in FIG. 14D, setup the chart inputs with the default sorts in FIG. 14E, sort by the Slice values 1439 in FIG. 14E and finally generate the chart 1146 in FIG. 11 as the final step in FIG. 14G. Thus, having exampled all the automatic actions by our technology that replace the Excel and other spreadsheet thirteen manual steps/actions. Therefore, explaining the one and one-half manual steps by the user in our technology compared to the thirteen manual steps in the other spreadsheets shown in FIG. 9.

More Chart Types and Formulas

Figure 15:
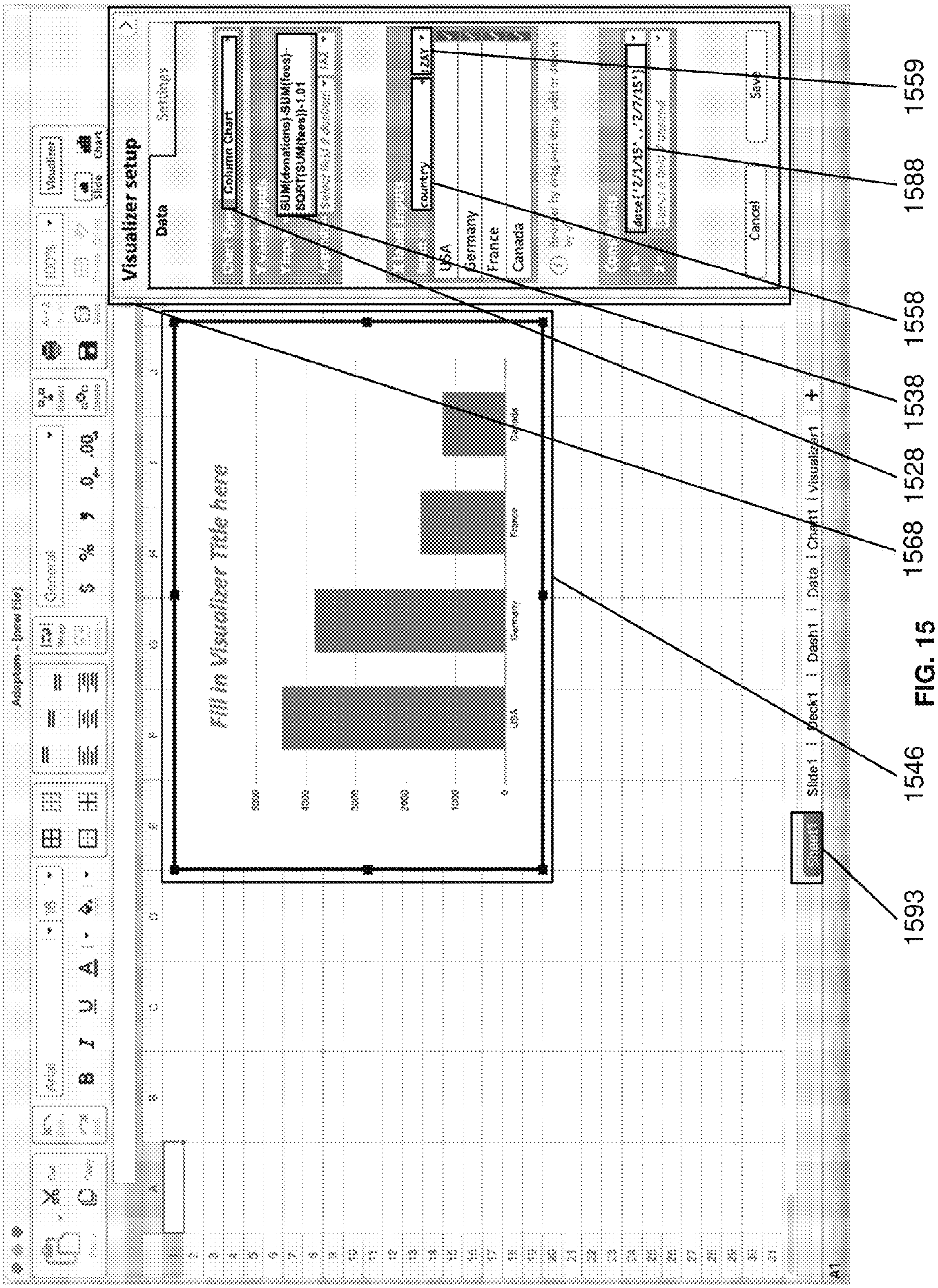
FIG. 15 examples our data visualizer (GROUP) technology generating a Column Chart for a multiple range function (e.g., 'SUM'), regular function (e.g., 'SQRT'), multi-function combination (e.g., 'SQRT(SUM(fees))' and constant (e.g., '1.01') containing algebraic formula.

Our chart visualizer technology supports a broad spectrum of chart types and a broad spectrum of calculational formulas. The charity user now wants to see a Column Chart of the donations net of all fees by country during the week of Feb. 1, 2015 shown in descending order. FIG. 15 examples that Visualizer Column Chart for an algebraic formula 1538 involving multiple range functions (e.g., three 'SUMs'), a regular function (e.g., 'SQRT' which is not a range or array function), a multi-function combination (e.g., 'SQRT(SUM(fees))' and a constant (e.g., '1.01') that nets out the fees from the donations. That calculation is repeated for all the X label 'country' 1558 unique (distinct) value groupings constrained (filtered) for the 'date{'Jan. 1, 2015' . . . 'Feb. 7, 2015'}' 1588 range and ordered largest to smallest (ZA) by Y (formula calculated Y) values '!ZAY' 1559 as shown in the chart 1546. In this example it is created in the 'Sheet1' 1539 worksheet of the spreadsheet from external data accessed via formulaic data fields. As we will example later that data could have come from in-cell source formulaic data fields and could be displayed in other worksheets or other tabs/UIs within the spreadsheet application. Like our previous examples the five chart setup inputs (1528, 1538, 1558, 1588 and 1559) into the Visualizer setup 1568 trigger the automatic execution by our technology of the steps retrieving the data, filtering as necessary, sorting as necessary, doing the grouping calculations and then generating the chart. None of these charting capabilities are within existing spreadsheets, yet all of which were accomplished by inputs into a sidebar type spreadsheet chart setup UI (e.g., similar to Google Sheets) in our technology. In later examples we will show how that is done by a more ribbon, menu and popup chart setup more similar and familiar to Microsoft Excel users. Allowing existing spreadsheet users to directly setup visualized charts that automatically execute data retrieval (FIG. 16A), data sorting (FIG. 16B and FIG. 17A), data filtering (FIG. 16C 1638 and 1688), repetitive grouped calculations (FIG. 17B and FIG. 17C), and unique label/legend grouping formula result ordering (FIG. 17D 1739) from external or in-cell data from a familiar UI without having to manually do those data manipulation, filtering, calculation and ordering activities manually in their spreadsheet cells or elsewhere.

Hint Chart Visualization Support

Our data visualization technology can be further simplified for the user by our hint technology, subject of U.S. Provisional Patent Application No. 63/192,475. Use of HINT technology reduces what the user needs to remember about their formulaic data and largely eliminates data input mistakes (e.g., wrong fields, wrong syntax and typos).

Figure 18:
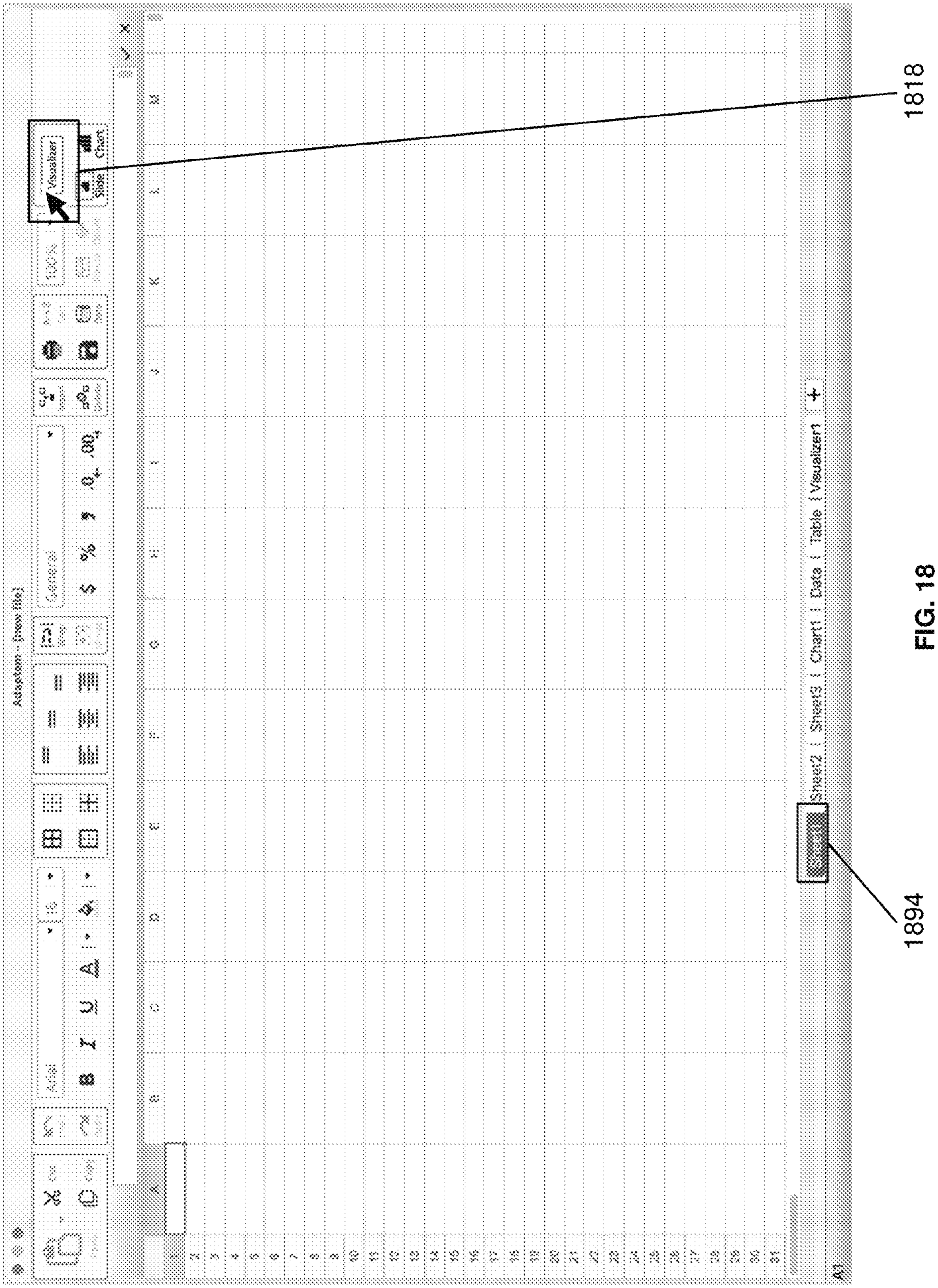
FIGS. 18, 19, 20, 21, 22, 23, 24 and FIG. 25 examples our data visualizer technology employing our HINT technology and our "previous input aware dropdown selectors".
Figure 19:
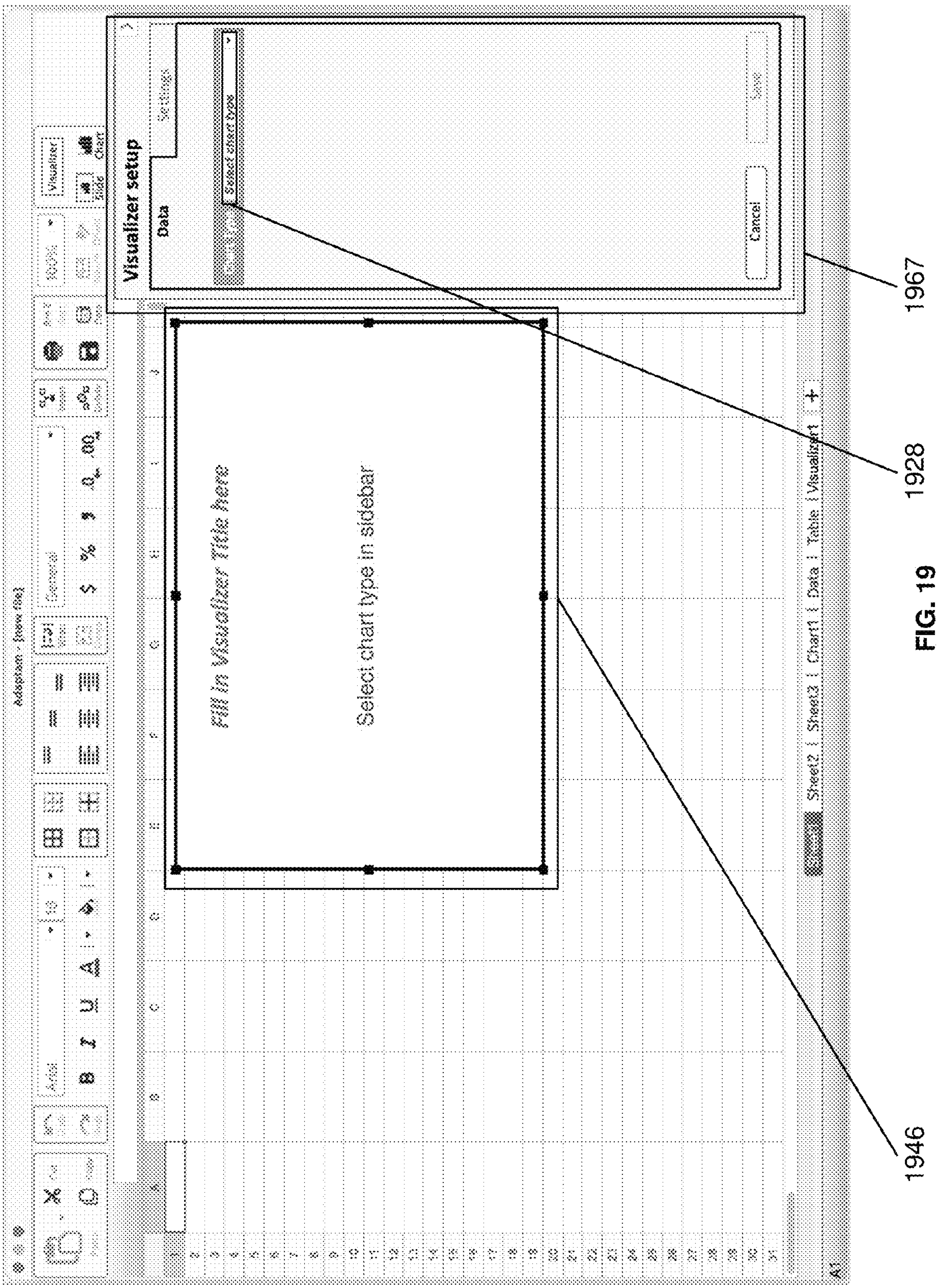
Figure 20:
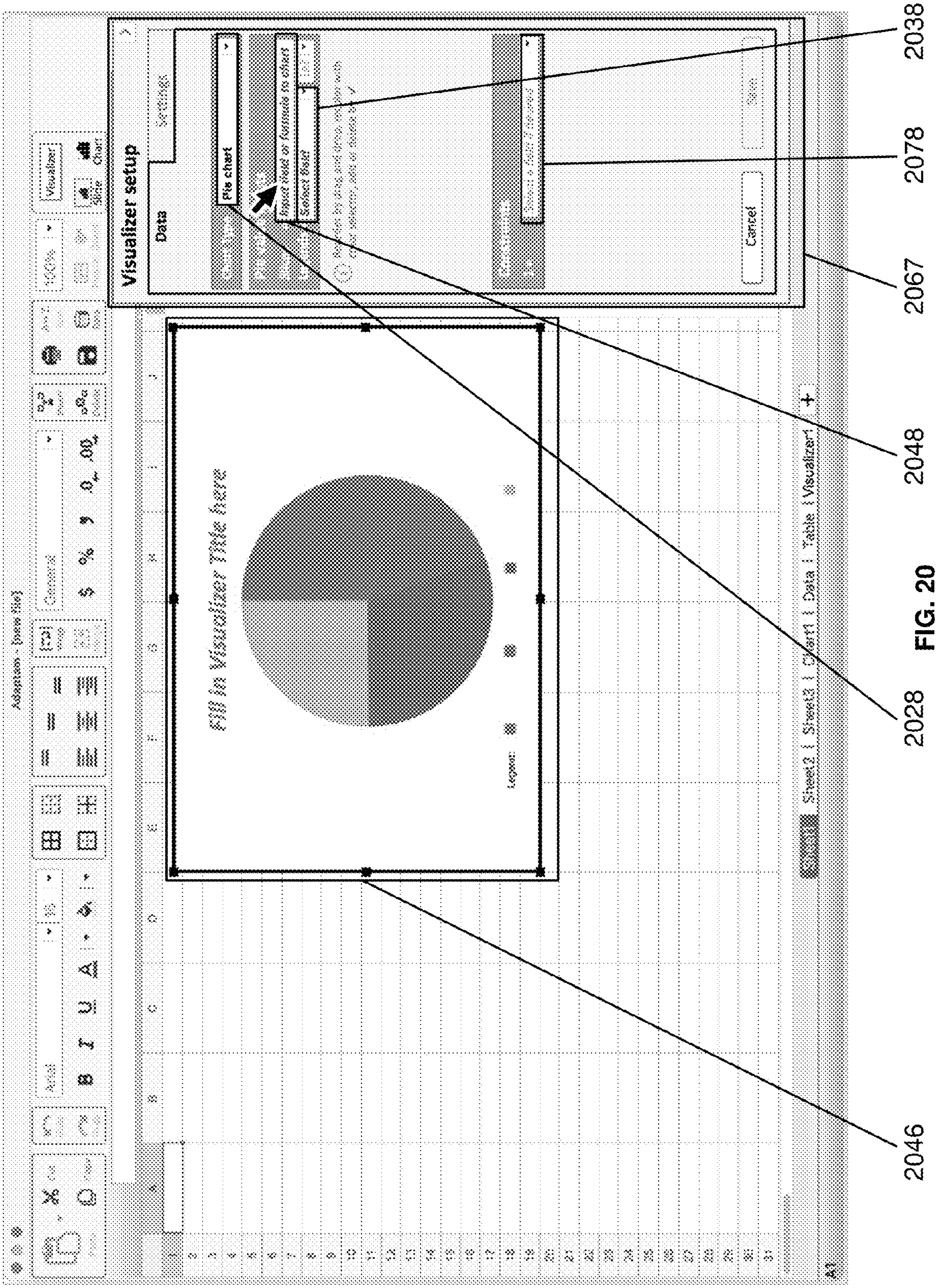

FIG. 18 examples a user starting the Visualizer chart setup by clicking a 'Visualizer' button 1818 on the spreadsheet ribbon while working in worksheet tab 'Sheet1' 1894. That could be triggered in other ways such as through a menu selection. In this embodiment the user is then presented with a blank visualizer chart 1946 and a sidebar 1967 with a chart selector 1928 that the user must fill in to start the process. Once the user selects the chart type desired, they are presented with and example chart 2046 (shown in FIG. 20) and a chart type specific sidebar 2067. For the 'Pie Chart'

Figure 21:
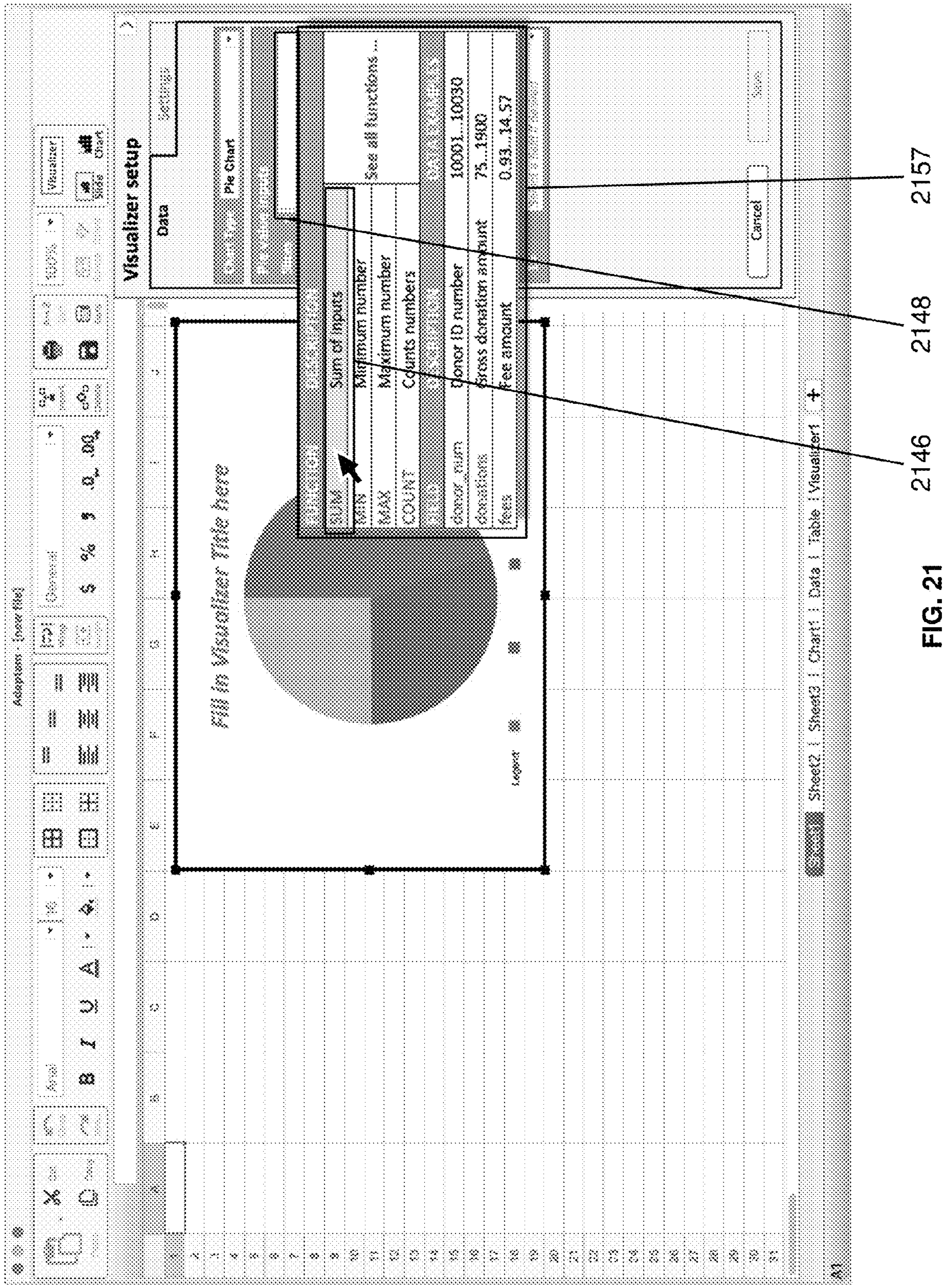

2028 that results in two mandatory inputs 2038, and 2048 that the user must fill in to generate the visualizer chart. They are also presented an optional input 2078 which they can use to automatically constrain (filter) the data used in the chart. In this example the user first clicks into the 'Slices' input 2048 getting an input HINT 2157 (shown in FIG. 21). That hint gives the user a selection of the function and formulaic data fields that they can populate into the 'Slices' input 2148. The technology screens the functions in the spreadsheet to only those that are applicable for Pie slices as well as the formulaic data fields (i.e., numeric) that are applicable to the Pie slices as exampled in the popup 2157. In this example the user clicks on the 'SUM' function 2146 line.

Figure 22:
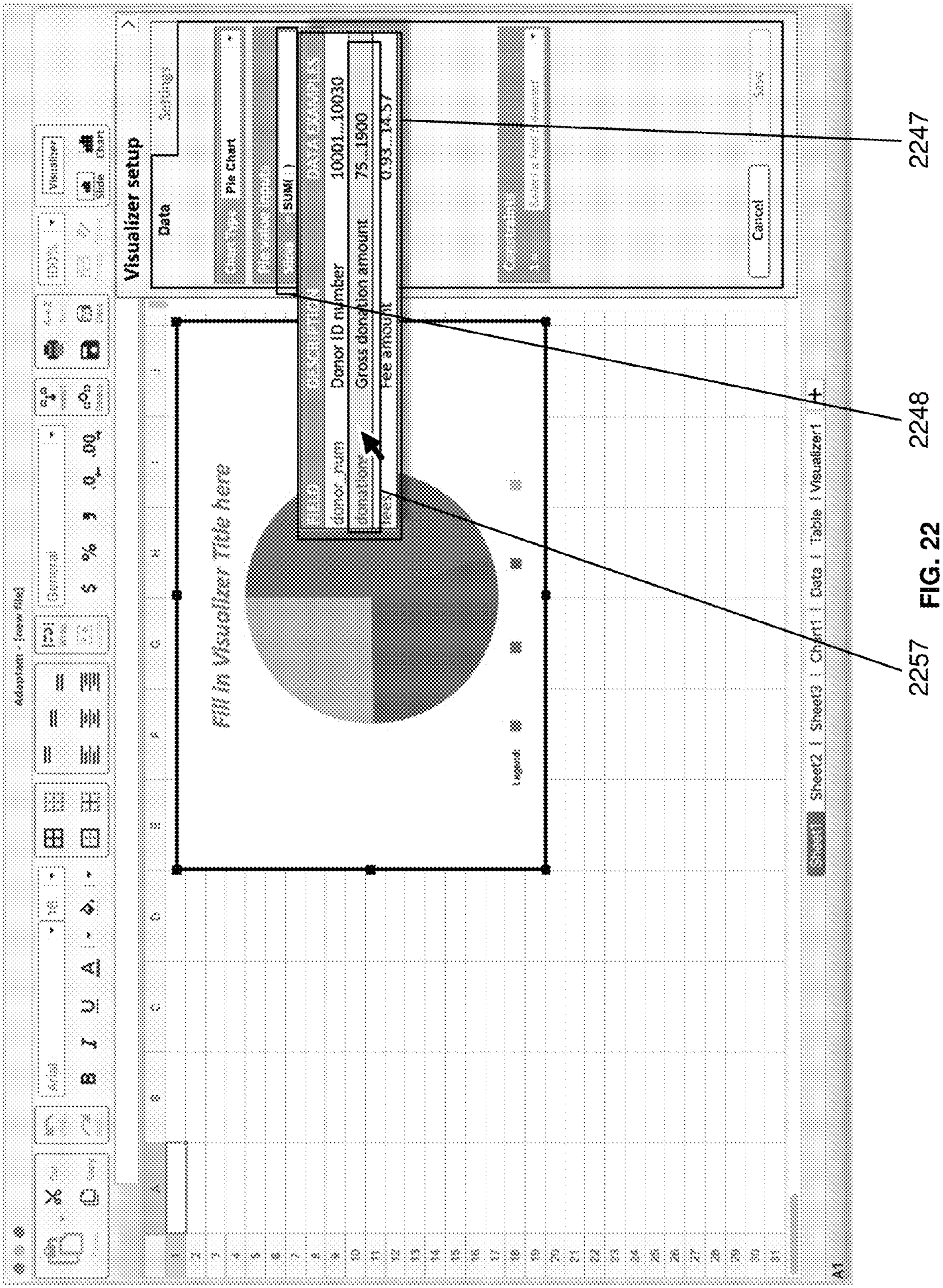
Figure 23:
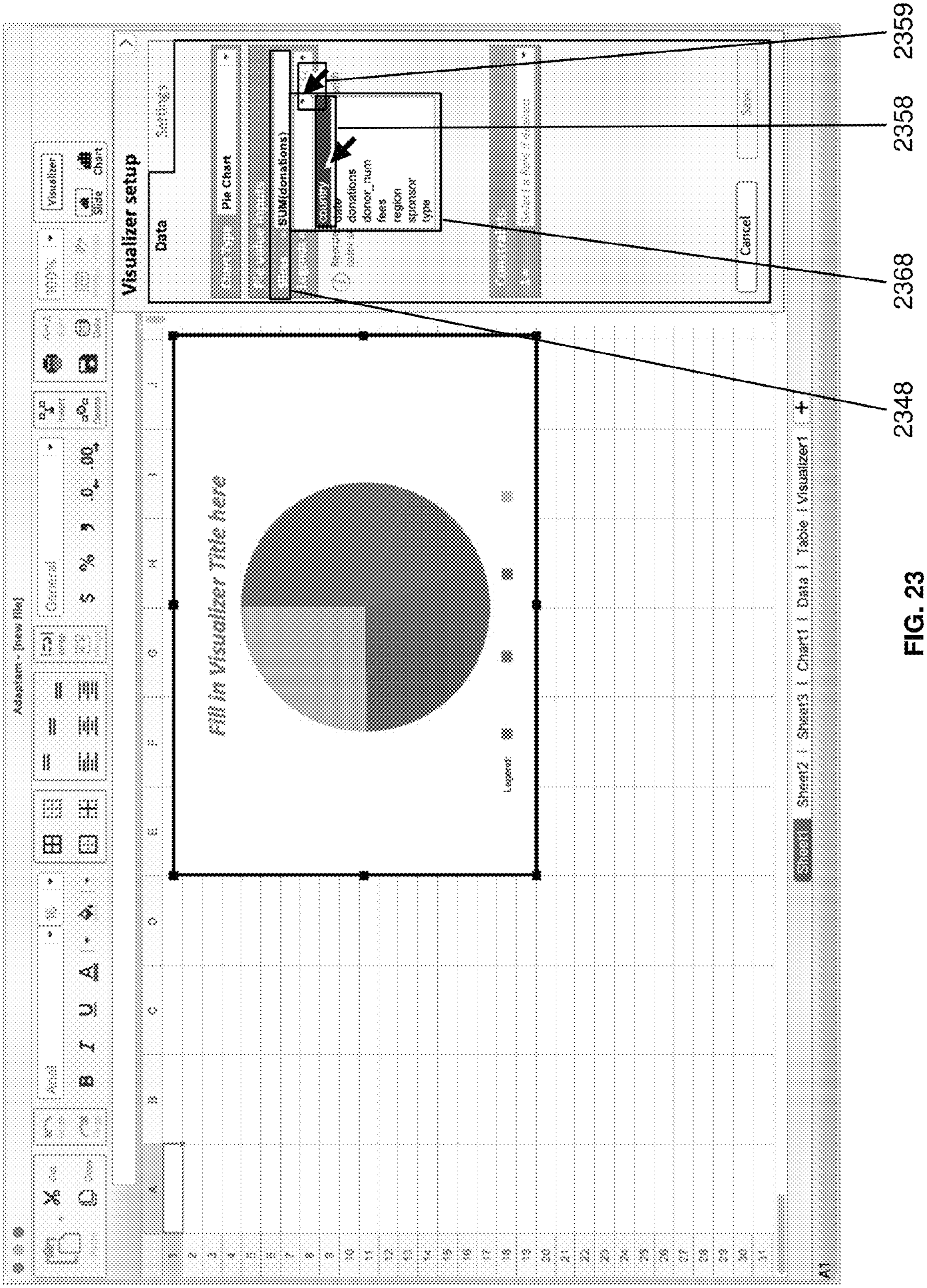

FIG. 22 shows the outcome of populating 'SUM' 2248 and gives the user another HINT 2247 with the formulaic data fields (i.e., numeric only as required by SUM) available to them to populate within the SUM function formula. For simplicity in this example, we have kept it to a short list of fields from a single table of data. However, most users would have many fields from many different data tables to choose from as our technology supports data sourced from many different external and in-cell data tables/sets. The user then clicks on the 'donations' line 2257 populating it into the 'Slices' formula 2348 'SUM(donations)' in FIG. 23. At that point the user decides to populate the Legends and clicks on the Legend dropdown button 2359 (shown in FIG. 23). In this embodiment that gives the user a "smart" dropdown 2368 with all the formulaic data fields available for use for the Pie chart legend (but no non applicable fields). Our technology knows the data table or data set that 'donations' in the Slice formula 2348 is from and limits the dropdown values shown to only fields in that table or data set. Because in this example the slices input (specification) contains a range function formula using 'donations', 'donations' is included in the Legends dropdown list 2368. Had instead this been simply a visualizer chart of the donations in the slices (with no range function calculation) then our technology would have known to eliminate 'donations' from the Legends dropdown list 2368. The dropdown is smart enough to only give the user options that will work given the previously specified selections. In this example the user clicks on 'country' 2358 in the Legends dropdown list 2368 which then fulfills the minimum requirement to generate a Pie chart.

Figure 24:
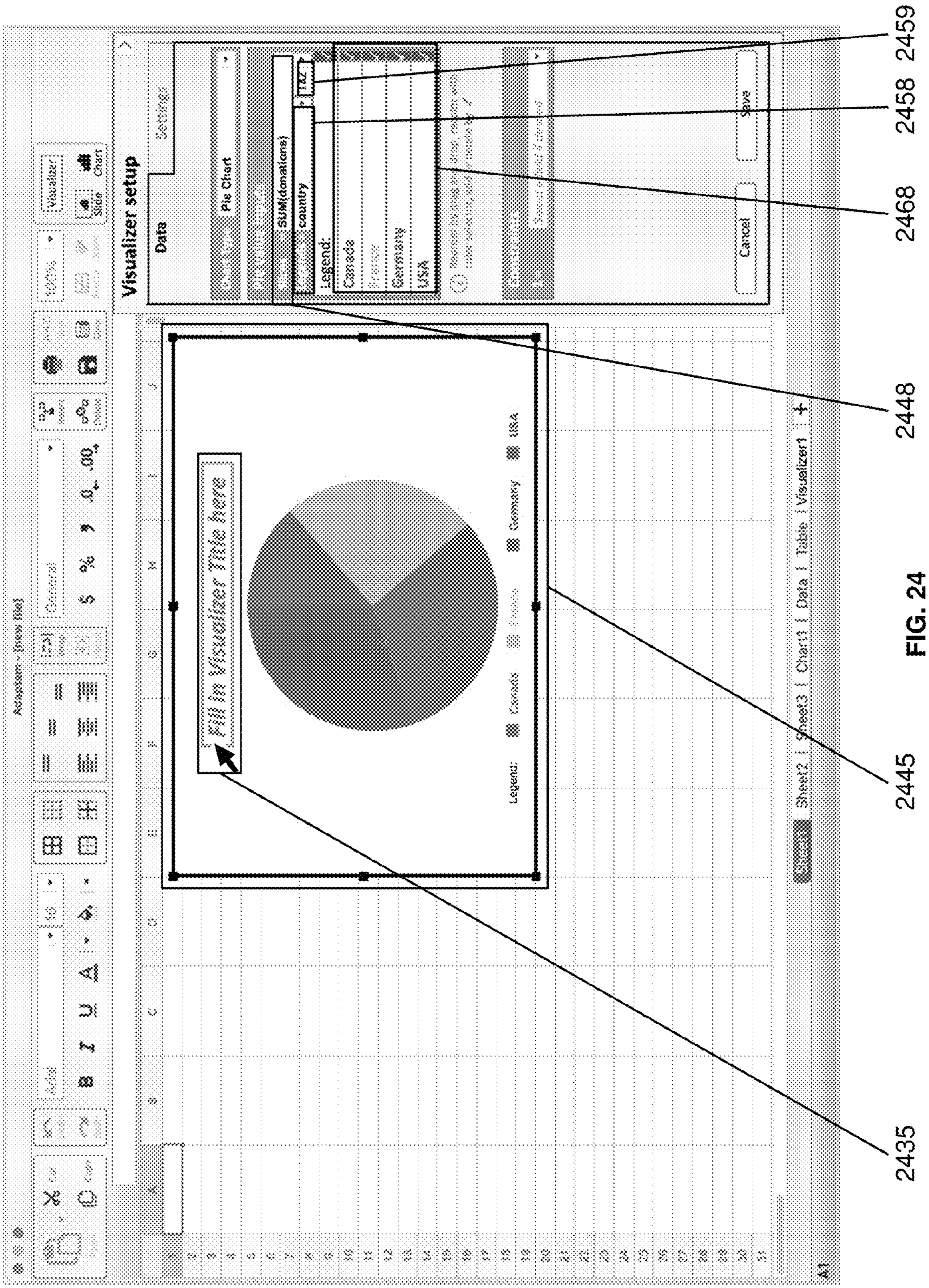
Figure 25:
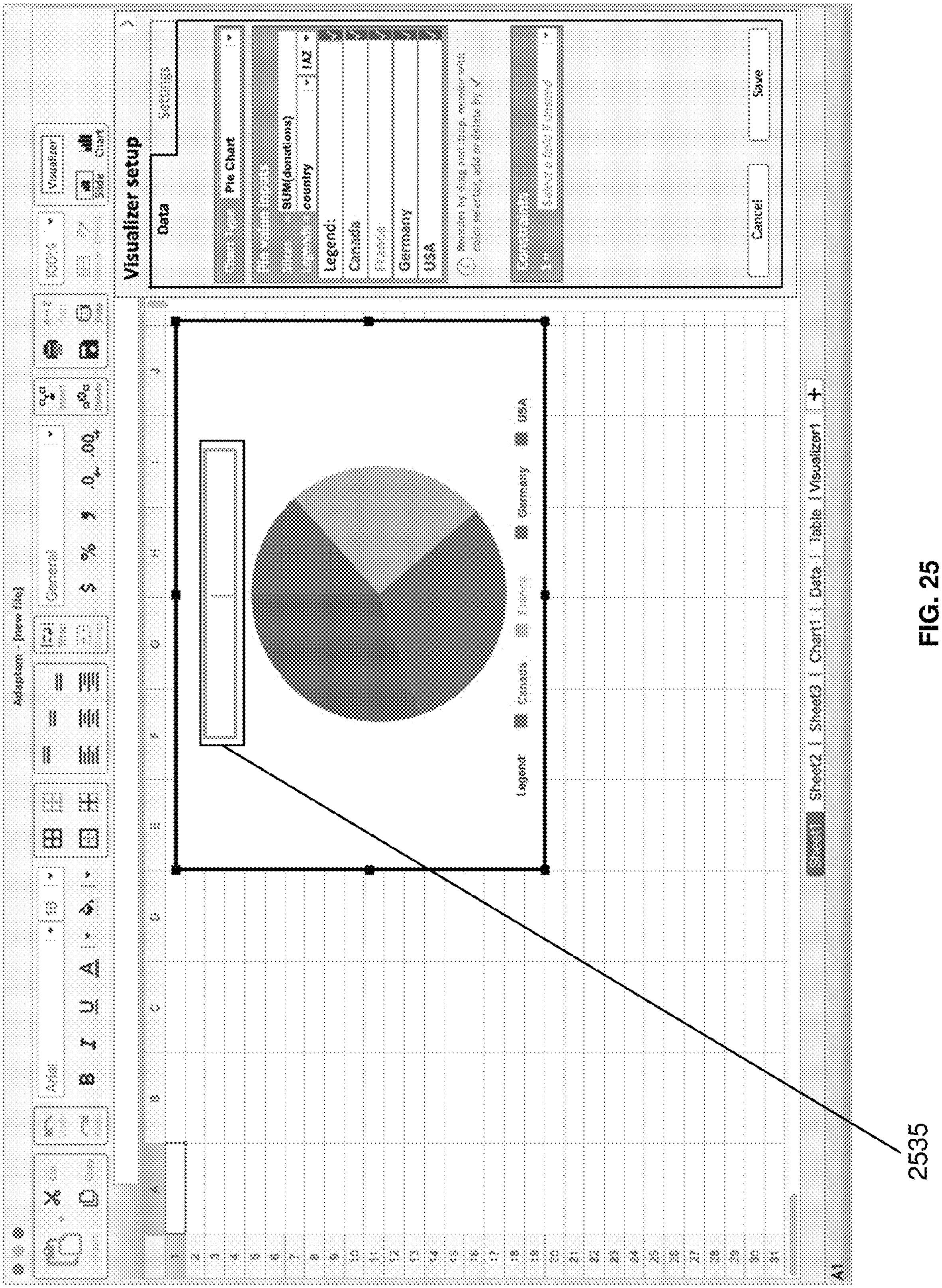
Figure 26:
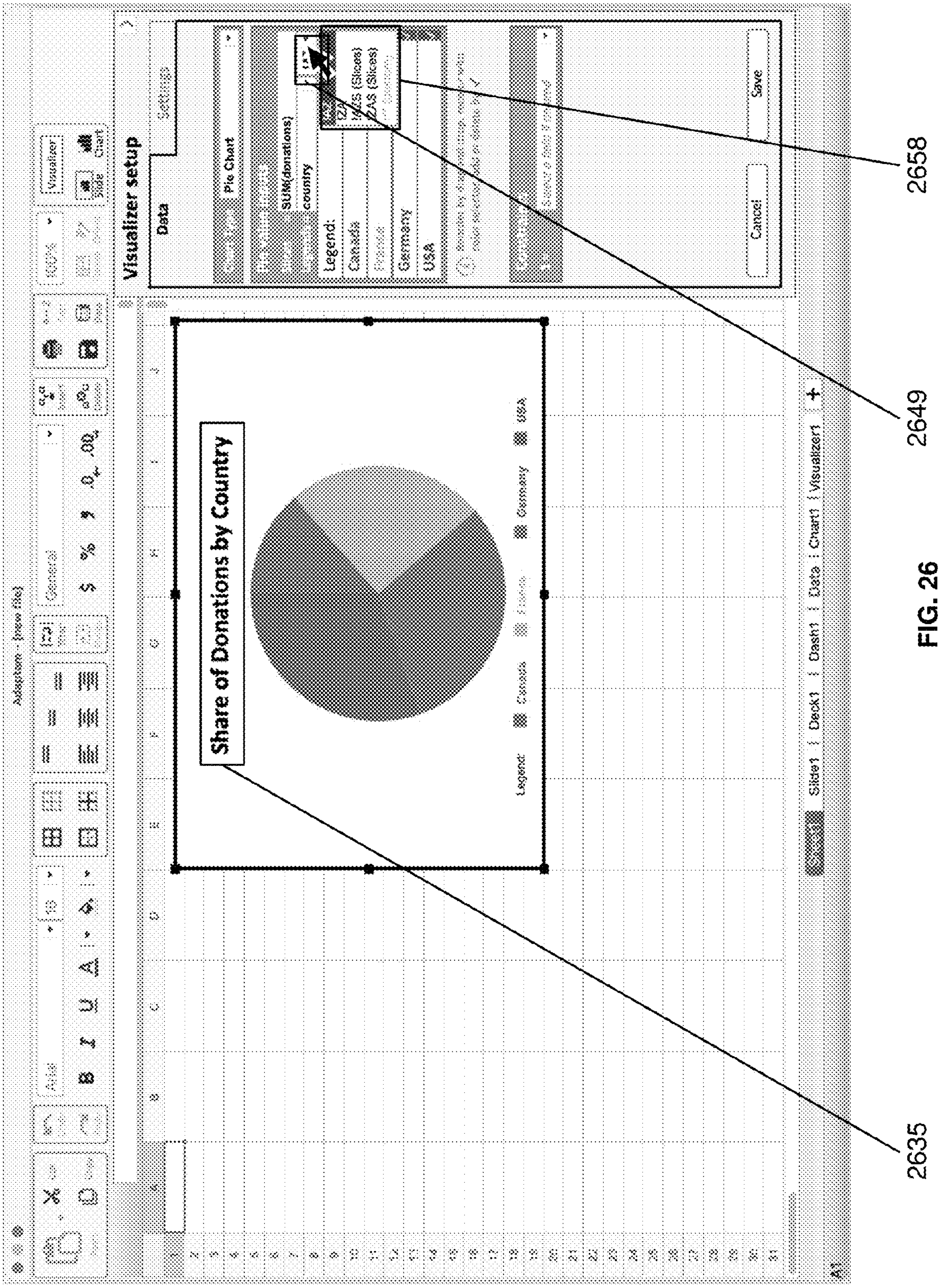
FIGS. 26, 27, 28, 29A and 29B examples our technology automatically reordering the calculated PIE slice values based on a single user specification, eliminating the need to do in-cell data manipulation, calculation and sorting work.
Figure 27:
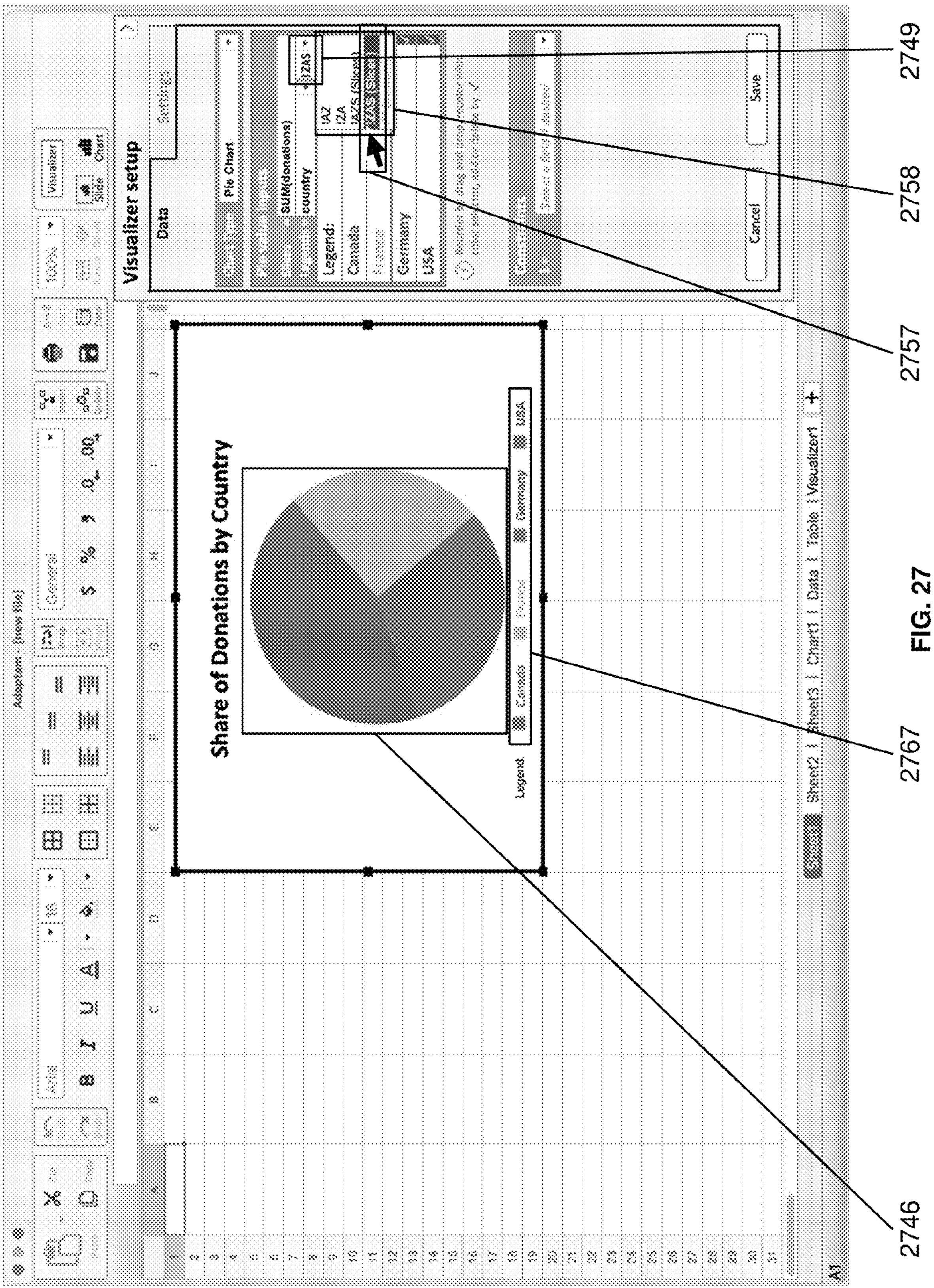
Figure 29B:
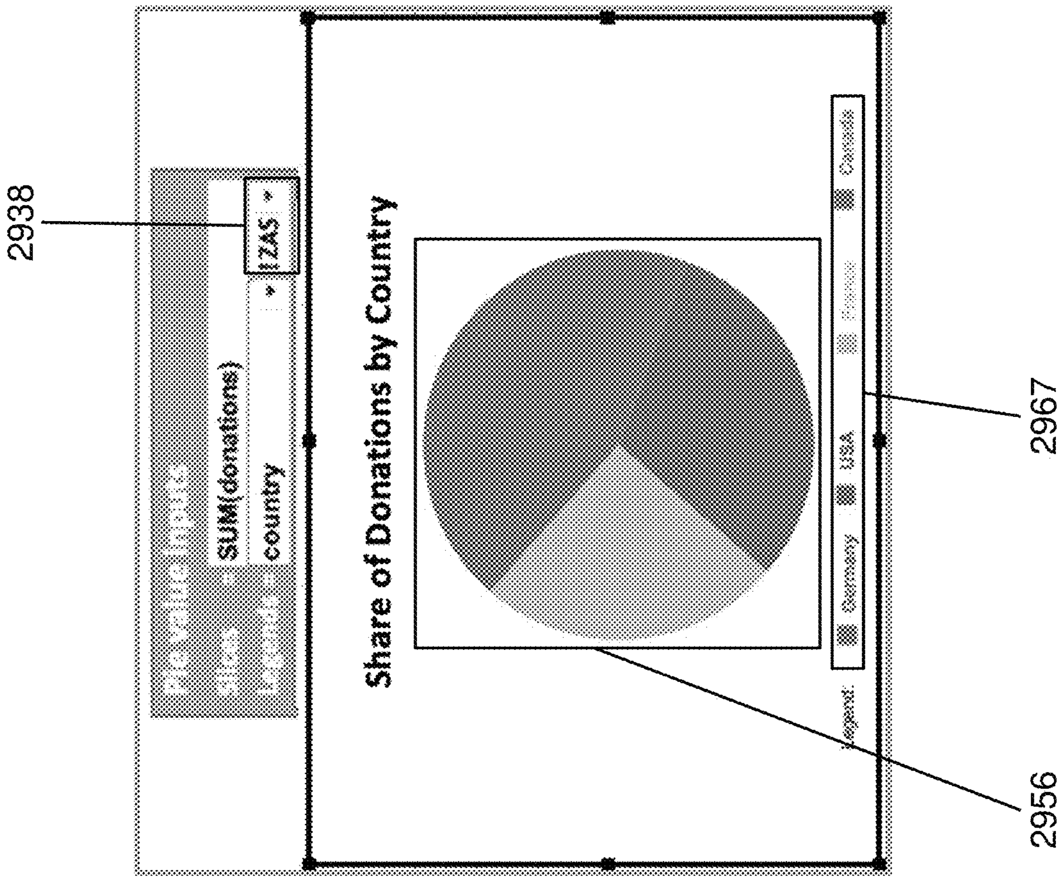
Figure 29A:
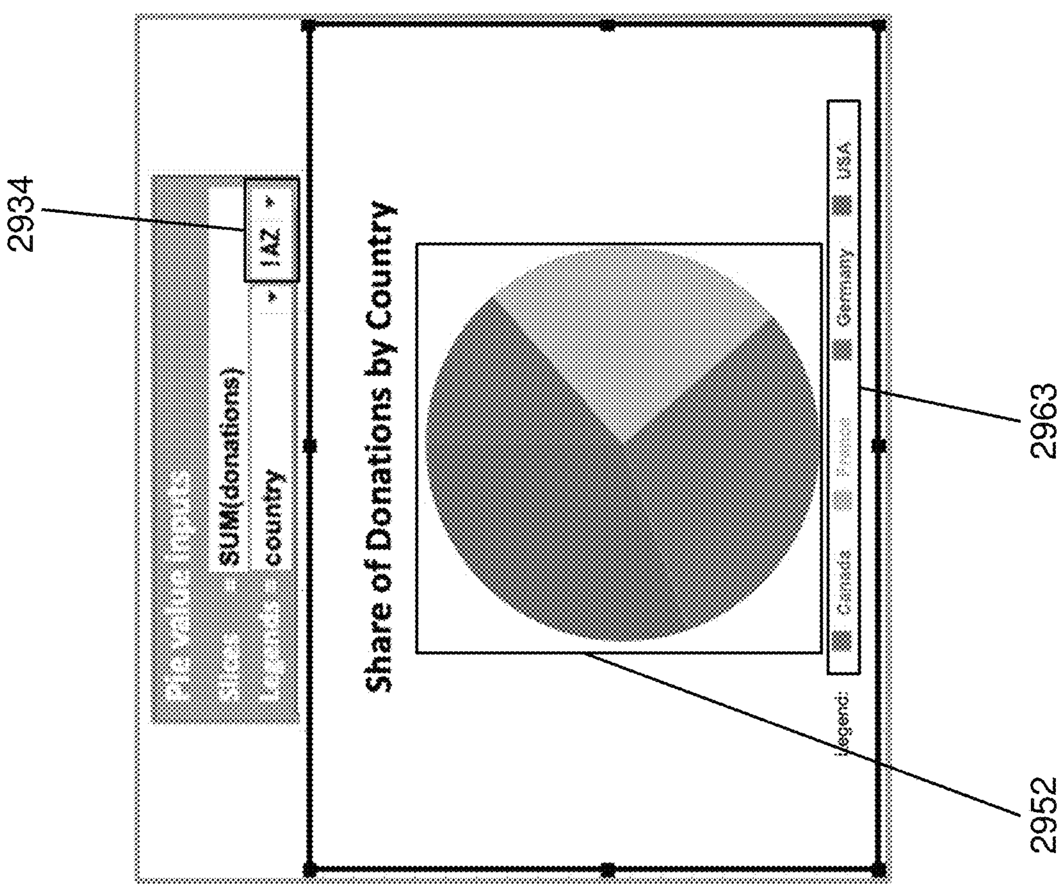
Figure 30:
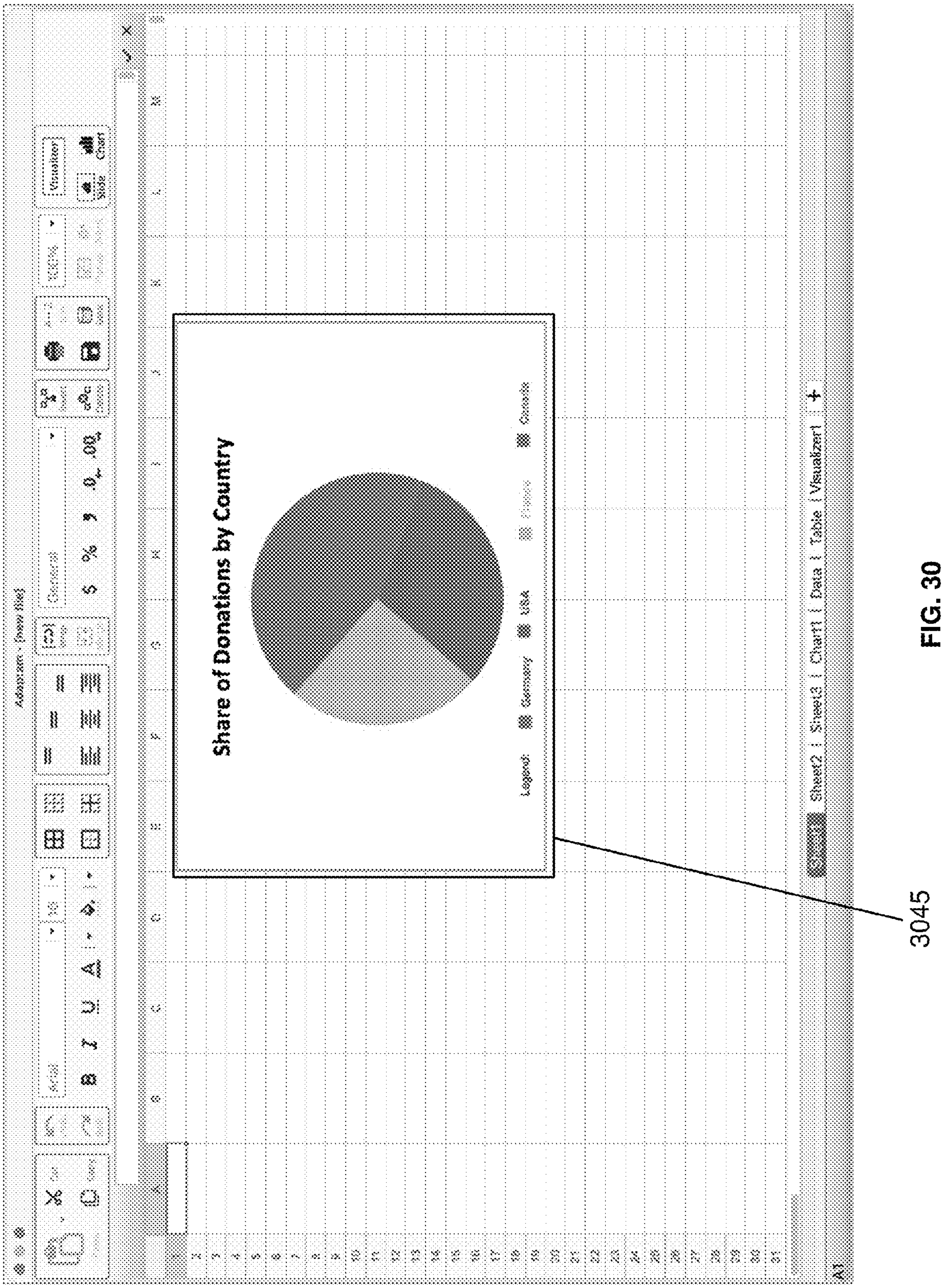
FIG. 30 and FIG. 31 example the reappearance of our data visualizer sidebar controls upon clicking on the chart.
Figure 31:
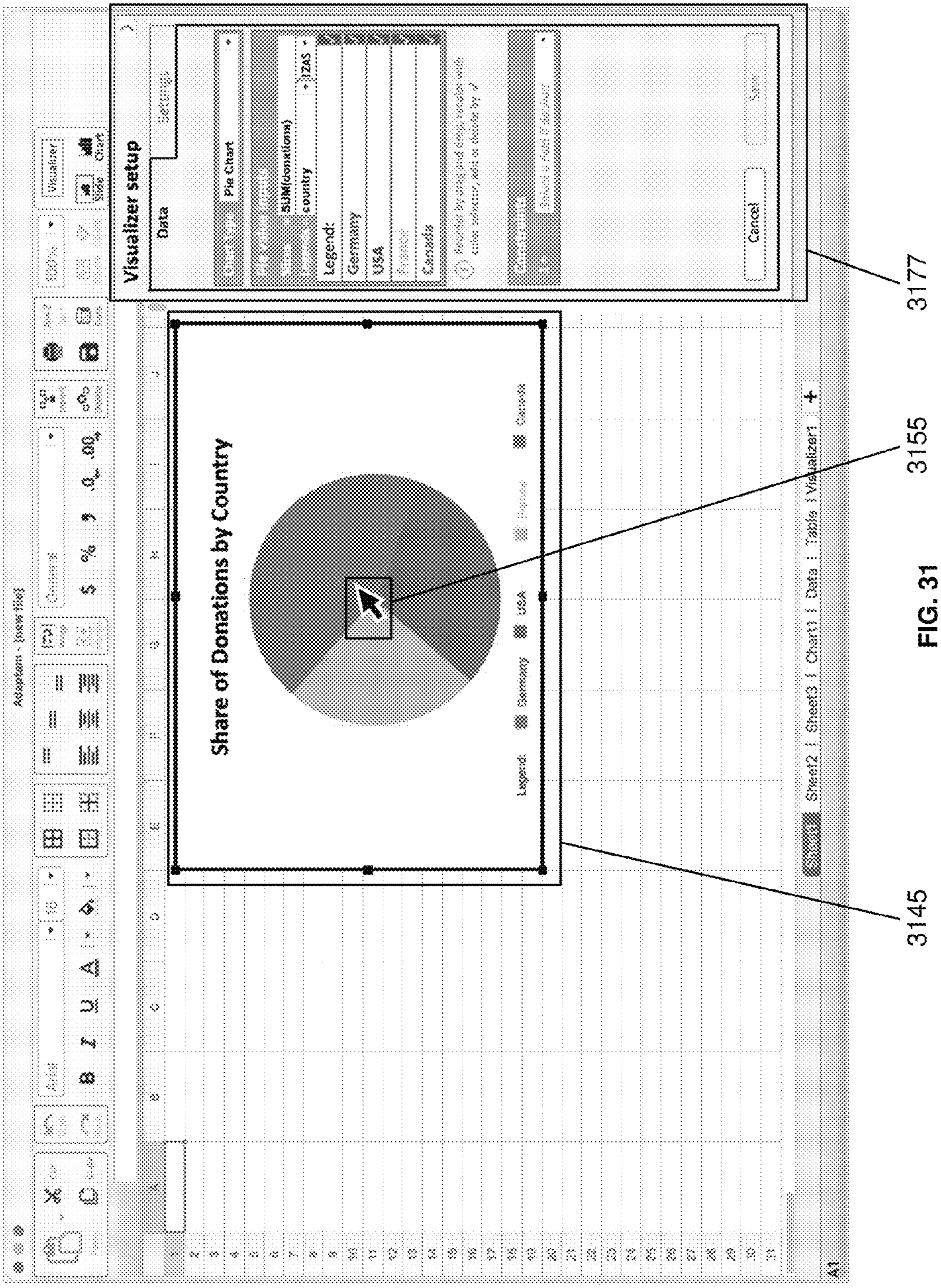

FIG. 24 shows that generated Pie chart 2445 having automatically retrieved all the specified data, done the SUM calculations for each of the unique label/legend countries 2468 groupings and sorted the data by the default setting of '!AZ' 2459 which is A to Z on the country labels as shown in 2468. In this embodiment it also automatically generates a Visualizer title fill in that user can click into and populate as done in 2535 (shown in FIG. 25) and then finished in 2635 (shown in FIG. 26). The user can then change the optional inputs and settings. The user wants to sort the Pie chart from largest to smallest 'Slice' so they click on the Legends order selector 2649 to display the options in the dropdown 2658. In FIG. 27 the user then clicks the '!ZAS (Slice)' option 2757 in the dropdown 2758 which then populates as the selection 2749 and automatically alters the chart 2746 and Legend 2767 to the new chart 2846 and new Legend 2867 outcome shown in FIG. 28. The change is shown side by side in FIG. 29A and FIG. 29B, where the change in the sort selection from '!AZ' 2934 to '!ZAS' 2938 automatically changes the order of the Pie slices from 2952 to 2956 and reorders the Legend values from 2963 to 2967. In this embodiment the user can then click the 'Save' button 2888 (in FIG. 28) to finish creating the visualizer chart, close the sidebar and save the chart 3045 (shown in FIG. 30) to the worksheet. If the user then decides they want to change anything in this embodiment they simply click 3155 into the visualizer chart, as shown in 3145 in FIG. 31 and the sidebar 3177 reappears ready for changes.

In-Cell Data Fed Chart Visualization

As we have described previously, our technology works with formulaic data from Non-spreadsheet cell external data and with in-cell data. FIG. 32 through FIG. 37 show two different examples using in-cell data.

Figure 32:
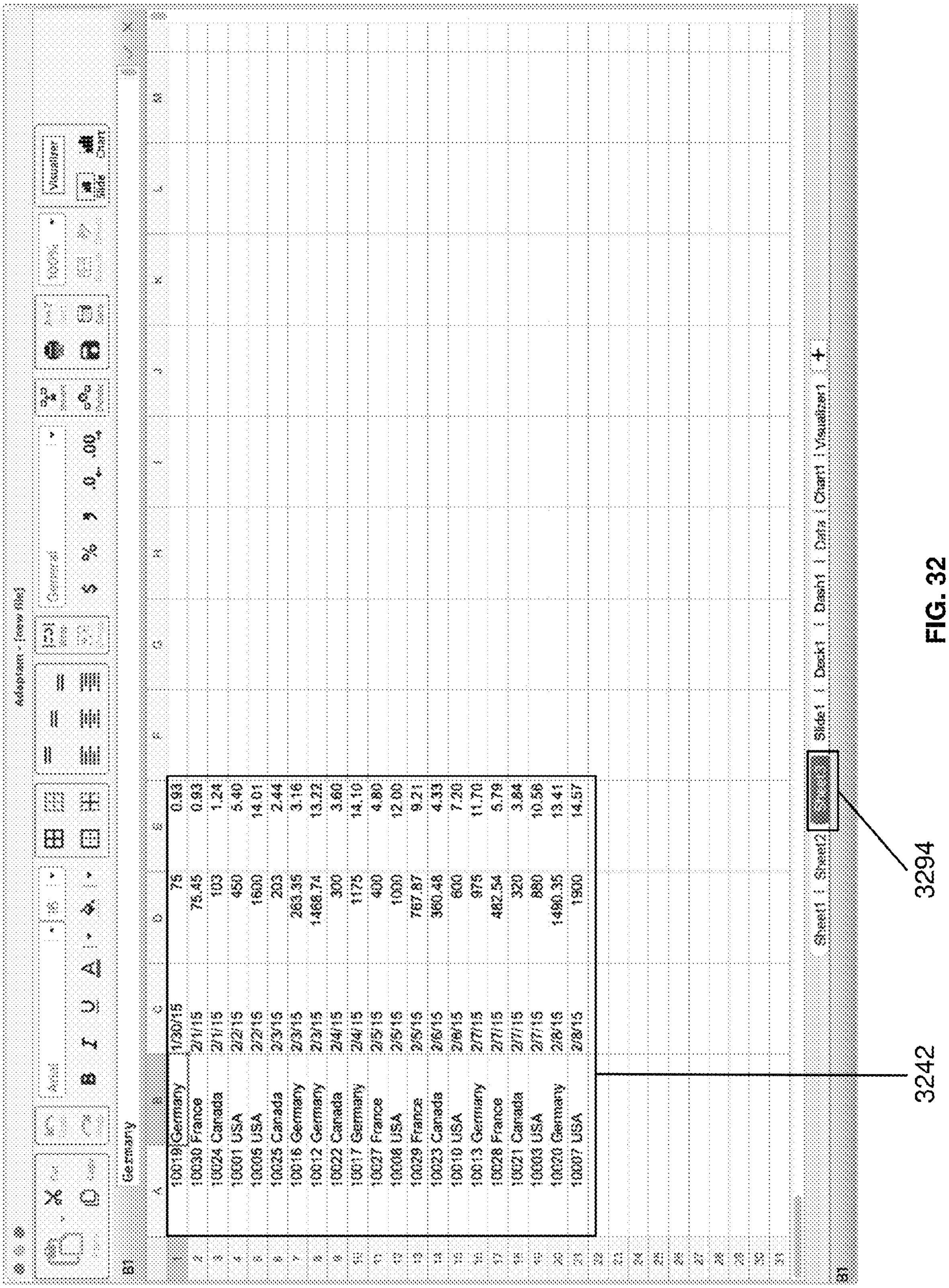
FIG. 32 and FIG. 33 example our data visualizer technology working with in-cell data.
Figure 33:
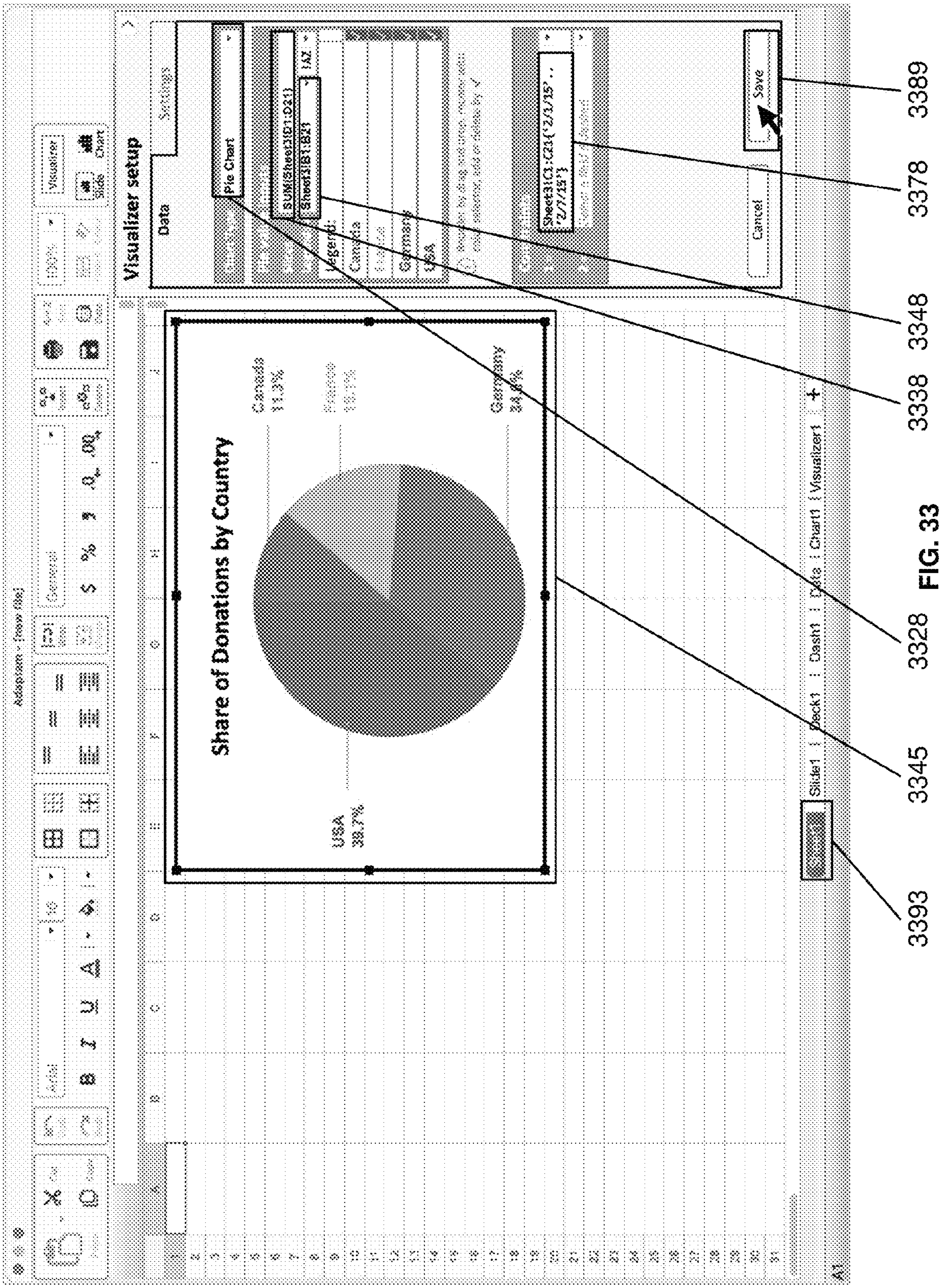

FIG. 32 examples a charity worker data set 3242 in a spreadsheet worksheet 'Sheet3' tab 3294, which like our previous example external data tables has a small set of data to facilitate readable examples. FIG. 33 examples the charity worker using our chart visualizer with that in-cell formulaic data to create a Pie chart of the country-by-county SUM of donation shares for the week of Feb. 1, 2015 through Feb. 7, 2015. The only difference in how that is done relative to the previous examples using NSC formulaic data is the formulaic data field names are the column ranges of the data as shown in each of the inputs (specifications) 3338, 3348 and 3378. The 'Slices' input is 'SUM(Sheet3!D1:D21)' 3338 with 'Sheet3!D1:D21' being the formulaic data field for the donations. The 'Legends' input is 'Sheet3!B1:B21' 3348 which is the formulaic data field for the country values and the constraints (filters) input (specification) 'Sheet3!C1:C21{Feb. 1, 2015' . . . 'Feb. 7, 2015'}' 3378 is the formulaic data field for the date values with a constraint (filter) of only dates between and including Feb. 1, 2015 through Feb. 2, 2015. The automatically triggered steps done in buffer are shown in FIG. 111A through FIG. 112D. It starts with the data retrieval in FIG. 111A from Sheet3 3294 cells 'A1' through ''E21' 3242 in FIG. 32 moving only the needed formulaic data fields into buffer. Step two FIG. 111B sorts the data by 'date' values so that step three FIG. 111C can automatically remove (filter) the undesired dates 11128 and 11188. Step four FIG. 112A then resorts the data by the legends/labels country values 11241 to create the calculation groups. Step five FIG. 112B then does the range function (SUM) calculations for each of the legend/label groupings. Step six FIG. 112C illustratively shows our technology setting up the chart inputs without instantiating any of it into a spreadsheet cell for step seven FIG. 112D to generate the chart 3345 in FIG. 33. Like the previous examples of our technology this required no work by the user other than supplying the inputs (specifications). The only other material change is the user in this example had a setting showing labels with percentages instead of a legend. The user created this chart on 'Sheet1' 3393 in FIG. 33, but as we will example later that could have been on other types of tabs or UIs within the spreadsheet application or could have been on a different spreadsheet worksheet.

Figure 34:
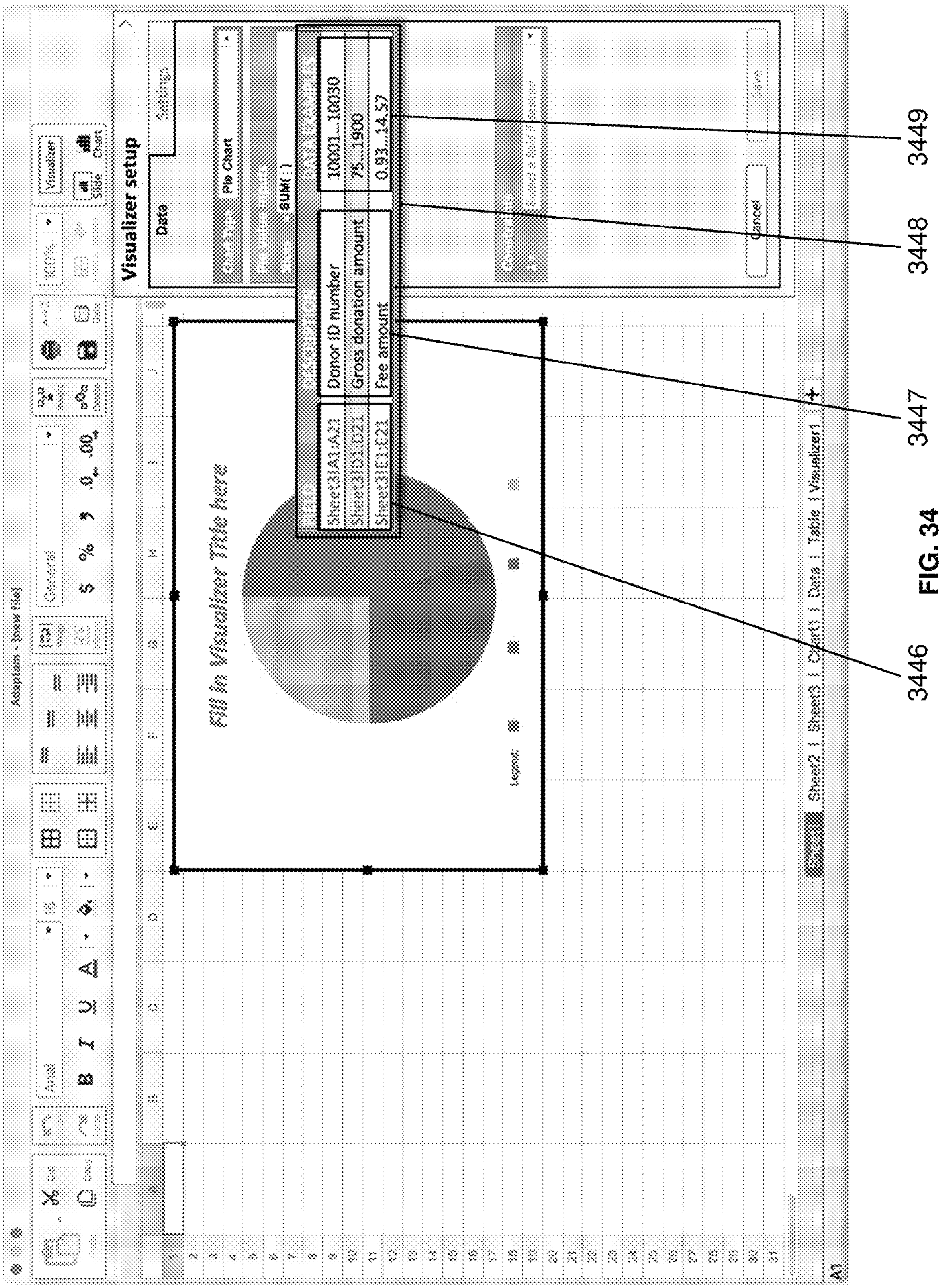
FIG. 34 examples our HINT technology working with our data visualizer technology using in-cell data.

FIG. 34 examples the value of our HINT technology when the formulaic data fields are named by their in-cell ranges 3446. This makes the field descriptions 3447 and data examples 3449 extremely helpful for the user to know what the data is. Other than the field names, our hints (e.g., 3448) work as previously exampled within this filing and our U.S. Provisional Patent Application No. 63/192,475.

Figure 35:
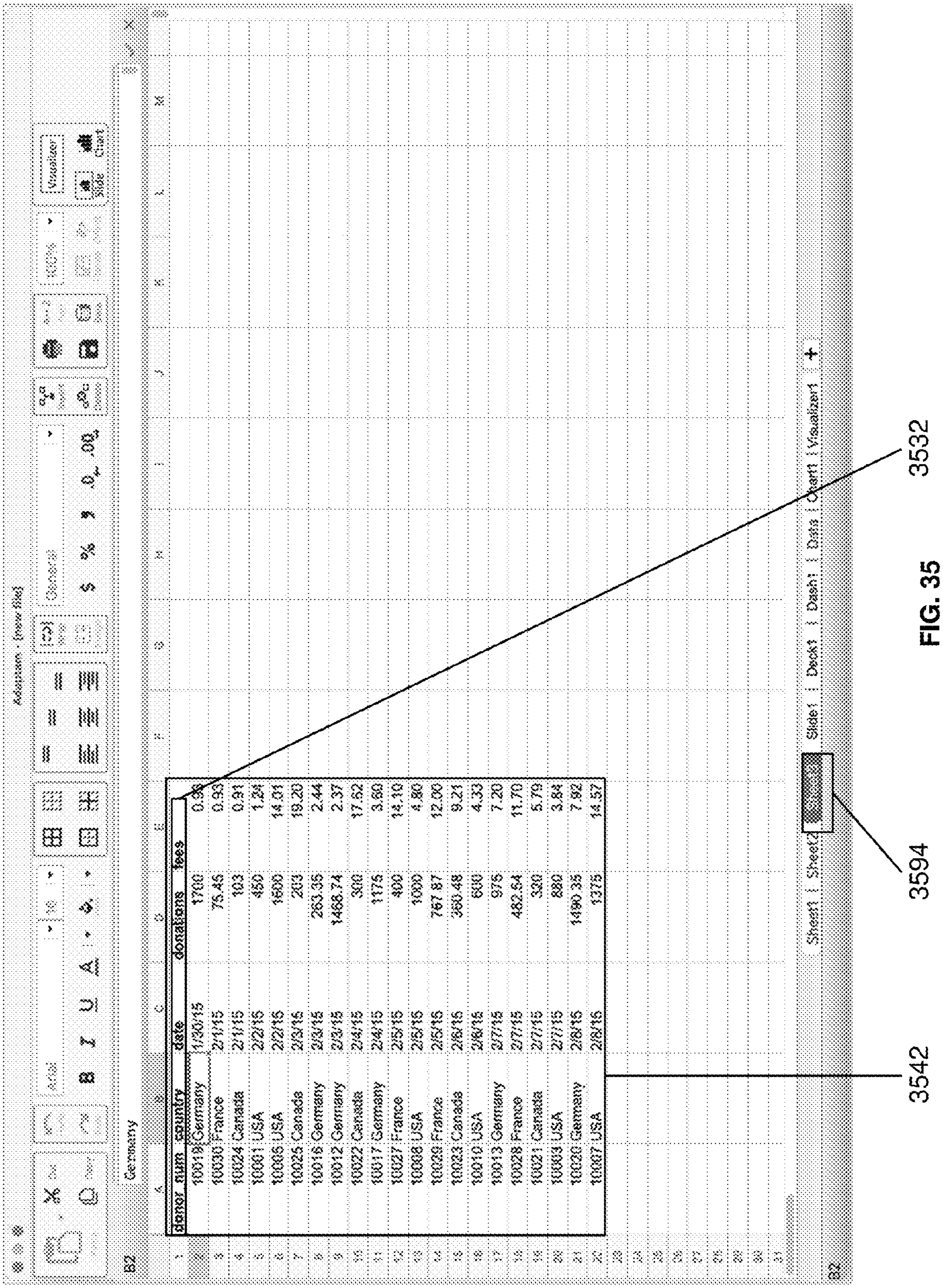
FIGS. 35, 36 and 37 examples our data visualizer technology working with in-cell data using formulaic data names from headers.
Figure 36:
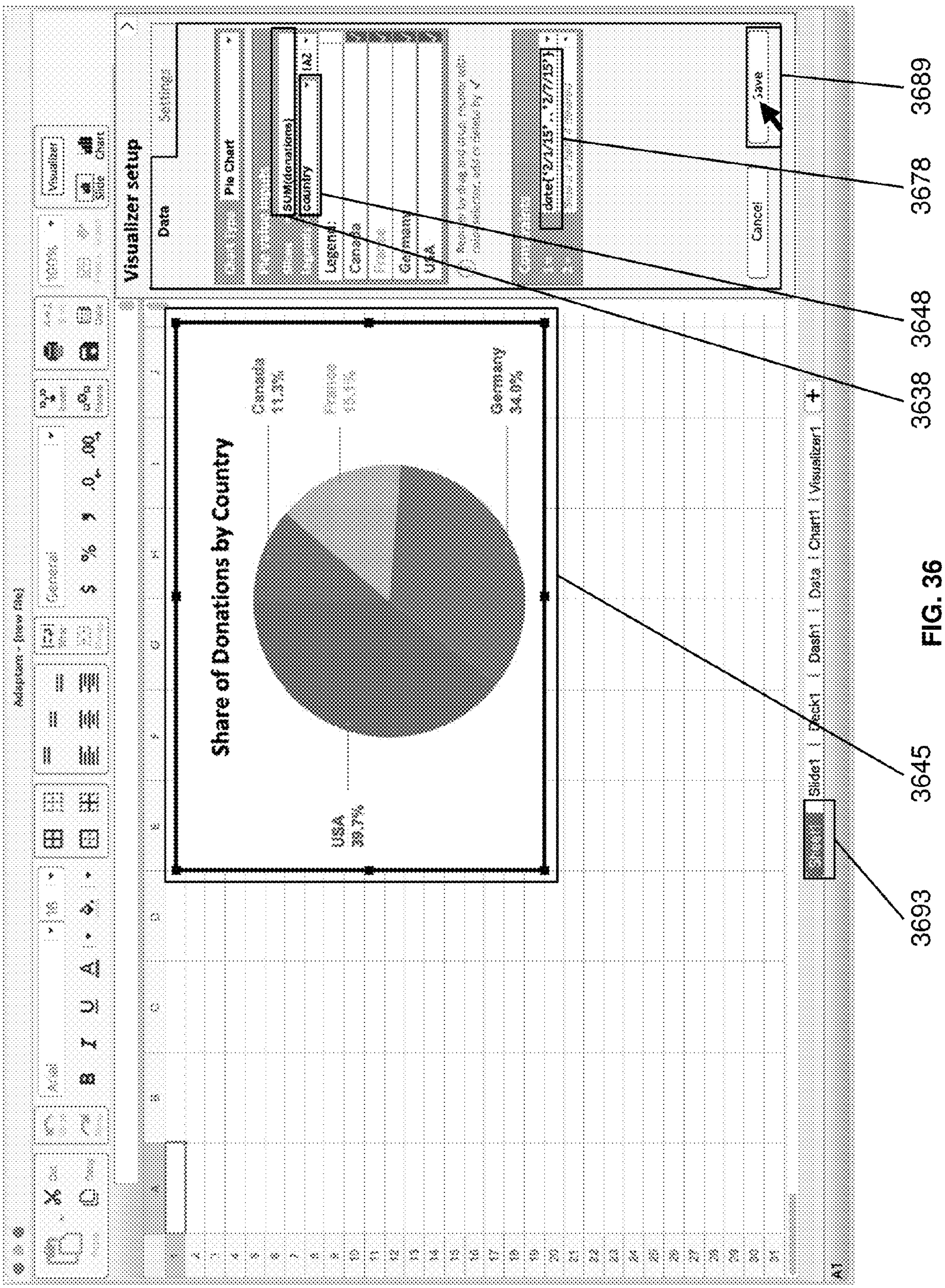
Figure 37:
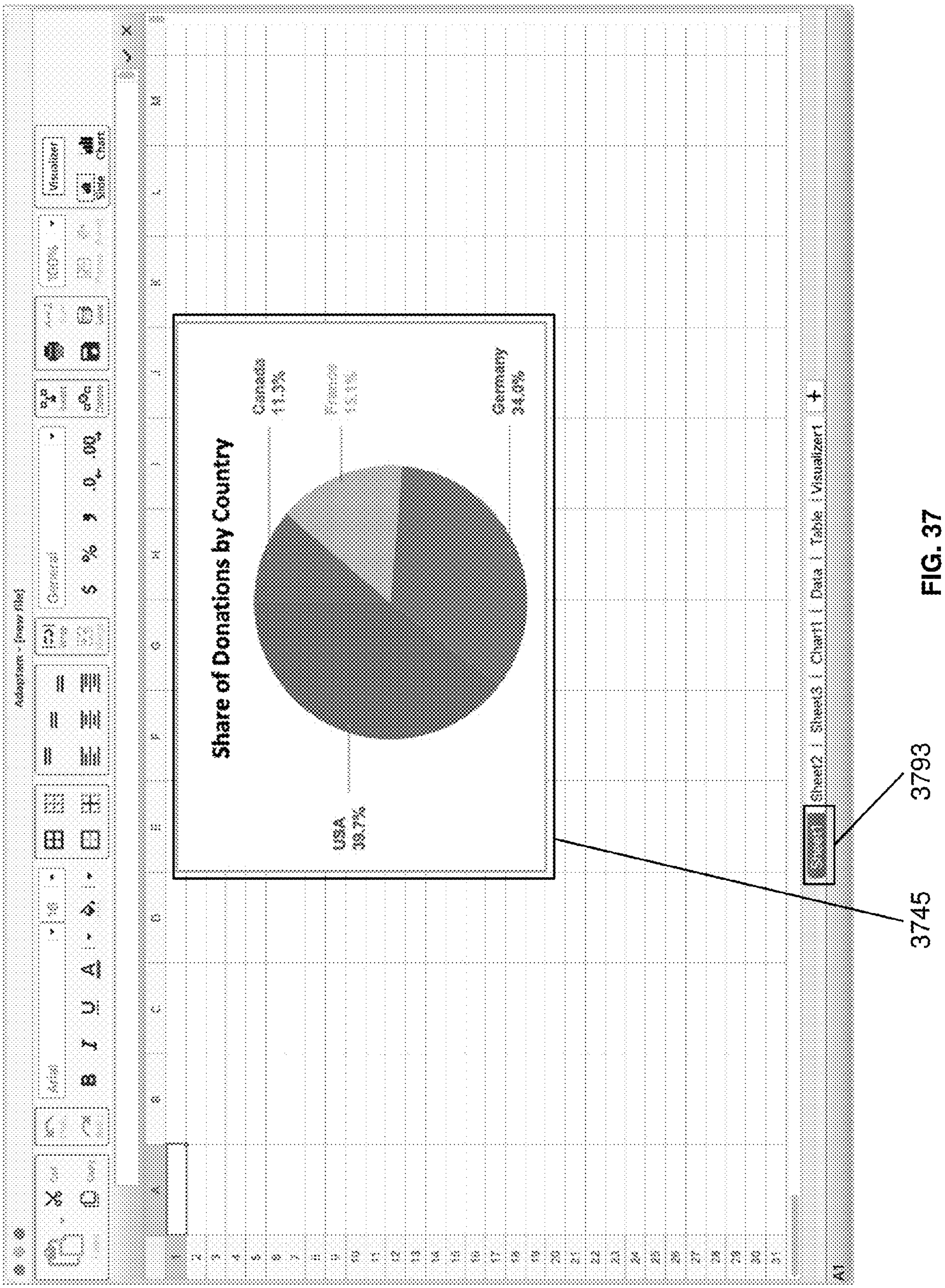

FIG. 35 examples in 'Sheet3' 3594 the same in-cell data set 3542 as FIG. 32 3242 with headers 3532 which become the field names in the formulaic data setup, along the lines described in our U.S. Provisional Patent Application No. 63/192,475. With header field name addition to the in-cell data, the formula field name inputs into the chart visualizer become exactly the same for NSC external formulaic data and in-cell formulaic data as shown in FIG. 36 (when like named despite coming from different data sources). The 'SUM(donations}' 3638 'Slice" input, the 'country' 3648 'Legend' input and the 'date{Feb. 1, 2015' . . . 'Feb. 7, 2015'} input are indistinguishable from some of the previous NSC external formulaic data inputs. The only material difference will be in the HINTs or tabs that show the data table source where one would reference an external table and the other an in-cell data set. In this embodiment when the user clicks the 'Save' button 3689 (in FIG. 36) or the 'Save' button 3389 (in FIG. 33) they get the chart 3745 in FIG. 37 on 'Sheet1' 3793 of the spreadsheet with the sidebar gone.

Dedicated Ribbon and Popup Chart Visualizer UI

Figure 38:
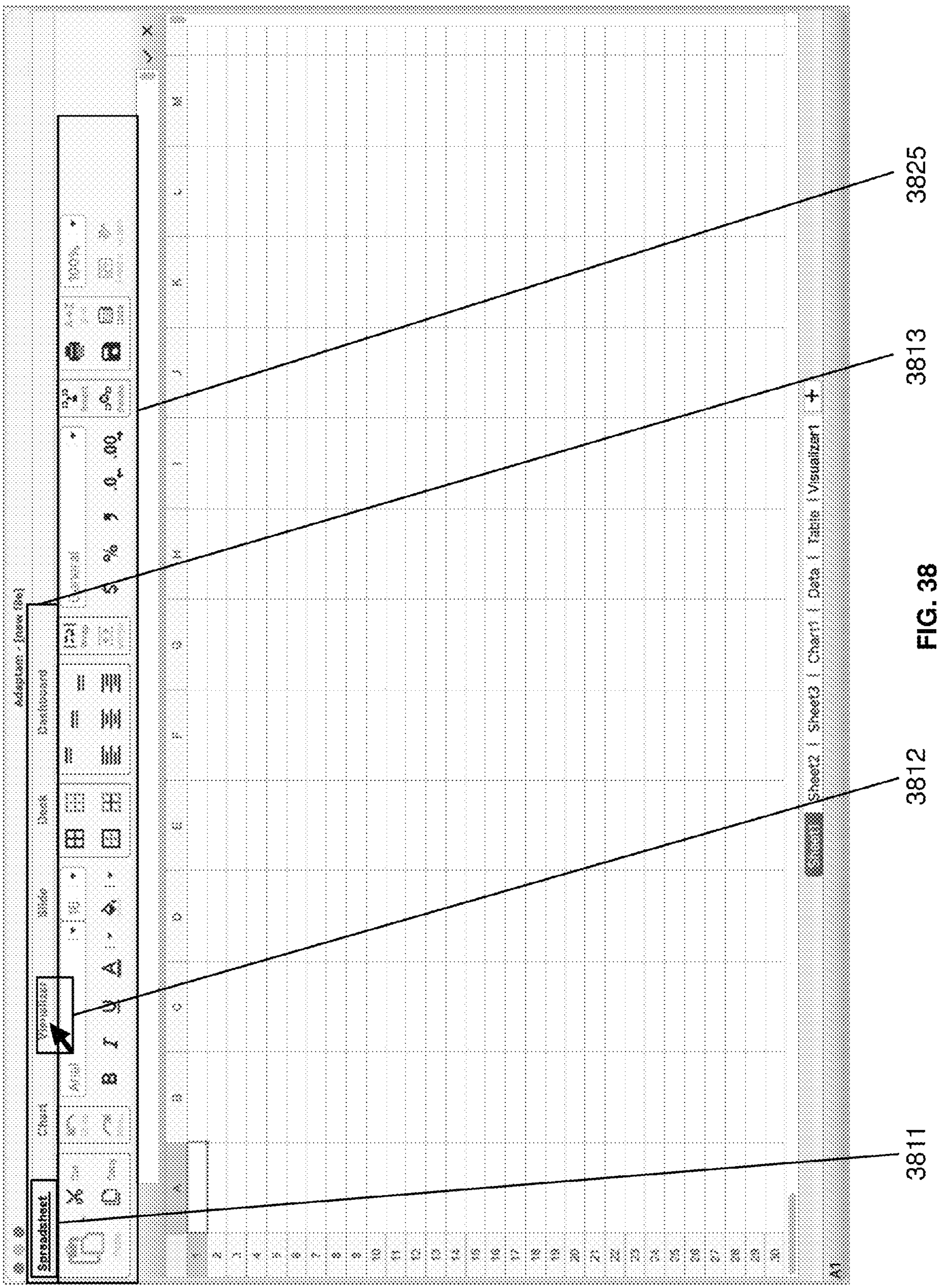
FIGS. 38, 39, 40, 41, 42, 43, 44, 45, 46 and 47 example a dedicated Visualizer ribbon and popup UI combination.
Figure 39:
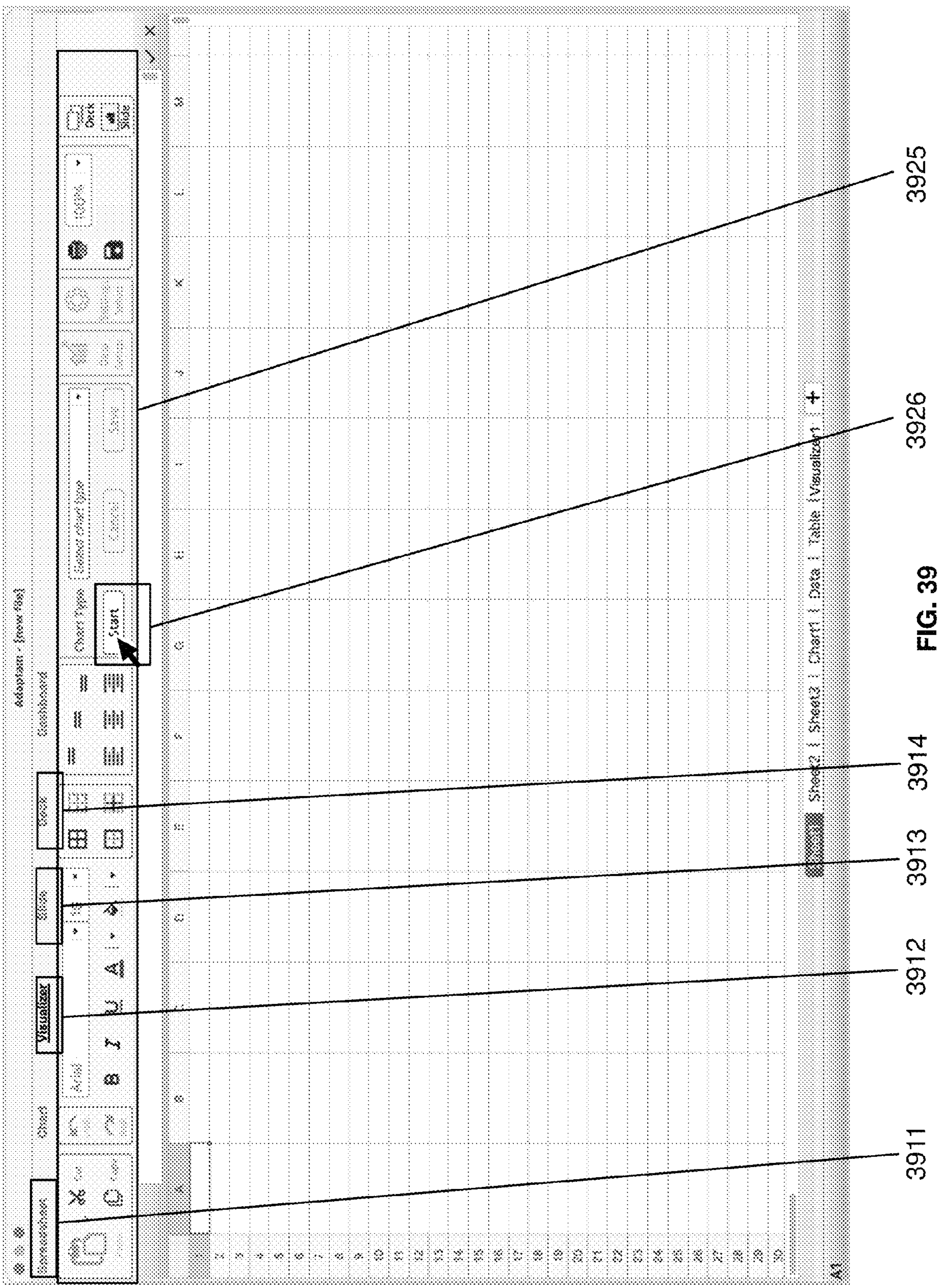
Figure 40:
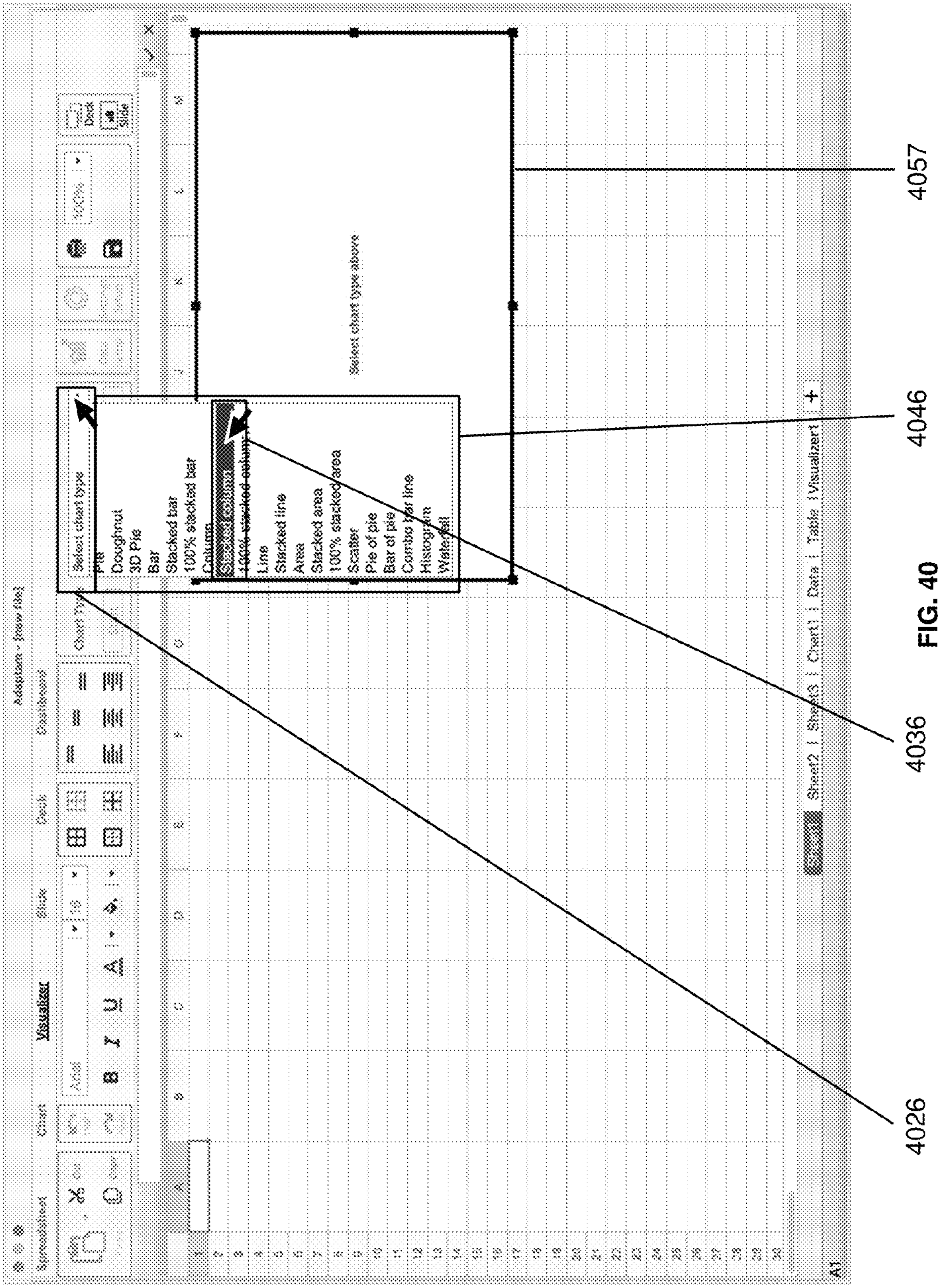
Figure 41:
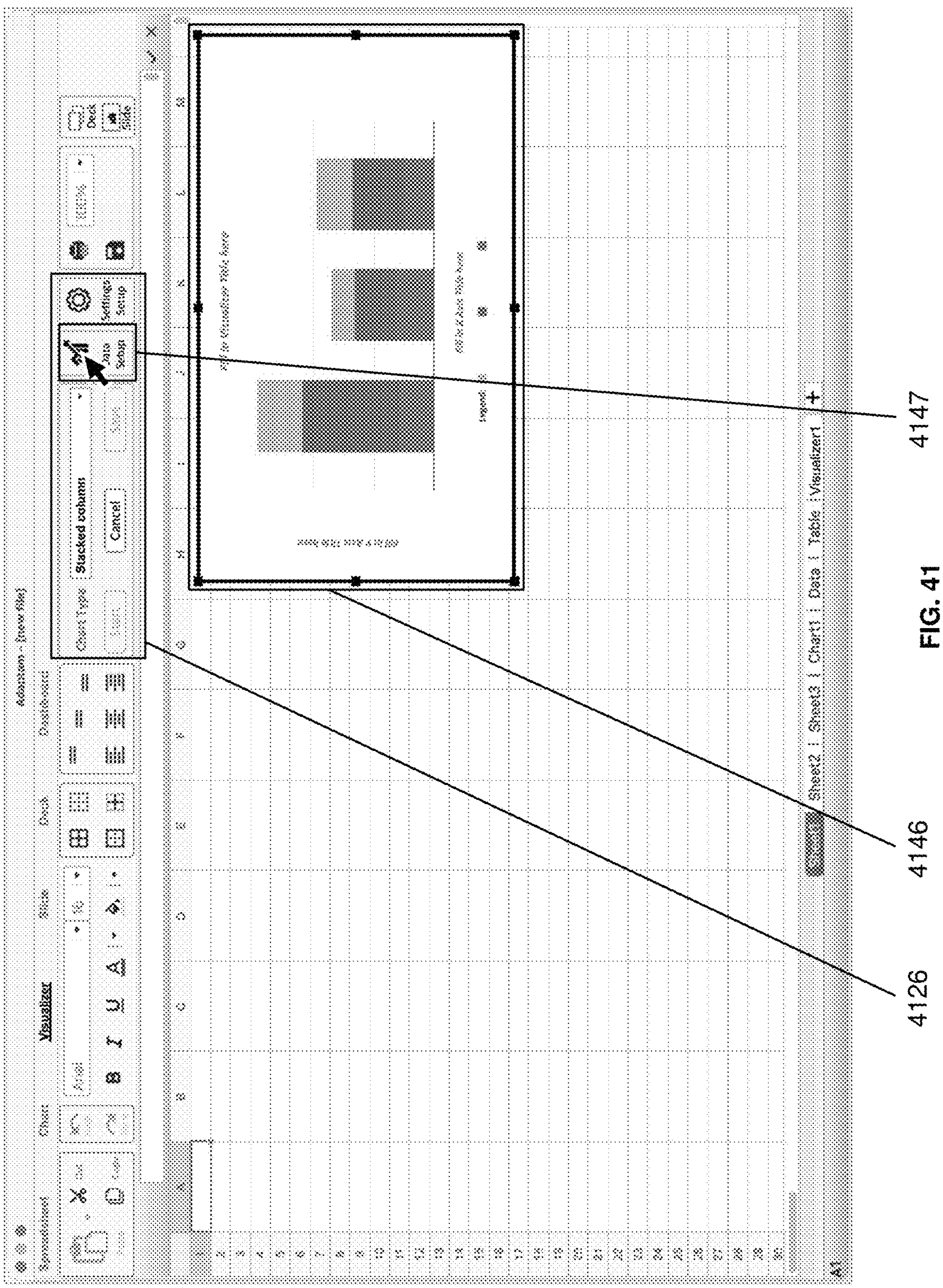
Figure 42:
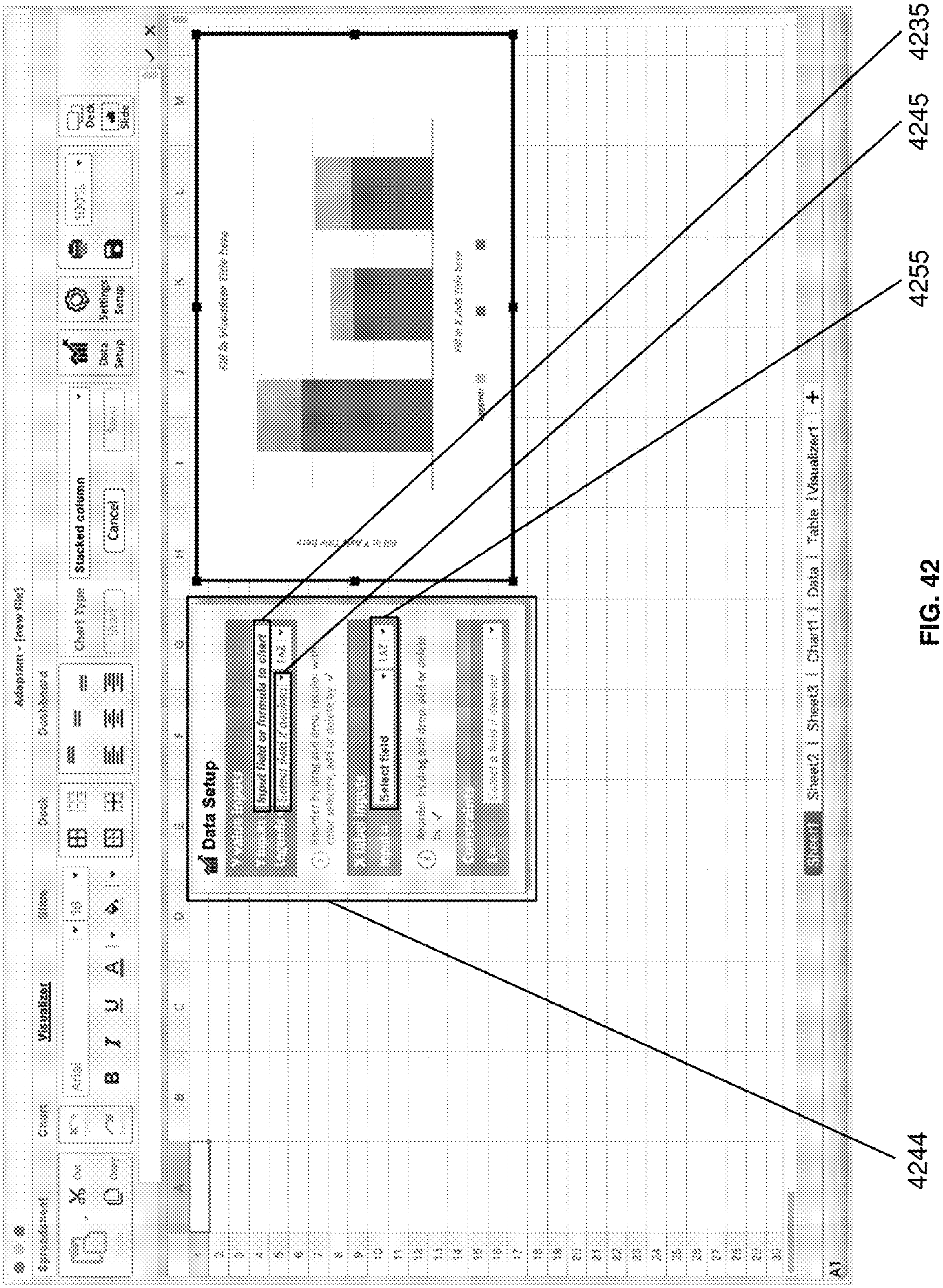

As mentioned before, our chart visualizer technology is very compatible with different charting UI setups. FIG. 38 through FIG. 47 example a dedicated Visualizer ribbon and popup UI combination embodiment more similar to the Microsoft Excel UI. FIG. 38 examples a spreadsheet ribbon 3825 which is part of a multiple ribbon setup 3813 where each ribbon is accessed by clicking its name. Right now, the spreadsheet ribbon 3825 is showing as indicated by the bolding and underlining 'Spreadsheet' 3811, but the user is now clicking on the 'Visualizer' name 3812 which triggers that ribbon 3925 as shown in FIG. 39. Now the 'Visualizer' 3912 name is bolded and underlined and the 'Spreadsheet' 3911 name is no longer bolded and underlined. The user then starts the Visualizer setup in this embodiment by clicking the 'Start' button 3926.

Figure 43:
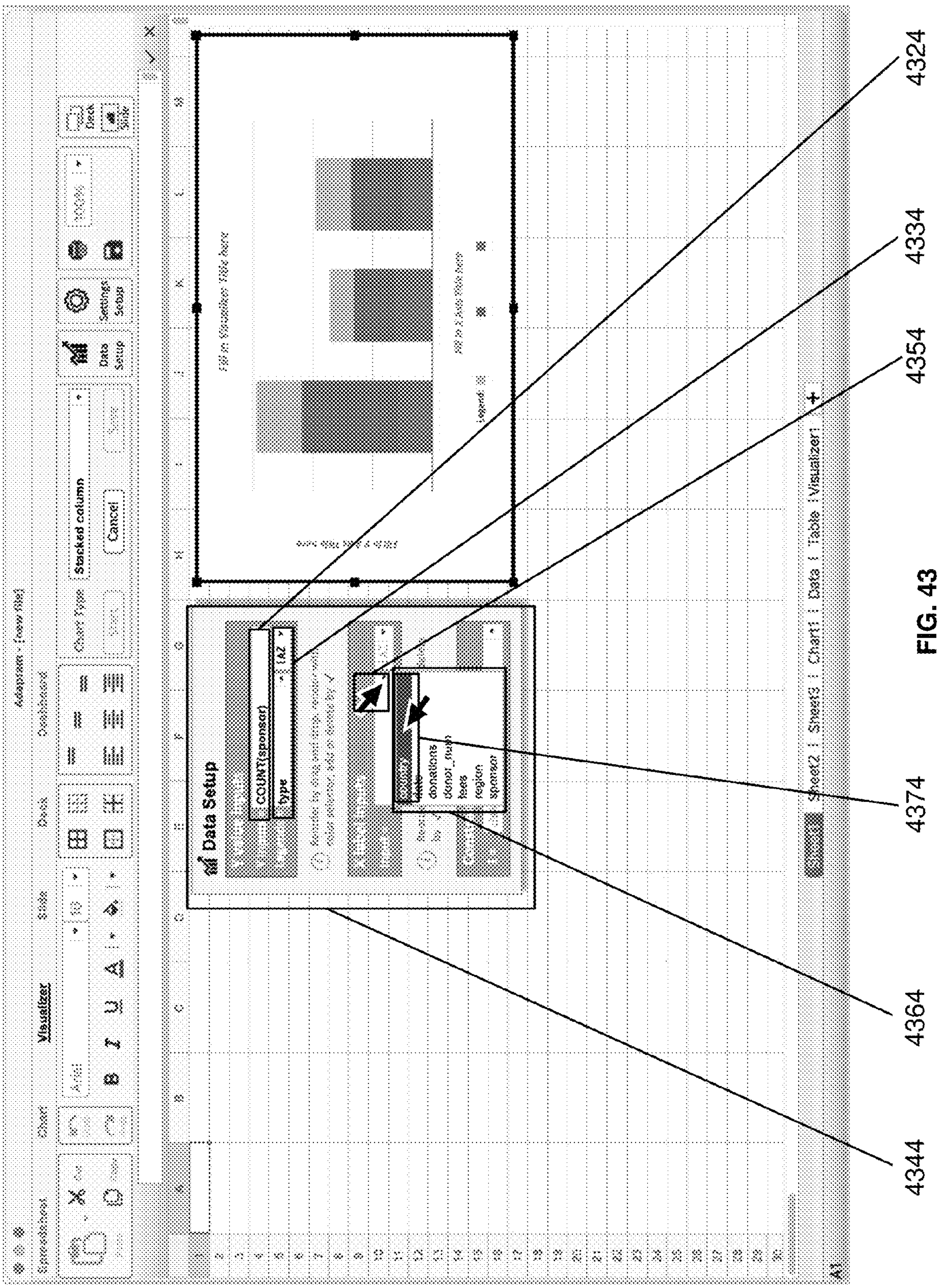
Figure 44:
Figure 45:
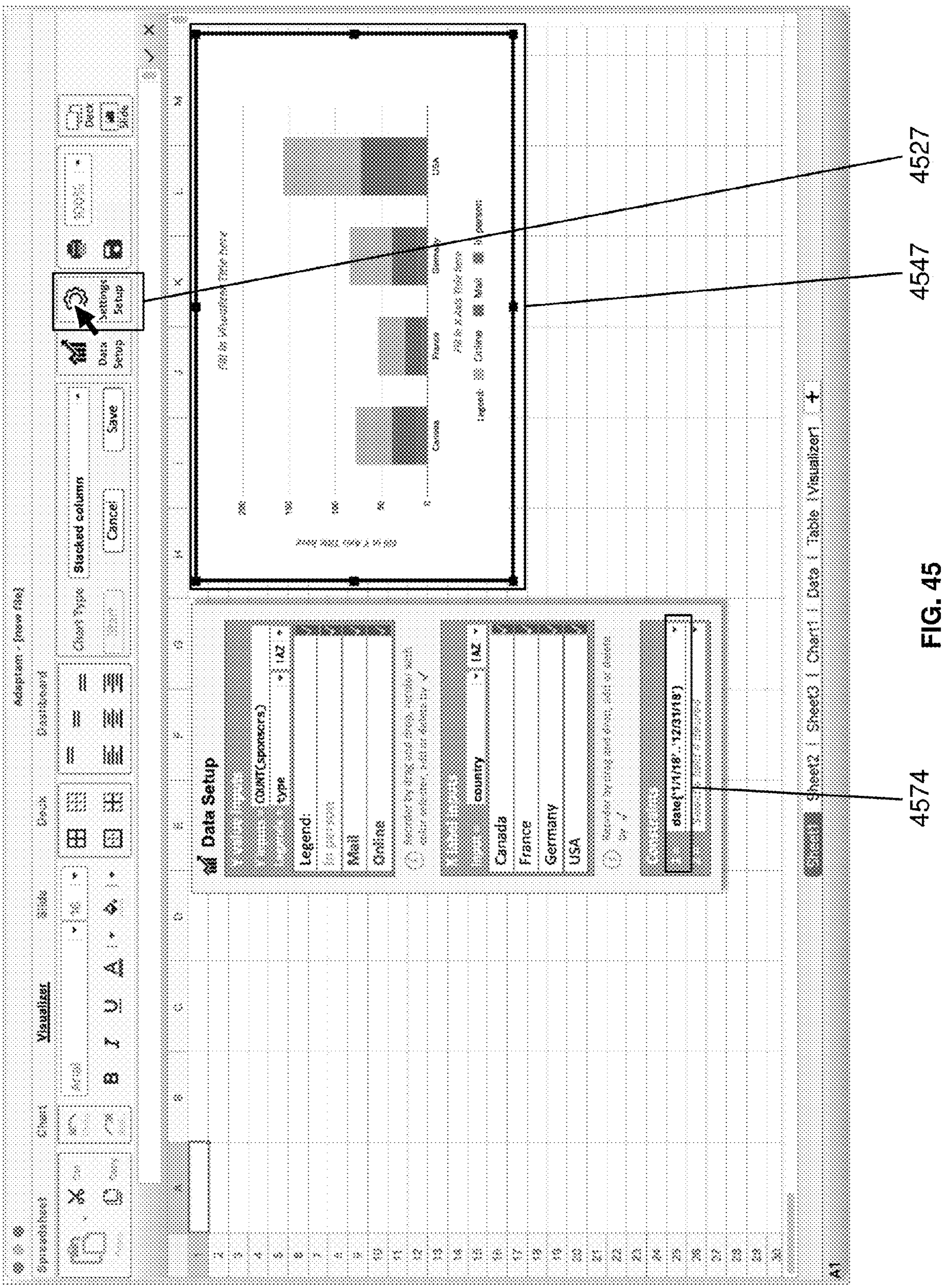
Figure 46:
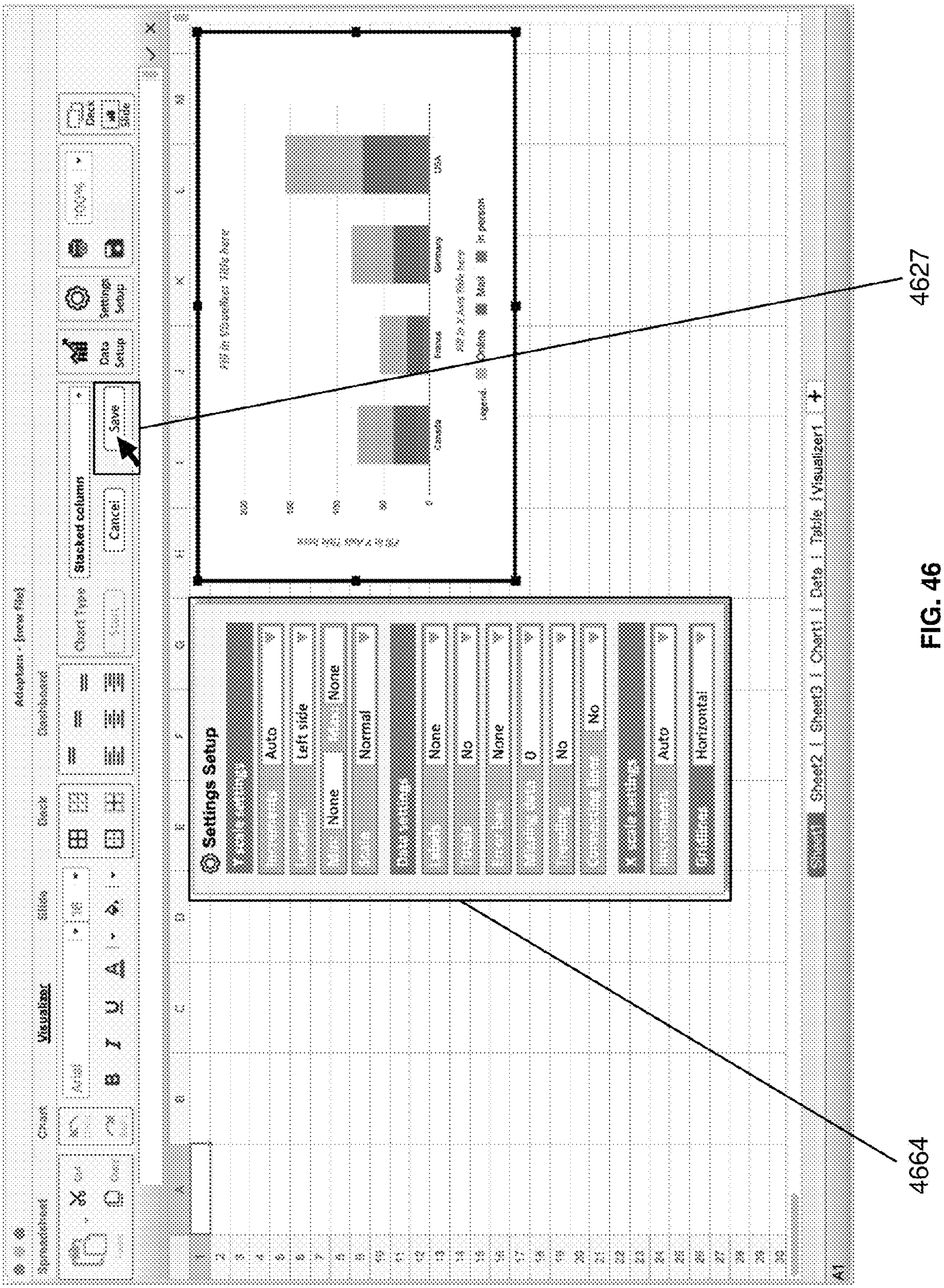
Figure 47:
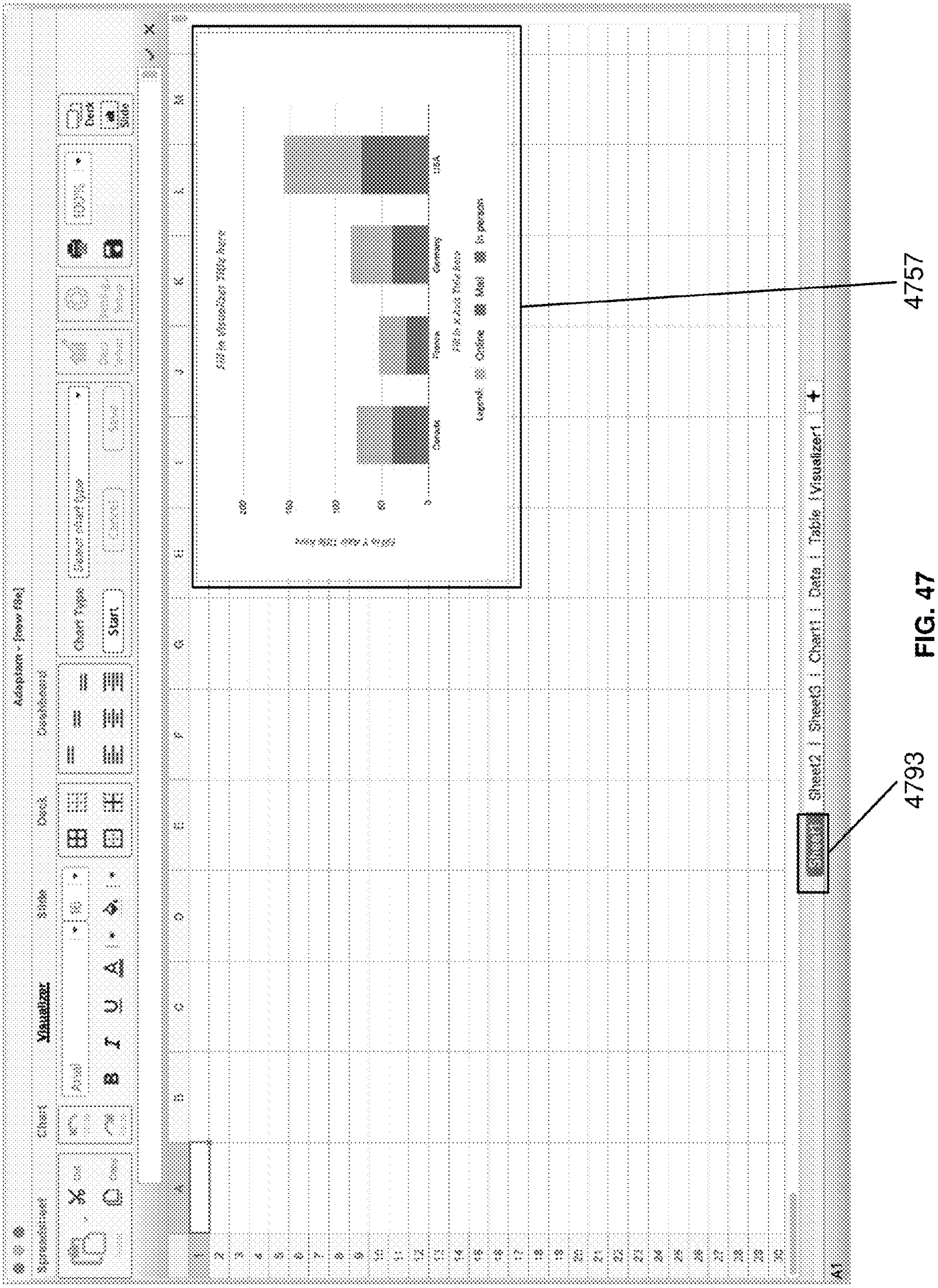

In this embodiment clicking Start opens a blank visualizer chart 4057 and bolds in red the required user first action 'Select chart type' 4026. The Start could have opened the visualizer with a default chart type that the user could then change if it was not the one they liked. Alternatively, the ribbon could have had many chart type icons that the user could click to start the setup or some other way to start the process. In this example the user then clicks 4026 to open a dropdown 4046 listing the chart types. They then click the 'Stacked column' 4036 chart type which populates in FIG. 41 an example stacked column chart 4146 and makes live buttons in chart setup area of the ribbon 4126. The user then clicks the 'Data Setup' button 4147 that opens the 'Data Setup' popup 4244 in FIG. 42 with, in this embodiment, the two absolutely necessary inputs 4255 and 4235 bolded in red. The 'Legends' input 4245 could be seen as necessary by some configurations but since not filling it in will generate a column chart with a single stack, it is not red and bolded in this embodiment. FIG. 43 shows that the user has filled in the 'Y inputs' 4324 and 'Legends' 4334 making selections from HINTS and "smart" dropdowns as previously exampled. In FIG. 43 the user then clicks the 'X label input' 4354 and clicks a selection of 'country' 4374 from the "smart" dropdown 4364. This triggers the creation of the visualizer chart 4457 in FIG. 44. It also displays the chart stacks ordered and color coordinated with the 'type' values in the 'Legend' proxy 4444 and the X labels ordered the same on chart and in the popup 'country' proxy values 4464. Our technology having done all the required data retrieval, sorting, filtering and calculating automatically and handling the added complexity of sorts and calculations for the combinations (composites) of both the Legends and X value labels. The user then clicks into the Constraints input 4474 and in FIG. 45 adds a 'date{'Jan. 1, 2018' . . . 'Dec. 31, 2018'}' constraint 4574 which changes the chart values 4547 to be limited by that date range. The user then clicks the 'Settings Setup' button 4527 to get the 'Settings Setup' popup 4664 in FIG. 46. In this embodiment this provides the user with chart specific options settings which they can change. The user then realizes they are fine with the current settings and clicks the 'Save' button 4627 which closes any popups, in this example the popup 4664 to give the chart 4757 in 'Sheet1' 4793 shown in FIG. 47. While we could example further UI combinations and approaches to specify our visualization technology, we will instead example different tab type and UI usage of our chart visualizations.

Dedicated Chart Visualizer tab

Figure 48:
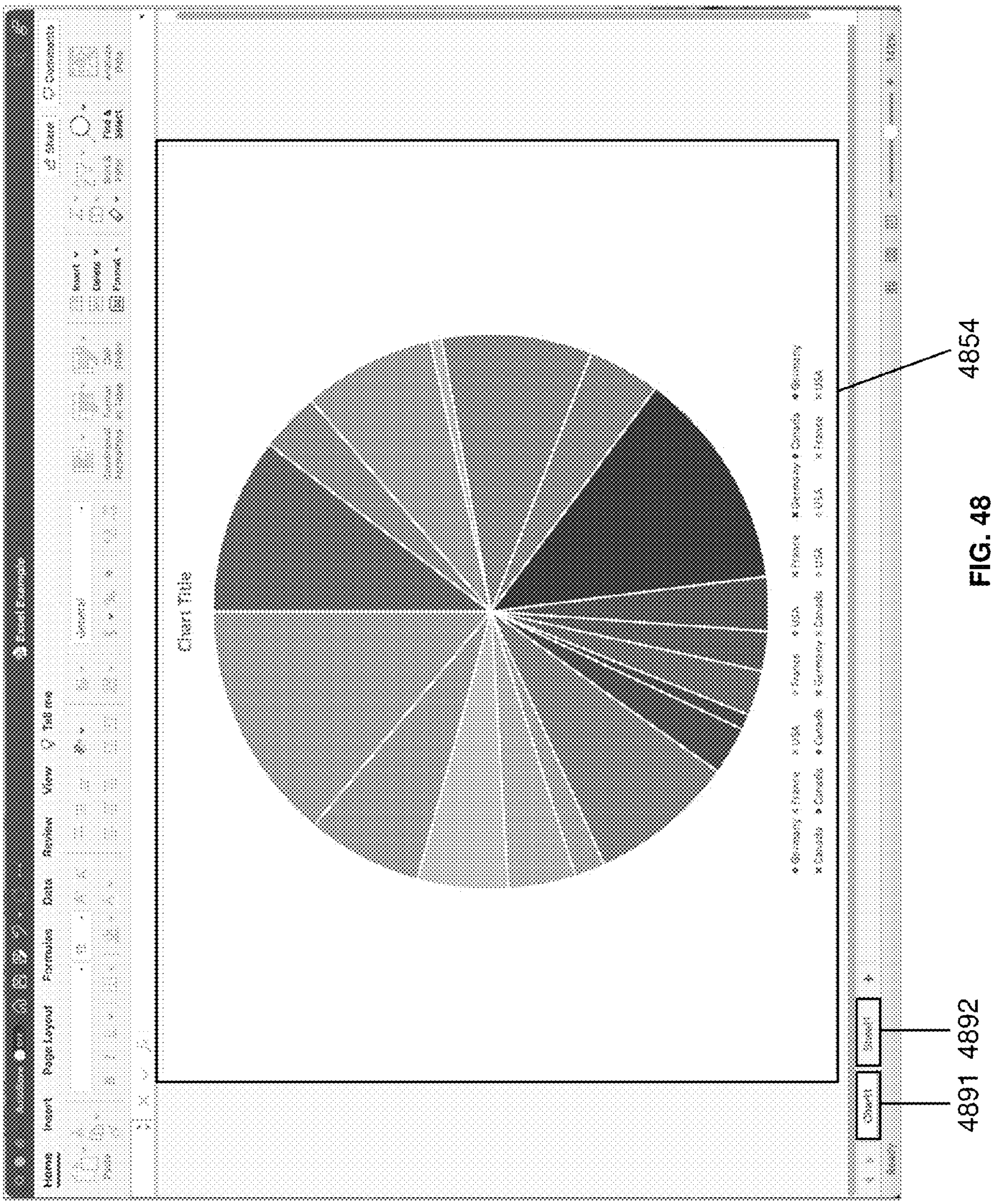
FIG. 48 examples the Microsoft Excel chart in FIG. 1 which has been transferred to its own dedicated chart tab.
Figure 49:
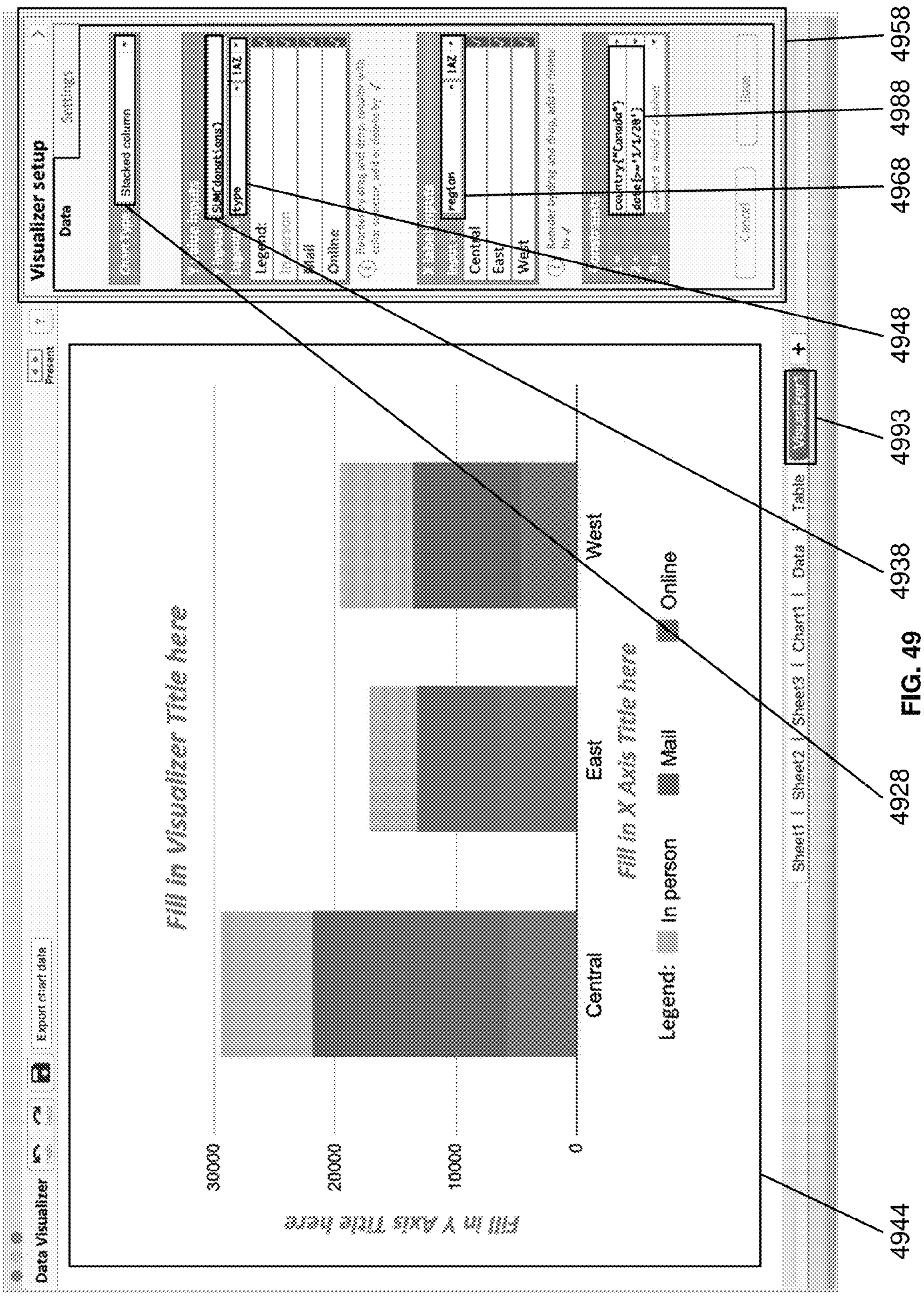
FIG. 49 examples our data visualizer technology operating in its own spreadsheet dedicated tab.

The leading spreadsheet apps (e.g., Microsoft Excel and Google Sheets) have chart dedicated tabs. FIG. 48 examples the Microsoft Excel chart 167 in FIG. 1 which has been moved from 'Sheet1' 4892 to its own dedicated tab 'Chart1' 4891 where it displays the chart 4854. Our chart visualizer technology not only supports a comparable dedicated tab, labeled 'Visualizer1' 4983 in FIG. 49 but supports the direct generation of the visualizer chart in the tab as well as the ability for a user to transfer a visualizer chart created in a spreadsheet worksheet or elsewhere within the application to a visualizer dedicated tab. FIG. 49 examples one embodiment of that tab using a sidebar 4958 for the visualizer chart setup. In this example the sidebar input works similarly to one or more of the previously exampled spreadsheet worksheet visualizer input (specification) sidebars. In this example the user has selected a 'Stacked column' chart 4928, inputted a Y input 'SUM(donations)' formula 4938, selected 'type' 4948 for the Legend specification, selected 'region' 4968 for the X label input and added two constraints 4988 to generate the visualizer chart 4944. As previously exampled our technology automatically does all the formulaic data retrieval, data sorting, data filtering, type and region combination SUM of donations calculations, then the two-dimensional (2D) reconfiguration of those calculations and their legends/labels for chart generation and finally the chart generation.

Figure 50:
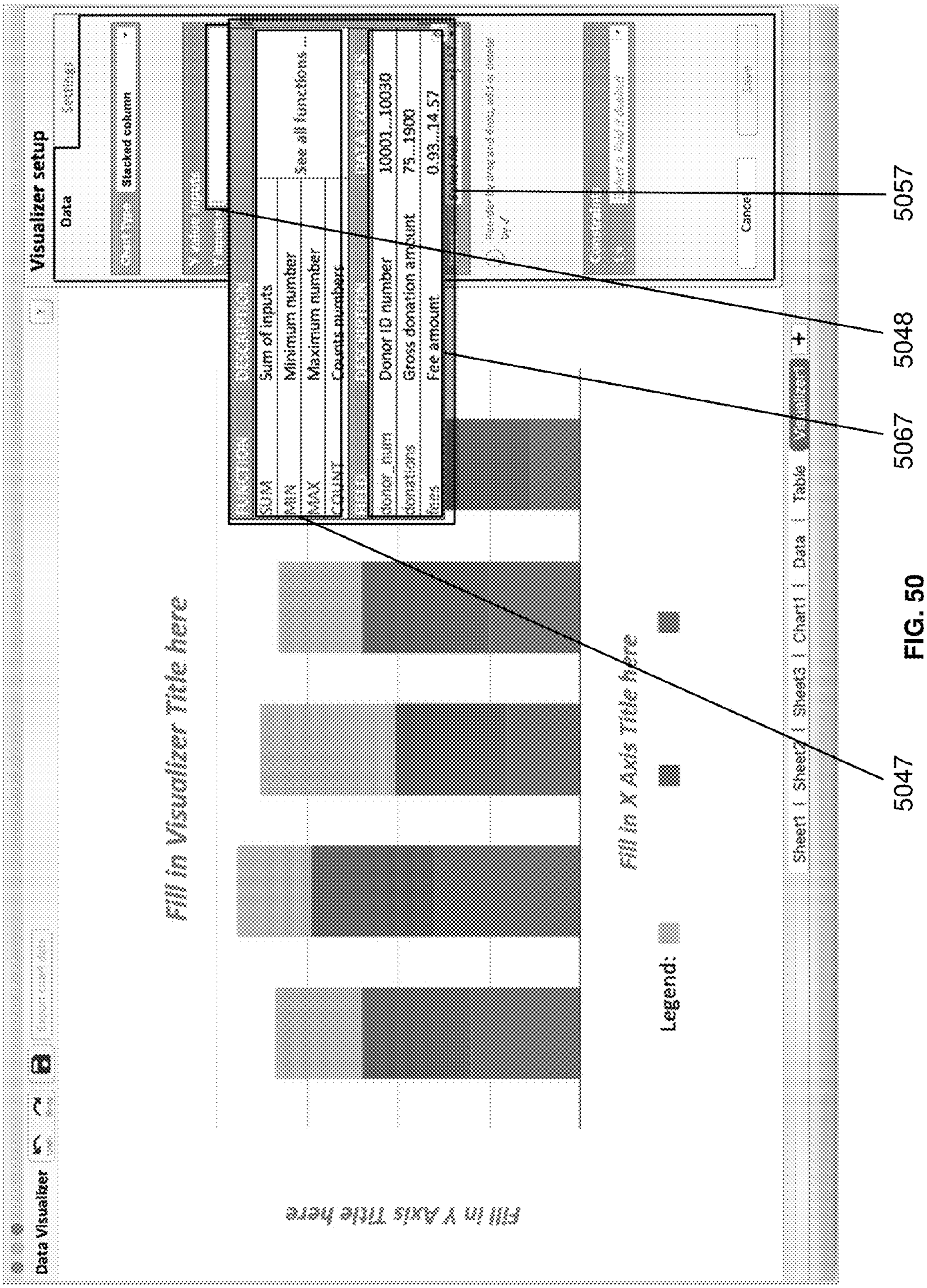
FIG. 50 examples our HINT technology working in a sidebar within a visualizer dedicated tab.
Figure 51:
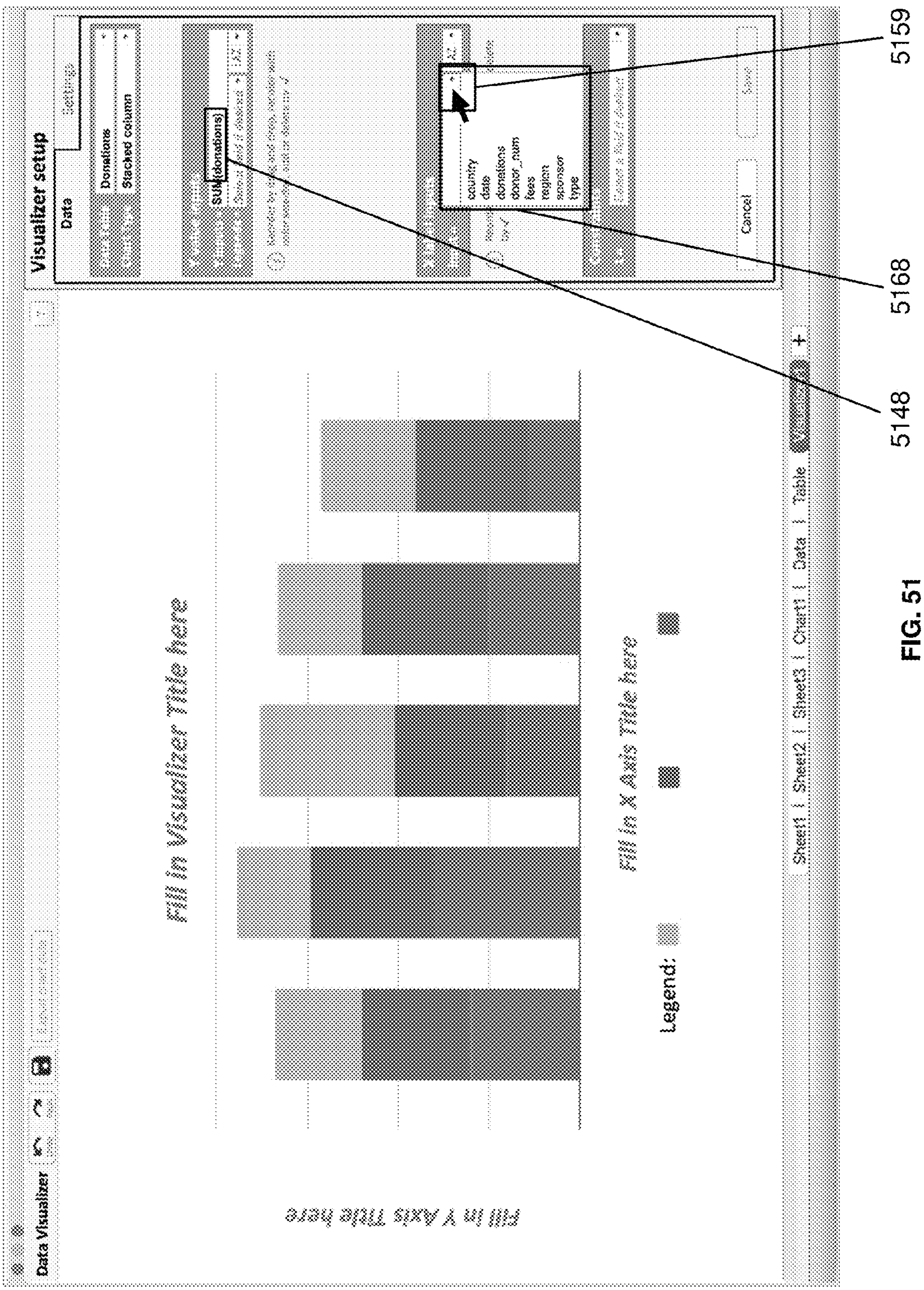
FIG. 51 examples our "previous selection smart dropdowns" working within a sidebar within a visualizer dedicated tab.

In this embodiment the Visualizer tab sidebar chart inputs work the same as previously exampled, using our HINTS and "previous selection smart dropdowns". FIG. 50 examples HINT usage and FIG. 51 examples our "previous selection smart dropdowns". The HINT 5057 in FIG. 50 displays only those functions 5047 and fields 5067 that can populate where the cursor 5048 is, which limits the functions to those delivering numerical outcomes (e.g., eliminating functions like CONCAT that do not deliver a numerical output) and limits fields to those that only deliver a numerical result. FIG. 51 examples our "previous selection smart dropdown" which when clicked 5159 limits the available selections in the dropdown 5168 to formulaic data fields from the same in-cell dataset or NSC external data table as the previously inputted field(s), in this example 'donations' 5148 in the Y inputs. Our "previous selection smart dropdown" technology also selectively screens whether to eliminate previously inputted formula data fields or not, in this situation not eliminating 'donations' because it was used in a calculation but would have removed it if it had been the Legend's input.

Figure 52:
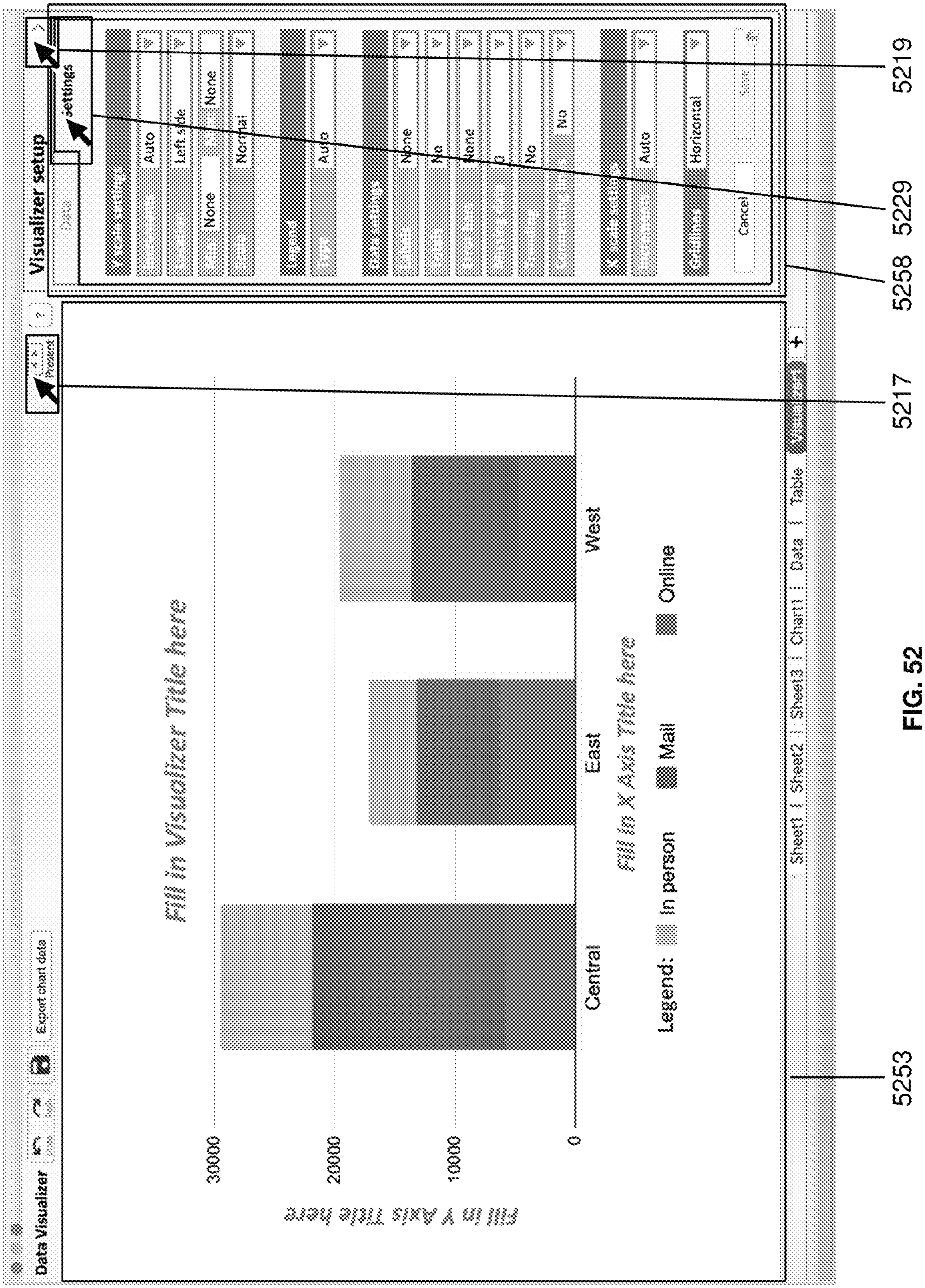
FIG. 52 examples chart settings UI working within our data visualization technology.
Figure 53A:
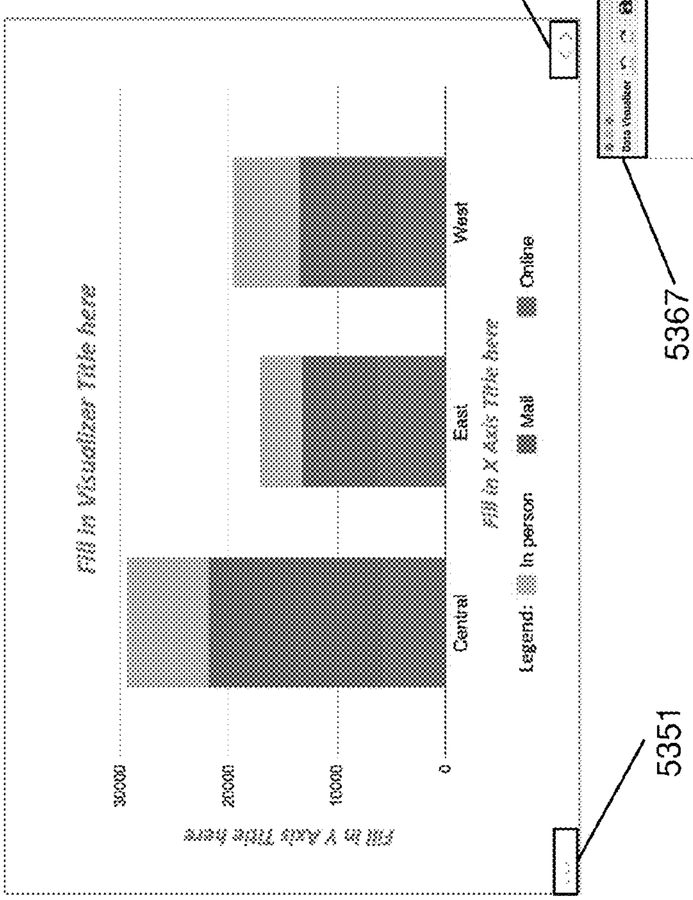
FIG. 53A and FIG. 53B example two different options for viewing our visualizer tab, one in presentation mode and the other in sidebar hidden mode.
Figure 53B:
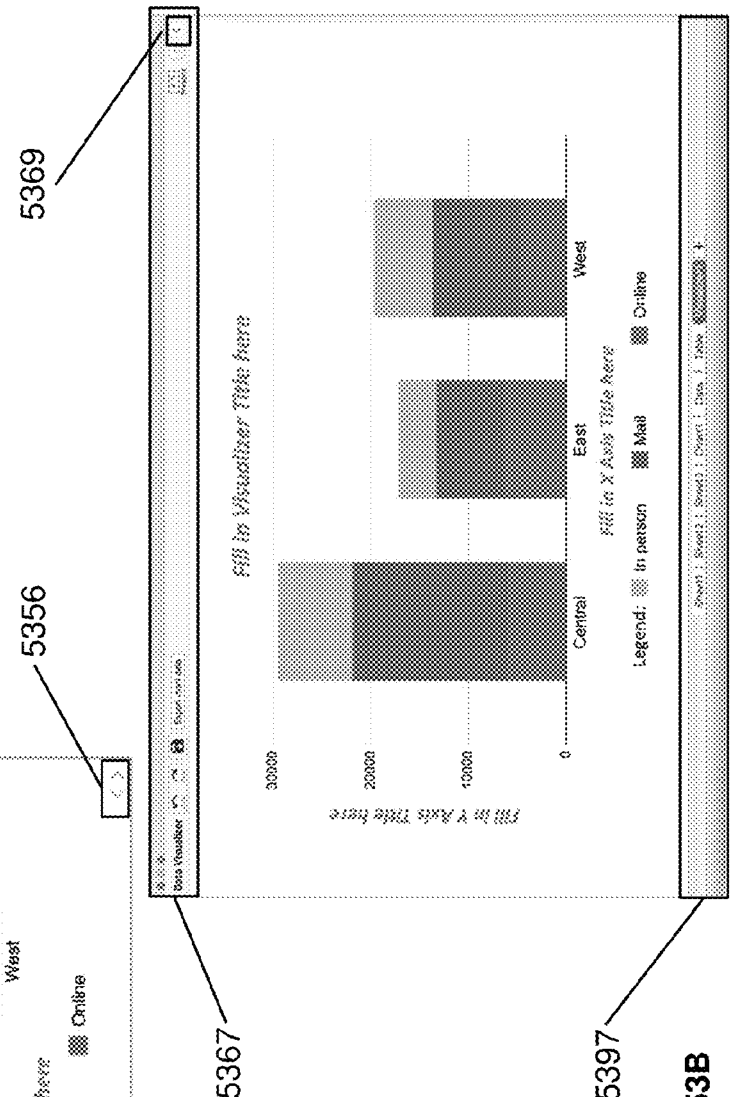
Figure 54:
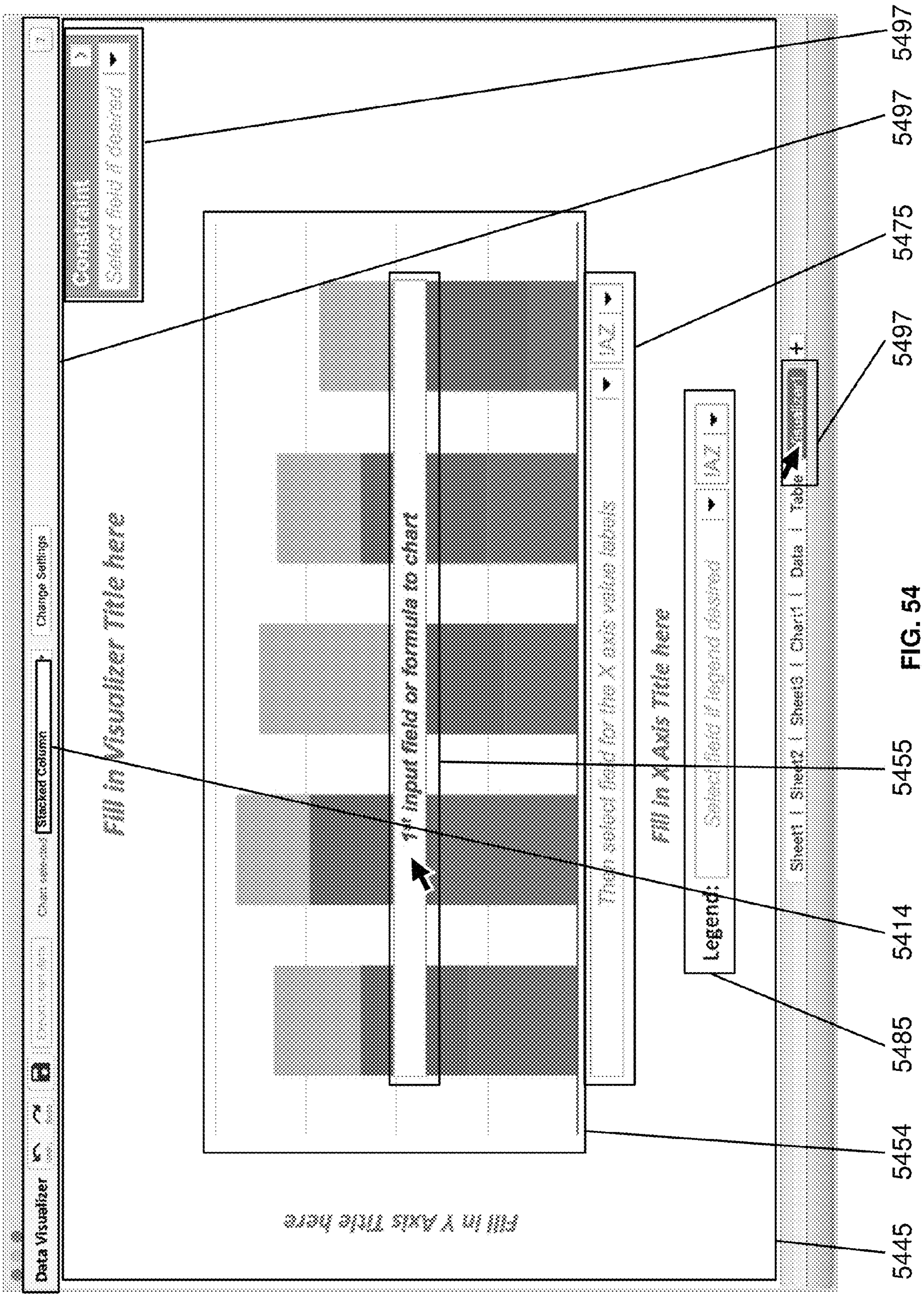
FIG. 54 examples our data visualizer technology replacing sidebar or ribbon/popup input approaches with a primarily on-chart approach comparable to our chart technology disclosed in U.S. application Ser. No. 17/384,404.

FIG. 52 examples the user having completed the chart 5253 and clicked on the 'Settings' 5229 to display the chart setting options. Here the user has the ability to select many different options of how to display the chart. The user instead decides that they are fine with the current settings and has two additional options in this embodiment which determine how the chart is displayed. FIG. 53A and FIG. 53B examples those two options. If the clicks the 'Present' button 5217 then the Visualizer tab presents as shown in FIG. 53A. This is a page presentation mode, similar to the slide show mode in Microsoft PowerPoint or Present command mode in Google Slides, showing only the page without any Ribbon or Footer. Note, 'present' is not a mode in their spreadsheets. In this embodiment our technology has navigation arrows 5356 in the bottom right corner which allow the user to move to the preceding or next tab in present mode. In the left bottom corner, the user has hover over three dots 5351 which open a menu allowing the user to change modes, such as moving to the chart tab mode shown in FIG. 53B or to go to that mode with the sidebar open to settings as in FIG. 52 or the sidebar open to Data (e.g., like FIG. 51). Clicking the right arrow 5219 (in FIG. 52) is another way to hide the sidebar so the tab looks like FIG. 53B with the small Chart Data Visualizer ribbon 5367 visible as well as the tabs footer 5397. In this embodiment the sidebar can be made to reappear by clicking the arrow button 5369. The user has these options on how to display and use Visualizer charts and as we will discuss later many more. In this embodiment we have shown a minimal Visualizer tab ribbon 5367, however in another embodiment it could have a more complete presentation slide like ribbon 8115 to allow more slide like content creation capabilities as exampled in FIG. 81.

On-Chart Input Data Visualizer

Our data visualizer technology also supports more user intuitive input approaches as described in our U.S. application Ser. No. 17/384,404. FIG. 54 through FIG. 62 examples replacing sidebar or ribbon/popup input approaches with a primarily on-chart approach. In this approach the user puts their inputs directly into where they will appear on the chart so there is no confusion as to what input (specification) is doing what. The embodiment exampled is for a visualizer tab, in this example 'Visualizer1' opened by the user clicking 5497 on the tab. It opens with a default Chart selection, in this example 'Stacked Column' 5414, which then displays a dummy example of that type of chart 5445 with the inputs where those inputs will display. This embodiment differentiates required versus optional inputs (specifications). It helps guide the user with color and bolding using red for mandatory (required) inputs and gray for optional ones. It gives the user an input bar 5455 for the field or formula to be charted in the middle of the chart content (body) 5454. It positions the X axis label input bar 5475 over where those labels will appear on the chart. It places the optional (not needed for a single stack) 'Legend' input 5485 where the legends will appear with the default legend position setting. Finally, it puts the very optional 'Constraint' input 5497 which affects everything on the chart in the upper righthand corner of the chart. Positioning the chart inputs where their content will appear on the chart eliminates confusion as chart types change and labels become legends (or vice versa) and there are different axis labels (e.g., X and Y) etc. That way users do not have to figure out what sidebar, ribbons, menu or popup input controls what on the chart. All uncertainty goes away if the input is directly on the location of result.

Figure 55:
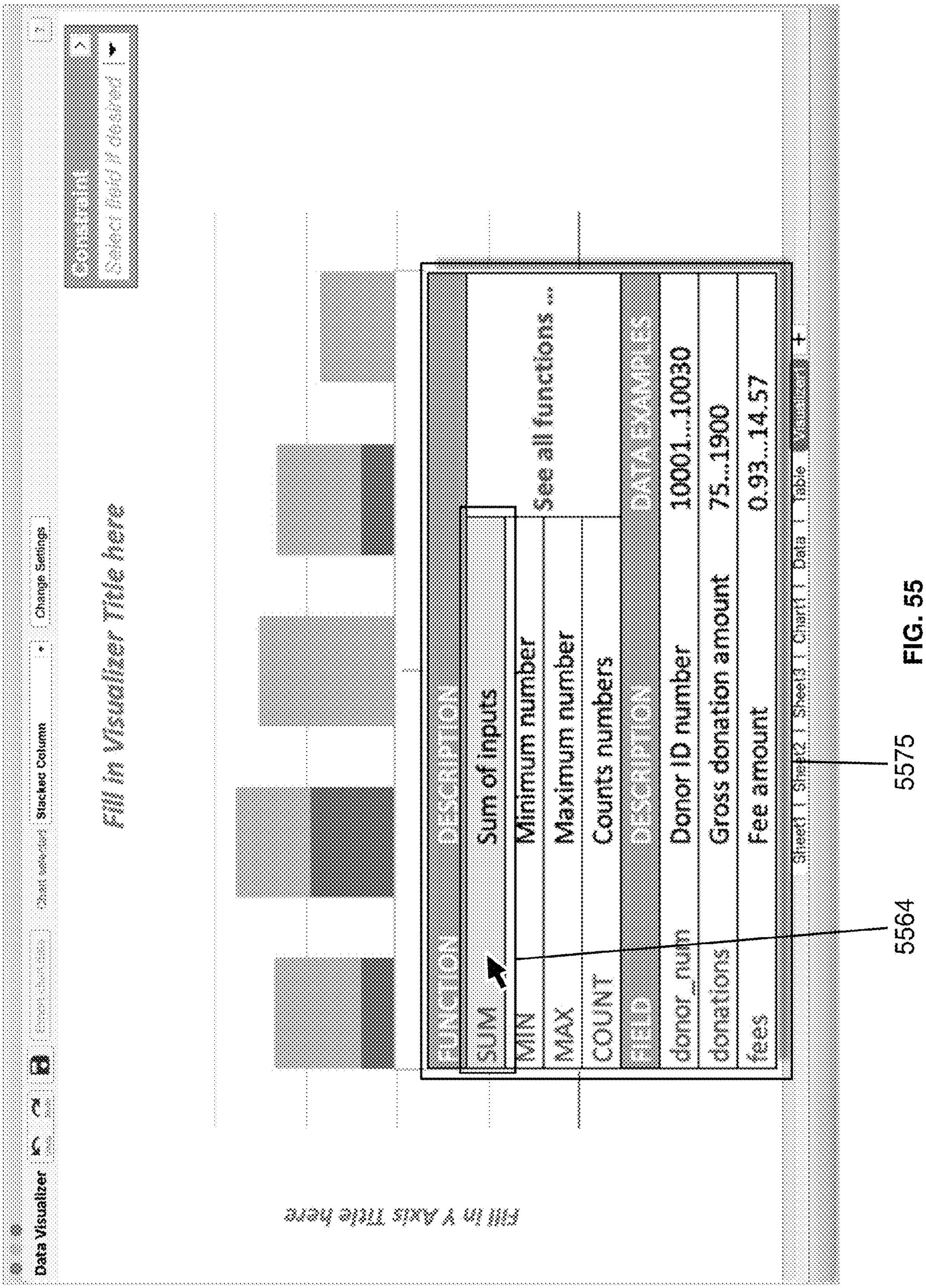
FIG. 55 and FIG. 56 examples our HINT technology working in the data visualizer on-chart UI.
Figure 56:
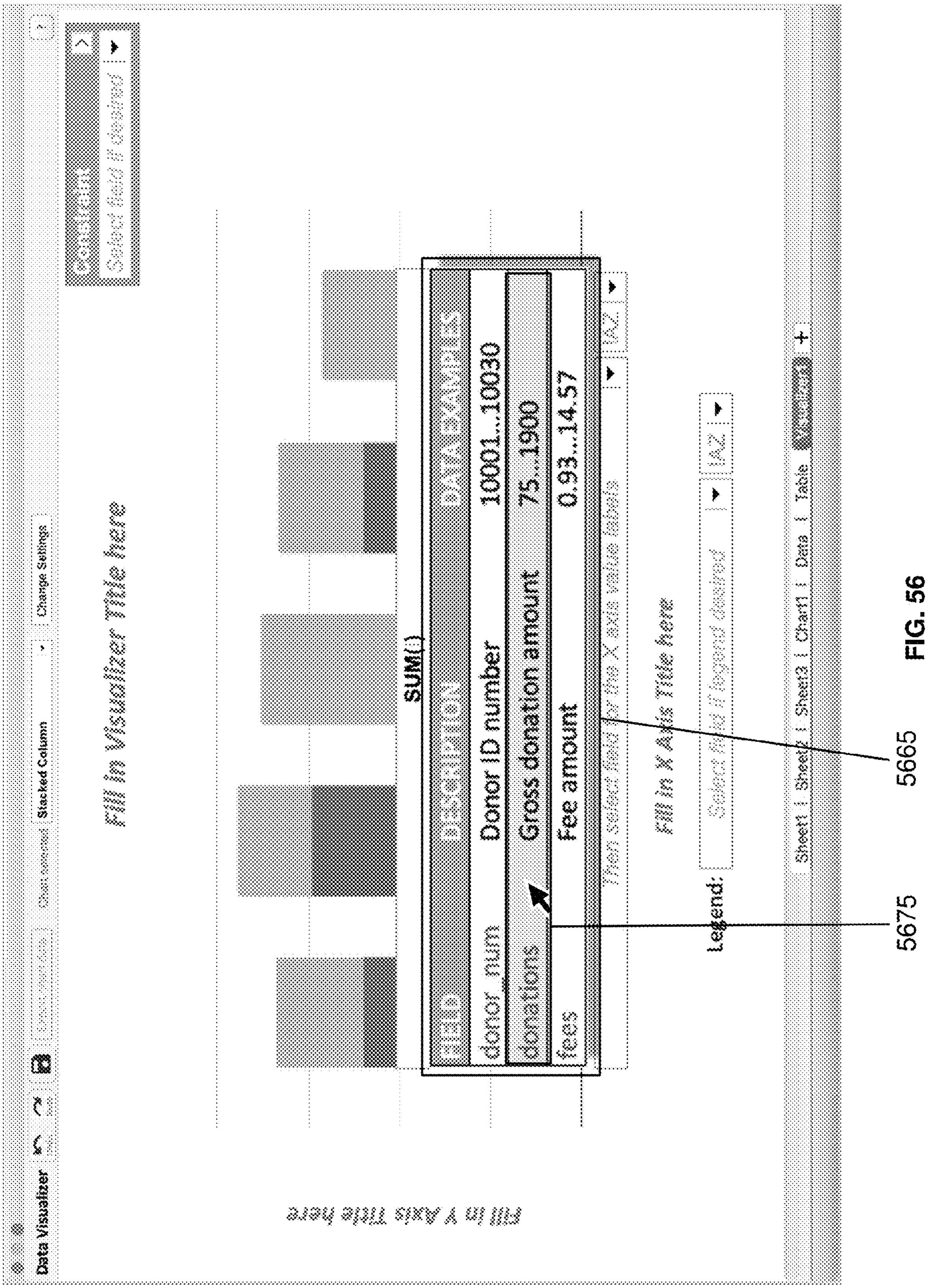
Figure 57:
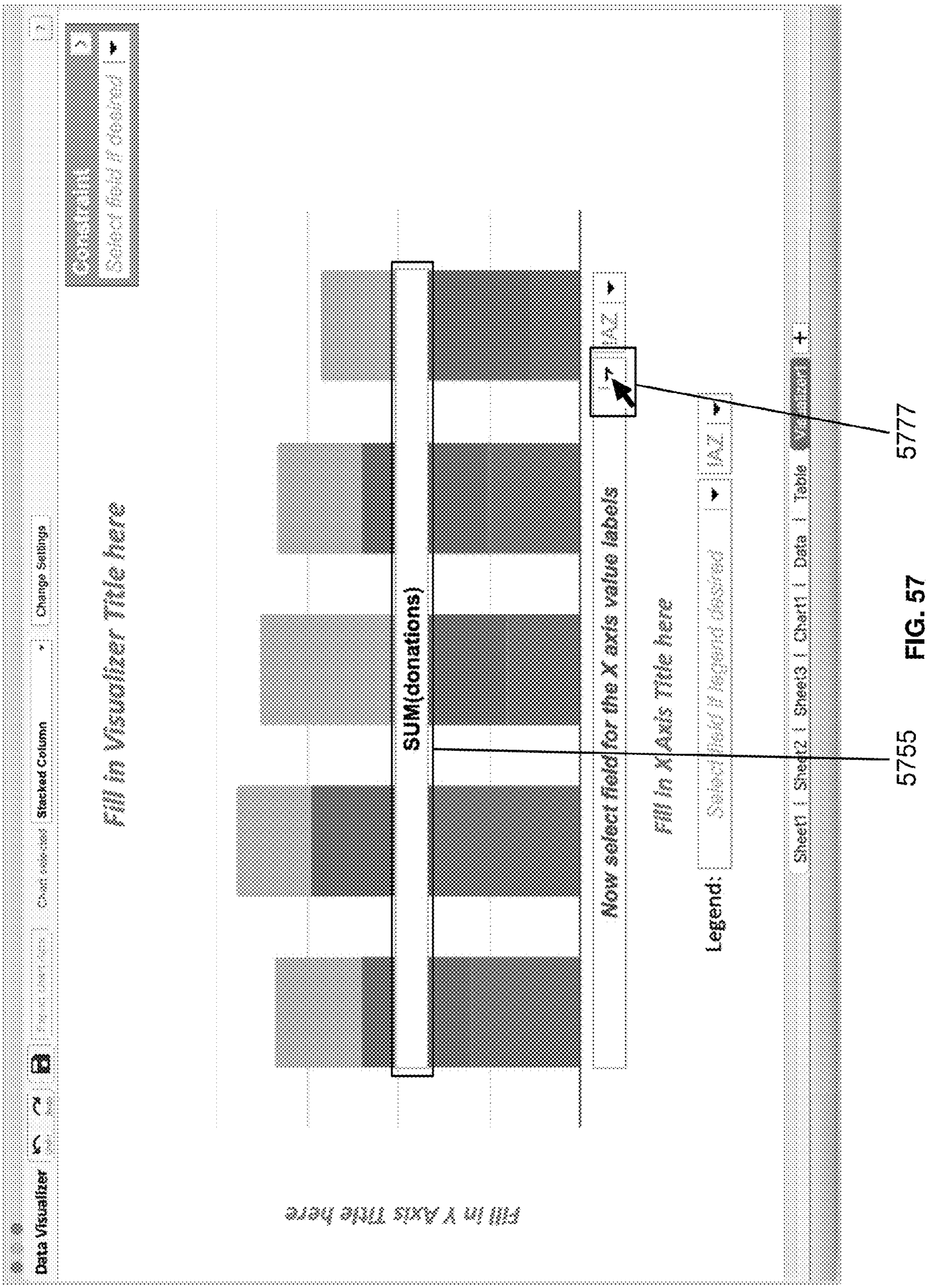
FIG. 57 and FIG. 58 example our "previous selection smart dropdowns" working within in an on-chart UI within a visualizer dedicated tab.
Figure 58:
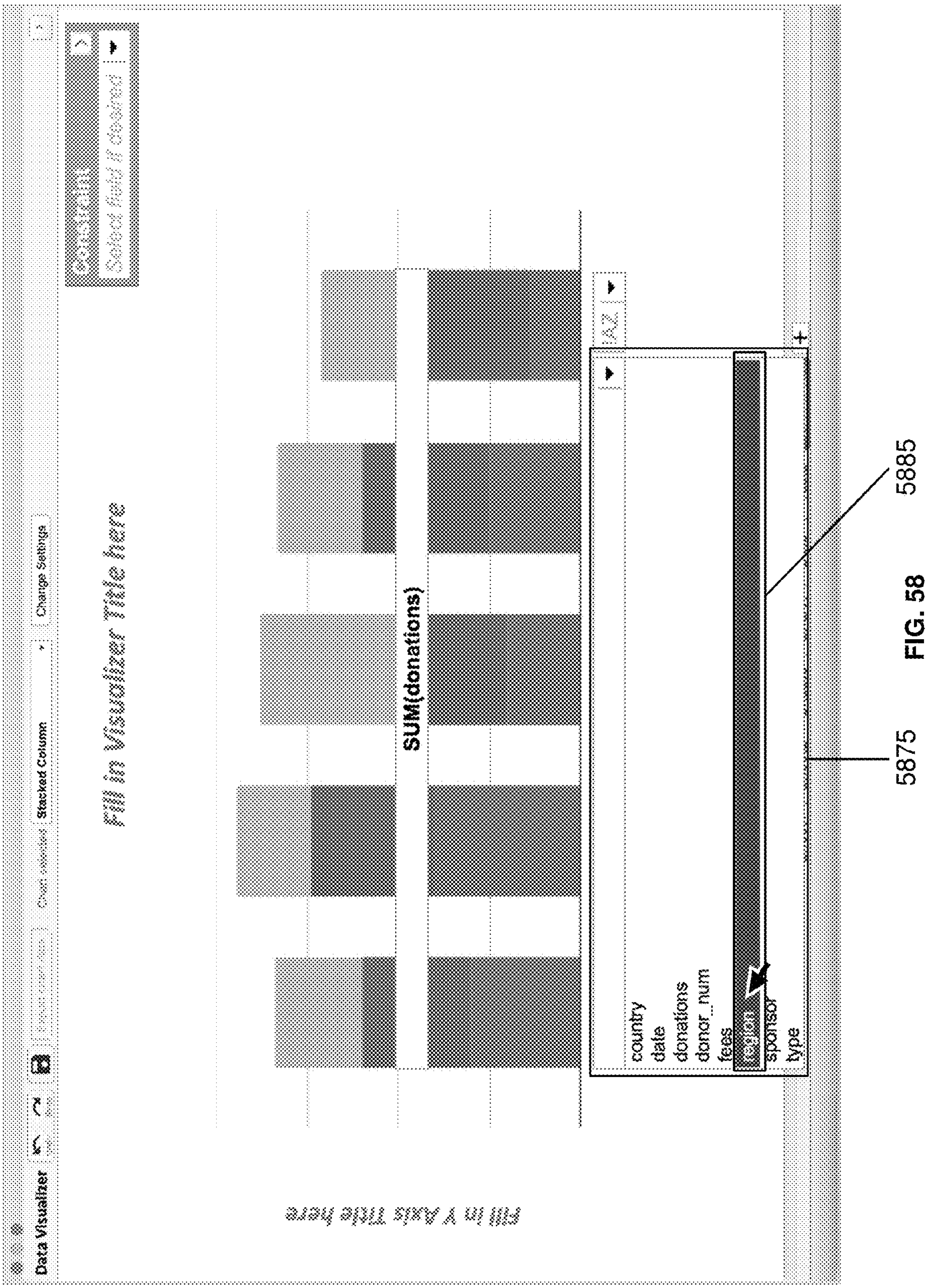
Figure 59:
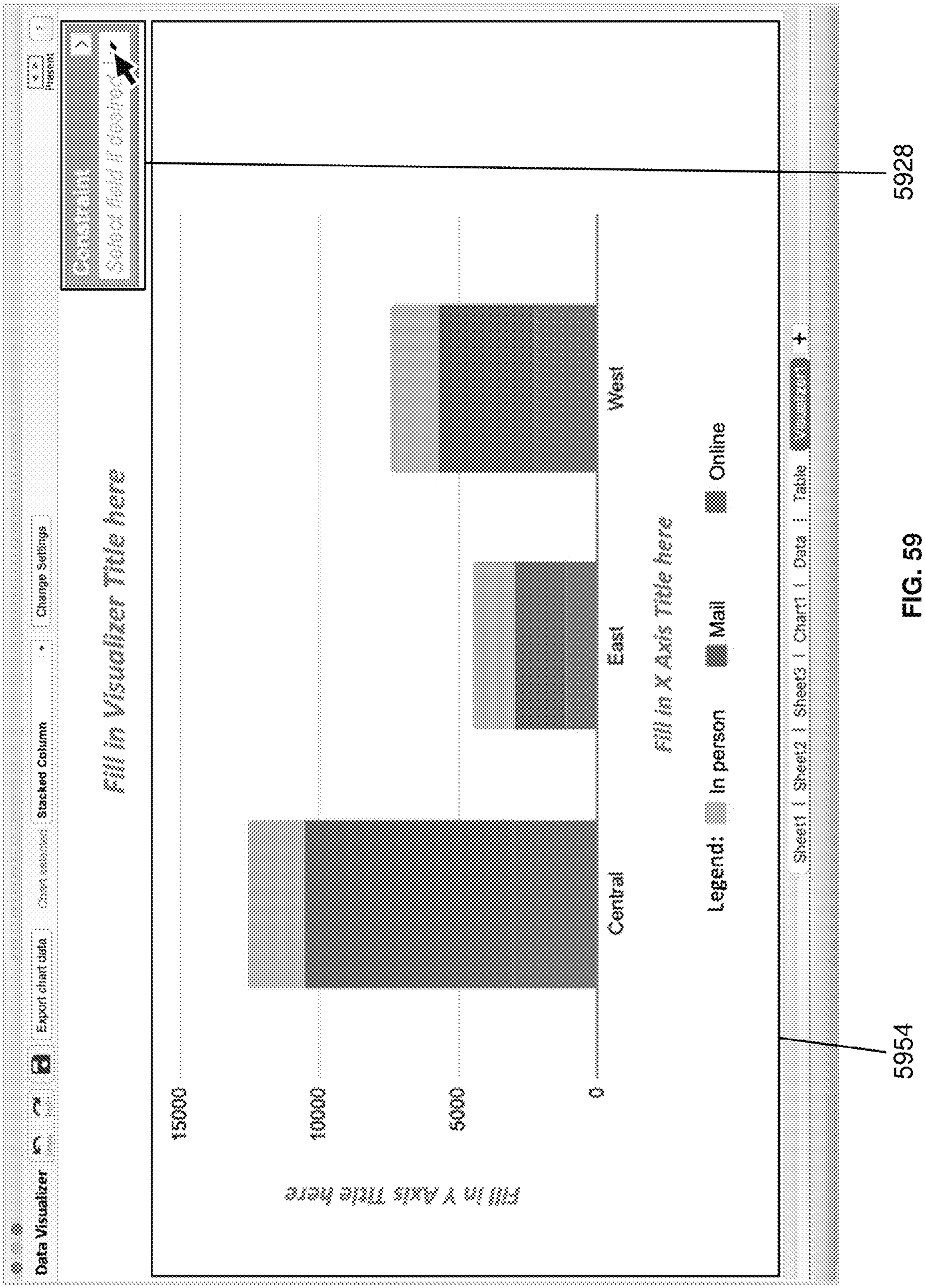
FIG. 59 and FIG. 60 example our data visualizer on-chart UI used to setup two constraints (filters).

FIG. 55 through FIG. 56 example that our HINTS work for these on-chart inputs. When the user clicks in the field or formula input 5455 (in FIG. 54) they get HINT 5575 (in FIG. 55) which as previously described only displays the functions or fields applicable to that input. Their selection of 'SUM' 5564 then displays a HINT 5665 (in FIG. 56) with the applicable fields. When the user clicks 'donations' 5675 they would be given an additional hint for possible next specifications, however in FIG. 57 the user has moved on from the 'SUM(donations)' 5755 and its HINT to the X axis clicking the "smart" dropdown button 5777 which delivers one of our "previous selection smart dropdowns" 5875 (in FIG. 58). When the user clicks 'region' 5885 for the X axis input and then does a similar type of selection using another "previous selection smart dropdown" for the Legend they get the chart content 5954 in FIG. 59. At that point the user can set one or more Constraints. They start by clicking 5928 at which point a "previous selection smart dropdown" displays for field selection. That is then followed by one or more HINTS for the constraint value selection(s). In this example the user specifies two constraints 6028 (in FIG. 60) changing the chart result 6054 (in FIG. 60) from 5954 (in FIG. 59). In this example the constraints did not change the X axis or Legend values but they could have based on the filtering in the constraint.

Figure 60:
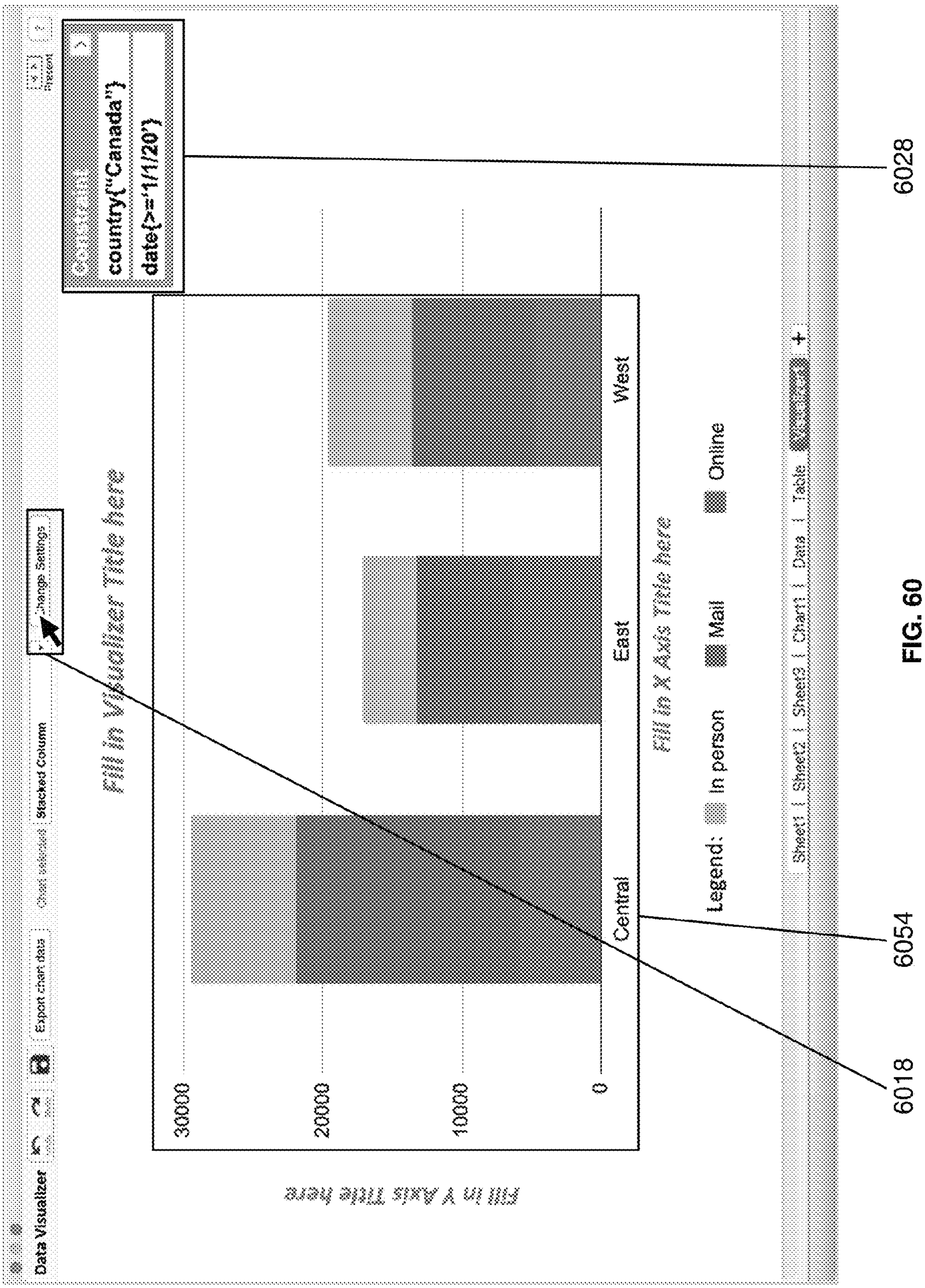
Figure 61:
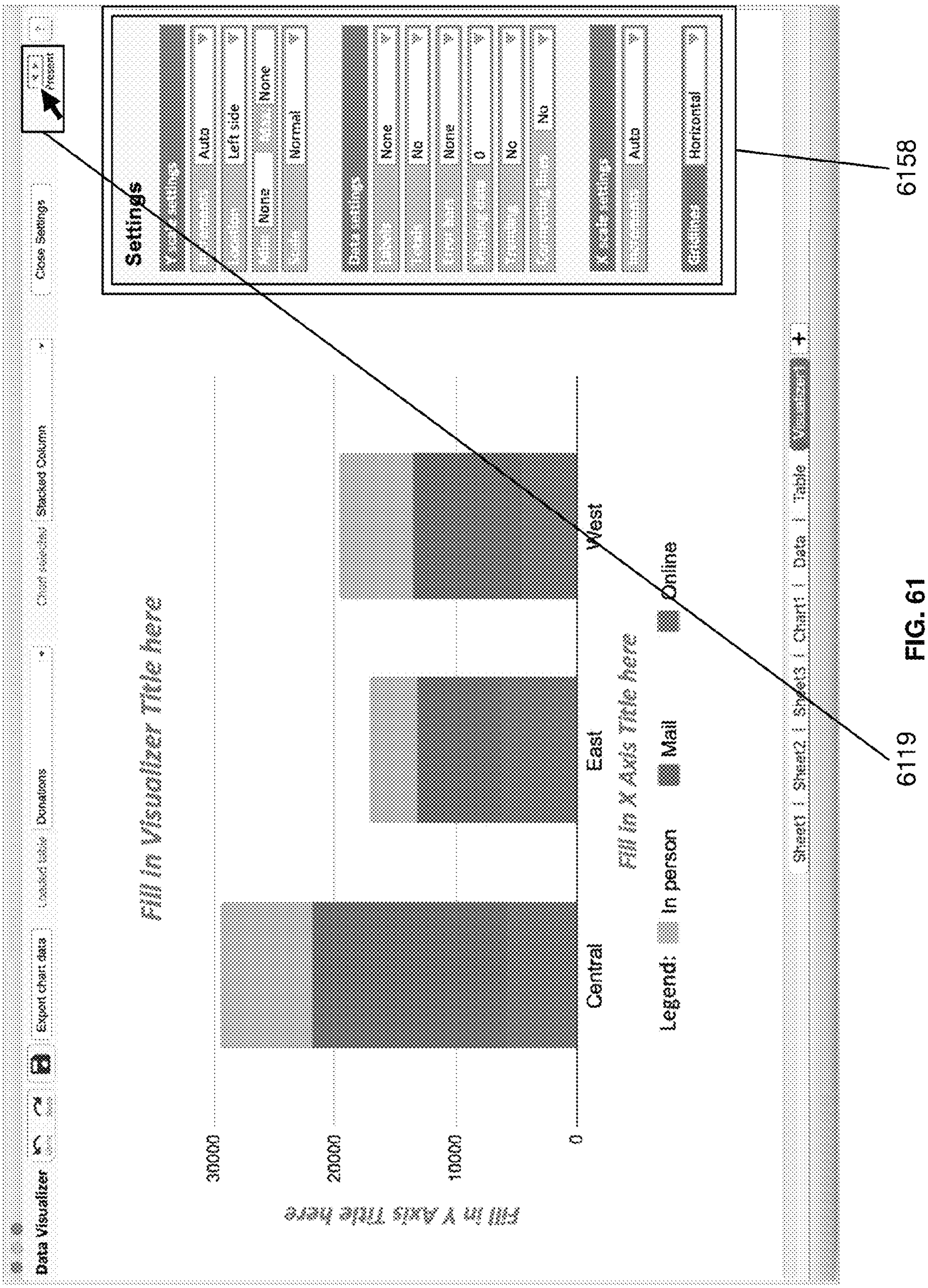
FIG. 61 examples chart settings UI working within our on-chart data visualization technology UI.
Figure 62:
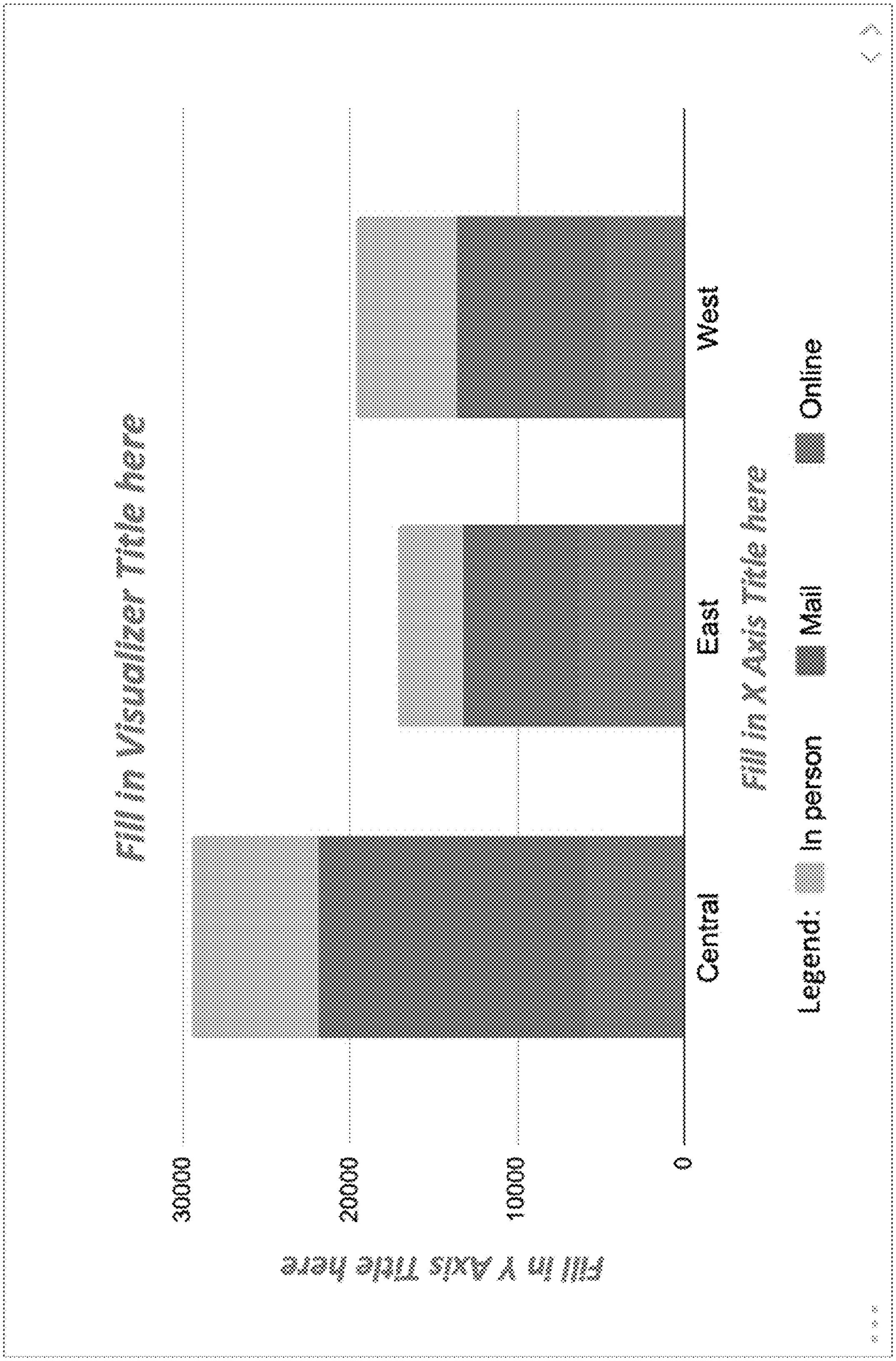
FIG. 62 examples the presentation mode of our primarily on-chart data visualization UI action triggered in FIG. 61.

In FIG. 60 the user then clicks the 'Change Settings' button 6018 to display the settings 6158 (in FIG. 61) applicable to this chart. At this point the user clicks the 'Present' button 6119 to put the tab into presentation mode in FIG. 62 as previously described. Thereby exampling that our on-chart input technology has all the chart visualizer capabilities previously described, just with a different user UI.

Figure 63:
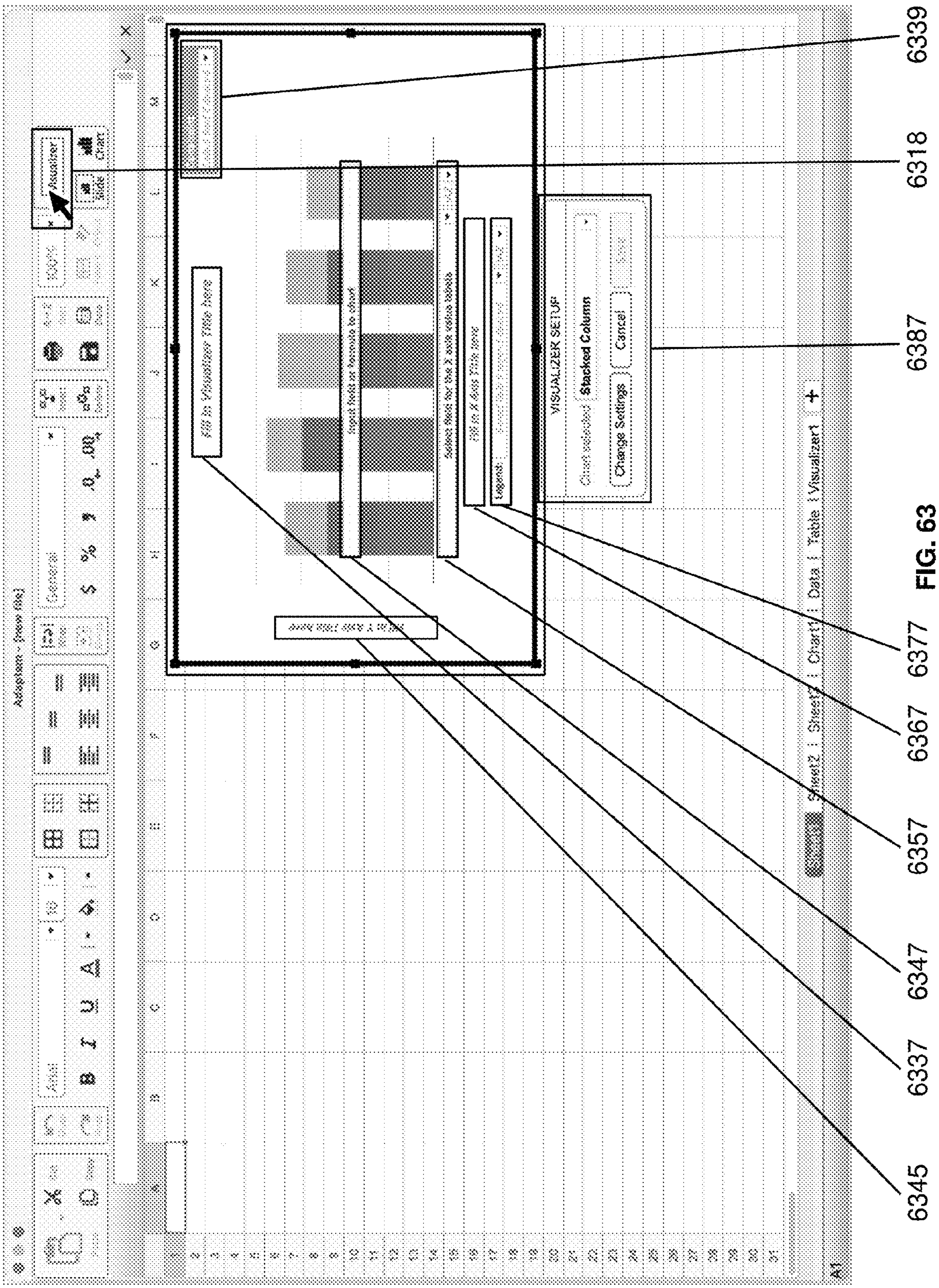
FIGS. 63, 64 and 65 our primarily on-chart data visualization UI working in a spreadsheet worksheet.
Figure 64:
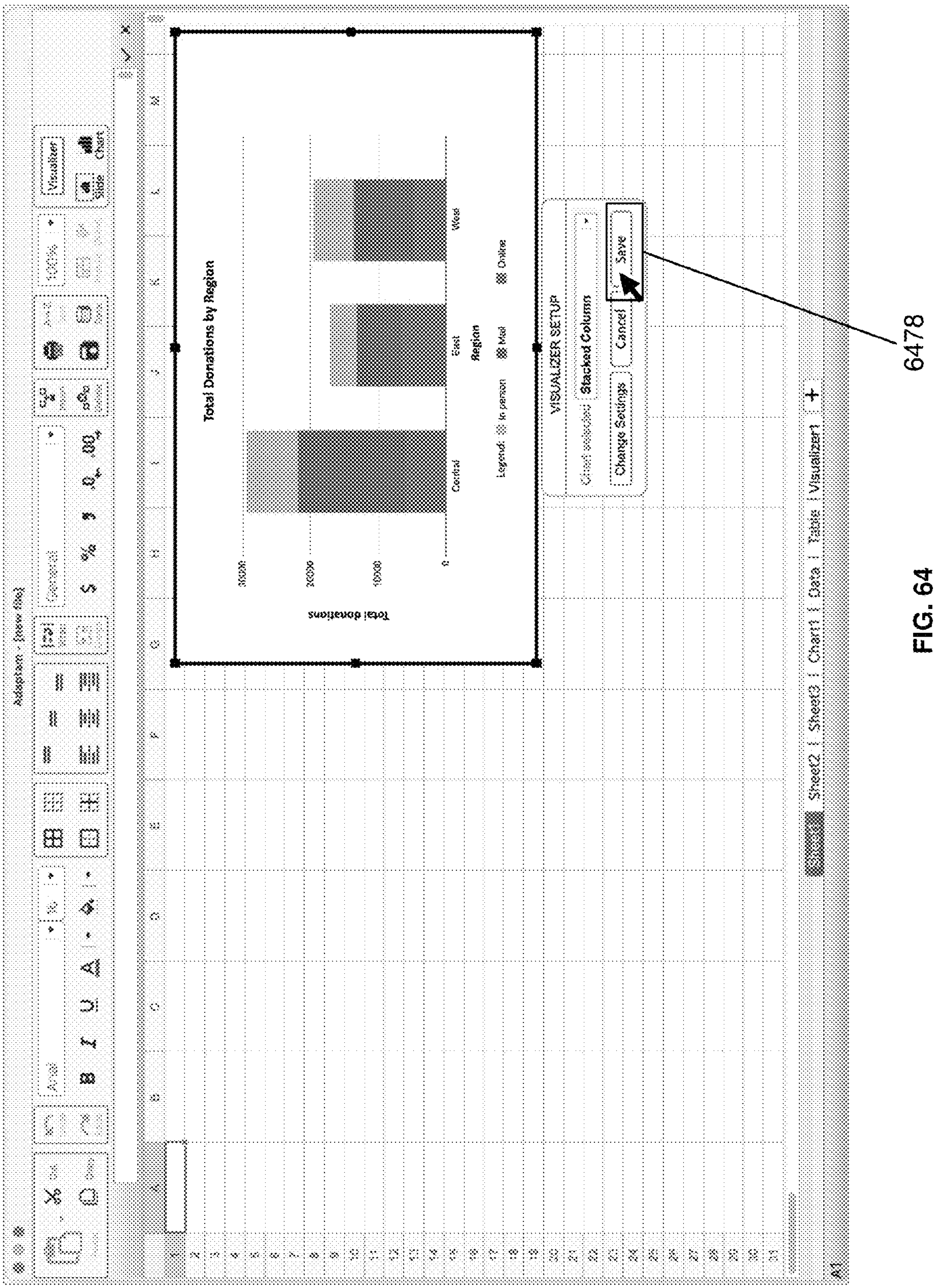
Figure 65:
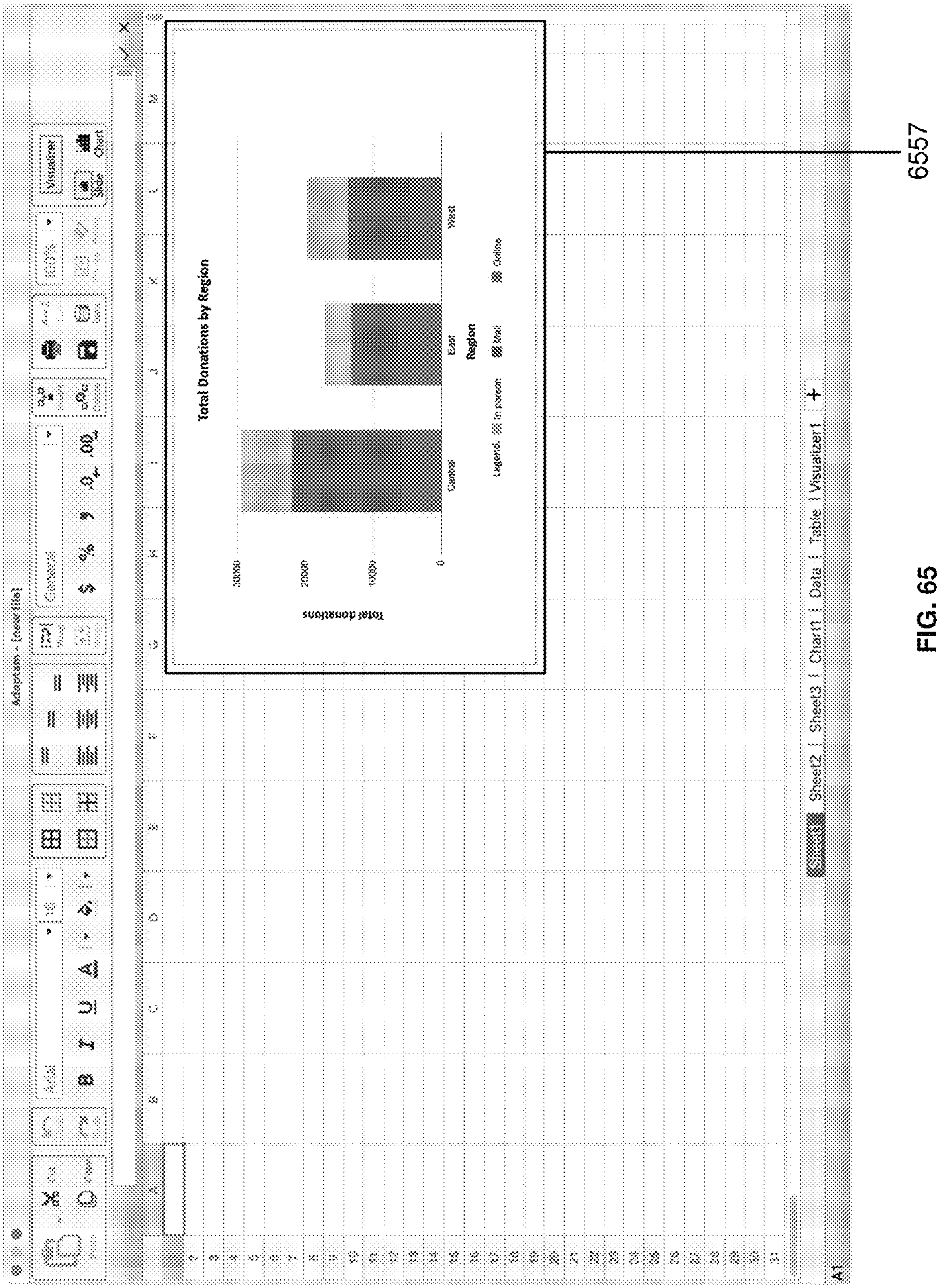

FIG. 63 through FIG. 65 shows that the on-chart data visualization works equally well for a spreadsheet worksheet tab created and embedded chart. FIG. 63 examples on chart inputs for another 'Stacked Column' chart. It examples the formula or field input 6347 which can be HINT supported or not. It examples the X axis label 6357 and Legend inputs 6377 which can use our HINTs, "previous selection smart dropdowns", regular type dropdowns or other selectors in the specification. It examples the Chart title 6337 and X and Y axis Title inputs (6345 and 6367, respectively) that accept typed inputs or cell references. In some embodiments these values could be automatically populated with the field names or formulas that populate the values. It examples Constraint input(s) 6339 which can be a combination of "previous selection smart dropdown(s)" and HINTS or regular type the field or value inputs. In this embodiment this was all triggered by clicking on a ribbon 'Visualizer' button 6318 but of course could have been triggered by a menu selection or other mode. This embodiment also has a 'VISUALIZER SETUP' popup 6387 for some operational activities like chart type selection, settings and canceling or saving the actions/result. FIG. 64 examples the user having completed all the inputs (specifications) including all the titles. In this embodiment when they click 'Save' 6478 our technology delivers the chart 6557 to the spreadsheet worksheet as shown in FIG. 65.

Broad Spectrum of Chart Types or Formula Inputs

Figure 66:
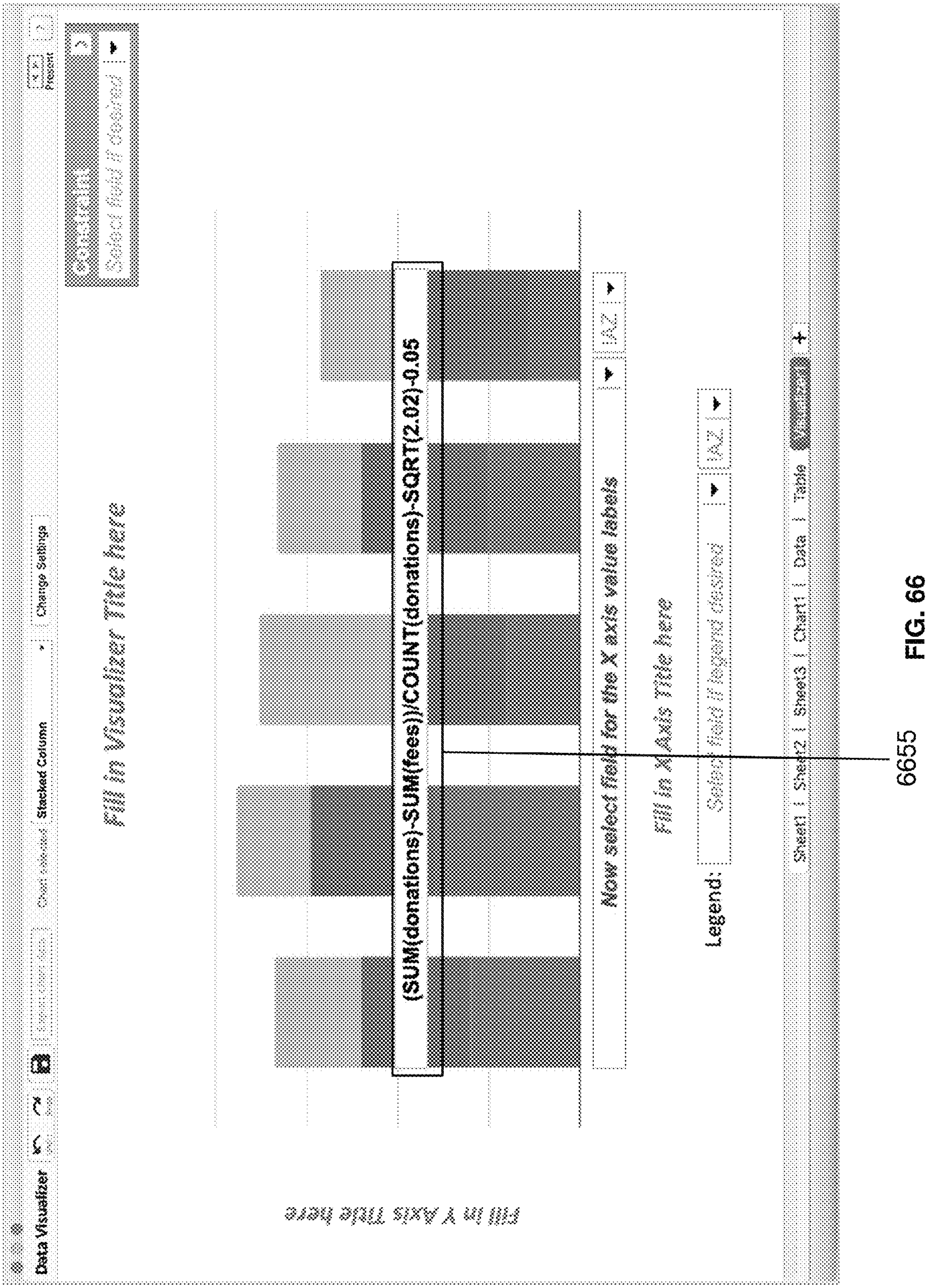
FIG. 66 examples a complex range or array spreadsheet predefined function formula (GROUP) for the combination of the X axis values and the Legend values for a formula with multiple range functions (i.e., 'SUM' and 'COUNT') and multiple fields (i.e., 'donations' and 'fees') as well as a non-range function (i.e., SQRT) and two constant values.

Our technology supports charting of a broad spectrum of data and formula inputs into a broad spectrum of chart types. FIG. 66 examples an iterative group calculation for the combination of the X axis values and the Legend values for the formula 6655 with multiple range functions (i.e., 'SUM' and 'COUNT') and fields (i.e., 'donations' and 'fees') as well as a non-range function (i.e., SQRT) and two constant values (i.e., 2.02 and 0.05). It is being done for a 'Stacked Column' chart but the same formula could be used in many chart types. Our technology supports a broad spectrum of spreadsheet range and array and otherwise functions in our chart visualizer formulas limited by the chart need to produce numerical outputs (meaning excluding predefined spreadsheet functions that do not generate numeric outputs).

Figure 67:
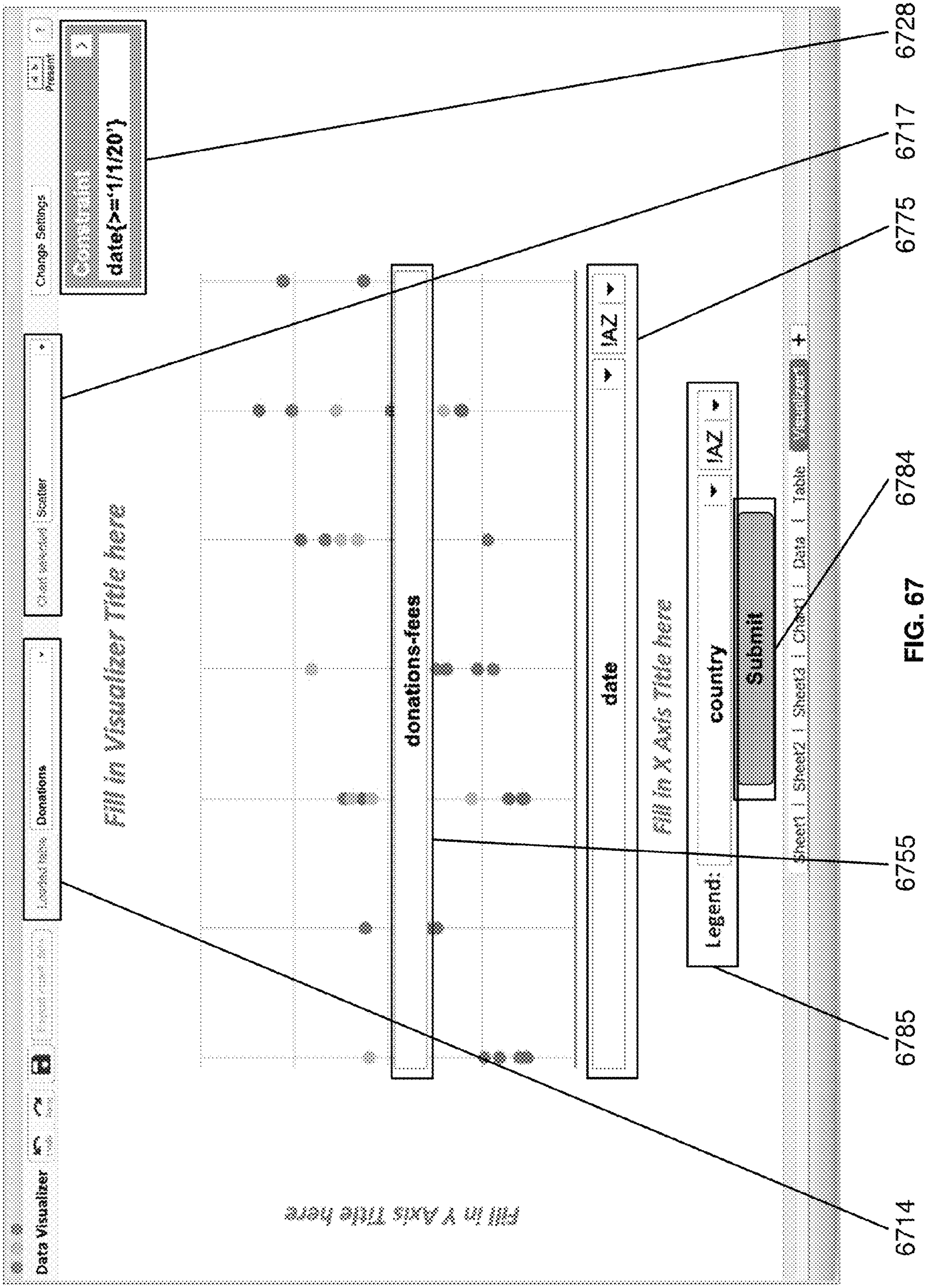
FIG. 67 examples an algebraic formula (CALC) data visualization.

FIG. 67 examples an iterative algebraic calculation for the combination of the X axis values for the field 'date' 6775 and the Legend values for the field 'country' 6785 for the formula 6655 'donations-fees' constrained to dates on and after 'Jan. 1, 2020' (date{>='1'1'20'}' 6728). The charity worker has donation and fees data by country by date for many years but wants to chart the net donations (donations—fees) by country and date for dates on or after Jan 1, 2020. As exampled earlier, our technology will automatically do those country-by-country date-by-date combination iterative calculations retrieving the data, sorting it, filtering it, doing the calculations and then organizing it for the chart and producing the chart. The user wanted it as a date by date 'Scatter' (XY) chart 6717 and in this embodiment will get that once they click 'Submit' 6784. This is just one example of the formulaic data algebraic formulas supported by our technology. Our technology supports all forms of algebraic formula combinations which can be iteratively calculated for the labels/legends values or combinations of values (i.e., when there are two fields labels/legends fields specified).

Figure 113:
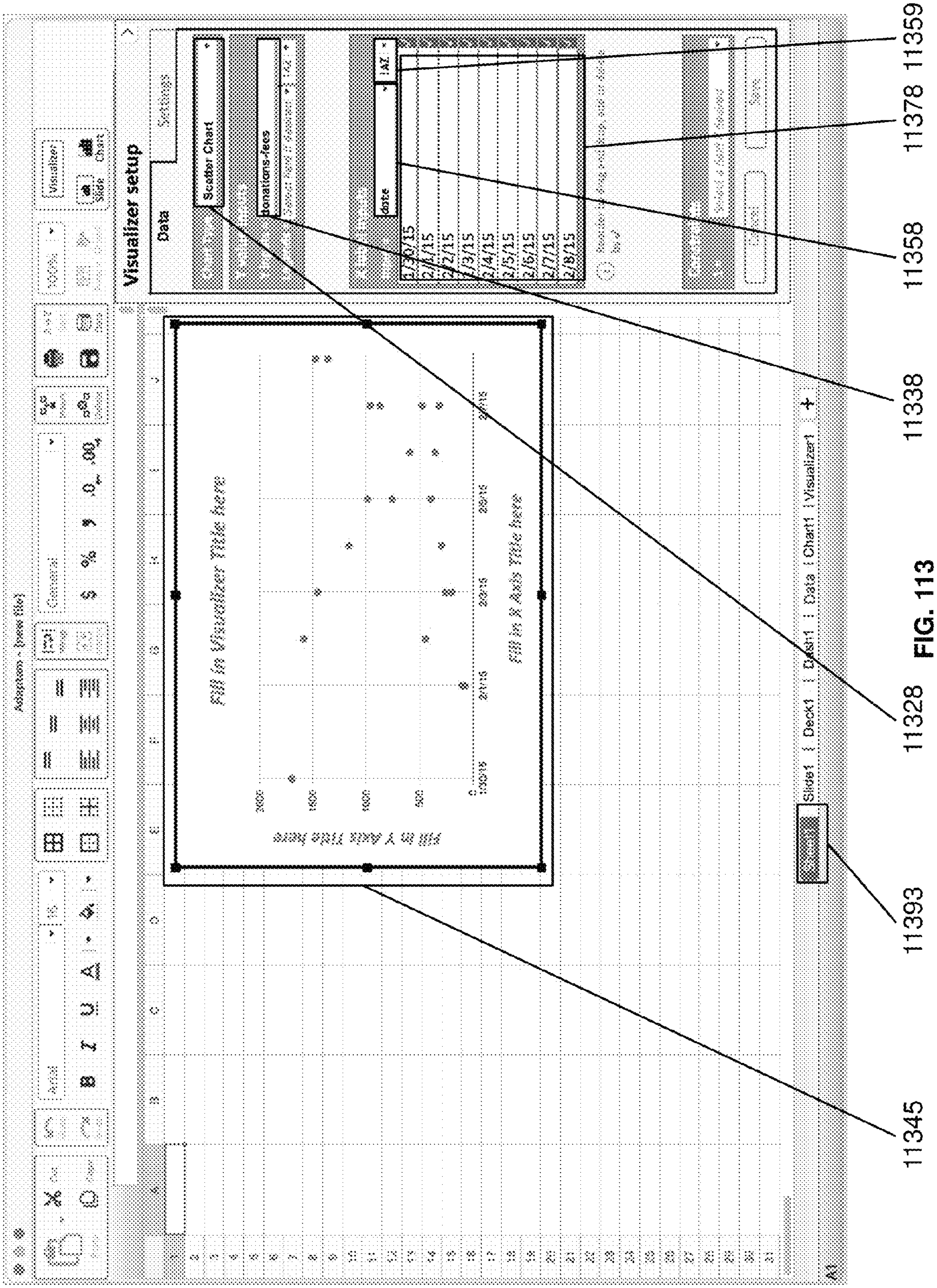

FIG. 113 through FIG. 114D examples a simpler version of FIG. 67 amenable to illustrative exampling of the automatically done steps by our technology. The data used could be either external data or in-cell formulaic data. If it is external data our technology delivers the chart without instantiating the date into a range of cells. In the case of both external or in-cell data used our technology delivers the chart without the user having to reorder cells and doing in-cell algebraic calculations as all these actions are done automatically in buffer without instantiating any of the actions in the spreadsheet cells. In this example the charity user wants to see their donations net of fees ordered from the earliest date to the latest. In FIG. 113 the user specifies the chart type 'Scatter Chart' 11328, a first field of labels/legends which is the X labels inputs of 'date' 11358 and an algebraic formula 'donations-fees' 11338 with two data fields from an external or in-cell data source. In this example the specification of the fields specifies the data source although it could have been like the example shown in FIG. 67 where the user directly specifies the external data table 'Donations' 6714 used for the iterative evaluations. Our technology then automatically retrieves into buffer the data in step one shown in FIG. 114A. In step two FIG. 114B our technology orders (sorts) the columns of data so the label/legend field 'date' is first as is required in a conventional chart setup. Then step two vertically sorts the rows of the data by the 'date' values 11453 applying the default '!AZ ordering from earliest to latest date (as default specified in 11359 in FIG. 113). Then in step three FIG. 114C our technology applies the formula to those legends/labels iterations doing the algebraic calculations for 'donations-fees'. Then in step four FIG. 114D) our technology automatically uses the labels/legends and calculated values to generate the chart visualization 11345 (in FIG. 113).

Figure 91:
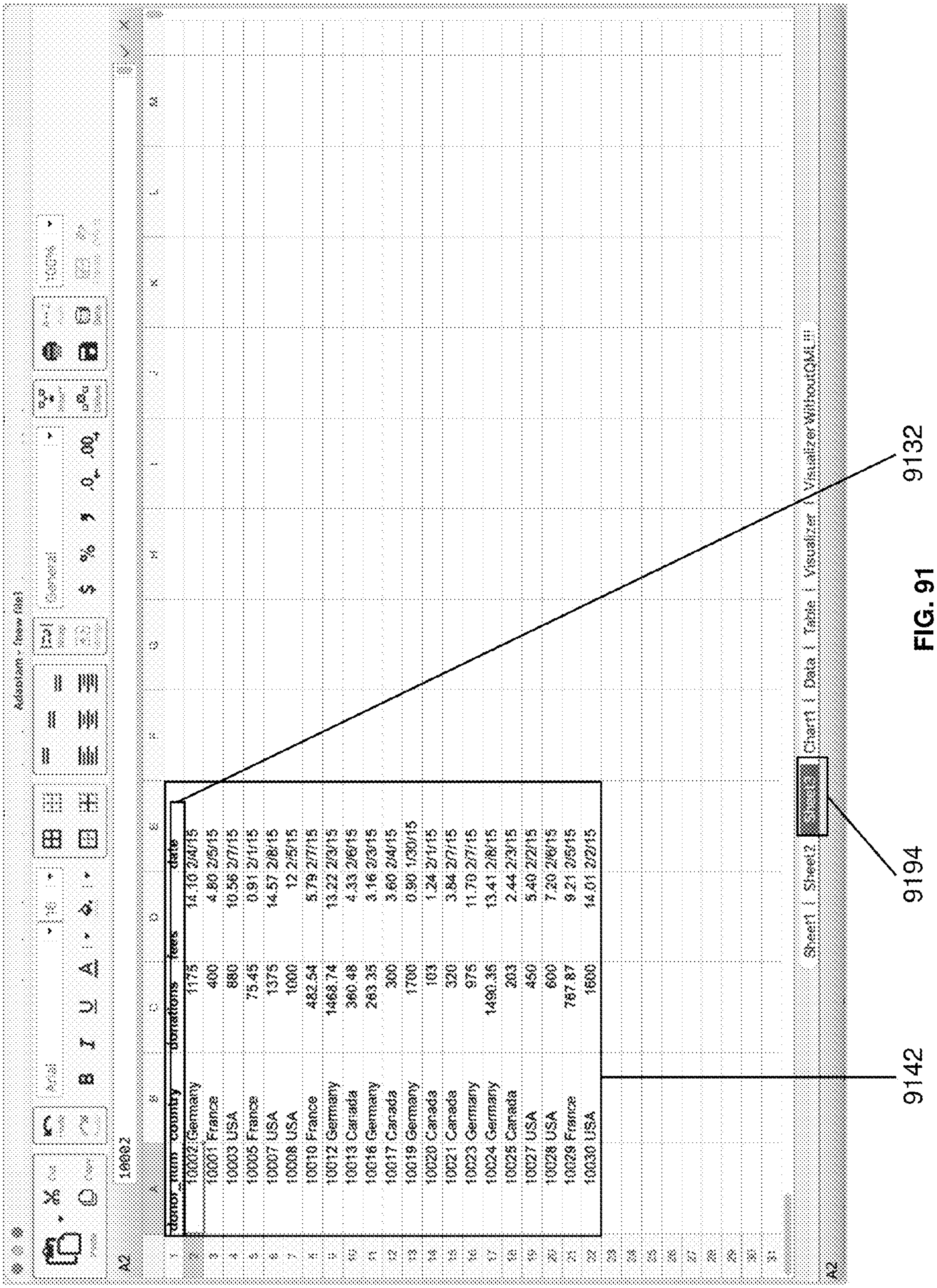
Figure 92:
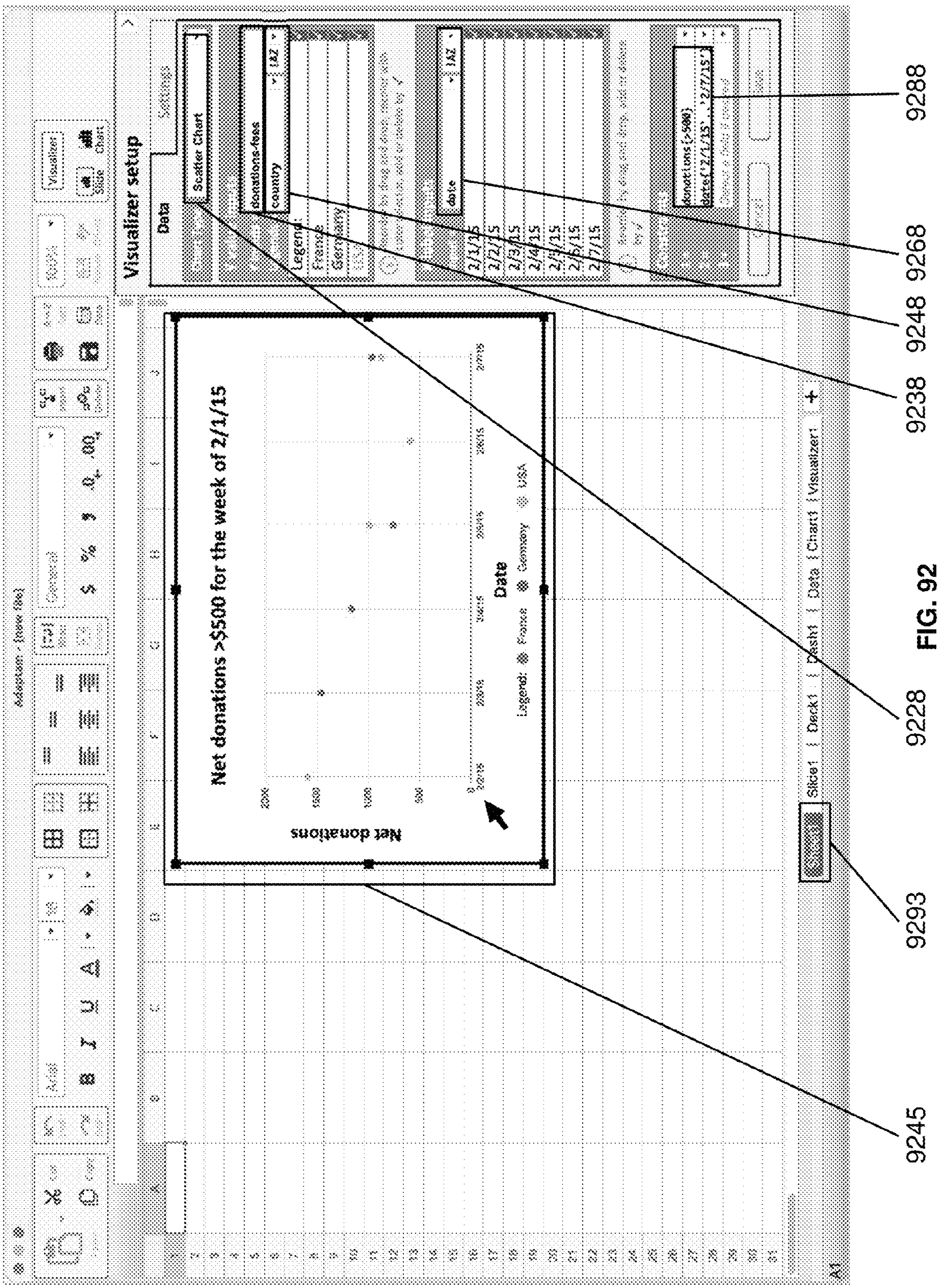

FIG. 91 through FIG. 95B examples the same 'donations-fees' formula visualized as in FIG. 67 for a small (example friendly) explicitly in-cell data set 9142 and its headings 9132 shown in FIG. 91 'Sheet3' 9194. The chart is visualized in a different 'Sheet1' 9293 in FIG. 92 where the user has no need to see the data (so they really do not care where the data is). Like FIG. 67 the user has specified a 'Scatter Chart' 9228, a Y values input of the algebraic formula 'donations-fees' 9238, a legends specification of 'country' 9248 and an X labels input of 'date' 9268. They then specify two constraints 9288 to automatically generate the chart 9245. Those inputs have triggered the automatic in buffer (where none of the steps are manually done in cell) set of steps by our technology, realizing our examples have been illustrative of the equivalent spreadsheet cell actions taken and not necessarily exactly how our technology generates the chart 9245. Step one FIG. 93A retrieves the in-cell formulaic data fields specified. Step two FIG. 93B then horizontally orders 9354 the data by the labels/legends 'date' and 'country'. Then step two FIG. 93B vertically sorts 9356 the data by the values of donations so that step three FIG. 93C can execute the first constraint of 'donations{>500}' 9288 removing the unwanted data 9338. Step four FIG. 94A then starts working on the second constraint 'date{'Feb. 1, 2015' . . . 'Feb. 7, 2015'}' 9288 by resorting the data by dates so that step five FIG. 94B removes the unwanted data 9424 and 9454. Step six FIG. 94C then does the 'donations-fees' algebraic calculations for all iterative combinations of 'date' and 'country' labels/legends. Step seven FIG. 95A then two-dimensionally reconfigures the algebraic formula calculated values by their combinations of the 'date' and 'country' labels/legends in this example default sorted '{!AZ} (i.e., from earliest to latest for date and from A to Z for the countries). Step eight FIG. 95B then generates the chart, with the eight automatically done steps exampling all of the avoided work in our technology relative to other spreadsheets.

Visualizing Just Data (No Formulas)

Figure 68:
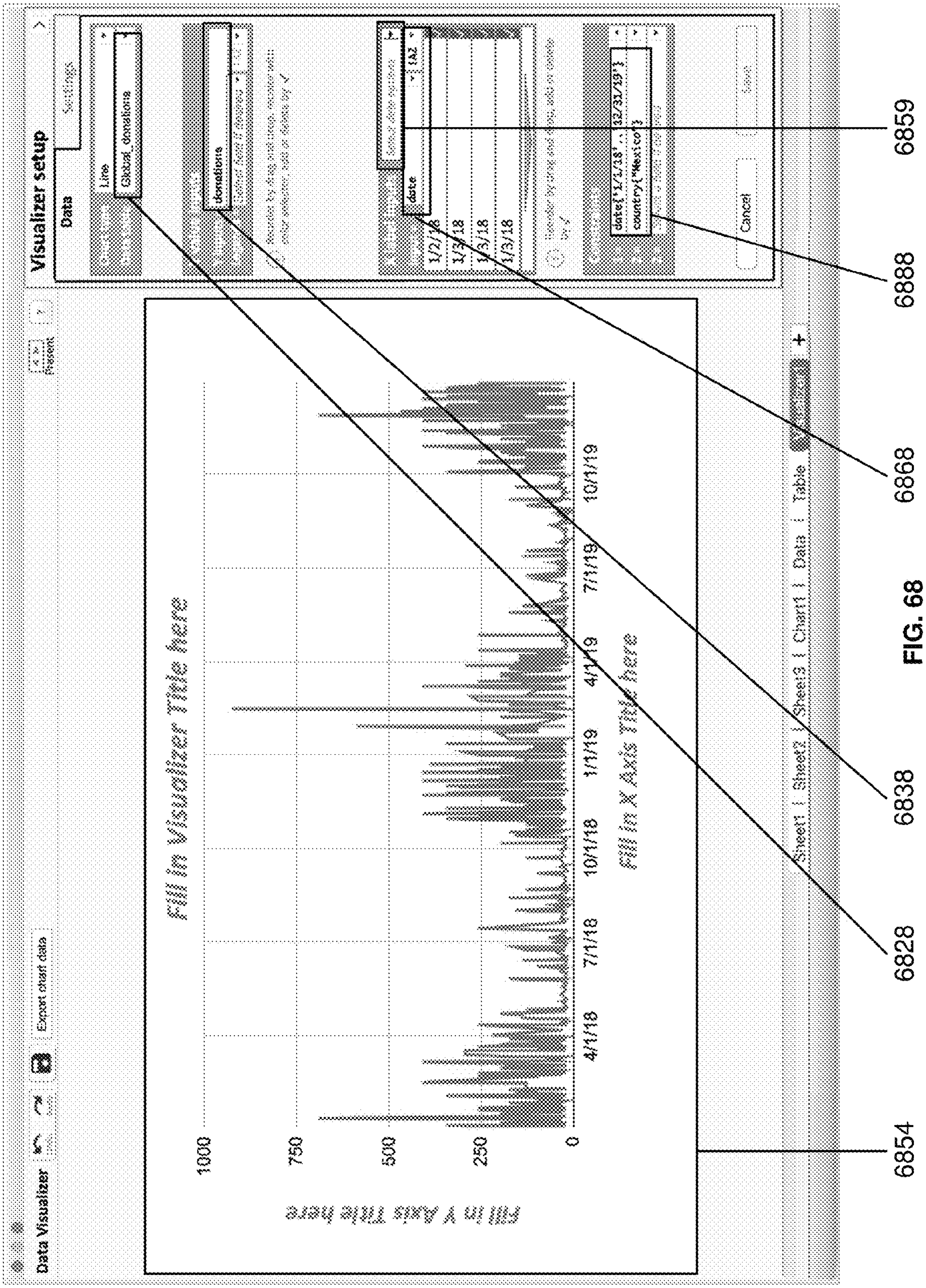
FIG. 68 examples a third data field and single legends/labels field (DATA) data visualization.

Users can also use our technology to chart data (as opposed to data in formulas). This is particularly helpful for external data but can be valuable for users with in-cell data when the data is not in form that matches the chart need (e.g., requiring sorting, filtering and/or other transformations automatically supported by our technology). FIG. 68 examples a charity user who has ten years of daily totals of donations by country and wants to chart two years of donations day-by-day for Mexico. Users often do this to help them see whether they have any data problems, like in this example absurdly high data entry donation errors or situations where the exact same donations have been recorded for more than one day. Rather than finding the data, sorting the data for both dates and Mexico, filtering the data for Mexico and the desired date range and then setting up the chart they can simply enter or select four inputs 6838, 6868 and 6888 (two constraint inputs) in our technology to get the chart. What is potentially even more powerful if they then decide to look at a different time period or a different country they simply make one input change to get the new result rather than having to redo sorts, filters and chart entries (similar to the 9 to 13 steps in Excel versus the 1 to 1.5 steps in our technology as shown in FIG. 9).

Figure 115:
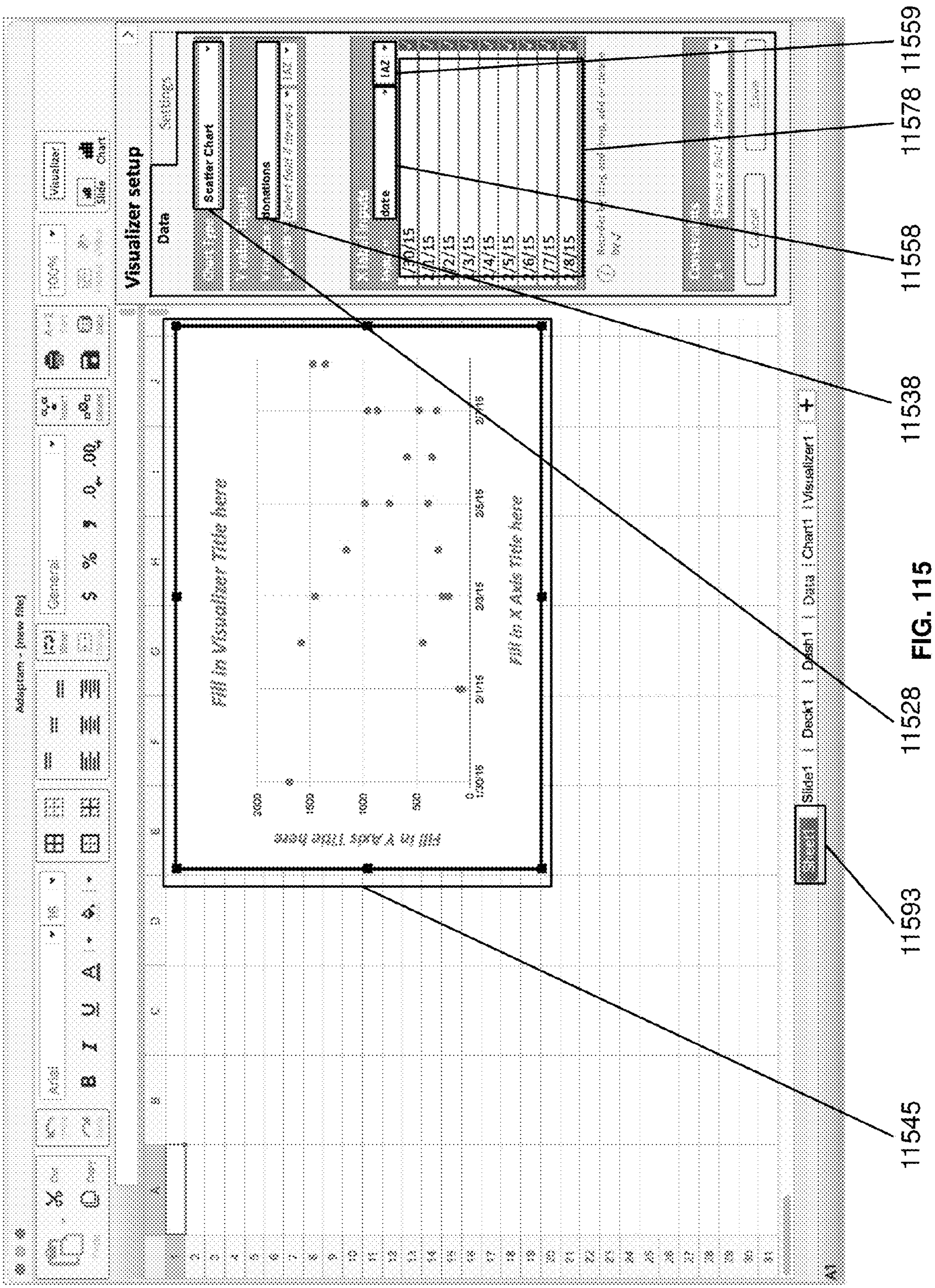

To example the automatically done steps we will use and example with a much smaller data size. FIG. 115 through FIG. 116D examples the same donations data set for a much shorter period of time more amenable to illustratively exampling the steps automatically done by our technology. The data used could be either external data or in-cell formulaic data. If it is external data our technology delivers the chart without instantiating the data into a range of cells. In the case of both external or in-cell data used our technology delivers the chart without the user having to horizontally or vertically reorder cells. In this example the charity user wants to see their donations by day to check and see if they have any unusual behavior or data errors. In FIG. 115 the user specifies the chart type 'Scatter Chart' 11528, a first field of labels/legends the X label inputs 'date; 11558 and a field 'donations' 11538 to be charted. In this example the specification of the fields specifies the data source although it could have been like the example shown in FIG. 68 where the user directly specifies the external data table 'Global_ onations' 6828 and in FIG. 119 where when the user clicks 11929 to open the 'Data Table' specifier they are presented with a list of external tables and/or in-cell data sets 11938 for their selection. Our technology then automatically retrieves in step one FIG. 116B only the data used from the data source FIG. 116A, which could be either external data or in-cell formulaic data. In step two FIG. 116C our technology horizontally orders (sorts) the data columns so that the label/legend column 'date' 11657 is to the left of the body of the chart values 'donations' 11658 as this is what is illustratively required to replicate what would need to be done in conventional spreadsheet charting setup. Then step two vertically sorts the rows of values on the ascending ('!AZ") legends/labels 'date' values 11657. Step three FIG. 116D then extracts the labels/legends with their matching field values to generate the chart visualization 11545 in FIG. 115.

Figure 117:
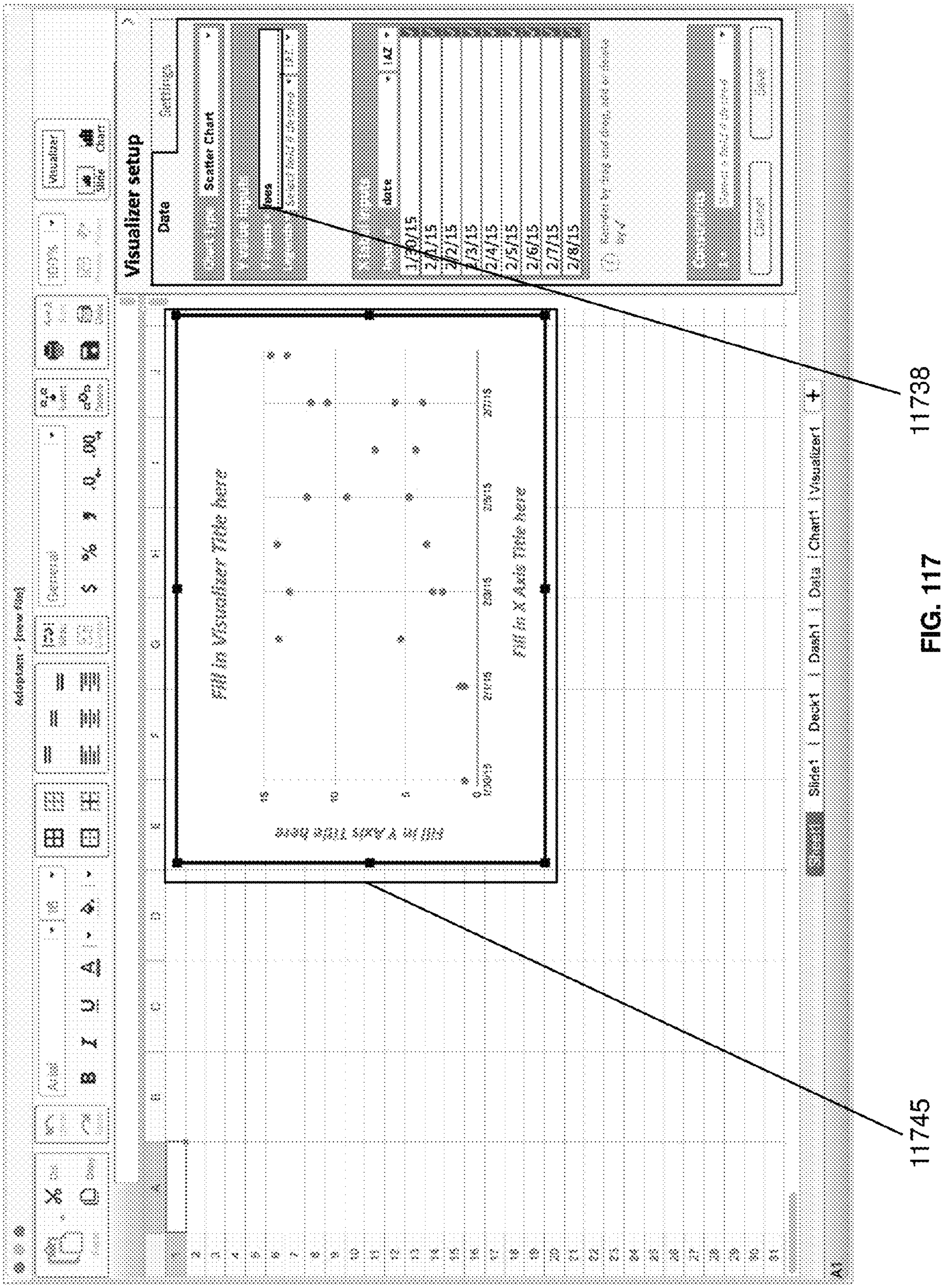

At this point the user decides they want to look at the donation fees to see if there is anything unusual in those charges. This simply requires one change replacing 'donations' 11538 in FIG. 115 with 'fees' 11738 in FIG. 117 which then automatically generates the chart 11745. That one change has automatically triggered the three steps exampled in FIG. 118A through FIG. 118D. So, the user avoided having to select the new data FIG. 118A and FIG. 118B, horizontally and/or vertically sort it FIG. 118C and then set it up in FIG. 118D having accomplished all of this with one formulaic data field replacement in our technology. Having looked at the donations and fees and feeling like there is no obviously erroneous data the user decides they would like to differentiate the donations by the countries they came from, look at donations only over $200 and limit them to the week of Feb. 1, 2015.

FIG. 96 through FIG. 98D examples that more complicated chart with the multiple constraints (filters) and the automated steps done by our technology to deliver it. The data could be coming from the in-cell data set shown in FIG. 91 'Sheet3' 9194 or it could be coming from an external data set. The chart is visualized in the 'Visualizer1' 9697 tab in FIG. 96 where the user has specified a 'Scatter Chart' 9618, a Y values input of the formulaic data field 'donations' 9628, a legends specification of 'country' 9638 and an X labels input of 'date' 9658. They then specified two constraints 9688 to generate the chart 9654. Those inputs then trigger the automatic set of steps by our technology illustrated by FIG. 97A through FIG. 98D. Step one FIG. 97A retrieves the formulaic data fields specified (limited here for exampling purpose), Step two FIG. 97B then horizontally orders (sorts) the data by the 'date' and 'country labels/legends and vertically sorts the data by the values of donations so that step three FIG. 97C can execute the first constraint of 'donations{>200}' 9688 removing the unwanted data 9728. Step four FIG. 98A then starts working on the second constraint 'date{'Feb. 1, 2015' . . . 'Feb. 7, 2015'}' 9688 by sorting the data by dates so that step five FIG. 98B removes the unwanted data 9834 and 9884. Step six FIG. 98C then two-dimensionally reconfigures (organizes) the 'donations' values by their combinations of the 'date' and 'country' labels/legends in this example default sorted '{!AZ} (i.e., from earliest to latest date and from A to Z for the countries). Step seven FIG. 98D then automatically generates the chart, again exampling all of the avoided work in our technology relative to other spreadsheets even when calculations are not involved.

Other Transformations

Figure 69:
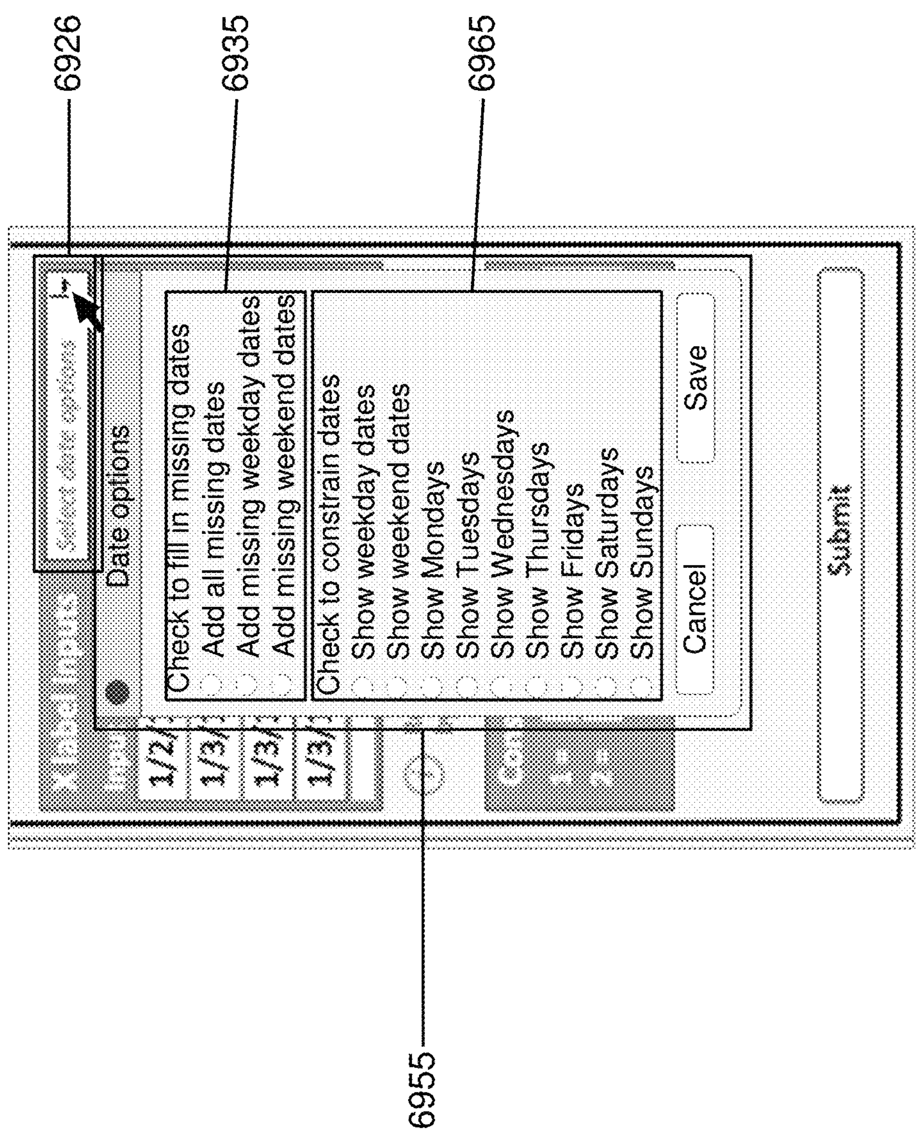
FIG. 69 examples some of the date transformations done in our data visualizer constraints.

There are also transformations automatically done by our technology which are very difficult and require a lot of work to replicate in conventional spreadsheets. The 'Select date options' selector 6859 (shown in FIG. 68) automatically exposed in this embodiment for date data type fields gives a number of those transformations as shown in FIG. 69. In this embodiment gaining access to those data transformations is done by clicking the dropdown button 6926 to display the dropdown 6955. The availability of this option is triggered by the use of a date type data field or formulaic data field in the input. One set of data transformations 6935 fills in any missing dates where the simple version of filling all missing dates is done by conventional spreadsheet charting capabilities but the more selective fill weekdays or fill weekends is not done by conventional spreadsheets. The other set of transformations 6965 constrains dates not by date but by day of week. Conventional spreadsheets have no simple check a box option in their charts for changing a chart to show only one or more specific day of the week (e.g., Mondays or Mondays and Tuesdays) or only show only weekdays or only weekends.

Drag & Drop Reordering

Figure 70A:
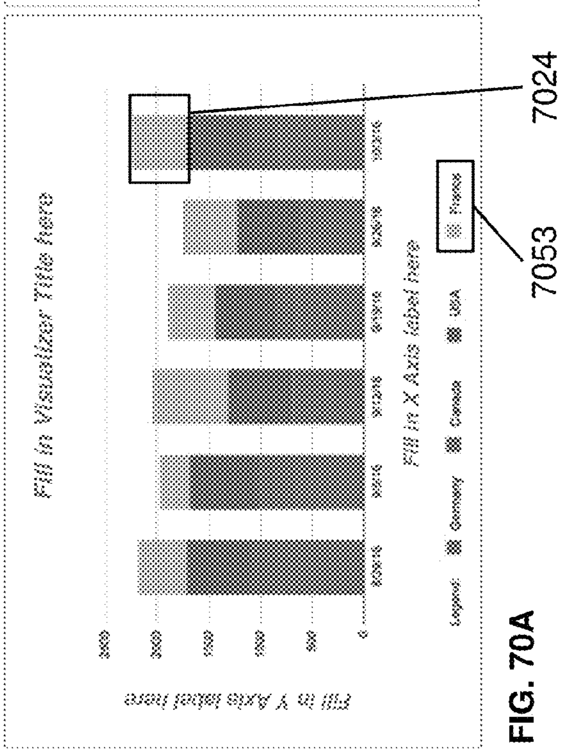
FIGS. 70A, 70B, 70C and 70D example two drag and drop ways for users of our technology to customize the order of data in their chart Y axis elements and chart legends.
Figure 70B:
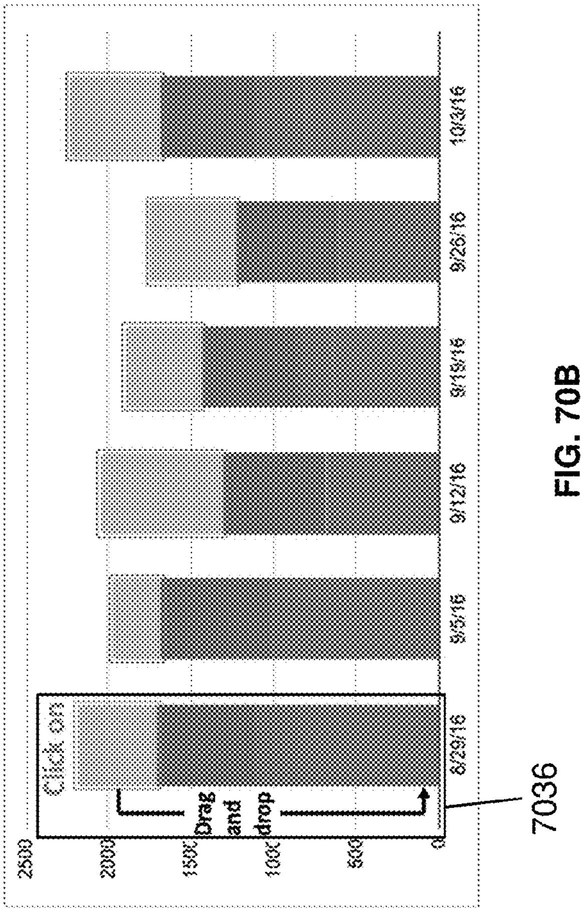
Figure 70C:
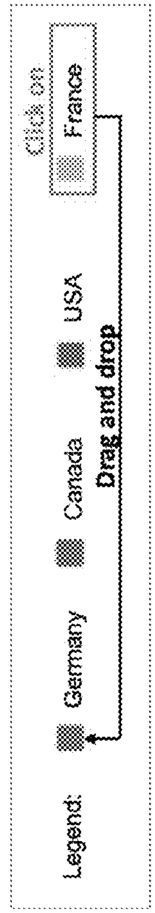
Figure 70D:
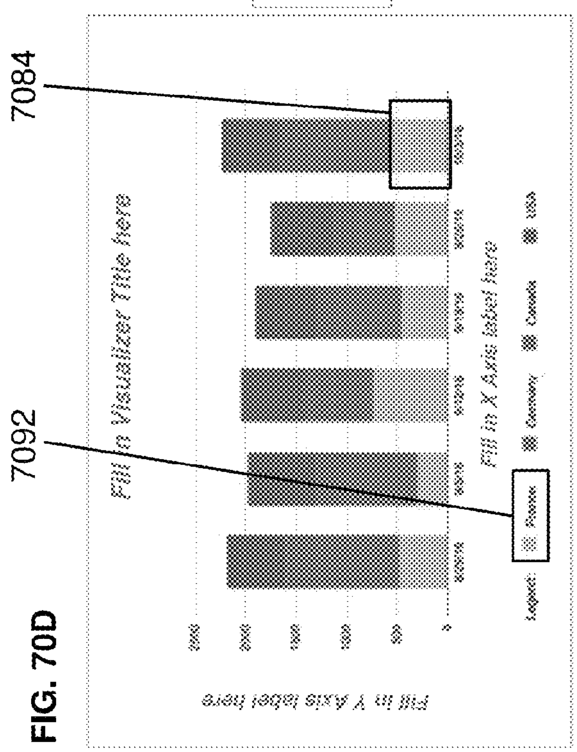

Our visualizer charting technology supports the innovations in our Chart U.S. application Ser. No. 17/384,404, as exampled with the drag and drop reordering of chart content and its related proxies working for our visualizer chart technology. FIG. 70A through FIG. 70D example two drag and drop ways for users of our technology to customize the order of data in a chart exampled with stacked columns. The user wants to move the yellow elements represented by 7024 from being on top to being on the bottom 7084 of the stack and correspondingly move the yellow positions 7053 to 7092 in the legend. The first exampled mode is dragging and dropping one of the stacked elements from the top to the bottom position as shown in FIG. 70B 7036 which then automatically reorders the legend. The second mode of doing it is to drag the legend element to be moved to the position the user would like as shown in FIG. 70C then automatically reordering the stacked column elements. Either of those actions would change the other and make the set of changes shown in FIG. 70D relative to those in FIG. 70A, 7053 to 7092 and 7024 to 7084.

Figure 71A:
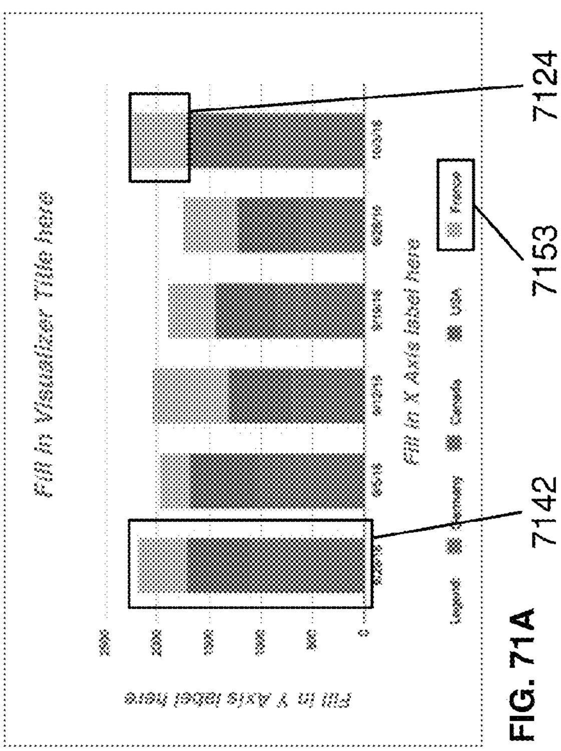
FIGS. 71A, 71B, 71C and 71D examples two drag and drop ways for users of our technology to customize the order of data in their chart Y axis elements and sidebar legends.
Figure 71B:
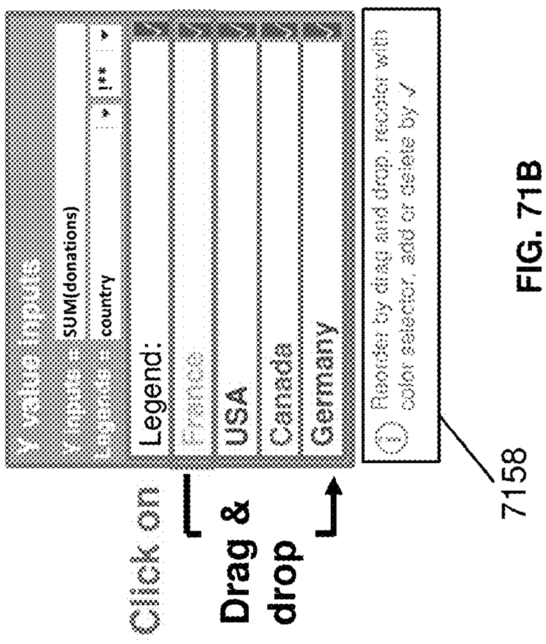
Figure 71C:
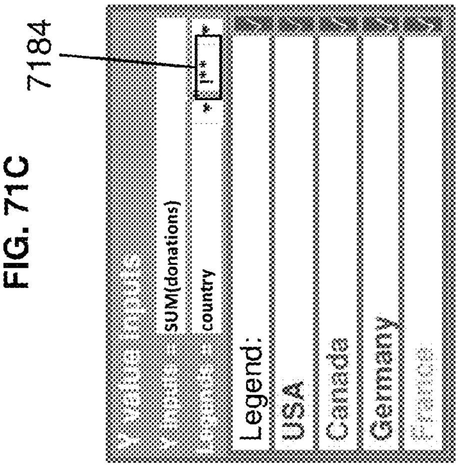
Figure 71D:
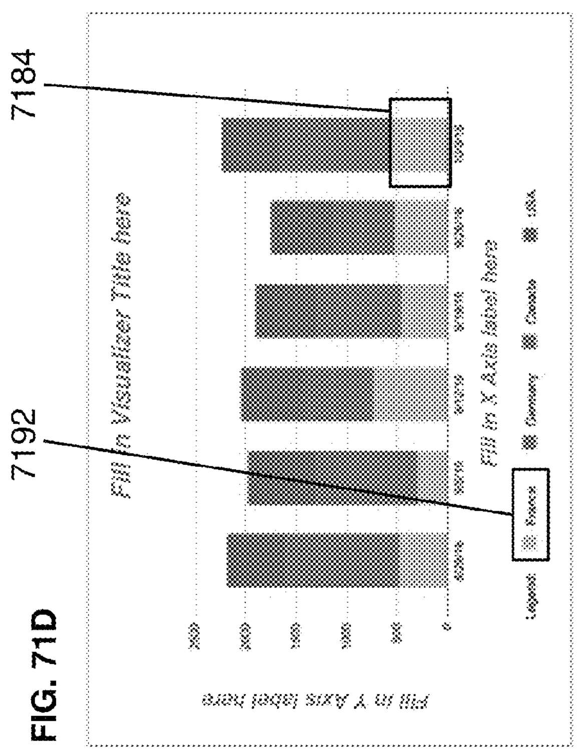

FIG. 71A through FIG. 71D examples how those same chart changes could be achieved using a sidebar equivalent drag and drop. In this embodiment one of the advantages of our sidebar technology is that when order and color matters, it is ordered and colored like the chart. That is reflected in the order and color of the 'France', 'USA', 'Canada', and 'Germany' Legend label values in the sidebar blow up in FIG. 71B matching the top to bottom stacked elements in the column 7142. Putting the Legend label values in the same order and coloring them the same as in the chart makes it visually much easier for users to drag and drop the sidebar labels, as shown in FIG. 71B giving the sidebar result shown in FIG. 71C. The on-chart results of this sidebar drag and drop are shown in FIG. 71D versus FIG. 71A where the yellow stacked elements have moved from top 7124 to the bottom 7184 and moved positions 7153 to 7192 in the Legend. All this was done with one simple drag and drop, and the user made aware of this capability through instructions like the 'Reorder above by drag and drop' 7158 in the sidebar. In this embodiment the change is also shown in the custom sort indicator '!' 7184** in the sidebar Legend sort selector dropdown.

Figure 72B:
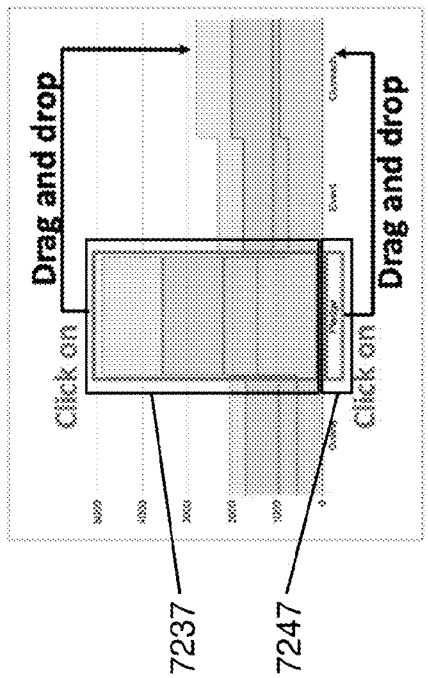
FIGS. 72A, 72B, 72C and 72D examples two drag and drop ways for users of our technology to customize the order of data in their chart X axis elements and sidebar X axis labels.
Figure 72C:
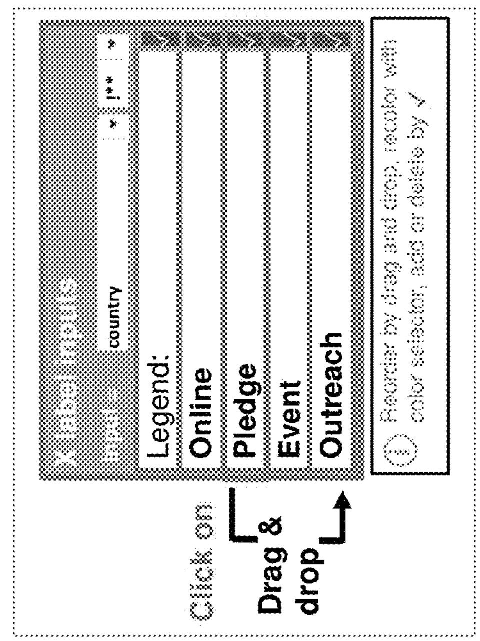
Figure 72A:
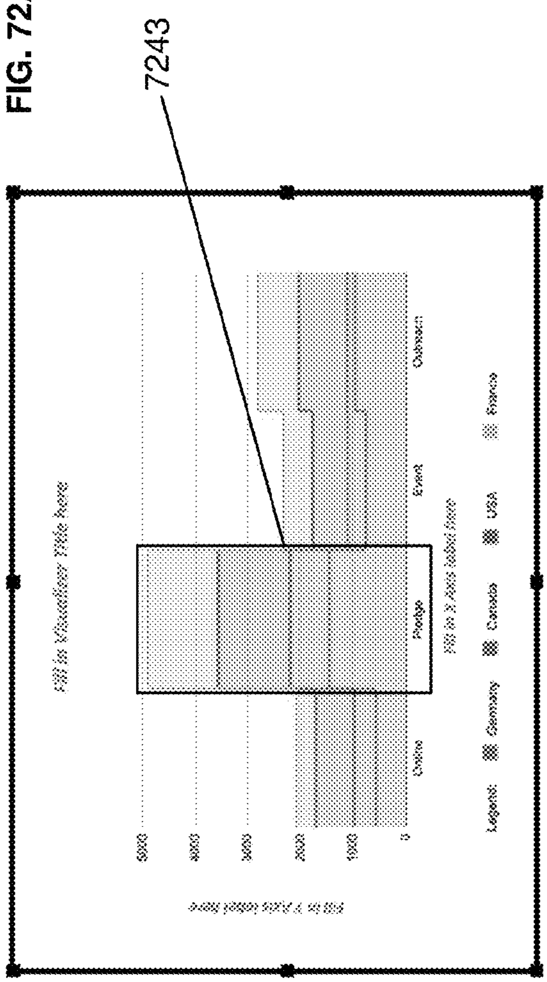
Figure 72D:
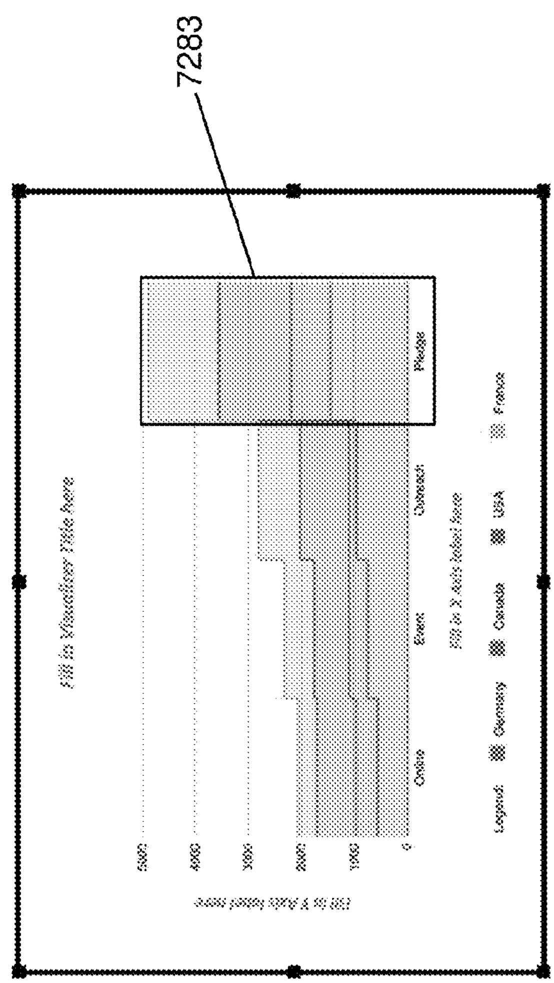

In our technology, the reordering drag and drop capability also works for any other axis. FIG. 72A through FIG. 72D example drag and drop data reordering for the X axis data. The user drags the second stacked element and/or X axis label 'Pledge' 7243 as shown in the blow-up FIG. 72B from second to the last position with the result shown in FIG. 72D 7283. In this embodiment they could do that by clicking on the section of the chart element 7237 and dragging and dropping it at the last position in the chart as indicated by the arrow and shown in FIG. 72B. They could also click the X axis label 'Pledge' 7247 and drag and drop it at the last position in the chart as indicated by its arrow to arrive at the position in FIG. 72C. Clicking and dragging and dropping either the section of chart element or its associated X axis label will reposition the other as well and it will reposition the proxy in sidebar. The user could also click both the section of chart element 7237 and its associate X axis label 'Pledge' 7247 and drag and drop both of them to the desired location. FIG. 72C examples an additional way of achieving the same outcome on this embodiment by dragging and dropping the X value label 'Pledge' in the sidebar which then moves the on-chart X axis label and the section of stacked elements as shown in 7283. This allows users to reorder the data very easily on any dimension or dimensions they would like without having to resort to ribbons, drop-downs, pop-ups or obscure function syntax and it allows user to reorder on multiple dimensions which cannot be done in any of the current spreadsheet charts without resorting to data changing.

Unclick Data Removal

Figure 73:
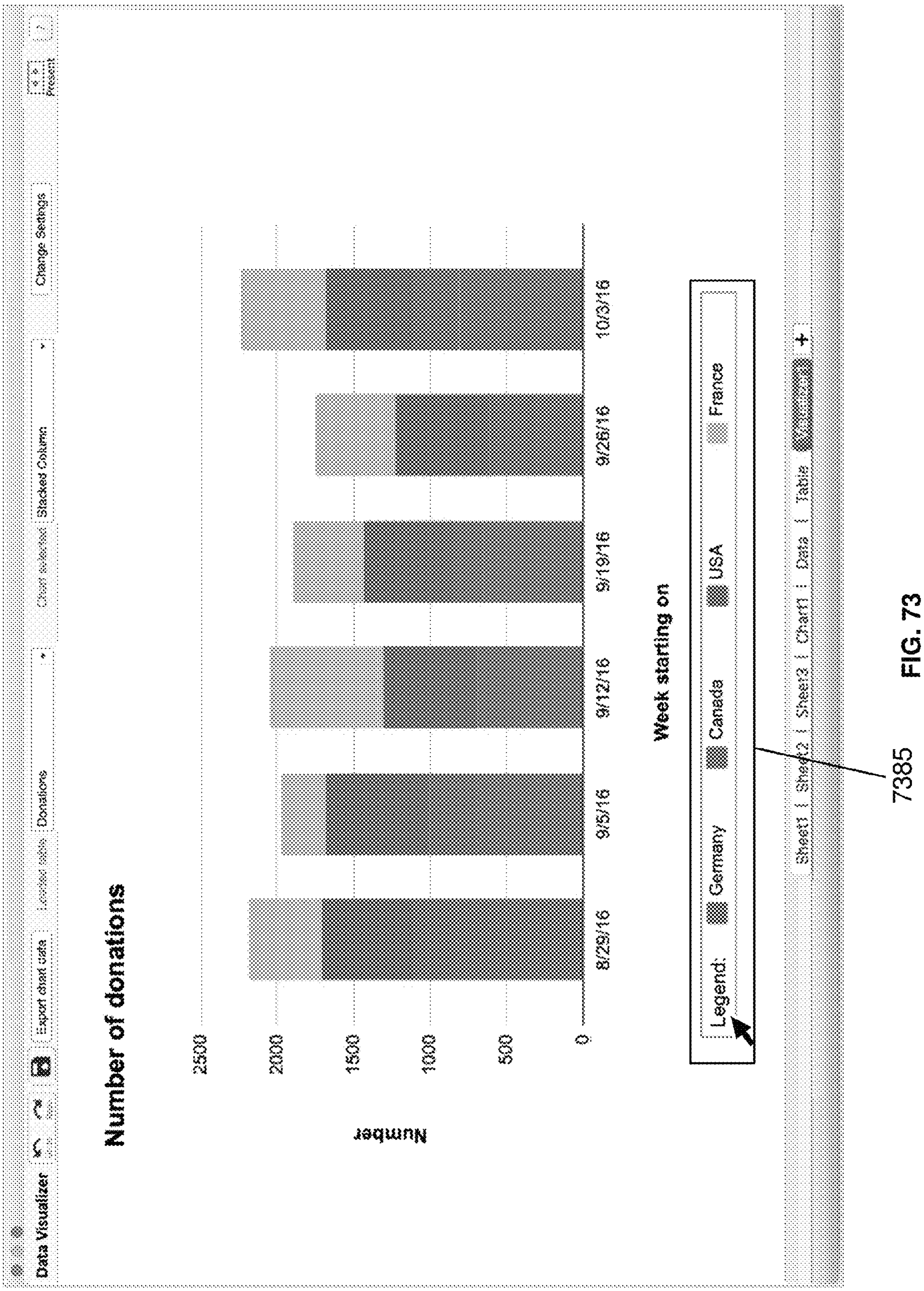
FIGS. 73, 74, 75 and 76 examples our click to remove data technology using an on-chart UI.
Figure 74:
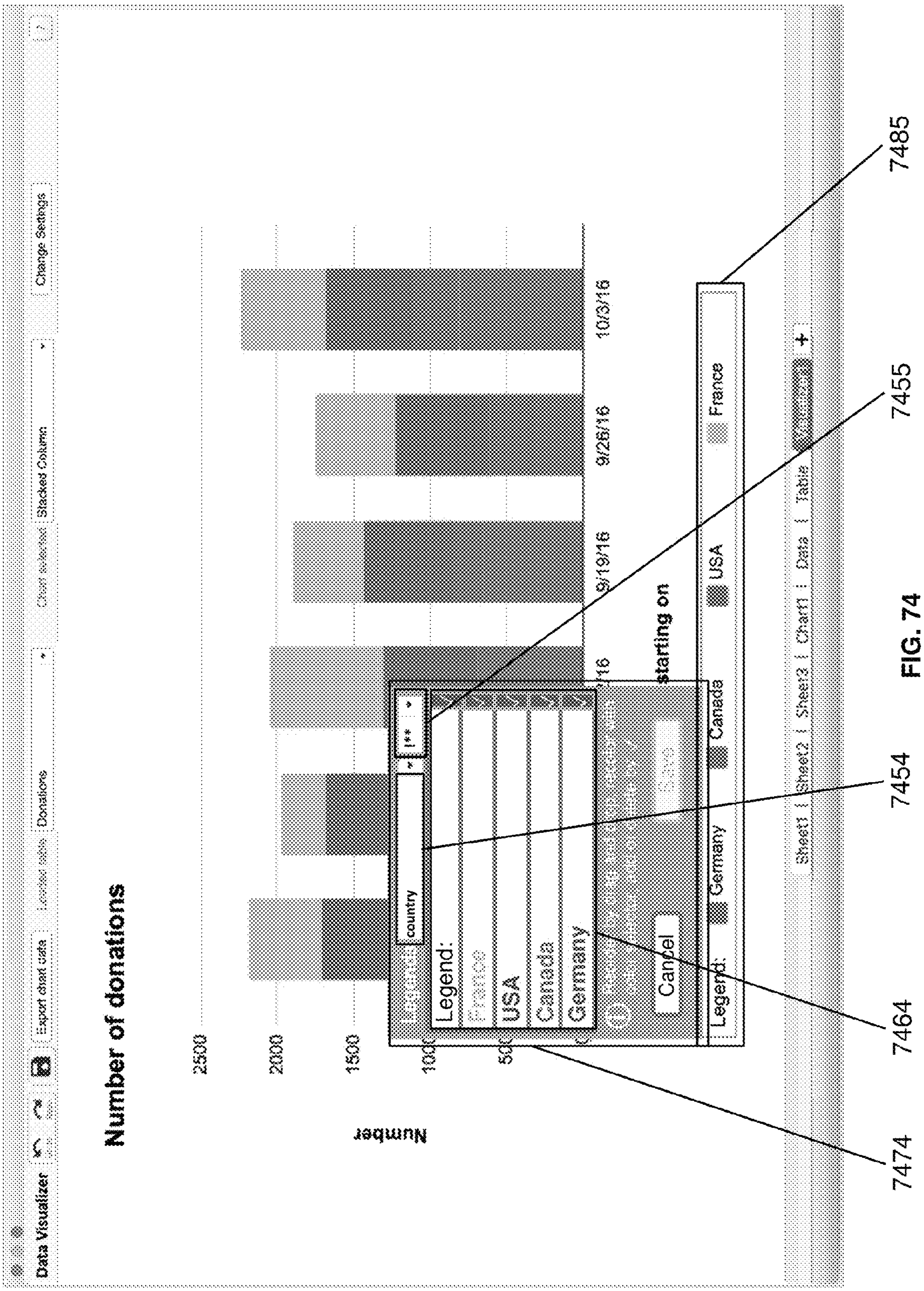
Figure 75:
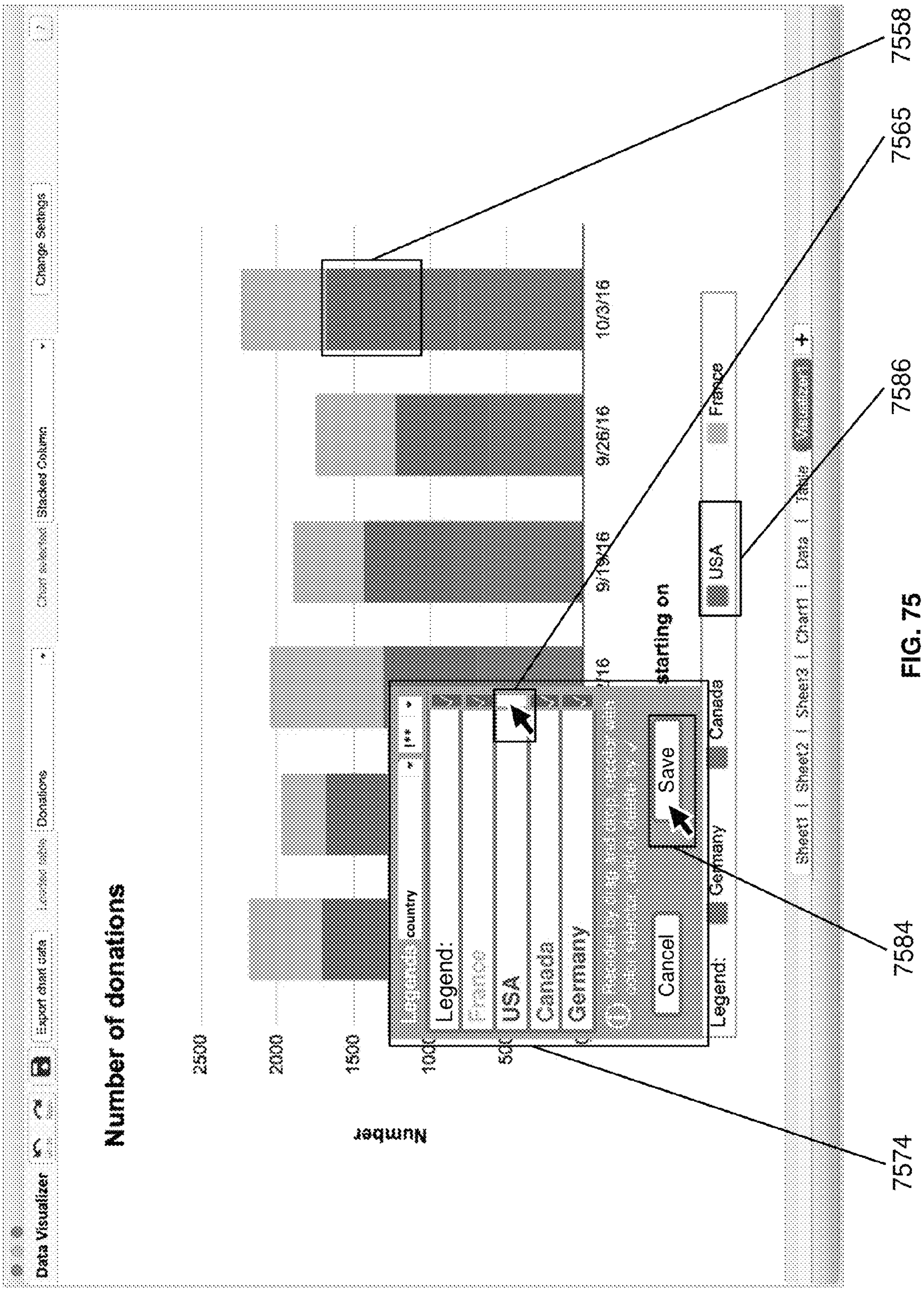
Figure 76:
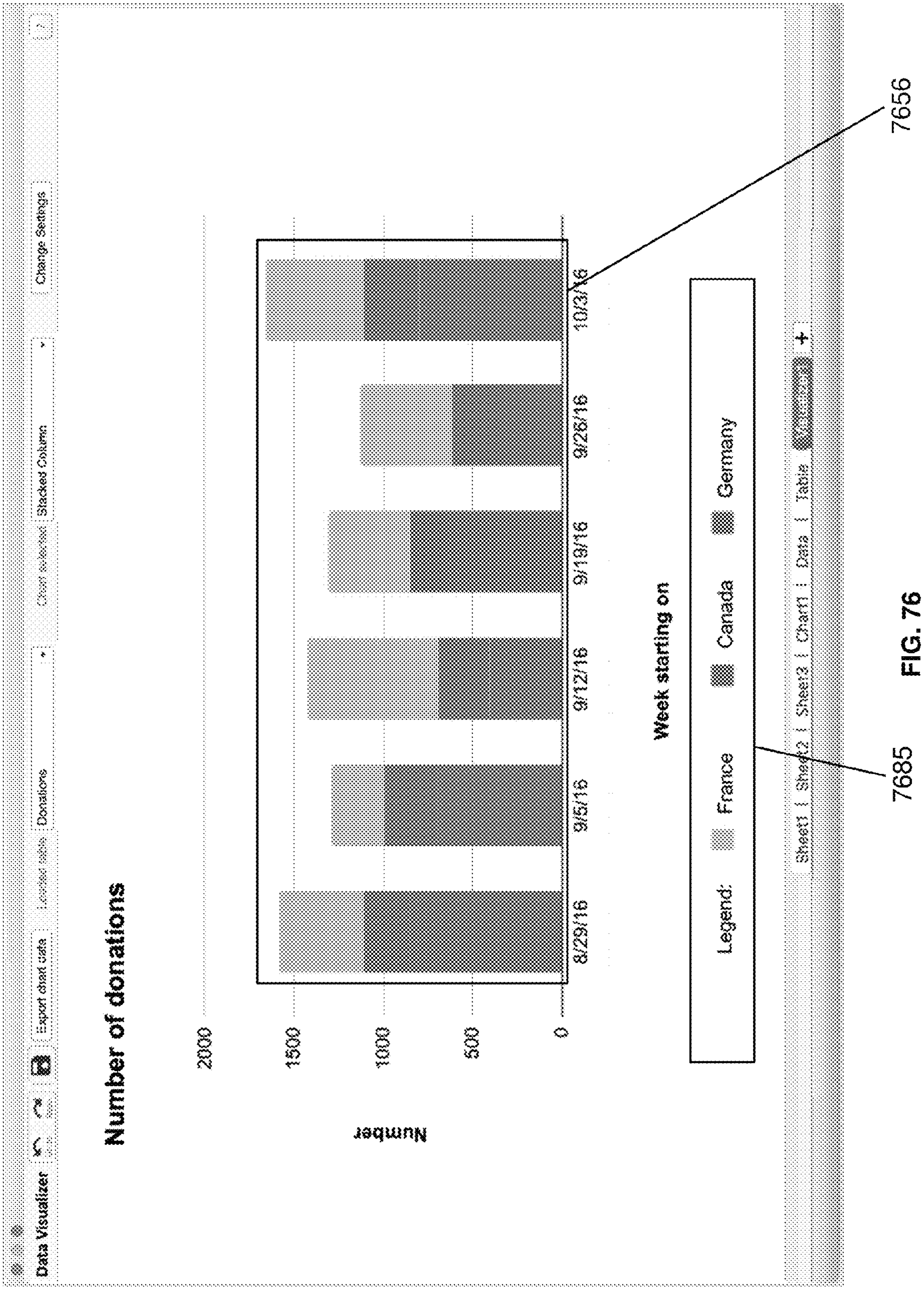
Figure 77C:
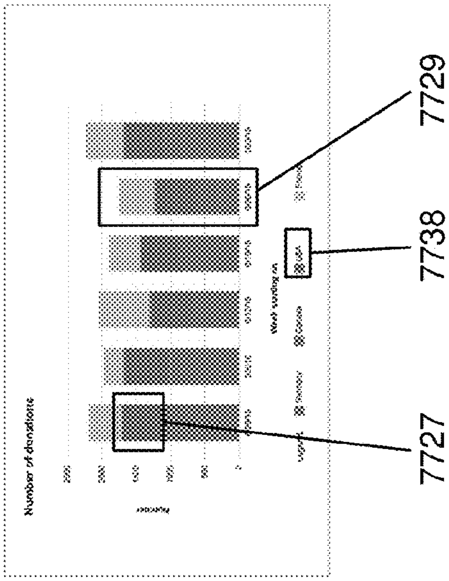
FIGS. 77A, 77B, 77C and FIG. 77D examples our click to remove data technology using a sidebar UI.
Figure 77D:
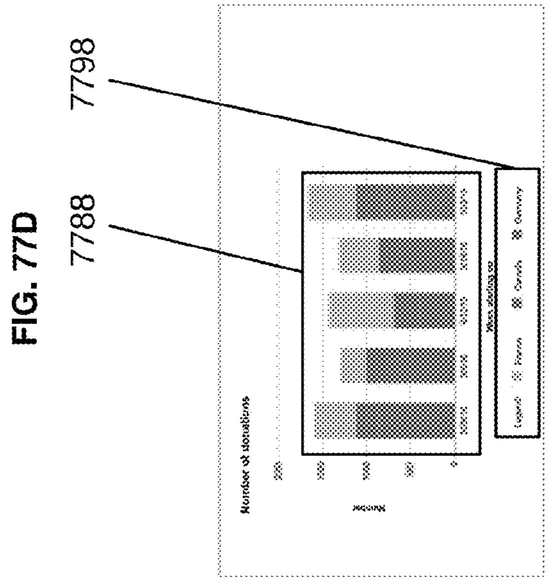
Figure 77B:
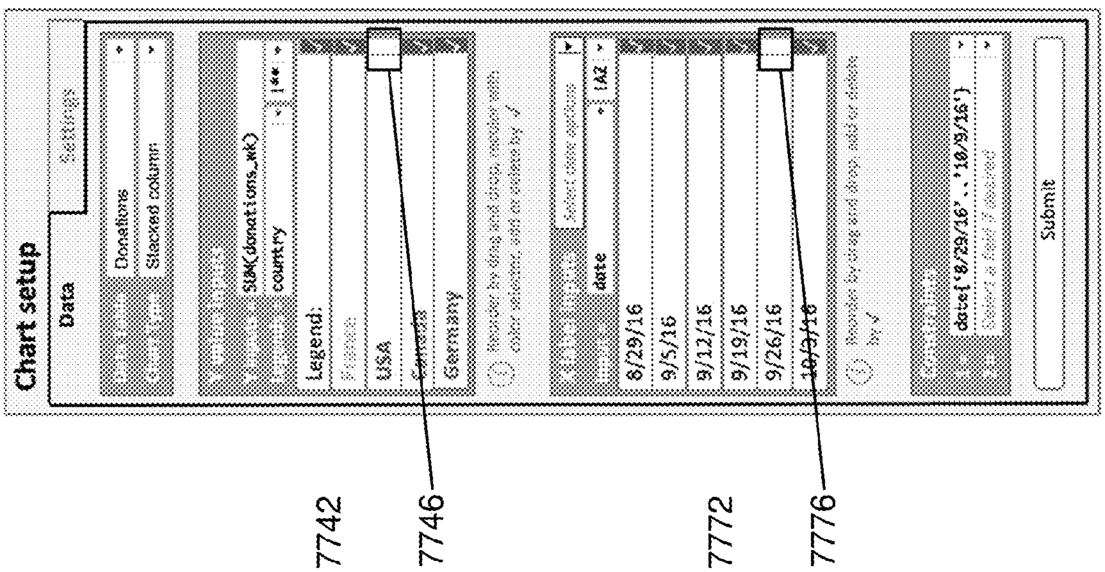
Figure 77A:
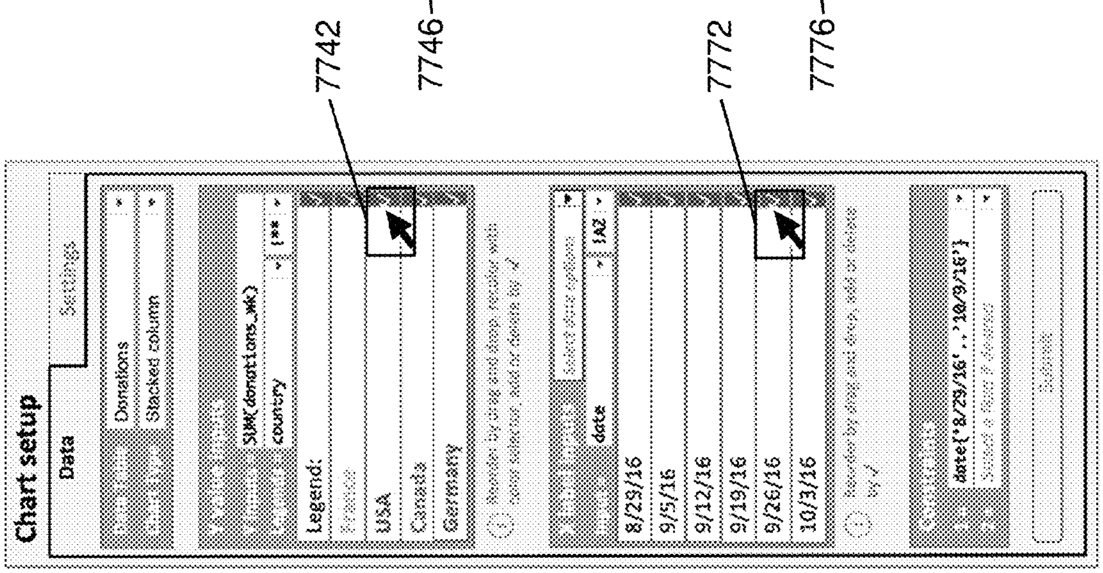

Our chart visualizer also supports a click to remove, or add back, data within the chart. FIG. 73 through FIG. 76 examples that capability for on-chart inputs while FIG. 77A through FIG. 77D examples that capability done via a sidebar. In FIG. 73 the charity user opens the 'Legend' 7385 by clicking on it. In this embodiment it opens the Legend input popup 7474 which shows the user inputted field 'country' 7454 and the order selector value '!' 7455 which tells the user they have a custom sorted order which is visible on the chart legend 7485 and in the popup color matched display 7464. In FIG. 75 the user wants to remove the 'USA' data from the chart which is done by simply unchecking the check mark 7565 beside 'USA' in the popup 7574 and then clicking 'Save' 7584. That will then remove all the USA chart values as exampled by comparing FIG. 76 and FIG. 75. In FIG. 76 there are no red 'USA' stacks in the chart body 7656 and no 'USA' in the 'Legend' 7685 while in FIG. 75 there are red 'USA' values 7558 in the body of the chart and 'USA' 7586** in the legend.

FIG. 77A through FIG. 77D examples that same removal of 'USA' done via a sidebar in our technology as well as removing the values for the date 'Sep. 26, 2016'. To remove the chart red USA stack (exampled by 7727 in FIG. 77C) and its accompanying Legend 7738 the user simply unchecks 7742 as shown in 7746 (in FIG. 77B) giving the chart result FIG. 77D which has no red stacks in the chart body 7788 or 'USA' in the 'Legend' 7798. Unchecking the X label value 'Sep. 26, 2016' 7772 (in FIG. 77A) as shown in 7776 (in FIG. 77B) gives the chart result FIG. 77D which has no values in the chart body 7788 for '9/26/16'. Both the stacked column 7729 with its 'Sep. 26, 2016' X axis value label shown in FIG. 77C has been removed in FIG. 77D. Our chart visualizer technology makes it point and click simple to remove data and to then later add it back as desired while retaining its order including customized orders, without ever touching the data.

Simultaneous Display of Regular and Visualizer Charts

Figure 78:
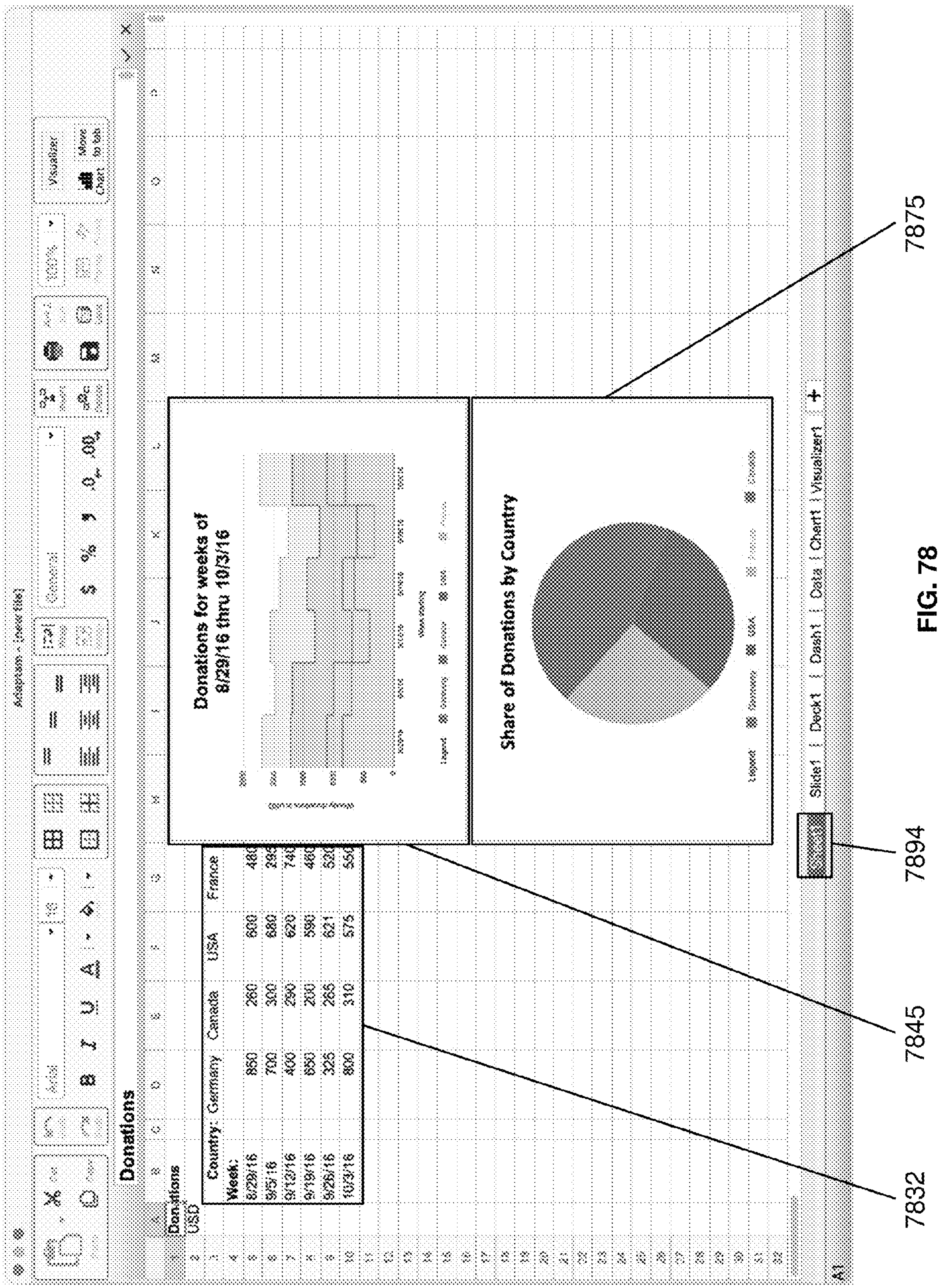
FIGS. 78, 79 and 80 examples the side-by-side working of a data visualizer chart and a regular data chart in our technology within a spreadsheet worksheet tab.
Figure 79:
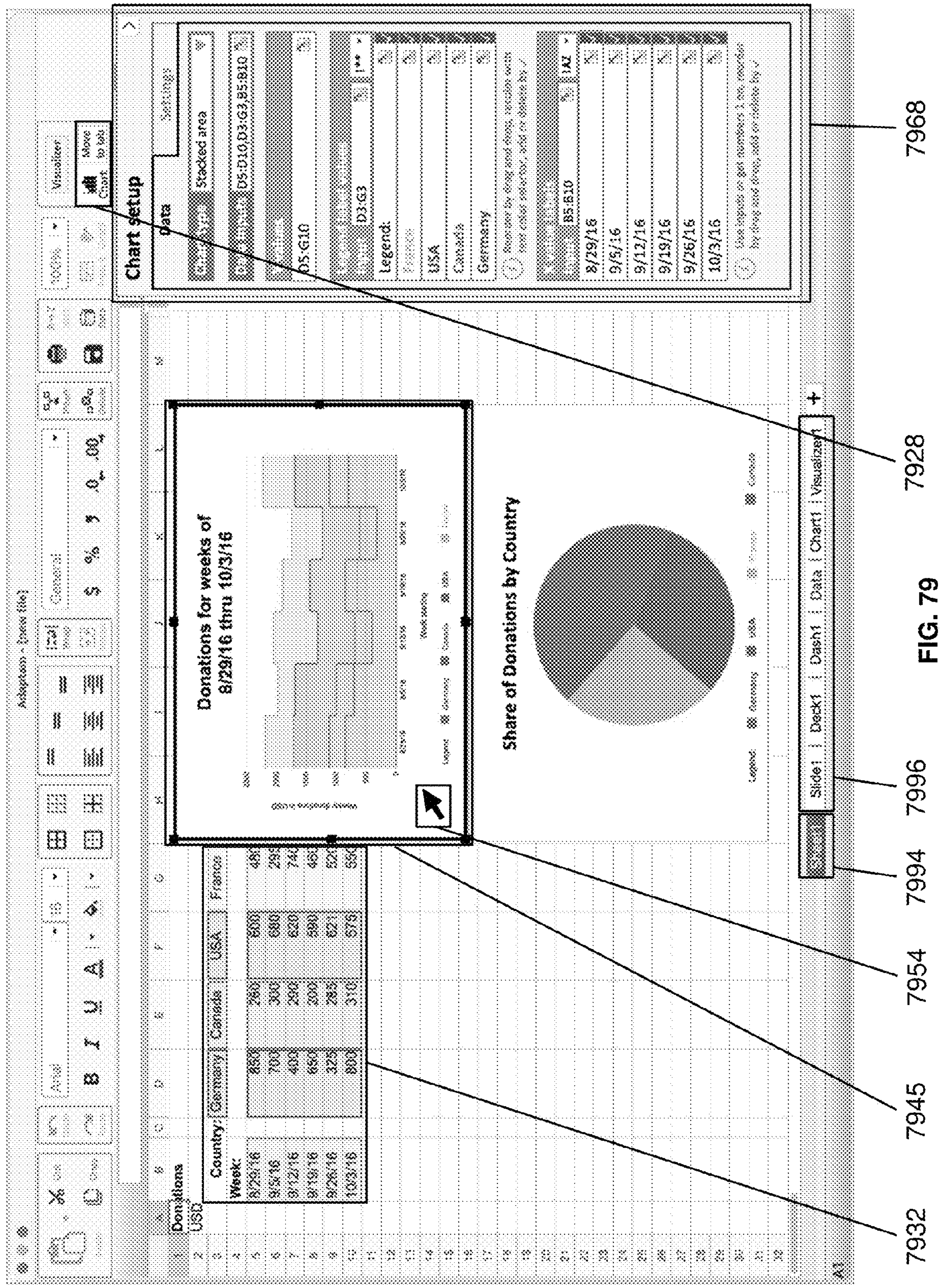
Figure 80:
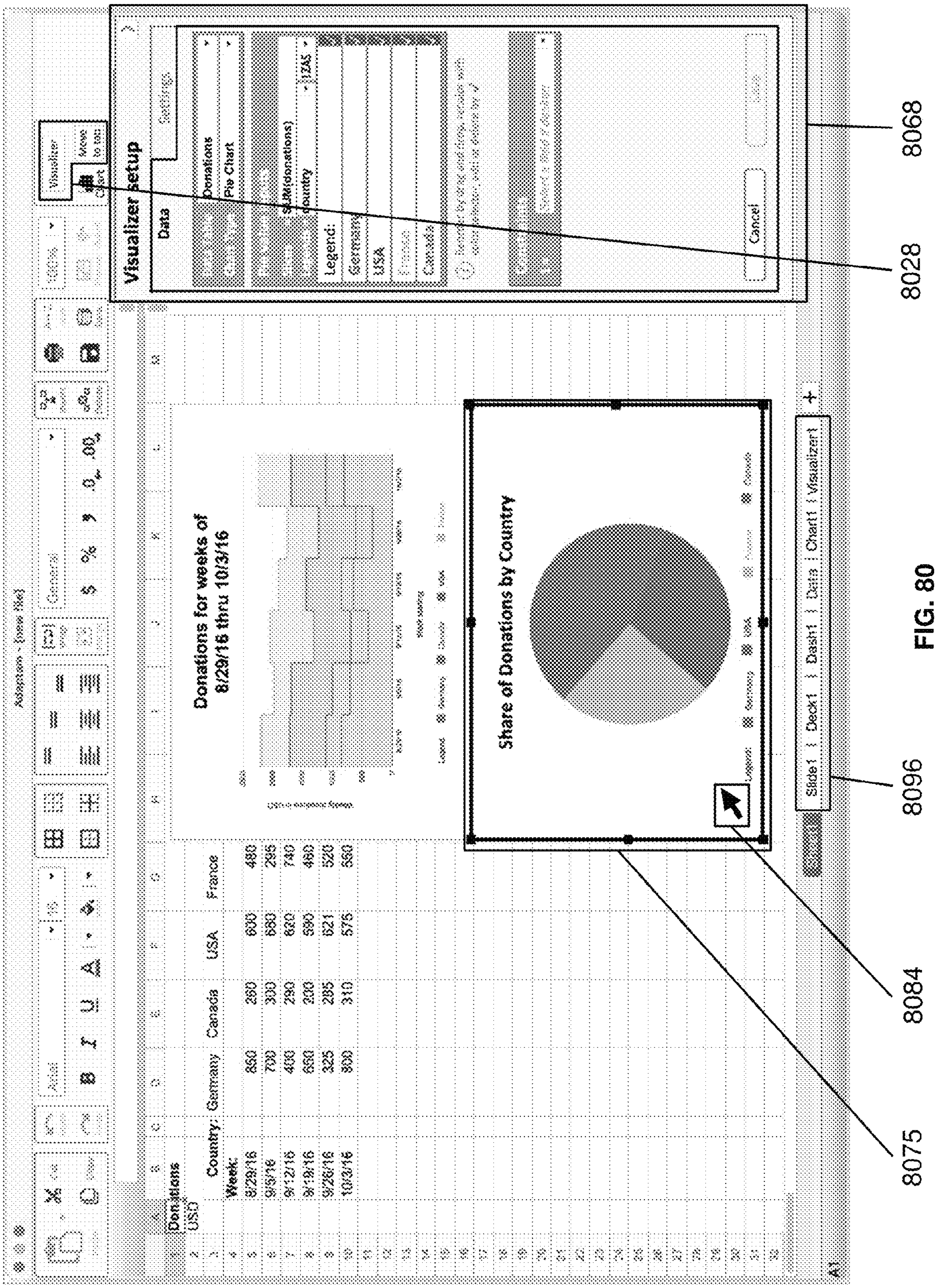

Our technology supports the simultaneous display and user use of both regular spreadsheet generated chart(s) and our visualizer generated chart(s) in many different spreadsheet tabs and UIs. FIG. 78 through FIG. 80 examples their display and use within a spreadsheet worksheet tab. FIG. 81 through FIG. 85G examples their display and use within a spreadsheet slide tab (e.g., presentation slide or page tab). FIG. 86, FIG. 87, FIG. 120 and FIG. 121 examples their display and use within a spreadsheet deck tab (e.g., full Microsoft PowerPoint or Google Slide multi-slide or page presentation in a ribbon, bottom or combination ribbon and bottom tab).

Worksheet Tab

FIG. 78 shows two charts within a spreadsheet worksheet tab 'Sheet1' 7894 using our technology. The top chart 7845 was generated from the data in select cells within the cell area 'B3' to 'G10' 7832 using our chart technology described in U.S. application Ser. No. 17/384,404. The bottom chart 7875 was generated using our chart visualizer technology, and both charts are visible and operational side-by-side in our technology. This is exampled in FIG. 79 when the charity user clicks 7954 into the top chart 7945 automatically opening in this embodiment the sidebar 7968 for the chart. It also triggers the color coordinated highlighting of the source data 7932 on the spreadsheet worksheet 'Sheet1' 7994. In this embodiment it also makes live the 'Chart' and the 'Move to tab' buttons 7928. Where the chart button is used to open other options and the 'Move to tab' button allows users to move the chart to one of the other tabs 'Slide1', 'Deck1', 'Dash1', Thart1' and 'Visualizer1' 7996. The 'Data' tab in this embodiment is a different type of tab presenting a summary overview of the external data available to the user and therefore is not a tab that accepts charts. The sidebar 7968 is fully functional as described in U.S. application Ser. No. 17/384,404 allowing the user to make changes as they desire. The bottom chart usage is exampled in FIG. 80 when the charity user clicks 8084 into the visualizer chart 8075 automatically opening in this embodiment the sidebar 8068 for visualizer setup or in this situation modification. In this embodiment it also makes live the 'Visualizer' and the 'Move to tab' buttons 8028. Where the Visualizer button is used to open other options and the 'Move to tab' button opens allows users to move the visualizer chart to one of the other tabs 'Slide1', 'Deck1', 'Dash1', 'Chart1' and 'Visualizer1' 8096. The sidebar 8068 is fully functional as described previously in this filing allowing the charity user to make changes as they desire. In this embodiment the sidebar is laid out very similarly for our regular chart and the visualizer chart with the real difference being what is put into the data inputs and the constraints (filter) capability in our data visualizer. The similarity of the UI is done so users do not need to learn two very different UIs to create the two different types of charts in our technology.

In many instances users want their charts to present like a slide in a presentation document, like slides do in Microsoft PowerPoint or Google Slides. As we already discussed in this filing and U.S. application Ser. No. 17/384,404, today's spreadsheet technologies allow users to create a chart dedicated tab however that chart is not the equivalent of a full-functioning presentation slide. And embedding and linking a spreadsheet generated chart into a presentation slide (e.g., Microsoft PowerPoint or Google Slides) is not seamlessly integrated with the ease of use of a single application but is instead a two-application experience presenting unneeded complexity for the user. Our previously described chart technology in U.S. application Ser. No. 17/384,404 provides that seamless experience and this additional technology extends that seamless experience to our data visualizer charts.

Presentation Slide Tab

Figure 81:
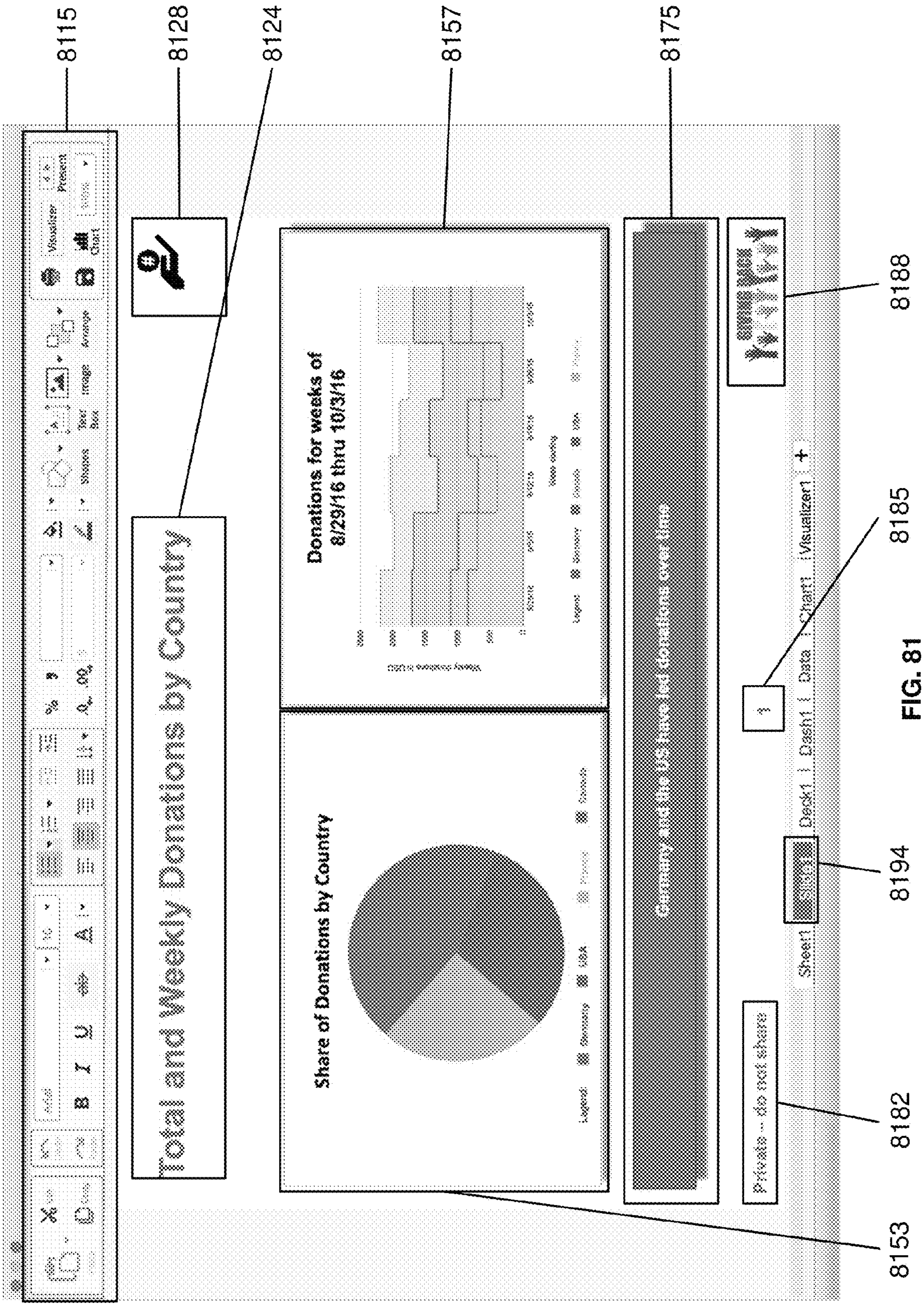
FIGS. 81, 82 and 83 examples the side-by-side working of a data visualizer chart and a regular data chart in our technology within a spreadsheet slide tab.

FIG. 81 examples a presentation slide, which as described in U.S. application Ser. No. 17/384,404 resides within our spreadsheet technology here as tab 'Slide1' 8194. It could of course be default named many things and like traditional spreadsheet tabs can be renamed by the user to whatever unique name they like. The page has a fairly traditional slide ribbon 8115 with a few new buttons (e.g., Visualizer and Chart). The chart has a text box storyline heading 8124, an inserted icon 8128, a box shadowed major point 8175, a Confidentiality warning 8182, a slide page number 8185 and an Organization logo 8188—none of which can be done in a Microsoft Excel chart tab as this goes beyond that to be a full functioning presentation app like slide or page. This example has two charts created by our technologies, the left chart 8153 is a data visualizer chart while the chart on the right 8157 is a direct data driven chart like those covered in U.S. application Ser. No. 17/384,404. And note, while this example has the user accessing this via a bottom tab that access could be through a different UI such as the ribbon tab selector previously exampled in this filing, a menu selector, a ribbon button, or some other UI.

Figure 82:
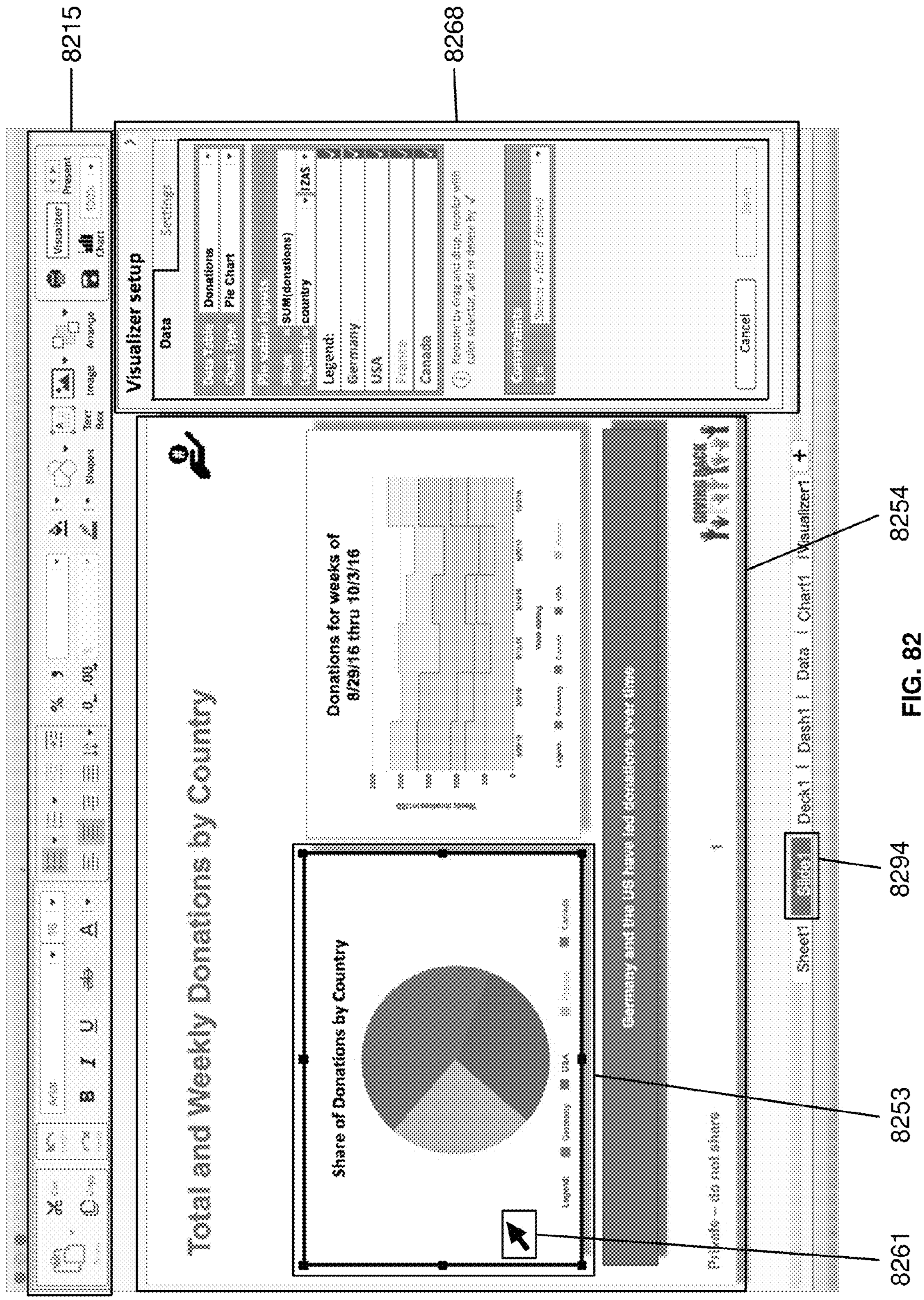
Figure 83:
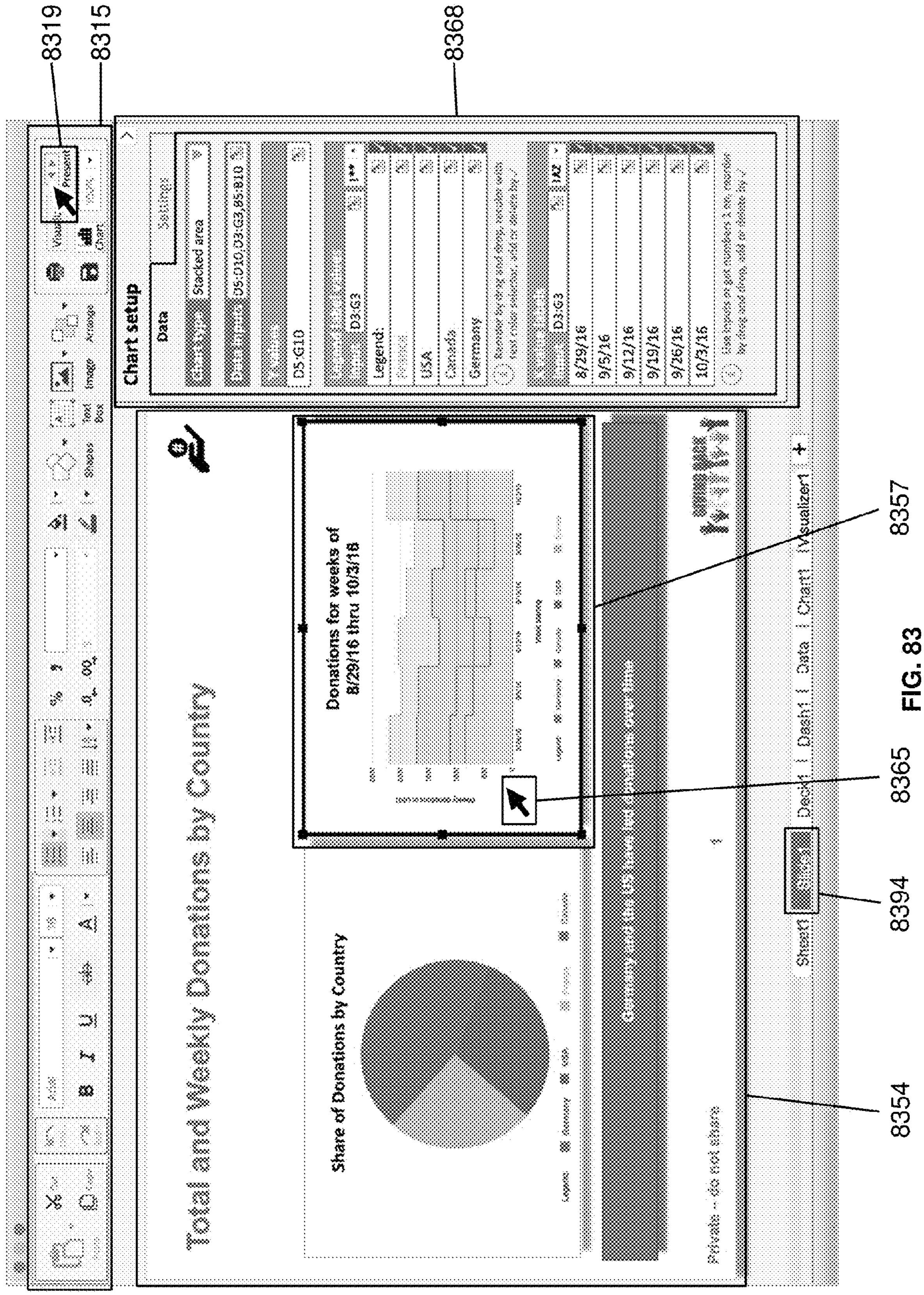
Figure 84:
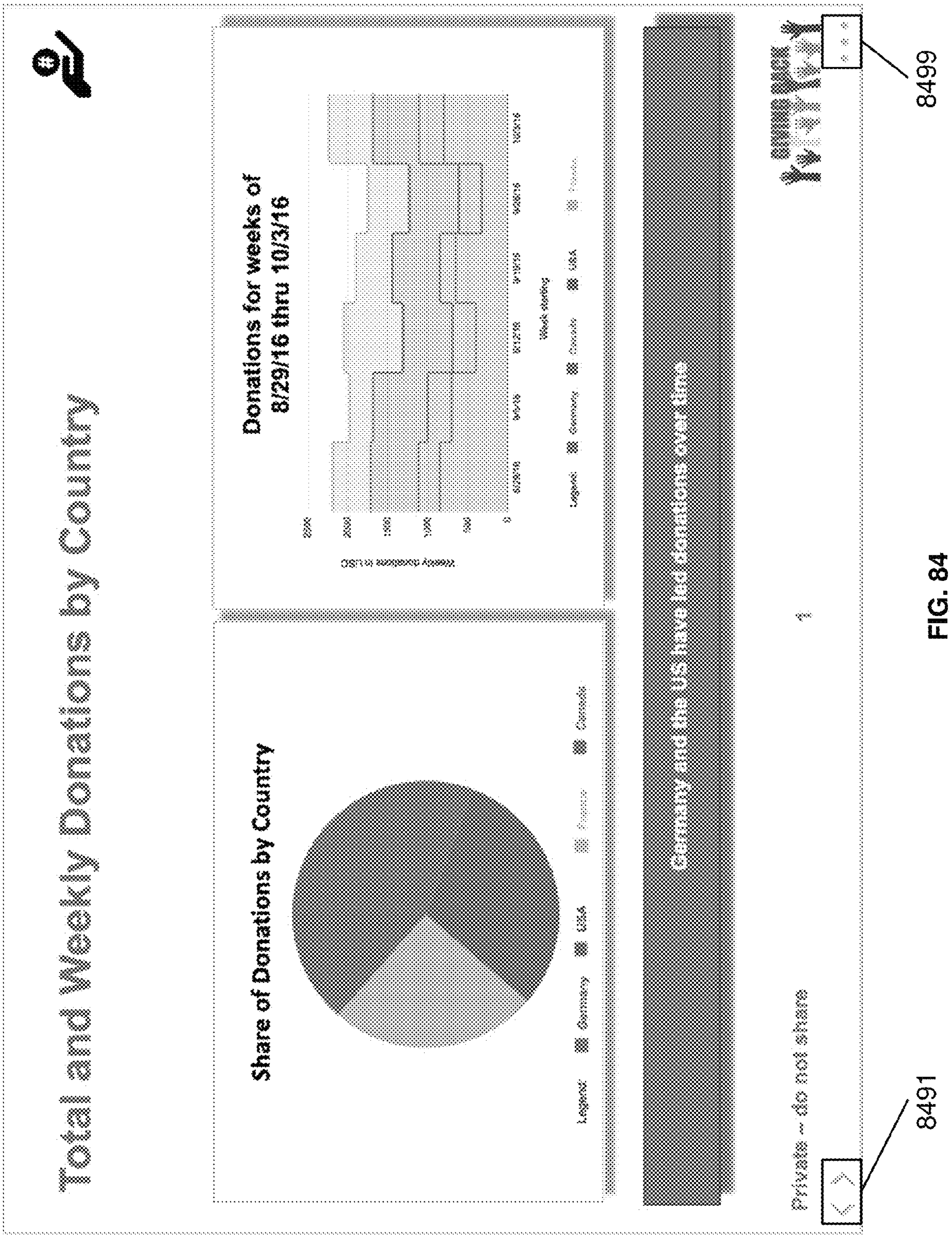
FIG. 84 examples a spreadsheet slide tab containing both a data visualizer and regular chart in page present mode.

FIG. 82 examples the result of clicking into the left side chart 8153 (in FIG. 81) as shown here with the click 8261 into the chart 8253 which opens the 'Visualizer setup' sidebar 8268. Thus, showing a fully functional data visualizer chart which can be changed as per the earlier descriptions. This has been seamless integrated into a fully functioning presentation slide or page (e.g., similar to Microsoft PowerPoint or Google Slides pages or slides) as a tab 'Slide1' 8294 (or other UI) within our spreadsheet application. FIG. 83 examples the addition integration of a more traditional spreadsheet chart using our U.S. application Ser. No. 17/384,404 technology side-by-side with the visualizer chart within our slide tab. FIG. 83 examples the result of clicking into the right-side chart 8157 (in FIG. 81) as shown here with the click 8365 into the chart 8357 which opens the 'Chart setup' sidebar 8368. Should the user then click into one of the data inputs they would be taken to the spreadsheet cells populated with the capability to then make changes as previously described in U.S. application Ser. No. 17/384,404. Thus, giving our technology users a seamless way to create slides containing regular and/or data visualizer charts.

Our charity user then wants to view and present the slide in a presentation mode where only the slide with no ribbon/formula bar, bottom bar/tabs etc. is shown and can move from slide-to-slide by some simple mechanism such as hitting the forward or back arrows on their keyboard. This capability of Microsoft PowerPoint or Google Sheets is not available in the chart tabs or any other UI mechanism of Microsoft Excel or Google Sheets. In our integrated technology however, the user clicks the 'Present' button 8319 in the ribbon 8315 to put the slide into the present mode shown in FIG. 84. The user is then given only a slide only view with mouse over forward or back tab to tab (or page to page) movement arrows 8491 and mouse over other option dots 8499 for access in this embodiment to a menu of other options including going back into non-present mode.

Figure 85A:
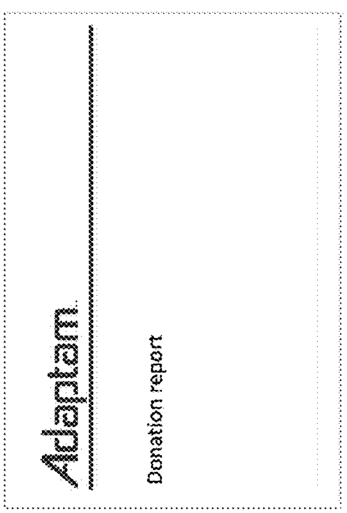
FIGS. 85A, 85B, 85C, 85D, 85E, 85F and 85G examples a five-page presentation in present mode with a listing of the presentation order and the tab order.
Figure 85B:
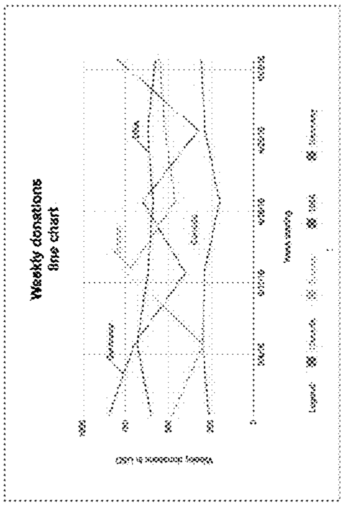
Figure 85C:
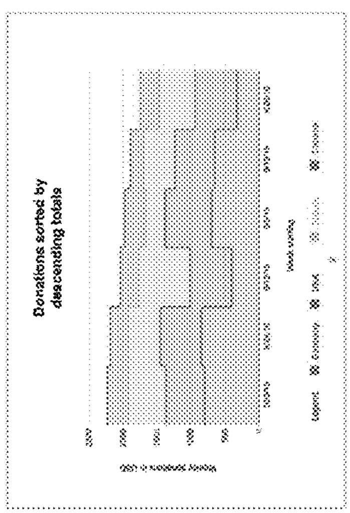
Figure 85D:
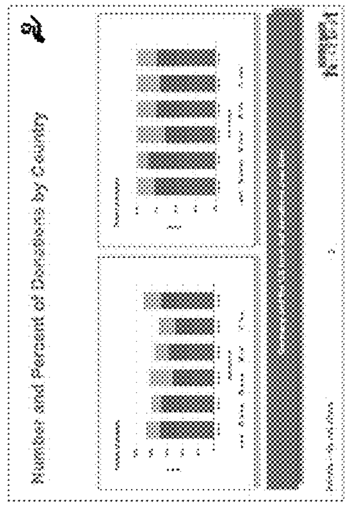
Figure 85E:
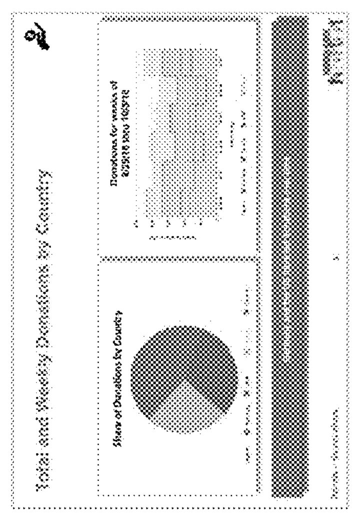
Figure 85F:
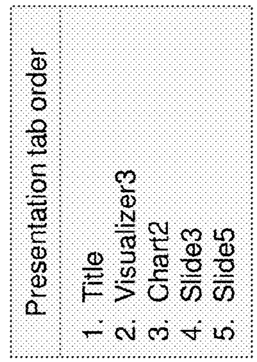
Figure 85G:
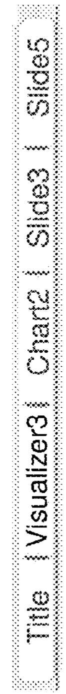

FIG. 85A through FIG. 85G examples a short five-page presentation that the user has constructed in our technology and presented in the tab order shown in FIG. 85F. The first page of the presentation FIG. 85A is a slide page with graphics and text (i.e., the cover page) sitting in a tab renamed 'Title'. Page two FIG. 85B is a Visualizer chart tab 'Visualizer5' put into present mode. Page three FIG. 85C is our version of a chart tab 'Chart2' (exampled in U.S. application Ser. No. 17/384,404) put into present mode. Page four FIG. 85D is a slide tab 'Slide3' containing two visualizer charts and other slide elements put into present mode. And finally, page five is FIG. 85E (also previously shown as FIG. 84) which has one visualizer chart and one direct data driven chart in a slide tab Slide5; which has been put into present mode. Thus, allowing a user of our technology to construct an easy-to-use presentation using many different regular and visualizer charts in different types of tabs in a seamless present mode.

Presentation Deck Tab

Figure 86:
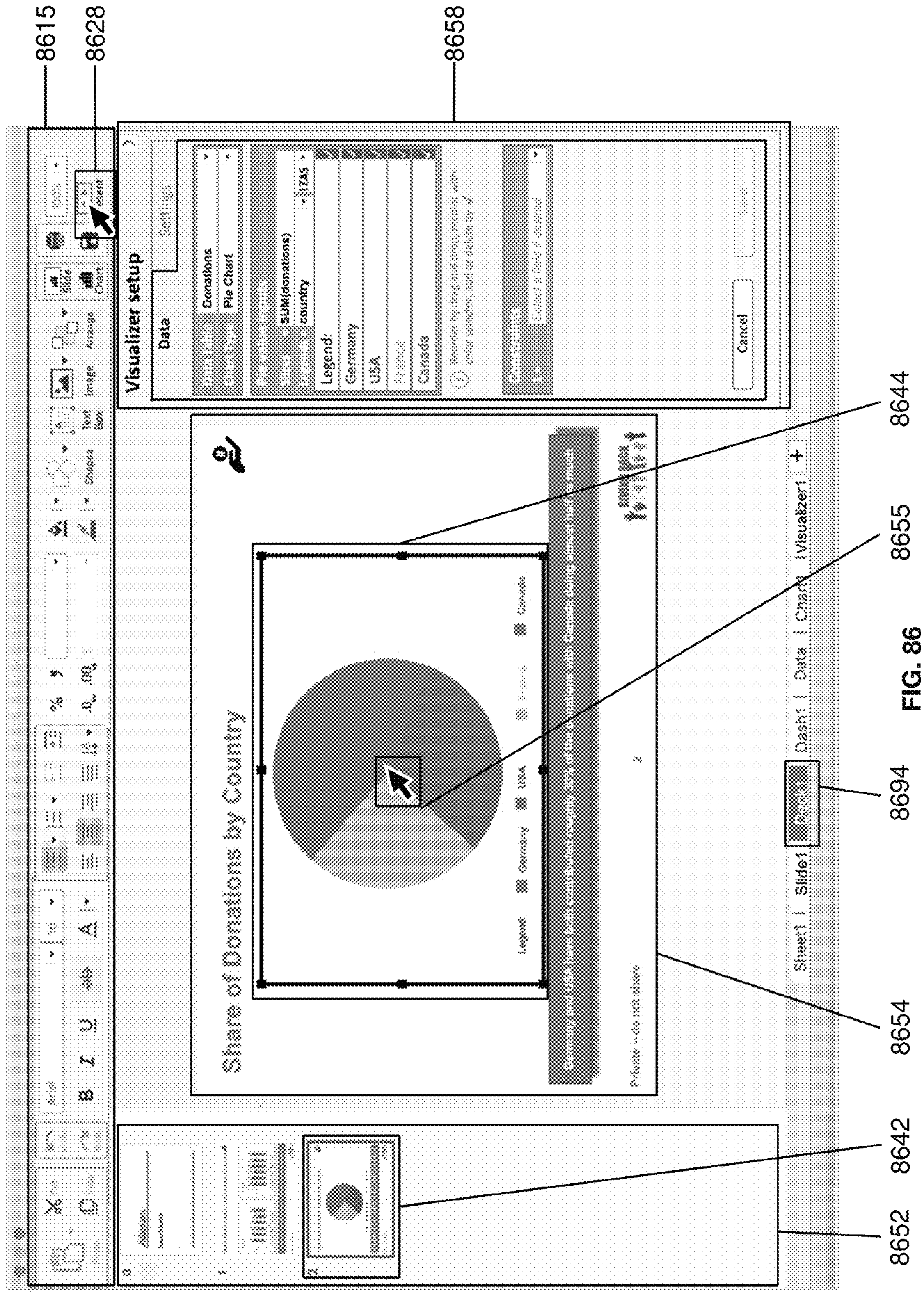
FIG. 86 examples a spreadsheet deck bottom tab in our technology containing a slide with a data visualizer chart.

FIG. 86 examples what we have called in U.S. application Ser. No. 17/384,404 the deck tab, a multi-panel visual including an ordering visual with multiple slide or page representations 8652, a current view presentation slide or page canvas 8654 and the ribbon 8615. This tab 8694, within the spreadsheet, holds multiple slides which users can use for a presentation. The user can also generate a new slide within the deck tab, in this example the 'deck1' tab 8694. The deck view contains a sidebar 8652 where the user can see some or all (if there are few enough) of the slides in the deck, depending upon the number of slides and size of their preview slides 8642. It is used to order the slides (or pages) as users can move the slides around, delete slides and copy and paste slides as they are used to doing in their presentation applications (e.g., Microsoft PowerPoint or Google Slides). The deck view also contains a slide or page canvas 8654 with all the capabilities of the previously described presentation slide or page and a ribbon 8615 more tailored for creating presentations including buttons for inserting shapes, text boxes, images, shape fill, shape outline and arranging content.

Figure 87:
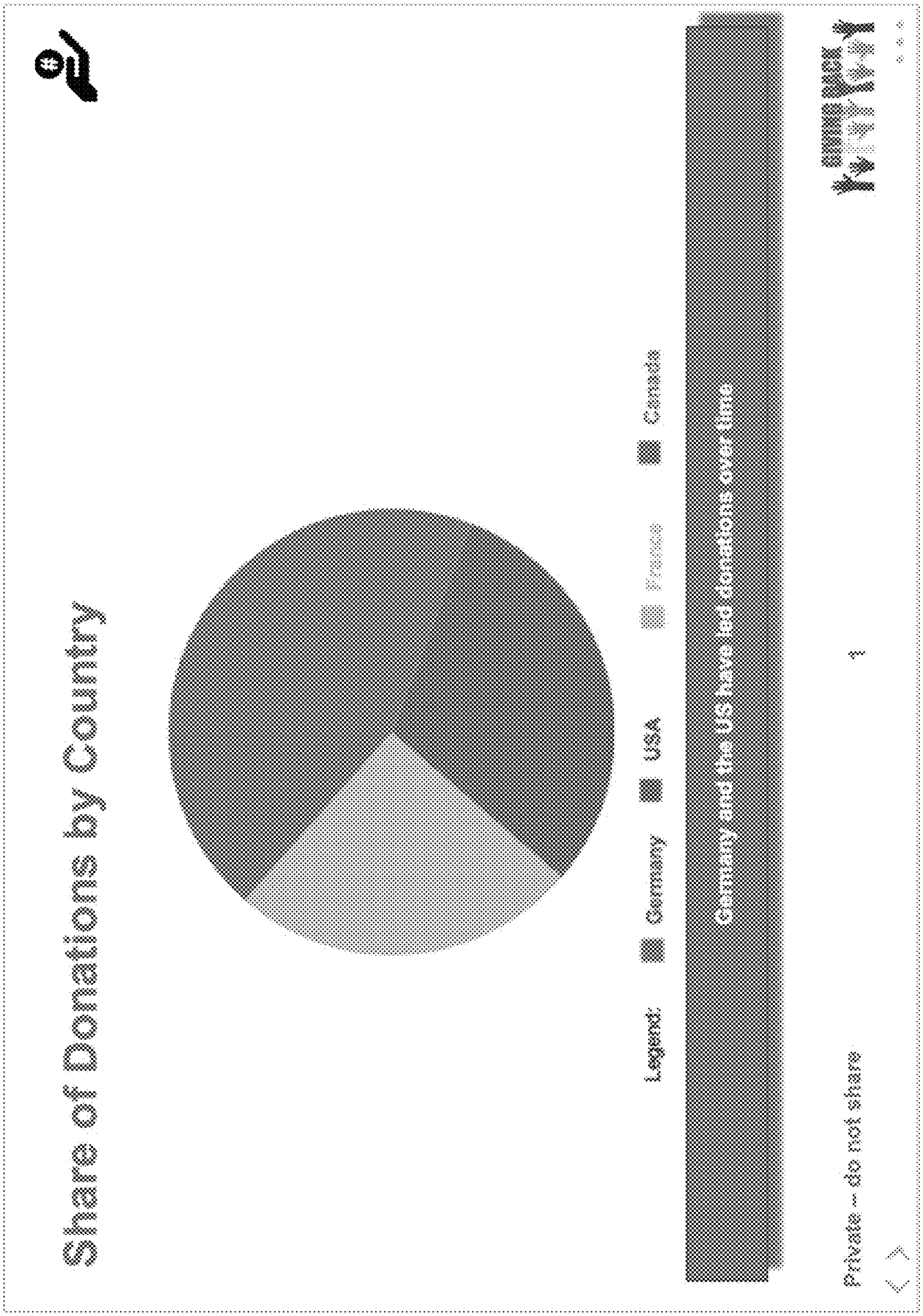
FIG. 87 examples a spreadsheet deck tab in our technology containing a slide with a data visualizer chart in page present mode.

FIG. 86 contains a visualizer chart 8644 which the charity user previously created. They have clicked into the visualizer chart 8655 exposing the 'Visualizer setup' sidebar 8658 which then gives them the ability to change the visualizer chart as they desire. This embodiment uses the sidebar UI for the visualizer but it could have just as easily been an embodiment with the on-visualizer chart UI, the ribbon and popup UI or some other way of inputting the necessary and optional visualizer chart specifications. In this embodiment of our technology a deck can be triggered into presentation mode by the 'Present' button. 8628, which then displays as previous described for slide or page as shown in FIG. 87 and operates for the slides or pages within the deck. Our data visualizer charts adds an even easier way for users to create and change analytically driven charts within their presentations. Modifying those visualizer created charts can be as simple a click into the chart, make the change desired in the UI presented and close it replacing what in a conventional technology would be a process of moving from you presentation app to your spreadsheet app, finding the data, selecting the data you need, sorting the data, filtering it, running analyses, structuring the analytical answers for a chart, inputting it into a chart, then moving the chart from your spreadsheet to your presentation app. Therein lies the powerful advantage of our technology.

Figure 120:
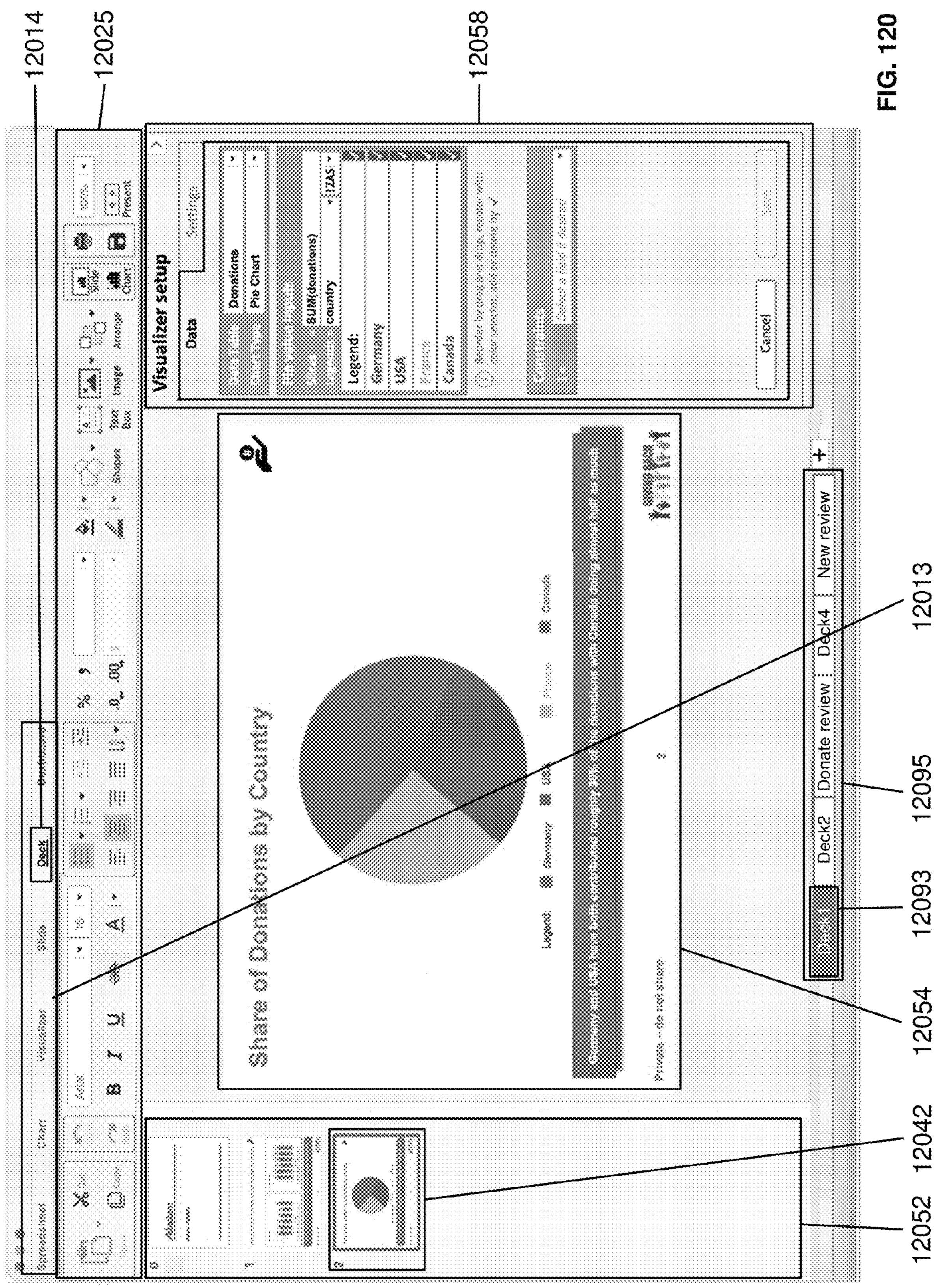
FIG. 120 examples a spreadsheet deck ribbon and bottom tab in our technology containing a slide with a data visualizer chart.

FIG. 86 exampled a visualizer chart 8644 in a deck accessed via a bottom tab. Our technology support other variants as previously mentioned for the other tab types. FIG. 120 examples the same slide 12054 with a visualizer chart as slide 8644 in FIG. 86, but with both a ribbon deck tab 12014 (the selected tab out of the set of ribbon tabs 12013) and a bottom set of tabs 12095 with the selected bottom tab 12093 "Deck1'. In this embodiment those bottom tabs only contain deck tabs, although in other embodiments they could contain other types (e.g., slides). In this embodiment the visualizer is set up using a sidebar 12058 (although it could have been set up through any of the setup UIs). The ribbon 12025 is more tailored to creating presentations and the page view sidebar 12052 contains small renditions of the slides including the selected slide 12042.

Figure 121:
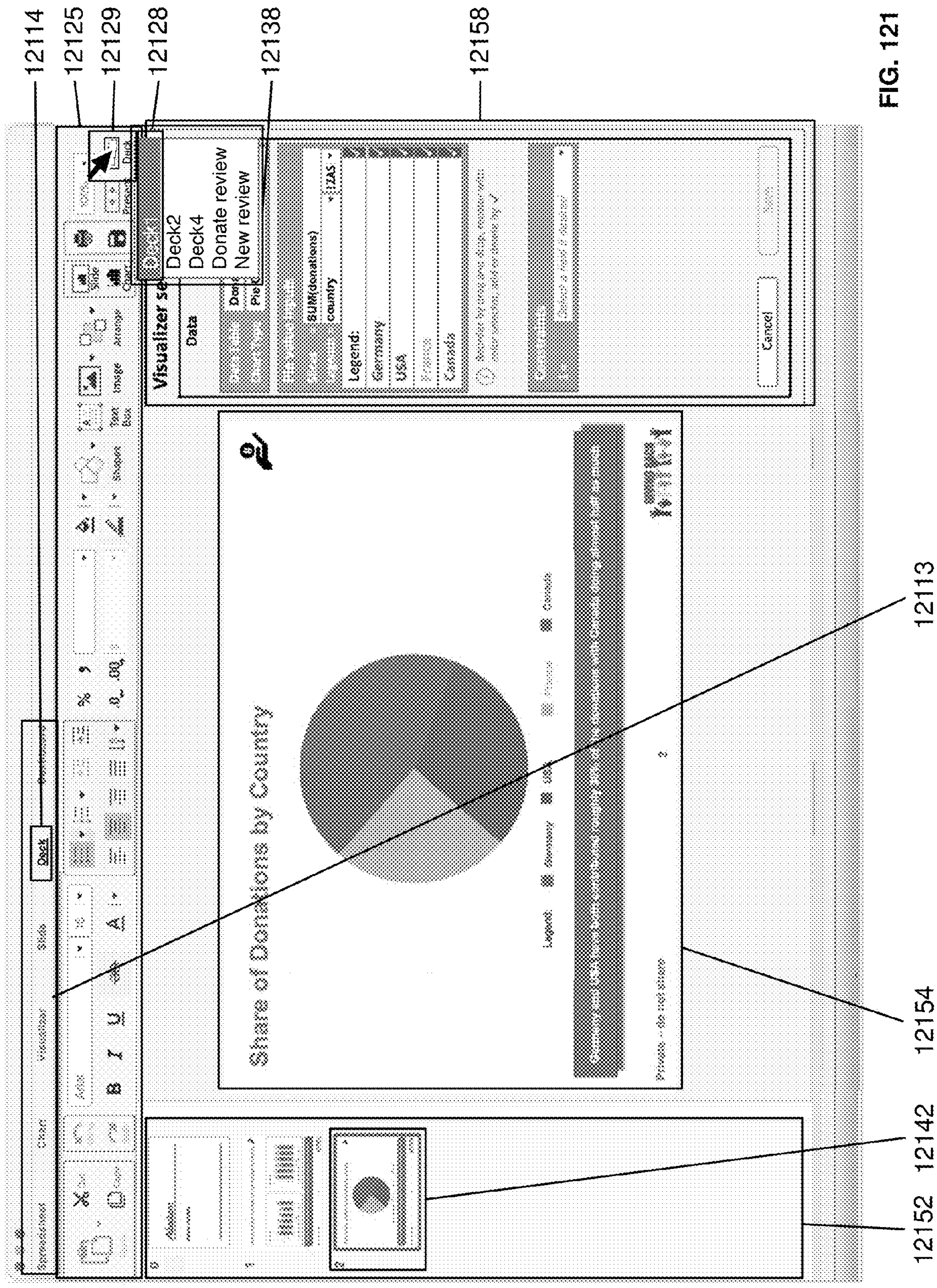
FIG. 121 examples a spreadsheet deck ribbon tab in our technology containing a slide with a data visualizer chart and a deck selection UI.

Another variant of the deck embodiments is exampled in FIG. 121 containing the same presentations as in FIG. 86 and FIG. 120 but with only ribbon tabs 12113 (including the selected tab 'Deck' 12114). Like in FIG. 86 and FIG. 120 it has a page selection sidebar 12152 (with the selected page 12142), a presentation like ribbon 12125, and the visualizer setup sidebar 12158. In this implementation the deck selection UI is triggered by clicking the deck button 12129 exposing the selection UI 12138 with the current selection 12128 highlighted. Our technology supports other selection triggering (e.g., menu) and selection types (e.g., drop-downs). Rather than exampling more tab and UI types we will next example how our visualizer technology supports dashboard visuals with our spreadsheet technology.

Dashboard Tab Visualizer Chart(s)

Figure 88:
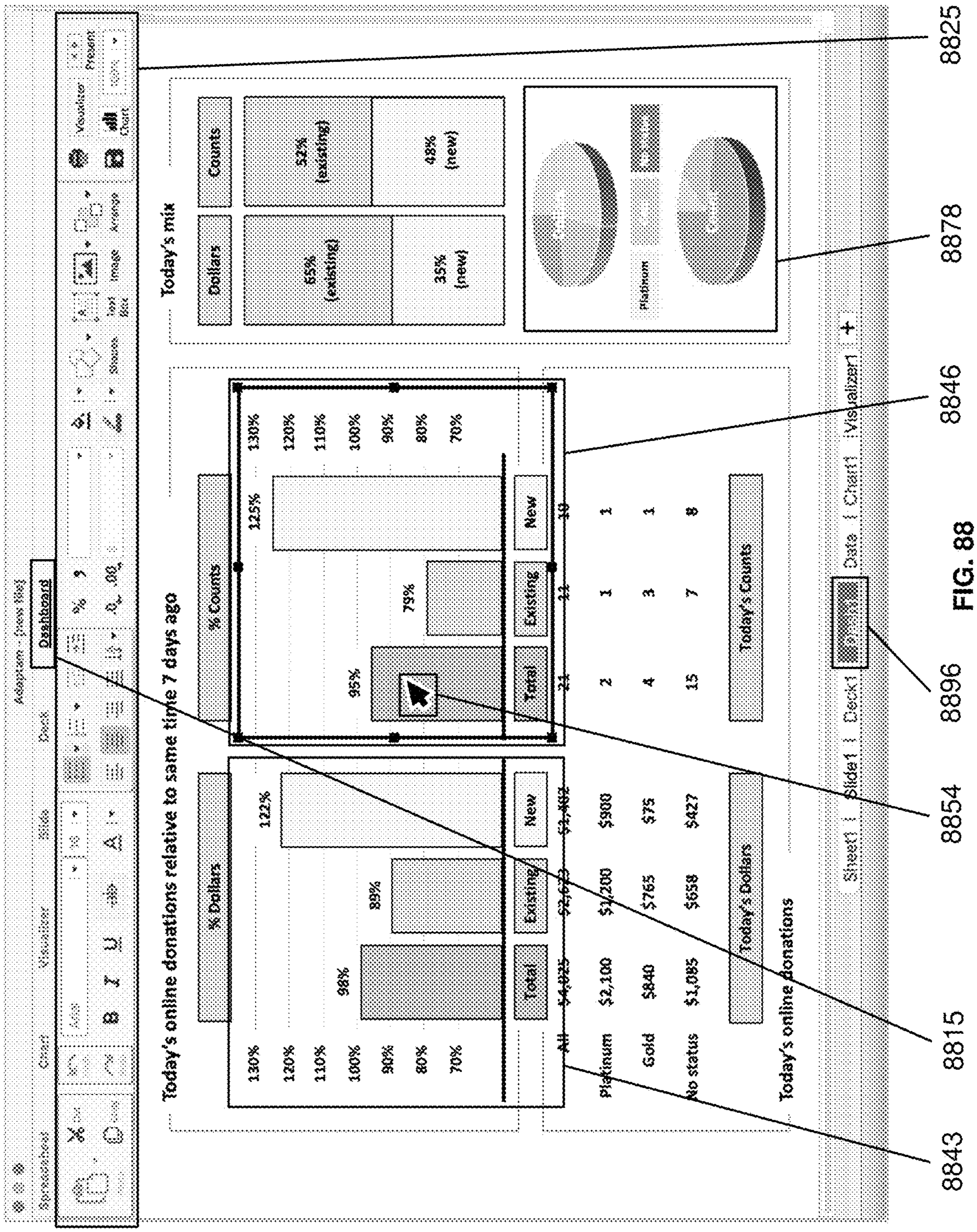
Figure 89:
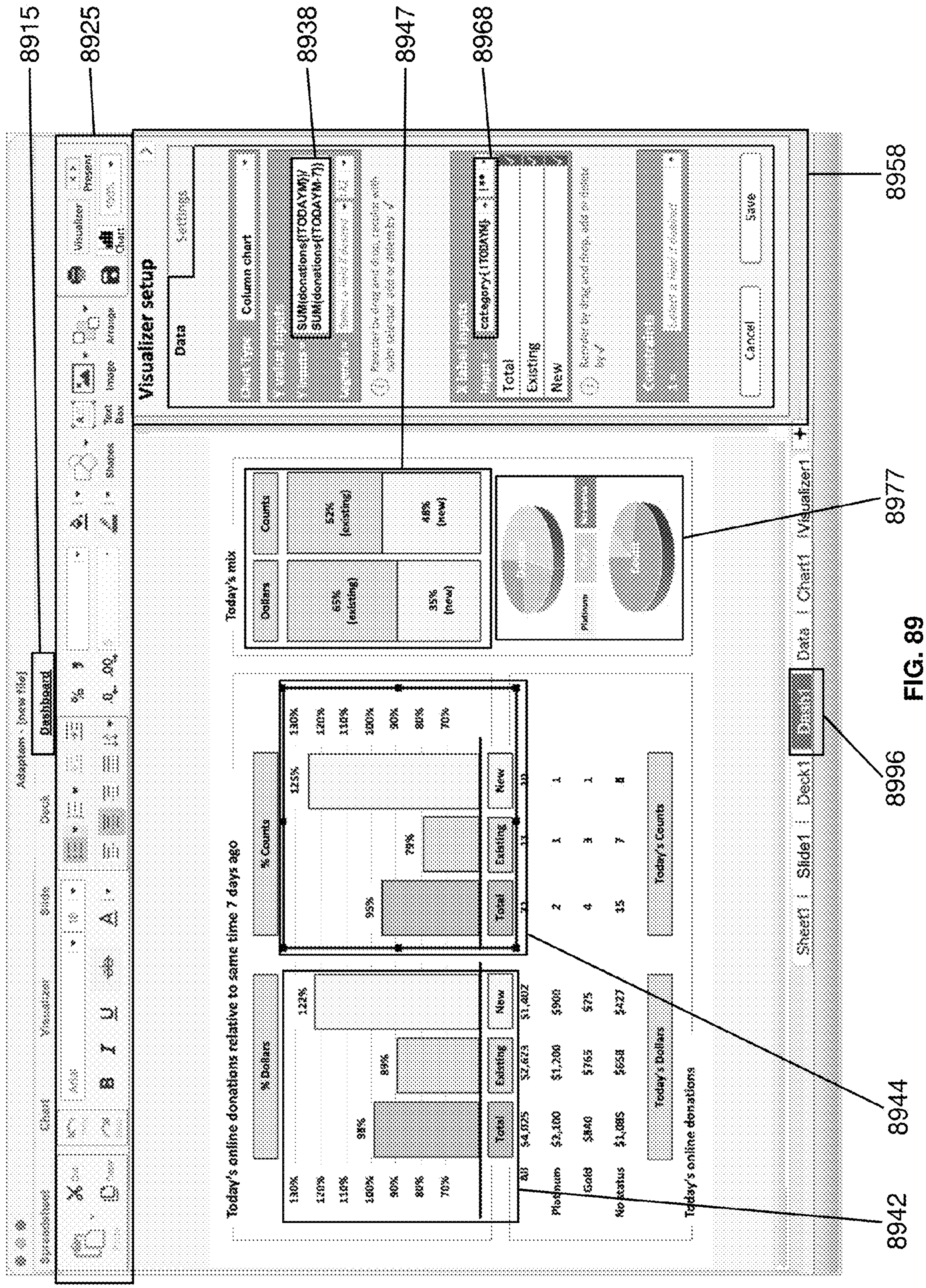

And finally, FIG. 88 through FIG. 90 examples the use of our data visualizer within a spreadsheet dashboard tab. The charity user has used this tab for a presentation of information that updates as the data updates, which in our technology could be real time, every few minutes, every day or less frequent depending upon the data availability and connection. The user has created a page in FIG. 88 that displays today's information for online donations. All of that information requires, at a minimum, summing dollars and counts of donations to the point in time of the day and then some of the charts require comparing values to the same point in time for the day a week ago. Two charts of interest 8843 and 8846 both require doing the point of time summations and then comparisons, one for donation dollars and the other for numbers (counts) of donations. In this embodiment of our technology the dashboard is a tab 'Dash1' 8896 with a dedicated ribbon 8825 for the 'Dashboard' 8815. However, when the user clicks on an embedded chart 8854 our technology opens the UI for that chart, which in this example is the sidebar UI for our data visualizer chart 8958 (shown in FIG. 89). This is a fully functional visualizer chart in this example using a '!TODAYM' data retriever in the chart inputs 8938 and 8968. In our technology, '!TODAYM' retrieves all of a day's data to the time timestamp, thus matching today's donations at any moment of time with last week's same day same time donations. Doing this in a regular spreadsheet would require some form of LOOKUP or other approach to get the data which then would need to counted for each of the cells exampled in FIGS. 90 9038 and 9058 after they were organized by category 9028. Then the count comparison calculations in 9078 would need to be done and finally the chart setup using that input and the category input 9028. In our technology the user sets up the inputs 8938 and 8968 and is done having to do no data manipulation, LOOKUPs, count calculations, formula calculations using the count calculations and data ordering for chart input. Therefore, the user of our technology can quickly setup the four different charts 8942, 8944, 8947 and 8977 in the dashboard in FIG. 89 instead of spending lots of time on four different versions of the preceding spreadsheet actions. Our formulaic data chart visualizer technology removes large amounts of data retrieval, data manipulation, data filtering and data calculations from the creation of charts for all types of spreadsheet supported visual presentations (e.g., in worksheet charts, chart tabs, slides, decks, dashboards and word documents with charts).

The exampled dashboard embodiment employed both ribbon and bottom tab selectors, although other embodiments support using either a ribbon or a bottom tab by themselves or some other UI selector. Similarly, the dashboard embodiment employed a sidebar for the visualizer chart setup although other embodiments in our technology support ribbon, popup, on-chart and other setup UIs. Rather than exampling all these mix and match combinations we will now example how our spreadsheet visualizer technology supports charts created from data from multiple different data sources.

Multiple External Table or In-Cell Data Set Sourced Visualizer Charts

Thus far the embodiments of our technology have created visualizer charts sourced from one external data table or formulaic data from one in-cell data set. However, embodiments of our technology using our formulaic data can generate charts using data from two or more external data tables or two or more in-cell data sets. FIG. 99 through FIG. 104C examples our technology generating data visualizer charts, with the same types of input specifications, using data from two external data tables (although they could have easily been two in-cell data sets). FIG. 105 through FIG. 112D examples our technology generating data visualizer charts from three external data tables, three in-cell data sets or a mixed combination of the external data tables and in-cell data sets.

Two External Table or Two In-Cell Data Set Example

Figure 99:
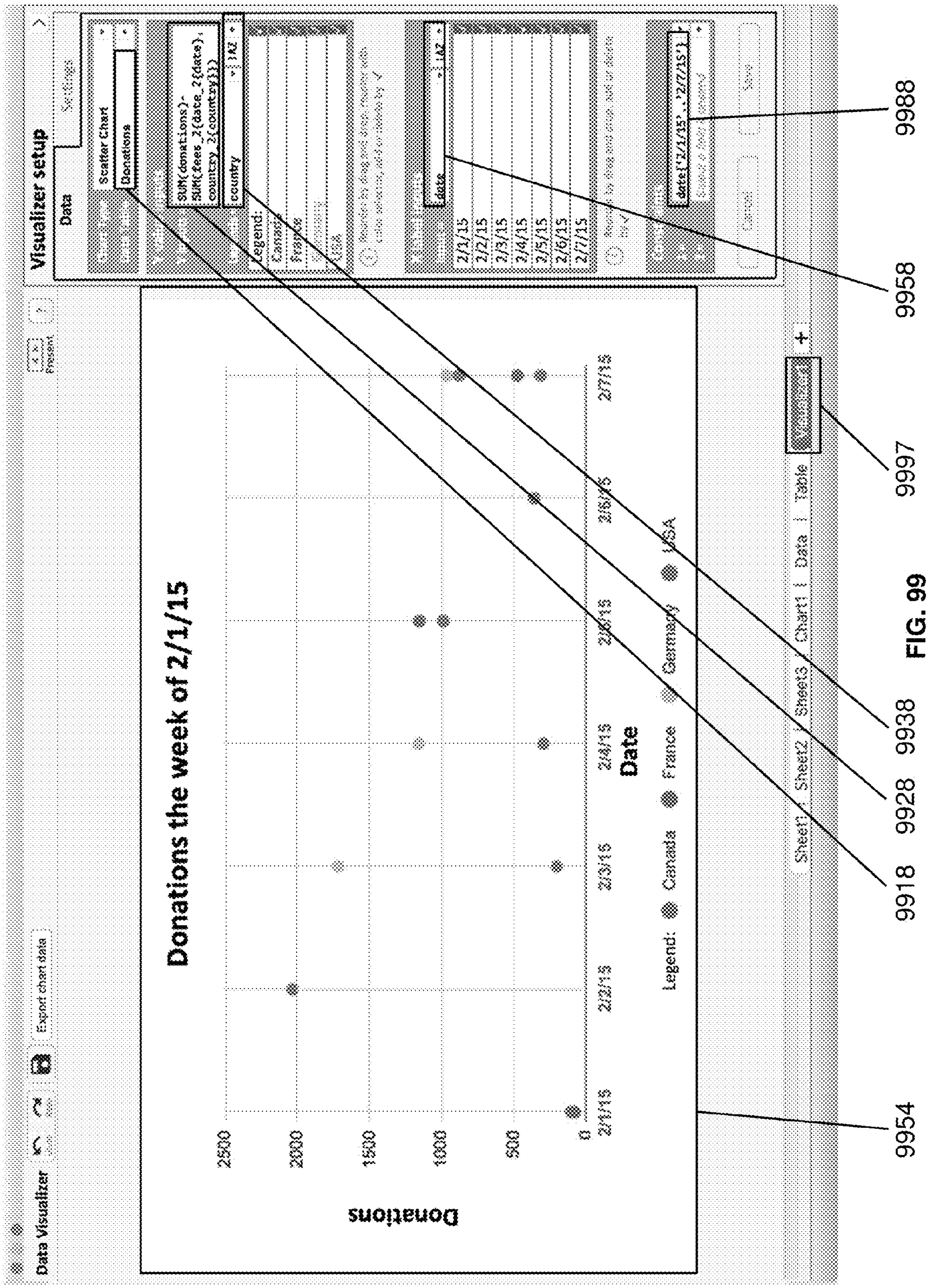

FIG. 99 examples the Visualizer chart setup for a Scatter Chart where this embodiment has a 'Data Table' input where the user has selected or type inputted 'Donations' 9918. The term Table in this embodiment actually covers both external data tables and in-cell data sets which have been setup with our formulaic data. What the 'Data Table' specification 'Donations' 9918 does is tell our technology which table values will be used for the labels/legends and therefore set up the iterative evaluation of the chart values input which in this example is the 'Y inputs' 9928:

SUM(donations)−SUM(fees_2(date_2{date}, country_2{country}})

This range function formula will be evaluated for each labels/legends unique group combination, which in this example is the legend values for the formulaic data field 'country' 9938 and the X axis label values for the formulaic data field 'date' 9958. These values will be constrained (filtered) by the specification of 'date{'Feb. 1, 2015' . . . 'Feb. 7, 2015'} 9988 to generate the visualizer chart 9954 in this example on the 'Visualizer1' tab 9997.

Figure 100:
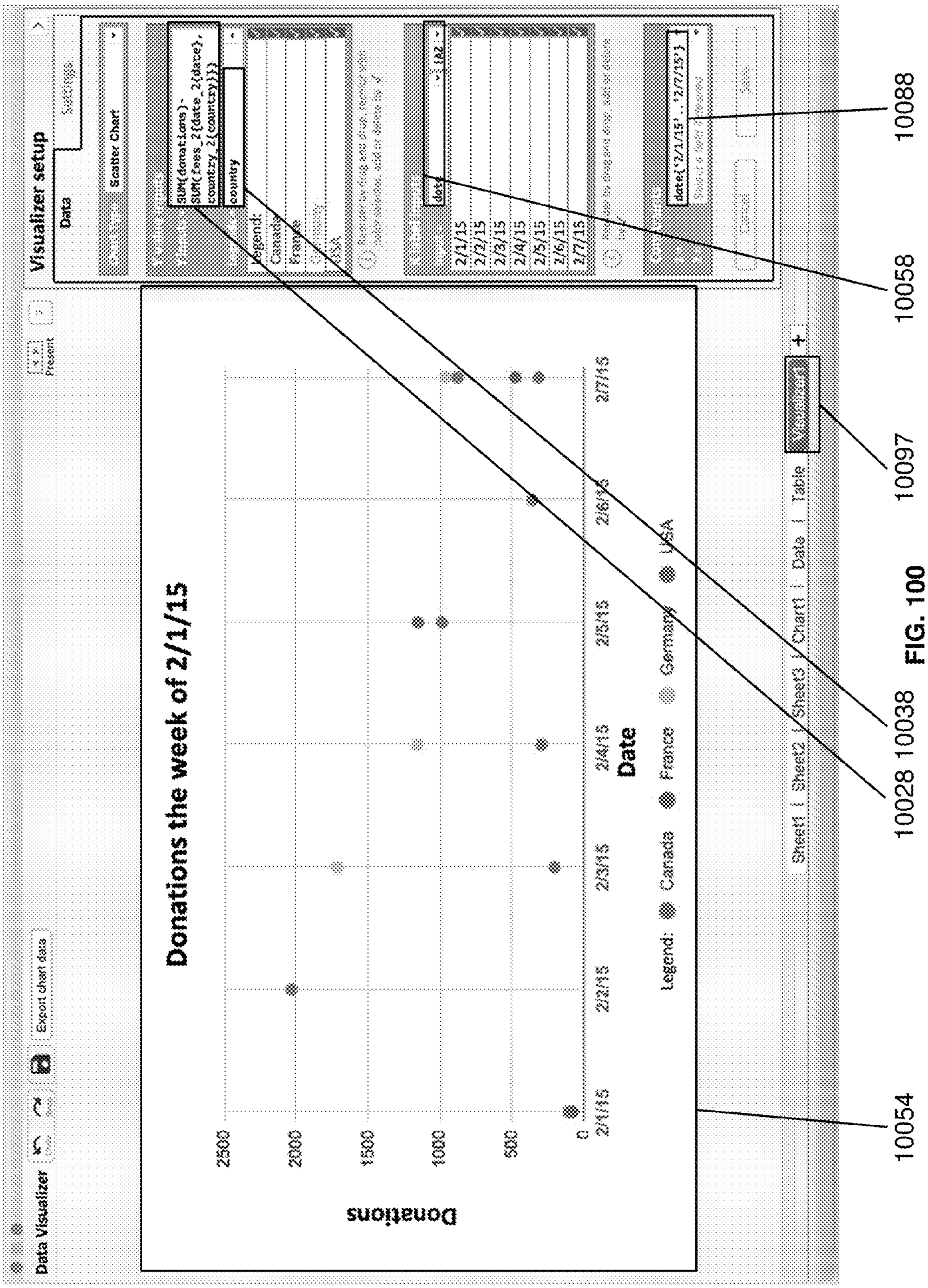

FIG. 100 examples another input embodiment for the same Visualizer Scatter Chart as in FIG. 99. However, the difference is instead of having a 'Data Table' input 9918 as in FIG. 99, the UI in FIG. 100 waits until the user inputs or selects from our HINTs a formulaic data field in a label/legend before deciding the table used for the iterations of the chart value formula or formulaic data field. Thus, the user specification difference in FIG. 100 is it has no 'Data Table' input 9918 but otherwise has all the same inputs (10028=9928, 10038=9938, 10058=9958 and 10088=9988). The chart outcomes 10054 and 9954 are the same. These visualizer charts are taking advantage of the ability of our formulaic data to match data across tables within our formulaic data field formulas.

FIG. 101A through FIG. 104C examples all the steps automatically done by our technology including the matching/usage of data across different external data tables and/or in-cell data sets to generate the visualizer charts 10054 (in FIGS. 100) and 9954 (in FIG. 99).

FIG. 101A and FIG. 101B (steps one and two) retrieve the data from the two different tables. In this example the charity user is doing the donations minus fees calculations for the country and date combinations but the difference is the donations and fees values are in different external data tables or in-cell data sets. So, to do the calculations they need to use data from both tables and match it (which is done by our technology). Step three FIG. 101C illustratively examples the matching of the data for each part of the formula 9928 or 10028:

SUM(donations) done in 10157−SUM(fees_2 (date_2{date},country_2{country}}) done in 10158

This matching works because for each unique labels/legends grouping there is a specified 'date' and 'country' that is then used by 'date_2' and 'country_2' to put the correct value of 'fees_2' into the formula as shown in FIG. 101C 10158. In step four FIG. 102A both tables of data are sorted by date and then country (composite key sort) for the filtering of the data in step five FIG. 102B to eliminate the dates not fulfilling the constraint (filter) 'date{'Feb. 1, 2015' . . . 'Feb. 7, 2015'}' 10227 and 10287. Step six FIG. 103A sets up the SUM iterative calculations by unique labels/legends groupings of date and country values. Step seven FIG. 103B then does the 'SUM(donations)' calculations (as exampled by 10337 summing 10332) and the 'SUM(fees_2 (date_2{date},country_2{country}})' calculations (as exampled by 10339 summing 10335). Step eight FIG. 104A then does the total formula calculation as exampled by 10432 subtracting 10339 from 10337 (both in FIG. 103B). Step nine FIG. 104B two-dimensionally (2D) organizes (reconfigures) the calculated values by their unique labels/legends combinations ready for chart input. Finally step ten FIG. 104C generates the chart 10054 (in FIGS. 100) and 9954 (in FIG. 99). Our technology has automatically eliminated even more user work as in a conventional spreadsheet application they would have had to join the data as they import it into the spreadsheet or do the matching with VLOOPUPs etc. within the spreadsheet. Our technology can support even more different sources of data and more complicated formulas and do it where the user does not have to join the data, manipulate the data, filter the data, do calculations and more as our technology automatically does all those operations for them.

Three External Table, Three In-Cell Data Set or Mixed Combination Example

Figure 105:
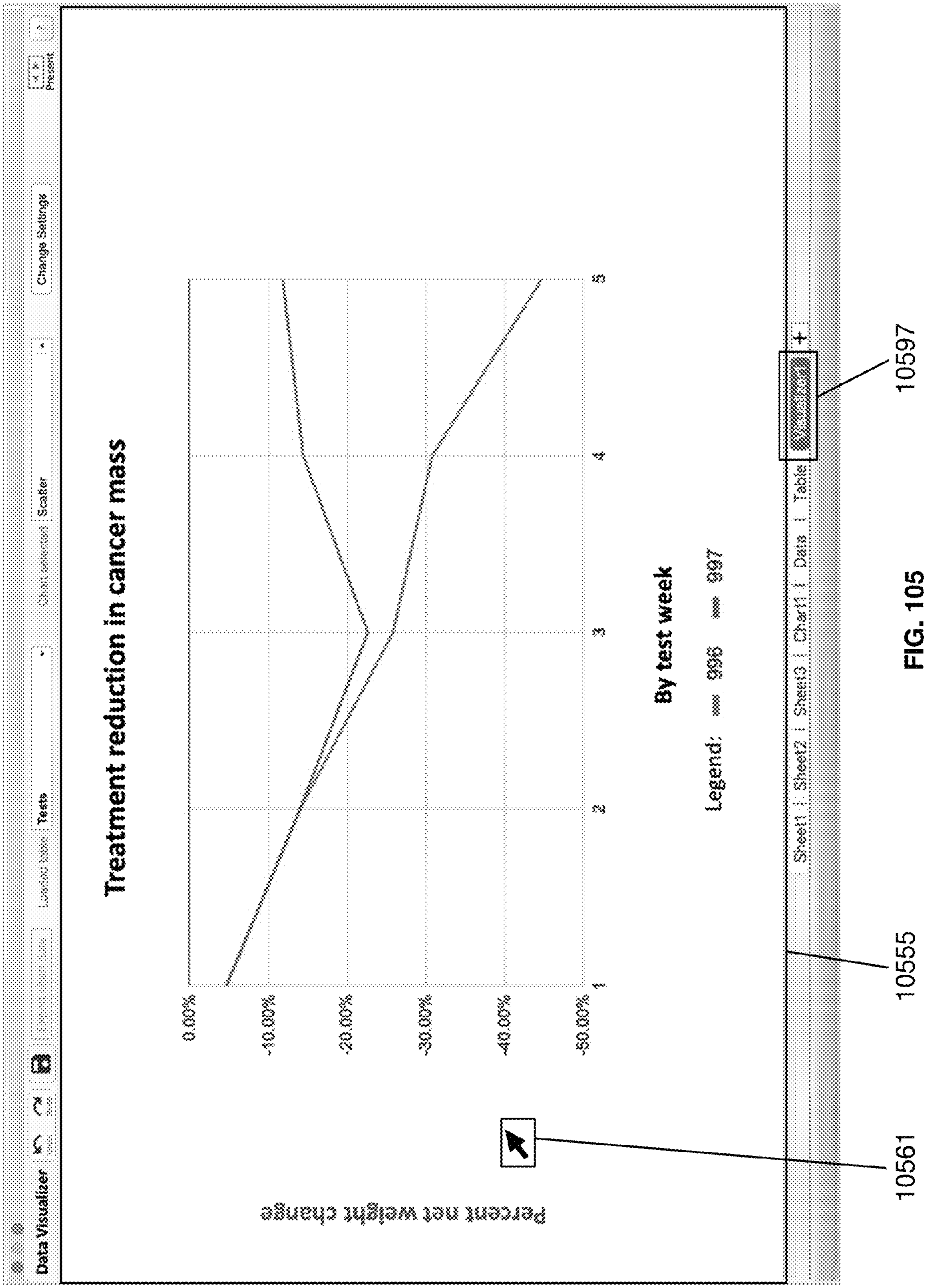

FIG. 105 through FIG. 112D examples our technology generating data visualizer charts from three external data tables, three in-cell data sets or a mixed combination of the external data tables and in-cell data sets for a somewhat complicated algebraic formula. FIG. 105 examples the visualizer chart created by a cancer researcher. That cancer researcher wanted to graph the results of two different sets of in vitro cancer treatment tests done in glass petri dishes with a support medium. They have the data in three different in-cell data sets, three different external data tables or a mix of in-cell data sets and external tables; one holding the 'Test' results, one holding the 'Control' results and one holding the petri 'Dish' weight for each test or control experiment. Our technology does not require the user to join all that data in order to do the sorting, filtering, calculations and other actions required for the chart. Instead, our technology automatically does all the necessary actions to use the data from the separate data sources and do all the data manipulations and calculations to create the chart.

Figure 106:
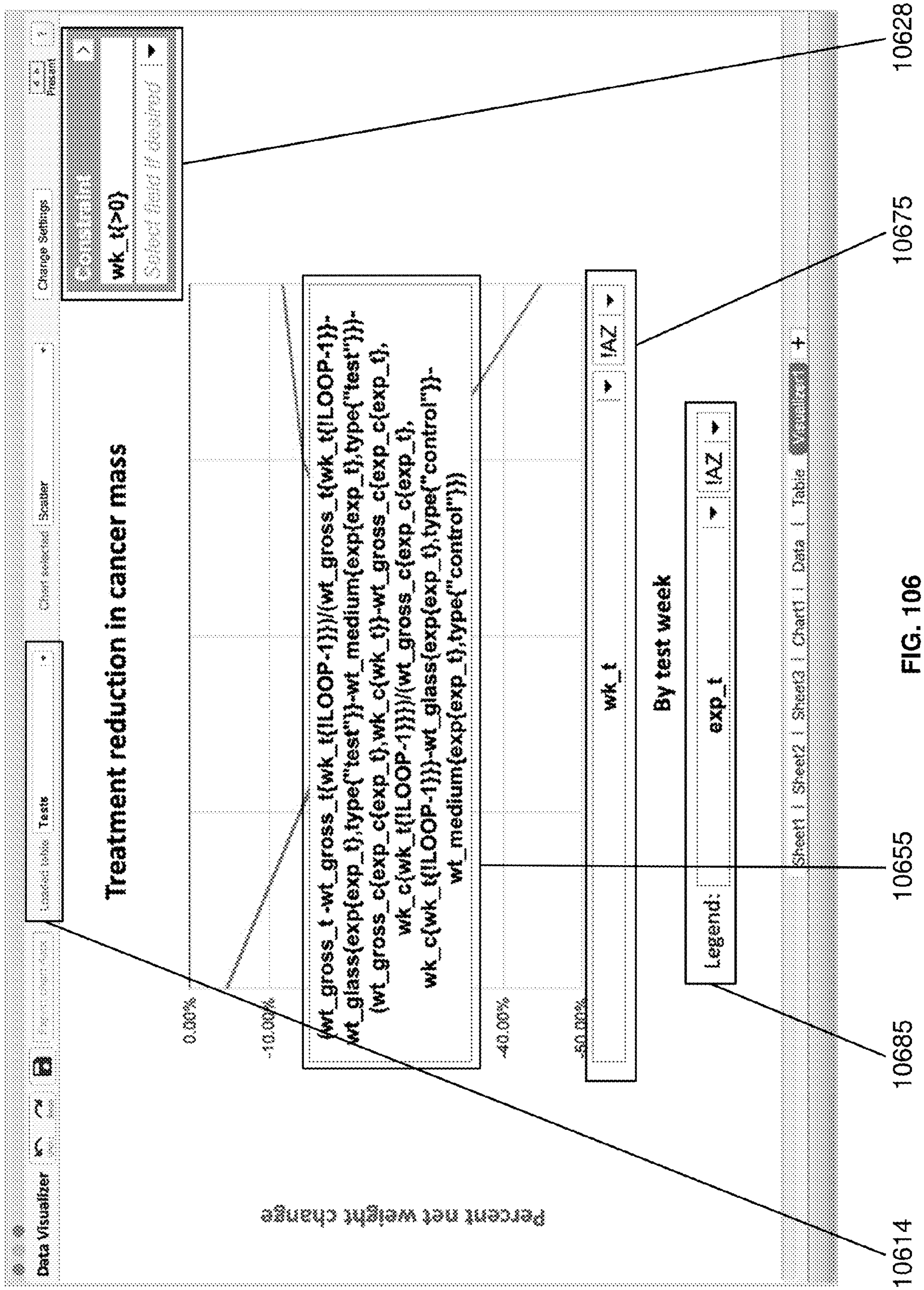

For purpose of exposing the visualizer chart inputs (user specifications) in this example the user clicks 10561 into the chart 10555 (in FIG. 105) which is in the 'Visualizer1' tab opening the user inputs as shown in FIG. 106. This embodiment has the Loaded table input 'Tests' 10614 which tells our application which data source to use for the labels/legends and any constraints. It exposes the algebraic formula 10655. This formula effectively compares the week-by-week percentage growth of the cancerous mass in the test and control for each experimental treatments. It calculates the change in the test cancerous mass minus the change in its control to understand the net impact of the treatment. Thus, telling the researcher how much better the test performs relative to its control. Because the week-by-week test and control weights include the glass petri dish and medium and the user wants the change as a percent of only the cancerous mass, the glass and medium weights must be netted out. Our formulaic data ensures that the data across tables matches correctly by using the loop values of the labels/legends 'wk_t' 10675 and 'exp_t' 10685 matched to their comparable fields 'wk', 'exp' and 'exp_c' in the Control and Dish formulaic data fields in the algebraic formula 10655.

FIG. 107A through FIG. 110C examples all the steps automatically done by our technology including the matching/usage of data across different external data tables and/or in-cell data sets to generate the visualizer chart 10555 (in FIG. 105).

FIG. 107A, FIG. 107B and FIG. 107C (steps one, two and three) retrieve and buffer the data from the three different data sources. Step four FIG. 108A sets up the labels/legends iterative loops so that in this embodiment the constraint (filter) is then applied to those values filtering according to the specification 'wk_t{>0}' 10628 in FIG. 106. Thus, removing 10835 and 10865 in FIG. 108B step five. Step six FIG. 109 then organizes all the data from FIG. 108B into the filtered set of iterative loops. This is a pretty massive task even for the small amount of data in this example given the need to match data across the three data sources. This embodiment also uses the '!LOOP' formulaic retriever disclosed in our previous U.S. application Ser. No. 17/374,901 to get the week earlier data for use in the calculations. Step seven FIG. 110A then does each of the labels/legends combinations iterative calculations using the data in FIG. 109. Step eight FIG. 110B then two-dimensionally organizes (reconfigures) the calculated values ordered by their labels/legends combination values for the chart. Then it formats the values as percentages. Step nine FIG. 110C then generates the chart. Consider all the avoided complexity for the user who had all these actions done automatically by entering the specifications into our chart visualizer UI. They did not need to join data from different data sources and then do all the sorting, filtering, calculating, 2D result ordering and organizing. And think about the scaling of our technology because the user specifications are the same if the data has two experiments or twenty and whether there are five weeks or fifty weeks. Our technology liberates spreadsheet users from large amounts of work creating charts.

Computer System

FIG. 122 is a block diagram of an example computer system, according to one implementation. Computer system 12210 typically includes at least one processor 12214 which communicates with a number of peripheral devices via bus subsystem 12212. These peripheral devices may include a storage subsystem 12224 including, for example, memory devices and a file storage subsystem, user interface input devices 12238, user interface output devices 12220, and a network interface subsystem 12216. The input and output devices allow user interaction with computer system 12210. Network interface subsystem 12216 provides an interface to outside networks, including an interface to communication network, and is coupled via communication network to corresponding interface devices in other computer systems or in the cloud and usable for cloud applications.

User interface input devices 12238 may include a keyboard; pointing devices such as a mouse, trackball, touchpad, or graphics tablet; a scanner; a touch screen incorporated into the display; audio input devices such as voice recognition systems and microphones; and other types of input devices. In general, use of the term "input device" is intended to include all possible types of devices and ways to input information into computer system 12210 or onto communication network.

User interface output devices 12220 may include a display subsystem, a printer, a fax machine, or non-visual displays such as audio output devices. The display subsystem may include a touch screen, a flat-panel device such as a liquid crystal display (LCD), a projection device, a cathode ray tube (CRT), or some other mechanism for creating a visible image. The display subsystem may also provide a non-visual display such as via audio output devices. In general, use of the term "output device" is intended to include all possible types of devices and ways to output information from computer system 12210 to the user or to another machine or computer system.

Storage subsystem 12224 stores programming and data constructs that provide the functionality of some or all of the modules and methods described herein. These software modules are generally executed by processor 12214 alone or in combination with other processors.

Memory 12226 used in the storage subsystem can include a number of memories including a main random-access memory (RAM) 12230 for storage of instructions and data during program execution and a read only memory (ROM) 12232 in which fixed instructions are stored. A file storage subsystem 12228 can provide persistent storage for program and data files, and may include a hard disk drive, a floppy disk drive along with associated removable media, a CD-ROM drive, an optical drive, or removable media cartridges. The modules implementing the functionality of certain implementations may be stored by file storage subsystem 12228 in the storage subsystem 12224, or in other machines accessible by the processor.

Bus subsystem 12212 provides a mechanism for letting the various components and subsystems of computer system 12210 communicate with each other as intended. Although bus subsystem 12212 is shown schematically as a single bus, alternative implementations of the bus subsystem may use multiple busses.

Computer system 12210 can be of varying types including a workstation, server, computing cluster, blade server, server farm, or any other data processing system or computing device. Due to the ever-changing nature of computers and networks, the description of computer system 12210 depicted in FIG. 122 is intended only as one example. Many other configurations of computer system 12210 are possible having more or fewer components than the computer system depicted in FIG. 122.

Some Particular Implementations

Some particular implementations and features are described in the following discussion. The technology disclosed can be practiced as a method, system or computer readable media.

Our chart visualizer module emulates the familiar user experience of creating a spreadsheet chart but does it using external data without instantiating the external data in spreadsheet cells and/or using in-cell data through formulaic data fields where the in-cell data is not ordered as required by the chart. For each of the two different data sources there are three different families of what our data visualizer charts. One that charts labels/legends and data applied to those labels/legends which we reference/tagline as Data. Second, we reference/tagline as Calc that charts labels/legends and algebraic data formulas applied to those labels/legends. Third, we reference/tagline Group that charts labels/legends and predefined spreadsheet range or array function data formulas (which could include algebraic operators) applied to those labels/legends. Then each of the six visualizer combinations, the two different data sources (External and In-cell) for each of the three different what is charted (Data, Calc and Group), is supported in our technology for:

- any applicable chart type (e.g., Pie, Column, Bar or Line), filtering (constraining),
- sorting (e.g., by labels/legends, charted values),
- any UI type (e.g., sidebar, ribbon, popup or on-chart),
- all where-created/where-used bottom tabs, ribbon tabs or other UIs (e.g., spreadsheet, visualizer, slide, deck and/or dashboard), and
- different ways of use (e.g., normal view mode and/or present view mode).

External and Calc Specific Implementations

One set of embodiments combines the externally sourced data and the Calc version of what is charted. We think of the Calc as a family of capabilities because the algebraic formulas span from the very simple, e.g., 'donations-fees' 11338 in FIG. 113, to the very complicated, e.g., 10655 in FIG. 106. One embodiment exampled in FIG. 113 through FIG. 114D and FIG. 67 generates a chart visualization in a spreadsheet using external data without instantiating the data in the spreadsheet cells. It also does not instantiate any of the algebraic calculations and the results of any ordering and reordering specified by the user into spreadsheet cells, instead instantiating the results into the chart. The user specifies the chart type 11328 (in FIG. 113), a first field of labels/legends 11358 and an algebraic formula 'donations-fees' 11338 with at least two data fields (third and fourth fields) from an external data source. In this example the specification of the fields specifies the external data source although it could have been like the example shown in FIG. 67 where the user directly specifies the external data table 'Donations' 6714. Our technology then automatically orders (sorts) the data on the legends/labels 11453 (in FIG. 114B), applies the formula to those groupings (in FIG. 114C) and extracts the labels/legends with those algebraic formula calculated values (in FIG. 114D) to generate the chart visualization 11345 (in FIG. 113). All this is done automatically by our technology from the user inputs without manual data ordering, sorting, and calculation replication steps undertaken by the user.

In another embodiment of the External/Ca/c combination the user specifies an additional (second) labels/legends data field as exampled in FIGS. 106 (10675 and 10685) and FIGS. 67 (6775 and 6785). Thus, the algebraic formula is automatically applied by our technology to the combinations of the two legends/labels field values as illustratively exampled in 108A through FIG. 110A. Then the labels/legends and algebraic formula results are extracted and two-dimensionally organized (reconfigured) as in FIG. 110B for generating the visualizer chart 10555 (in FIG. 105).

Our embodiments accommodate more complicated formulas using additional field inputs (fields five and beyond) used in the algebraic formula as exampled by FIG. 105 through FIG. 110C. Another embodiment allows users to select data from multiple different external data sources. That data can come from a list as exampled in 11938 in FIG. 119 or the external data source is determined by the data field table affinity. These embodiments support using data from multiple different external data tables (e.g., FIG. 107A through FIG. 107C) within the visualizer algebraic formula as exampled in FIG. 105 through FIG. 110C.

As described above, there are many embodiment capabilities that work for all the six combinations of External and In-cell data source with Calc, Data, and Group charting. So rather than go into those now we will layout the embodiment for the other five combinations and then do the embodiments applicable to all six.

External and Data specific Implementations

Another family of embodiments combines the externally sourced data and the Data version of what is charted. One embodiment exampled in FIG. 115 through FIG. 116D and FIG. 68 generates a chart visualization in a spreadsheet using external data without instantiating the data in the spreadsheet cells. It also does not instantiate any of the horizontal and/or vertical sorts of the labels/legends and third field values into spreadsheet cells, instantiating only the end results into the chart. The user specifies the chart type 11528 (in FIG. 115), a first field of labels/legends 11558 and a field 'donations' (third field) 11538 where the field values are sourced from external data. In this example the specification of the fields specifies the external data source although it could have been like the example shown in FIG. 68 where the user directly specifies the external data table 'Global donations' 6828 (as in FIG. 119 where when the user clicks 11929 to open the table specifier they are presented with a list of external tables and/or in-cell data sets 11938 for their selection). Our technology then automatically orders (sorts) the data on the legends/labels values 11657 (in FIG. 116C) and extracts the labels/legends with their matching (third) field values (in FIG. 116D) to generate the chart visualization 11545 (in FIG. 115). All these operations done automatically within our technology without the user bringing the data into spreadsheet cells and then manually sorting the data to put it into the typical spreadsheet chart input layout.

Figure 96:
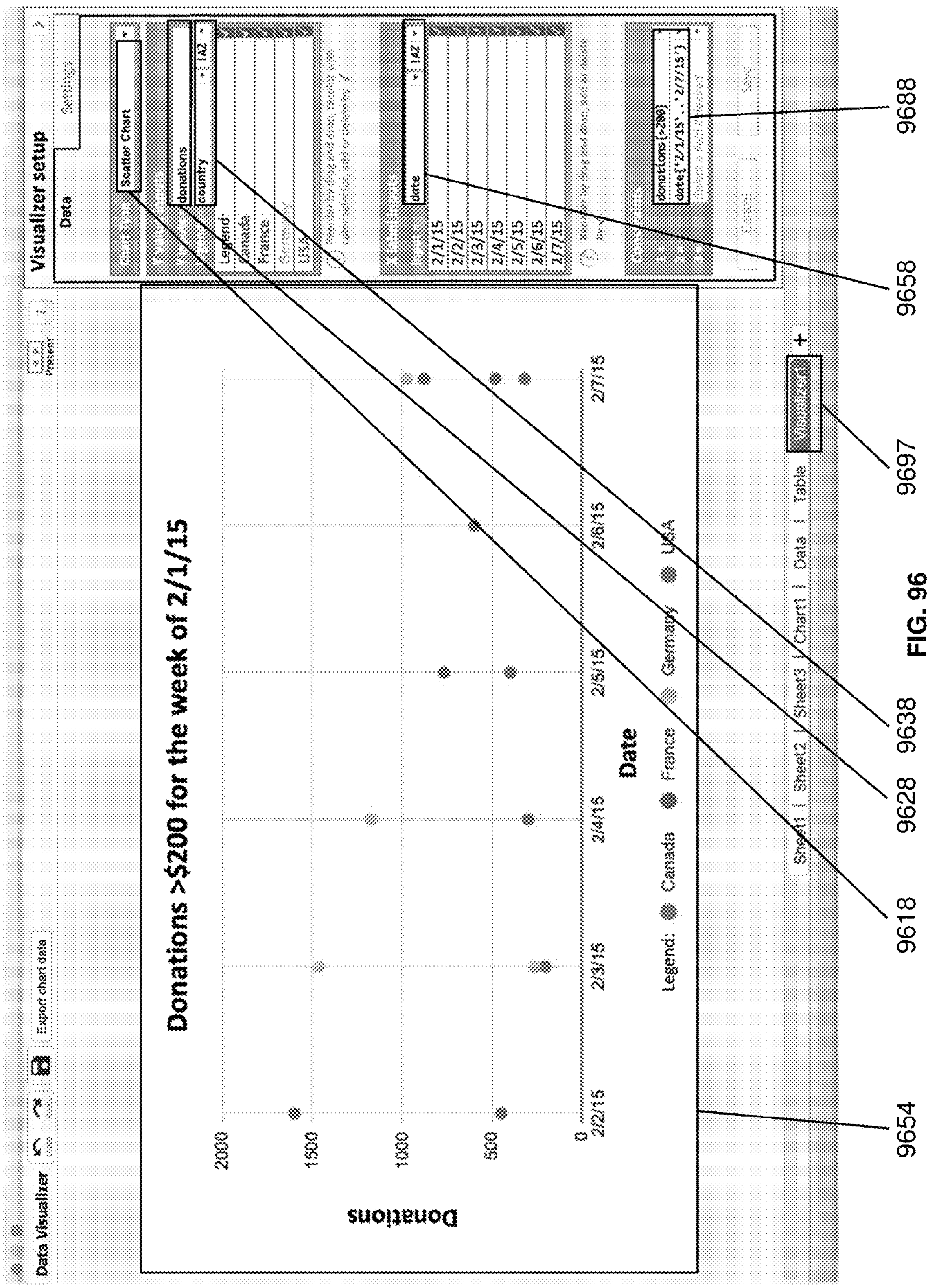

In another embodiment of the External and Data combination the user specifies an additional (second) labels/legends data field as exampled in FIGS. 96 (9638 and 9638). Thus, the third field 9628 is automatically applied by our technology to the combinations of the two legends/labels field values as exampled in FIG. 98A. Then the labels/legends and their matching (third) field values are extracted and two-dimensionally organized (reconfigured) as in FIG. 98C for generating the visualizer chart 9654 (in FIG. 96). Where all the steps automatically executed by our technology as illustratively exampled in FIG. 97A through FIG. 98D.

In another embodiment of the External and Data combination the user changes the chart content by changing field specification as shown in the replacement of 'donations' 11538 (in FIG. 115) by 'fees' 11738 (in FIG. 117) changing the visualizer chart 11545 (in FIGS. 115) to 11745 (in FIG. 117) without the user needing to import the data into cells, sort and manipulate it, and then highlight or type in the exact cell references of the data they want into the chart.

Figure 119:
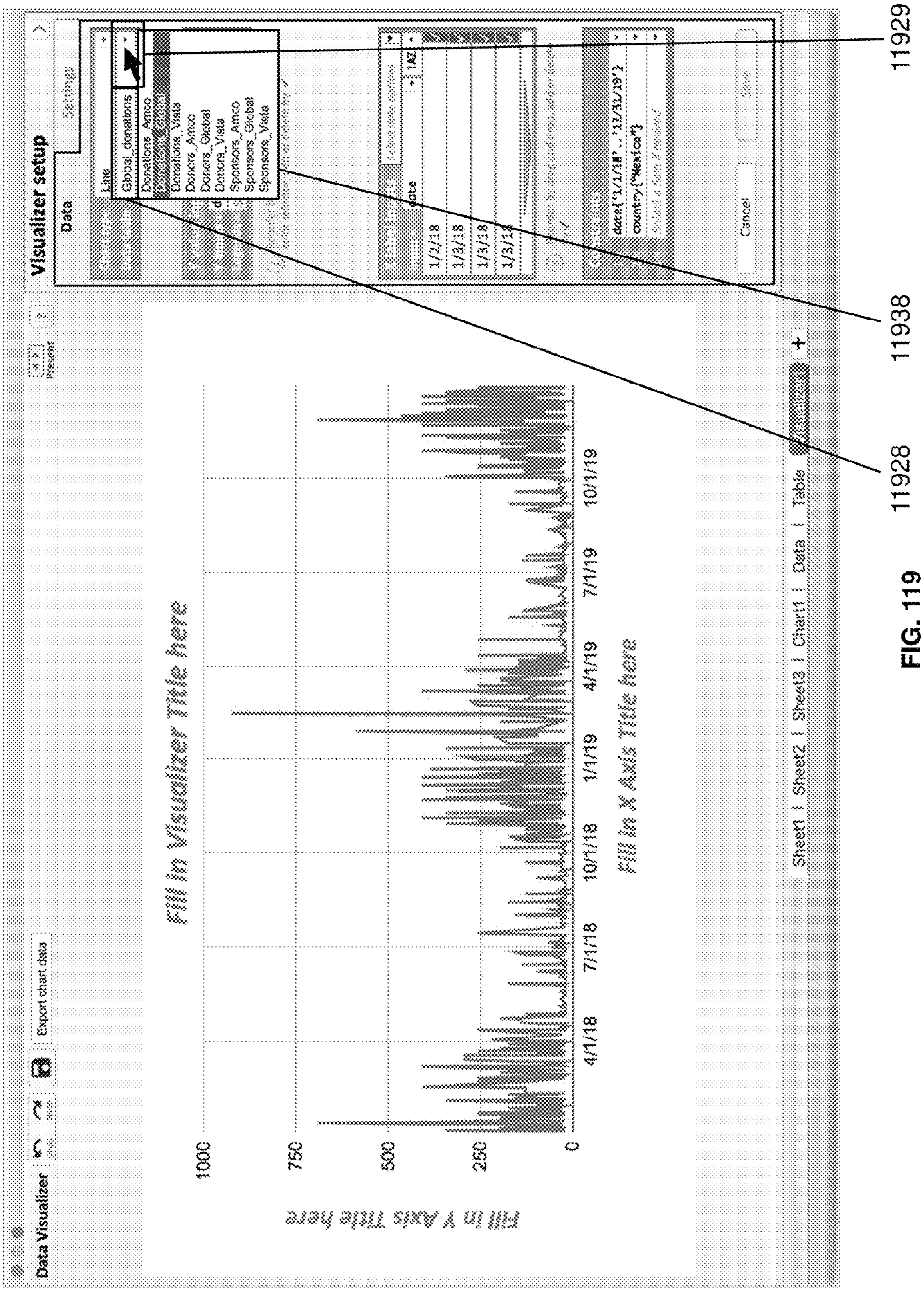
FIG. 119 examples the multiple table selector for specifying the external and/or in-cell data sources.

Another embodiment allows users to select data from multiple different external data sources such as multiple of those listed 11938 in FIG. 119 or the external data source is determined by the data field table affinity of the first labels/legends specified as in FIG. 115. In this situation the third field would be from a different external data set than the first and second field, if there is a second field, and would use the first and second, if there is a second field, as joined/matched inputs to specify the values of the third field used for the chart.

External and Group Specific Implementations

Another family of embodiments combines the externally sourced data and the Group version of what is charted. We think of Group as a family of capabilities because the formulas span from the very simple, e.g., SUM(donations), to the very complicated, e.g., with multiple range functions, regular functions, constants and many data table data sources. One embodiment exampled in FIG. 10 and FIG. 12A through FIG. 13E generates a chart visualization in a spreadsheet using external data without instantiating the data in the spreadsheet cells. It also generates the chart visualization without pre-charting instantiation in spreadsheet cells of any of the data manipulation and grouped calculations. The user specifies the chart type 1028 (in FIG. 10), a first field of labels/legends 1048 and a range or array function with an external data field (third field) 1038 where the data fields used have specified the external data source. Our technology then automatically groups the data on the unique legends/labels first field values 1341 (in FIG. 13A) and extracts those values for the on-the-chart visualization. It also uses those unique legends/labels values as the groupings for evaluating the range or array spreadsheet predefined function formulas (in FIG. 13B) and extracts the unique labels/legends with those formula calculated values (in FIG. 13C) to generate the chart visualization 1046 (in FIG. 10) from the action in FIG. 13E. The specification of the external data source can also be explicit in this embodiment as exampled in FIG. 99 9918. All of this was automatically done without instantiating the data into a range of cells, without the user have to do sorts or other data manipulation, without doing range function calculations, and without doing any other regular spreadsheet chart input preparation. It is further exampled in FIG. 11 and FIG. 14A through FIG. 14G with the grouped calculations automatically done in FIG. 14D.

In another embodiment of the External/Group combination the user specifies an additional (second) labels/legends data field as exampled in FIGS. 49 (4948 and 4968) and FIGS. 99 (9938 and 9958). Thus, the range function formula is automatically applied by our technology to the unique groupings of the combinations of the two legends/labels field values as exampled in 103A through FIG. 104A before being extracted and two-dimensionally organized (reconfigured) as in FIG. 104B for generating the visualizer chart 9954 (in FIG. 99). All the automatically executed steps by our technology to generate that chart are illustratively exampled in FIG. 101A through FIG. 104C.

Our embodiments accommodate more complicated formulas using additional field inputs (four and beyond) as exampled by FIG. 15 through FIG. 17E and FIG. 99 through FIG. 104C. Our embodiments also support use of many different range or array functions within the formula as well as non-range or -array functions, constants and algebraic operators as exampled by FIG. 15 through FIG. 17E. Another embodiment allows users to select data from multiple different external data sources as exampled in 11938 in FIG. 119 or the external data source is determined by the data field table affinity of the first labels/legends specified as in FIG. 10. While an additional embodiment supports data from multiple different external data tables used within the visualizer formula as exampled in FIG. 99 through FIG. 104C. Wherein the data from the different external data sets is automatically joined/match within our technology without the user having to do any such manual data retrieval and joining operations.

There are many embodiment capabilities that work for all the six combinations of External and In-cell data source with Data, Calc and Group charting. So we will layout the other three combinations of Data, Calc and Group charting with in-cell data (described below as clauses) before exampling the embodiments that are applicable to all six families of embodiments of our technology.

In-Cell Specific Implementations

The in-cell formulaic data sourced embodiments of our technology very much parallels the formulaic data versions of the external data embodiments for each of the different chart types—Calc, Data, and Group. Our technology transforms the data into whatever forms required to generate the visualizer chart without the user changing the in-cell source data in any form. In examples where the user has used field names from in-cell headers, like 3532 in FIG. 35, or created field names in the Formulaic data field setup tool, as described in our U.S. Provisional Patent Application, the field names can be indistinguishable between data sourced externally and in-cell sourced data. However, our technology also accommodates using the cell ranges as the formulaic data field names as exampled in FIG. 32 through FIG. 33 and FIG. 111A through FIG. 112D despite the fact that the values used can be ordered very differently than in the cells and not all the values within the cell range are necessarily used. Our technology allows users to take in-cell data not configured for a chart or the desired chart and generate the chart without pre-charting instantiation in the spreadsheet cells of column ordering, data filtering, data sorting (into groups) and group calculation of the in-cell data as required in a conventional spreadsheet (exampled in FIG. 2 through FIG. 4C in Microsoft Excel). It allows users to change charts without changing data source highlighting and then without having to do any cell data reordering, reconfiguring and/or and doing in-cell range or array function calculations as required in a conventional spreadsheet (exampled in FIG. 6A through FIG. 6E in Microsoft Excel).

In-Cell and Calc Specific Implementations

The in-cell sourced data and the Calc version of what is charted family of embodiments therefore parallels our externally sourced family of implementation previously described. Similarly, we think of Calc as a family of capabilities because the formulas span from the very simple, e.g., ‘donations-fees’ 11338 in FIG. 113, to the very complicated, e.g., 10655 in FIG. 106, algebraic formulas. One embodiment exampled in FIG. 113 through FIG. 114D generates a chart visualization in a spreadsheet using in-cell data without horizontally and/or vertically reordering cells and doing in-cell algebraic calculations. The user specifies the chart type 11328 (in FIG. 113), a first field of labels/legends 11358 and an algebraic formula ‘donations-fees’ 11338 with two data fields (third and fourth fields) from an in-cell formulaic data source. Our technology then automatically orders (sorts) the data on the legends/labels 11453 (in FIG. 114B), applies the algebraic formula to those groupings (in FIG. 114C) and extracts the labels/legends with those algebraic formula calculated values (in FIG. 114D) to generate the chart visualization 11345 (in FIG. 113).

In another embodiment of the in-cell and Calc combination the user specifies an additional (second) labels/legends data field as exampled in FIGS. 106 (10675 and 10685) and FIGS. 67 (6775 and 6785). Thus, the algebraic formula is automatically applied by our technology to the combinations of the two legends/labels field (first and second) values as exampled in 108A through FIG. 110A. Then the labels/legends and algebraic formula results are extracted and two-dimensionally organized (reconfigured) as in FIG. 110B for generating the visualizer chart 10555 (in FIG. 105) without horizontally reordering, vertically reordering and/or reconfiguring cells, and doing in-cell algebraic calculations. With all the steps illustratively exampled in FIG. 107A through FIG. 110C being automatically executed by our technology based on the user setup done in FIG. 106.

Our embodiments accommodate more complicated formulas using additional field inputs (fields five and beyond) used in the algebraic formula as exampled by FIG. 105 through FIG. 110C. Another embodiment allows users to select data from multiple different in-cell data sources as exampled in 11938 in FIG. 119 or the in-cell data source is user determined by the data field table affinity of the first label/legend specified as in FIG. 113 11358. The technology disclosed also supports using data from multiple different in-cell data sets within the visualizer algebraic formula as exampled in FIG. 105 through FIG. 110C.

In-Cell and Data Specific Implementations

Another family of embodiments combines the in-cell sourced data and the Data version of what is charted. One embodiment exampled in FIG. 115 through FIG. 116D generates a chart visualization in a spreadsheet using in-cell data without horizontally and/or vertically reordering data cells and instantiating pre-charting any of those reorders in spreadsheet cells or spreadsheet tab content. The user specifies the chart type 11528 (in FIG. 115), a first field of labels/legends 11558 and a (third) field 11538 of formulaic data rather than highlighting or typing the exact cell references to be charted in the order to be charted. Our technology then automatically orders (sorts) the data on the legends/labels 11657 (in FIG. 116C) and extracts the labels/legends with their matching third field values (in FIG. 116D) to generate the chart visualization 11545 (in FIG. 115).

In another embodiment of the In-cell and Data combination the user specifies an additional (second) labels/legends data field as exampled in FIGS. 96 (9638 and 9658). Thus, the third field 9628 is automatically applied by our technology to the combinations of the two legends/labels field values as exampled in FIG. 98A. Then the labels/legends and matching field values are extracted and two-dimensionally reconfigured as in FIG. 98C for generating the visualizer chart 9654 (in FIG. 96). All those steps automatically done by our technology as illustratively exampled in FIG. 97A through FIG. 98D thereby eliminating user manually ordering columns, sorting rows, and filtering data to set up a traditional spreadsheet chart input.

In another embodiment of the in-cell and Data combination the user changes the chart content by changing field specification as shown in the replacement of ‘donations’ 11538 (in FIG. 115) by ‘fees’ 11738 (in FIG. 117) changing the visualizer chart 11545 (in FIGS. 115) to 11745 (in FIG. 117) without the user needing to highlight or type in the exact cell references of the data they want with the data ordered exactly as they want it in the chart.

Another embodiment allows users to select data from multiple different in-cell data sources as those listed in 11938 in FIG. 119 or the in-cell data source is determined by the data field table affinity of the first labels/legends specified as in FIG. 115. In this situation the third field would be from a different in-cell data set than the first and second field, if there is a second field, and would use the first and second, if there is a second field, as joined/matched inputs to specify the values of the third field used for the chart without the use of VLOOKUP or other spreadsheet data matching capabilities.

In-Cell and Group Specific Implementations

We also think of the In-cell and Group as a family of capabilities because the formulas span from the very simple, e.g., SUM(donations), to the very complicated, e.g., with multiple range functions, regular functions, constants and many data table data sources. One embodiment exampled in FIG. 32, FIG. 33 and FIG. 111A through FIG. 112D generates a chart visualization in a spreadsheet of range or array function calculations using in-cell data without reordering cells and doing in-cell range or array function calculations. The user specifies the chart type 3328 (in FIG. 33), a first field of labels/legends 3348 and a range or array function with a (third) data field 3338 where the data fields used have specified the in-cell data source. Our technology then automatically retrieves the desired data, reorders, sorts, and filters it as illustratively exampled in FIG. 111A through FIG. 111C, then automatically groups (sorts) the data on the legends/labels 11241 (in FIG. 112A). applies the range or array function formula to those groupings (in FIG. 112B) and extracts the unique labels/legends with those formula calculated values (in FIG. 112C) to generate the chart visualization 3345 (in FIG. 33) from the final action automatically done in FIG. 112D.

In another embodiment of the External/Group combination the user specifies an additional (second) labels/legends data field as exampled in FIGS. 49 (4948 and 4968 in a situation where in-cell formulaic data is being used). Thus, the range or array function formula is automatically applied by our technology to the unique groupings of the combinations of the two legends/labels field values as exampled in 103A through FIG. 104A before being extracted and two-dimensionally organized (reconfigured) as in FIG. 104B for generating the visualizer chart 10054 (in FIG. 100). FIG. 101A through FIG. 104C illustratively examples the full set of steps automatically done by our technology requiring only the user inputs in FIG. 100.

Our embodiments accommodate more complicated formula using additional field inputs (four and beyond) used in the formula as previously exampled by FIG. 15 through FIG. 17E and FIG. 99 through FIG. 104C. Another embodiment allows users to select data from multiple different external data sources as exampled in 11938 in FIG. 119 or the in-cell data source is determined by the data field table affinity of the first labels/legends specified as in FIG. 100. Our embodiment also support use of many different range or array functions within the formula as well as non-range or -array functions, constants and algebraic operators as previously exampled by FIG. 15 through FIG. 17E.

Another embodiment allows users to select data from multiple different in-cell data sources such as those in the list 11938 in FIG. 119 or the in-cell data source is determined by the data field table affinity of the first labels/legends specified as in FIG. 33. Another embodiment using our formulaic data supports data from multiple different in-cell data sets used within the visualizer formula as previously exampled in FIG. 99 through FIG. 104C and exampled for in-cell data sets in FIG. 107A through FIG. 107C. Our technology also supports automatically using data across multiple data sets from both in-cell and external tables together.

All Six Implementations

All six of the families of embodiments previously described each share the following set of dependent features which also fall into some sets of related capabilities. For conciseness, combinations of features are not enumerated, even though virtually all of the following features can be combined in numerous possible combinations. The first of those sets which has many permutations is, where embodiments of our technology give users a default mode and many options that they can apply to the visualized chart. For, example any one of the applicable options could be the default mode (situationally specific) and so there are many sets of permutations which we will not attempt to example.

Sorting (Ordering) Implementations

Figure 28:
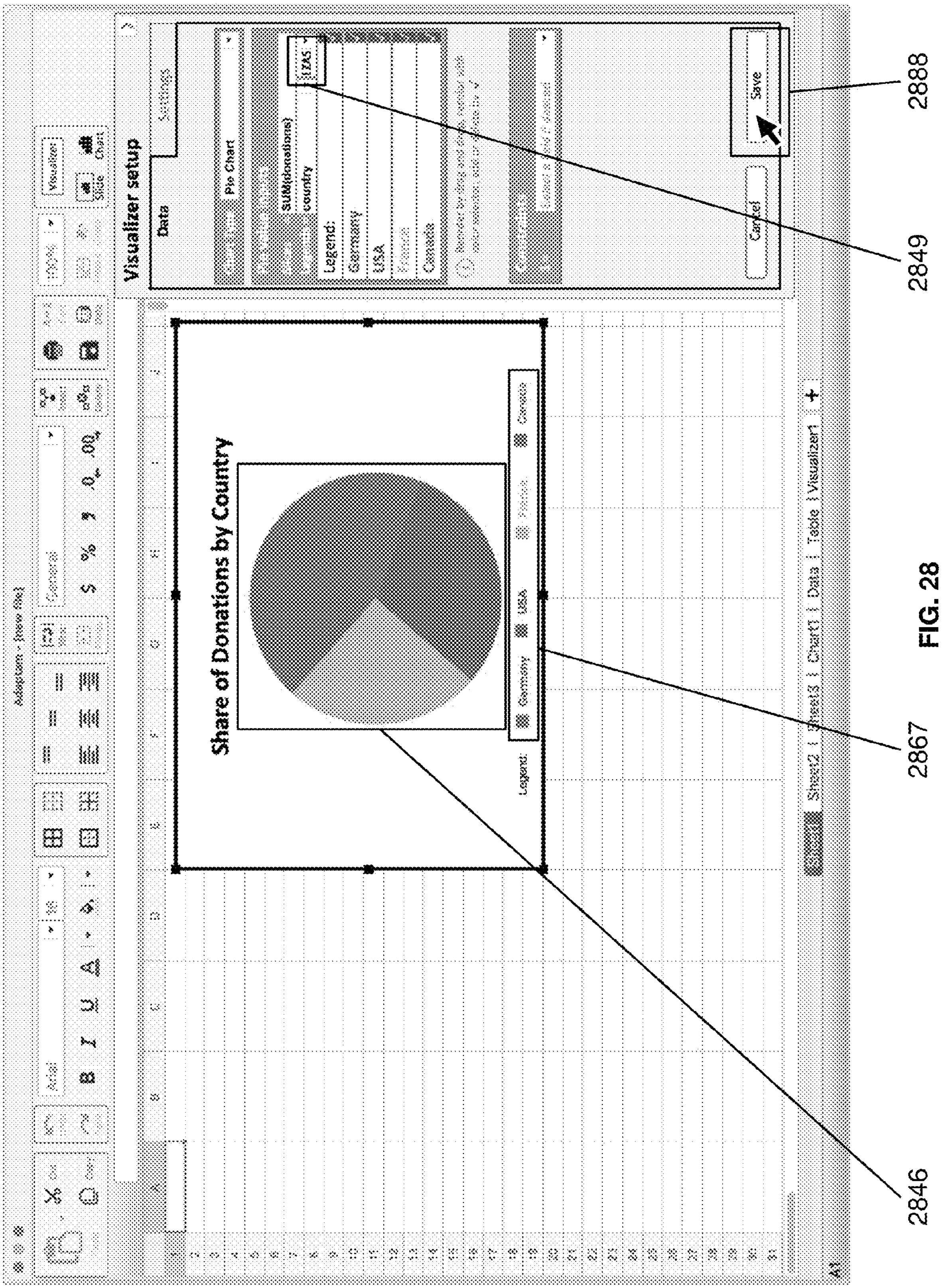

An embodiment to our technology does not require users to specify a sort for the visualized data by having a default sort (order). That default sort is frequently exampled as Ascending ordering by the labels/legends (e.g., 2459 in FIG. 24, 11359 in FIGS. 113, and 11559 in FIG. 115). However, it could easily be any of the sorts (orderings) exampled or others that users might prefer. In our embodiments users are given the option to specify the sort of their choice for the legends/labels and the data or formula results as exampled in 1049 in FIG. 10, 1559 in FIGS. 15 and 2757 in FIG. 27. Our technology accommodates simple key or composite key sorting (ordering) of the data or formula results. Simple key sorting is exampled in the third field values range formula values (slice values) sorted by the legend values in 2849 in FIG. 28 showing the before and after impact in FIG. 29A and FIG. 29B. It is also exampled in 1558/1559 in FIG. 15 exampling a column chart with only 'X axis label inputs' and no 'Legend' inputs. The single results sort (ordering) can be by the values of the label/legend, the values of the third field, the values of the third field range or array formula, or the values of the third field and further fields formula (e.g., Calc or Group). Our technology also supports custom sorts as exampled in FIG. 89 with a simple key manual custom sort indicated by the '!' sort indicator 8968**.

In visualized charts with two legends/labels field inputs our technology supports both labels/legends field inputs having user specifiable sorts, and thereby doing composite key sorting. This is exampled by the two dropdown selectors '!AZ' 4948 and 4968 in FIG. 49 which have other sort selection options, where those options can include but not be limited to descending legend/label values, ascending or descending data or formula values (e.g., SUM(donations) in this example) for selected values of the other legend/labels (e.g., 'In person', 'Mail' or 'Online' for the 'region' selections 4968). The two sort selectors creating a composite key sort is also exampled in FIGS. 92 9248 and 9268, FIGS. 96 9638 and 9658, FIGS. 99 9938 and 9958 and FIGS. 67 6775 and 6785.

In another embodiment of our technology the user ordering is done by drag and drop of the label/legend on chart elements or their sidebar, popup or other UI proxies as exampled in FIG. 70A through FIG. 72D. Our technology supports these actions done on charts with a single label/legend or two labels/legends.

Constraints (Filters) Implementations

An embodiment of our technology allows users to alter visualizer charts by constraining (filtering) the values through a constraint (filter) user specification as exampled in FIG. 10 1078 and FIG. 12C for externally sourced data and FIG. 32, FIG. 33 3378 and FIG. 111C for in-cell sourced data. Other examples are shown in FIG. 15 1588, FIG. 45 4574, FIG. 49 4988, FIG. 60 6028, FIG. 68 6888 and FIG. 92 9288. The constraint can be specified by the user many different ways and our technology allows users to very quickly and easily change visualizer chart outputs without having to do any in-cell sorting, filtering and altering of formula calculations.

In another more specialized embodiment of our technology the user specified constraint(s) applies only to the labels/legends, not limiting the data available to the third and beyond fields charted as data values (third field) or used in formulas (algebraic and/or range or array function formulas) as exampled in FIG. 106 10628 and FIG. 108B. This allows users to write more complicated formulas using unconstrained (unfiltered) data and in the Data variants to loop offset the data (e.g., show the value for the previous week instead of the value for the week used as a label/legend).

In another embodiment of our technology specialized date constraints are supported which go beyond filtering (constraining) by dates to the types of dates—meaning different days of weeks. As exampled in FIG. 69, limiting the dates shown to particular days of the week (e.g., Mondays) or to types of days of the week (e.g., weekdays or weekends). This capability could then be expanded to other types of days like holidays, first day of the month or last seven days of quarter to name just a few.

Another embodiment of our technology allows users to remove a specific value of a label/legend from the visualized chart by clicking on that value or one of its control proxies as shown in FIG. 73 through FIG. 77D. User can then add back any removed values by re-clicking one of its control proxies. Again, this makes it very easy for users to alter the chart without touching the underlying data feeding the chart.

Chart Location Implementations

Our technology supports creating or transferring data visualized charts into many different types of spreadsheet bottom or ribbon tabs, tabs that range from the typical spreadsheet worksheet to a tab that contains a full presentation deck (e.g., similar to Microsoft PowerPoint of Google Slides).

One embodiment of our technology generates a data visualizer chart in a spreadsheet worksheet bottom tab as exampled in FIG. 18 through FIG. 37, and FIG. 80. Our technology also supports the transfer of a data visualized chart to another tab as exampled in the 'Move to tab' button 8028 in FIG. 80 which allows a user to move the selected chart to any tab (bottom or ribbon) of their choice including many different types of tabs.

Another embodiment supports generating the data visualizer chart in a tab dedicated to visualizer charts as exampled in FIG. 49 through FIG. 62, and FIG. 96 through FIG. 112D. These tabs in our examples started with a default name of 'Visualizer1' exampled in 4993 in FIG. 49. However, they could have had any starting name and of course can be renamed to any not already used bottom tab name by the user. These visualizer charts also could have been created in a visualizer ribbon tab, such as 3912 in FIG. 39 which displays all the bottom tabs, displays only bottom tabs with visualizer charts, displays only visualizer dedicated bottom tabs, or displays some other UI with or without bottom tabs for locating all or subsets of the visualizer charts within the instance of the application.

Another embodiment supports generating, receiving and/or modifying a data visualizer chart in a slide dedicated bottom tab as exampled in FIG. 81 and FIG. 82. The visualizer charts can be used side-by-side with regular data generated charts in a slide tab as exampled in FIG. 81, FIG. 82 and FIG. 83. These visualizer charts also could have been created in a slide ribbon tab, such as 3913 in FIG. 39 which displays all the bottom tabs, displays only bottom tabs with visualizer charts, displays only slide dedicated bottom tabs, or displays some other UI with or without bottom tabs for locating all or subsets of the visualizer charts within the instance of the application. Note, slide is a descriptive term we have used in these embodiments but of course it could otherwise named.

A further embodiment of our technology supports multiple slides housed within a UI which we have called a deck tab (of course it could be named anything but use deck because it is a common term for multiple slides) as exampled in FIG. 86. FIG. 86 is a bottom tab only deck tab while FIG. 120 is a combination ribbon and bottom tab deck tab and FIG. 121 is a ribbon tab only deck tab. Our implementations support these and other deck UI tab versions with our spreadsheet technology. As previously exampled the slides within the deck may contain more than one data visualizer charts within a single slide and can support side-by-side use of data visualizer charts with regular spreadsheet chart.

An embodiment of our technology supports any one of these presentation-oriented tabs, e.g., visualizer, chart, slide, deck, and dashboard to be put into page presentation mode as exampled in FIG. 84, FIG. 87 and FIG. 85A through FIG. 85G.

Another embodiment of your technology supports generating, receiving and/or modifying a data visualizer chart in a spreadsheet dashboard dedicated tab as exampled in FIG. 88 through FIG. 90. It also supports the co-existence of our regular charts and data visualizer charts in dashboards that use our formulaic data to update near real-time or at whatever update timing of the formulaic data. These visualizer charts also could have been created in a dashboard ribbon tab without bottom tabs or a bottom ribbon tab without ribbon tabs, as exampled for other tab types in this filing.

Chart Generation Implementations

Our technology supports setting up the data visualizer chart using any of the UI types used in conventional spreadsheet chart creation, e.g., the popups, ribbons and menus used by Microsoft Excel and the ribbon and sidebar used by Google Sheets. It also supports improvements on those UIs disclosed in our U.S. application Ser. No. 17/384,404. Our embodiments support sidebar user inputs as exampled in FIG. 10, FIG. 15, FIG. 19 through FIG. 29B, FIG. 33, FIG. 36, FIG. 49, FIG. 82, and FIG. 86.

Another embodiment supports ribbon and popup user inputs as exampled in FIG. 38 through FIG. 47. And another embodiment supports visualizer user inputs done on-chart as exampled in FIG. 54 through FIG. 67. Embodiments of our technology with all types of user input benefit from usage of HINT technology disclosed in our U.S. Provisional Patent Application No. 63/192,475 and exampled in FIG. 21, FIG. 22, FIG. 34, FIG. 50, FIG. 55 and FIG. 56.

While the technology disclosed is disclosed by reference to the embodiments and examples detailed above, it is to be understood that these examples are intended in an illustrative rather than in a limiting sense. It is contemplated that modifications and combinations will readily occur to those skilled in the art, which modifications and combinations will be within the spirit of the innovation and the scope of the following clauses and claims.

CLAUSES

Further to the Particular Implementations, the technology disclosed is exampled in the following clauses.

1. A method of generating a chart visualization in a spreadsheet of in-cell data requiring calculations without horizontally and/or vertically reordering cells and doing in-cell algebraic calculations, including:

a chart visualization module receiving a user specification of
a chart type,
a source of the in-cell data,
at least a first field of labels/legends from the in-cell data,
at a third and fourth field from the in-cell data, and
an algebraic formula that uses at least the third field and fourth field;

reordering the in-cell data in a buffer based on the labels/legends in the first field and using the labels/legends for on-the-chart visualization without horizontally and/or vertically reordering of the cells that hold the in-cell data; and generating the chart visualization with the labels/legends, with the algebraic formula using the third and fourth fields applied to each of the labels/legends from the first field, without horizontally and/or vertically reordering cells holding data for the third and fourth fields.

2. The method of clause 1, further including:

receiving a user specification of a second field of labels/legends from the in-cell data;

ordering the in-cell data based on combinations of the labels/legends of the first and second fields and using the labels/legends for on-the-chart visualization generating the chart visualization with the labels/legends, with the algebraic formula using the third and fourth fields applied to each labels/legends from the first and second fields, without horizontally reordering, vertically reordering and/or reconfiguring cells, and doing in-cell algebraic calculations.

3. The method of clause 1, wherein a fifth or more fields are used in the algebraic formula.

4. The method of clause 1, wherein the user can select to visualize data from multiple different in-cell formulaic data sets.

5. The method of clause 4, wherein one or more fields within the algebraic formulas automatically joins data from two or more in-cell tables.

6. A method of generating a chart visualization in a spreadsheet of in-cell data without horizontally and/or vertically reordering cells, including:

a chart visualization module receiving a user specification of a chart type, a source of the in-cell data, at least a first field of labels/legends from the in-cell data, and a third field from the in-cell data;

ordering the in-cell data based on the labels/legends in the first field and using the labels/legends for on-the-chart visualization; and generating the chart visualization with the labels/legends, with the data from the third field applied to each labels/legends from the first field, without horizontally and/or vertically reordering cells.

7. The method of clause 6, further including:

receiving a user specification of a second field of labels/legends from the in-cell data;

ordering the in-cell data based on combinations of the labels/legends of the first and second fields and using the labels/legends for on-the-chart visualization; and generating the chart visualization with the labels/legends applied to the third field, without horizontally reordering cells, vertically reordering cells and/or reconfiguring cells.

8. The method of clause 6, wherein chart content is changed by changing a field specification.

9. The method of clause 6, wherein the user can select to visualize data from multiple different in-cell formulaic data sets.

10. A method of generating chart visualizations in a spreadsheet of in-cell data without reordering cells and without instantiation in spreadsheet cells, prior to charting, of grouped calculations of the in-cell data, including:

a chart visualization module receiving a user specification of a chart type, a source of the in-cell data, at least a first field of labels/legends from the in-cell data, a third field from the in-cell data, and a range or array spreadsheet predefined function formula that uses the third field and is applied with grouping according to the labels/legends;

grouping the in-cell data based on unique labels/legends in the first field and extracting unique labels/legends from the first field for on-the-chart visualization generating the chart visualization with the extracted unique labels/legends, with the formula applied to the grouping of the in-cell data based on the unique labels/legends from the first field, without reordering cells and without instantiation in spreadsheet cells, prior to charting, of results from applying the formula.

11. The method of clause 10, further including reordering the in-cell data into groups in a buffer distinct from any of the cells in the spreadsheet.

12. The method of clause 10, further including receiving a user specification of a second field of labels/legends from the in-cell data;

grouping the in-cell data based on unique labels/legends of the first and second fields and extracting unique labels/legends from the first and second fields for on-the-chart visualization; and generating the chart visualization with the extracted unique labels/legends, with the formula applied to the grouping of the in-cell data based on combinations of the unique labels/legends in the first and second fields, without reordering cells, reconfiguring cells and doing in-cell range or array function calculations.

13. The method of clause 10, further including receiving a user specification of a fourth field from the in-cell data and a range or array spreadsheet predefined function used in the formula that uses the fourth field and is applied with grouping according to the labels/legends.

14. The method of clause 13, further including receiving user specification of additional fields from the in-cell data and range or array or non-range and array functions used in the formula that uses those additional field and is applied with grouping according to the labels/legends.

15. The method of clause 10, wherein the user can select to visualize data from multiple different in-cell formulaic data sets.

16. The method of clause 15, wherein one or more range or array formulas automatically joins data from two or more in-cell formulaic data sets.

17. The method of clauses 1, 6, and 10, wherein the ordering (sorting) of the labels/legends and formula results (third field values) is set by application default.

18. The method of clauses 1, 6, and 10, wherein the ordering (sorting) of the labels/legends and data or formula results (third field values or formulas using the third field) is set by user specification.

19. The method of clause 1, 6, and 10, wherein the user specification ordering is a simple key of the formula (third field) values or the formula (third field) values for a specified labels/legends value.

20. The method of clause 1, 6, and 10, wherein the user specification ordering is a composite key of the formula (third field) values for specified labels/legends values.

21. The method of clause 18, wherein the user specification ordering is by drag and drop of the label/legend on-chart elements or their proxies (e.g., in sidebar or popups).

22. The method of clauses 1, 6, and 10, further including receiving a user specification of a constraint on the external or in-cell data used when generating the chart visualization.

23. The method of clause 22, wherein the constraint specified applies only to the labels/legends.

24. The method of clause 22, wherein the constraint specified limits dates by day of week (e.g., Mondays, Tuesdays, Weekends or Weekdays).
25. The method of clauses 1, 6, and 10, wherein a label/legend and its associated chart value(s) can be removed or added back by user click of label/legend on-chart or proxy controls.
26. The method of clauses 1, 6, and 10, wherein the visualized chart is generated in a spreadsheet worksheet tab.
27. The method of clauses 1, 6, and 10, wherein the visualized chart is generated in a spreadsheet visualizer dedicated tab.
28. The method of clauses 1, 6, and 10, wherein the visualized chart is generated in a spreadsheet slide dedicated tab.
29. The method of clauses 1, 6, and 10, wherein the visualized chart is generated in a spreadsheet deck dedicated tab.
30. The method of clauses 1, 6, and 10, wherein the visualizer chart is used in a page present mode.
31. The method of clauses 1, 6, and 10, wherein the visualizer chart is generated in a spreadsheet dashboard dedicated tab.
32. The method of clauses 1, 6, and 10, wherein visualizer chart inputs are in chart sidebar.
33. The method of clauses 1, 6, and 10, wherein visualizer chart inputs are in a chart popup.
34. The method of clauses 1, 6, and 10, wherein visualizer chart inputs are on-chart.
35. The method of clauses 1, 6, and 10, further including hint technology to support the specification of the formulaic data and formulas.

I claim as follows:

1. A method of generating a chart visualization, in a single spreadsheet-plus-visualization application that includes spreadsheet cells, spreadsheet predefined functions usable in the spreadsheet cells, and visualization capabilities for charting of non-spreadsheet cell external data, including:

a chart visualization module of the single spreadsheet-plus-visualization application:
- receiving user specifications of
  - a chart type,
  - a source of the external data,
  - at least a first field of the external data holding values of labels,
  - at least a second field, different from the first field, of the external data holding values of legends, wherein each value of legends accounts for a respective label of the labels,
  - at least a third and fourth field of numeric values from the external data, wherein the third and fourth fields are distinct columns of data,
  - at least a first and a second spreadsheet predefined function and
  - an algebraic formula that connects at least the first spreadsheet predefined function employing at least the third field in one of its arguments by an algebraic operator to at least the second predefined function employing at least the fourth field in one of its arguments;
- ordering, in response to receiving the user specifications, the external data based on combinations of the labels of the first field and the legends of the second field and using the labels and the legends for the chart visualization; and
- generating, based on the ordering, the chart visualization with the labels and legends in the single spreadsheet-plus-visualization application, with the algebraic formula using the first and second spreadsheet predefined functions and the third and fourth fields applied to values grouped by the combinations of labels from the first field and legends from the second field, without instantiating the external data and without instantiating chart plot points into any range of the spreadsheet cells.

2. The method of claim 1, further including receiving a user specification of a third spreadsheet predefined function and a fifth field of numeric values from the external data, wherein the algebraic formula further uses the third spreadsheet predefined function employing at least the fifth field as one of its arguments and at least one additional algebraic operator to connect the first and second spreadsheet predefined functions and third, fourth and fifth fields applied to values grouped by the combinations of labels from the first field and legends from the second field.

3. The method of claim 1, wherein the first, third and fourth data fields include data fields from multiple different external data tables.

4. The method of claim 3, wherein one or more fields within the algebraic formula automatically joins data from two or more external tables.

5. The method of claim 1, further including receiving a user specification of a constraint on the external data used when generating the chart visualization.

6. The method of claim 1, wherein a label first field value(s) and its associated chart value(s) can be removed or added back by user click of label first field value(s) on-chart or proxy controls.

7. The method of claim 1, wherein the chart visualization is generated in a spreadsheet worksheet tab.

8. The method of claim 1, wherein the chart visualization is generated in a spreadsheet visualizer dedicated tab.

9. The method of claim 1, wherein the chart visualization is generated in a spreadsheet slide dedicated tab.

10. The method of claim 1, wherein the chart visualization is generated in a spreadsheet deck dedicated tab.

11. The method of claim 1, wherein visualizer chart inputs are in a spreadsheet sidebar.

12. The method of claim 1, wherein visualizer chart inputs are in a spreadsheet popup.

13. The method of claim 1, wherein visualizer chart inputs are on-chart.

14. The method of claim 1, further including hint technology to support the user specifications of the first, third, and fourth fields of the external data and the algebraic formula.

* * * * *